US009931681B2

(12) United States Patent
Costa

(10) Patent No.: US 9,931,681 B2
(45) Date of Patent: Apr. 3, 2018

(54) MULTI-STYLUS ORBITAL ENGRAVING TOOL

(71) Applicant: Larry J. Costa, Mooresville, NC (US)

(72) Inventor: Larry J. Costa, Mooresville, NC (US)

( * ) Notice: Subject to any disclaimer, the term of this patent is extended or adjusted under 35 U.S.C. 154(b) by 356 days.

(21) Appl. No.: 14/875,239

(22) Filed: Oct. 5, 2015

(65) Prior Publication Data

US 2016/0098030 A1 Apr. 7, 2016

Related U.S. Application Data

(60) Provisional application No. 62/059,692, filed on Oct. 3, 2014.

(51) Int. Cl.
*G05B 19/00* (2006.01)
*G05B 19/18* (2006.01)
(Continued)

(52) U.S. Cl.
CPC ............ *B21C 51/005* (2013.01); *G03B 11/06* (2013.01); *G03B 17/561* (2013.01); *G05B 19/00* (2013.01);
(Continued)

(58) Field of Classification Search
None
See application file for complete search history.

(56) References Cited

U.S. PATENT DOCUMENTS 3,122,376 A * 2/1964 Atherholt, Sr. ....... B23B 31/305
277/644
4,317,287 A * 3/1982 Sausele ..................... G09F 3/00
33/24.1
(Continued)

FOREIGN PATENT DOCUMENTS

EP 0296723 A2 12/1988
EP 2296102 A1 3/2011
(Continued)

OTHER PUBLICATIONS

Notification of Transmittal of the International Search Report and the Written Opinion of the International Searching Authority, or the Declaration, issued by the Korean Intellectual Property Office for PCT/US2015/054036 dated Dec. 7, 2015, 12 pages.
(Continued)

*Primary Examiner* — Isaac T Tecklu
(74) *Attorney, Agent, or Firm* — Perkins Coie LLP

(57) ABSTRACT

A selectable symbol engraving tool for use with a CNC machine. The engraving tool includes a housing and an array of styluses supported in the housing. A pattern disk is rotatably supported in the housing and is connectable to a spindle of the CNC machine. The pattern disk includes a plurality of hole patterns, each selectable via rotation of the spindle and including one or more clearance holes corresponding to a symbol. The array of styluses is positioned to confront a selected one of the plurality of hole patterns such that styluses corresponding to the clearance holes are refracted and the remaining styluses are extended. The extended styluses are operative to engrave the symbol corresponding to the selected hole pattern in a work piece via orbiting about a virtual axis of rotation when the selectable character engraving tool is moved in a circular motion by the CNC machine.

13 Claims, 162 Drawing Sheets

(X+ Iso. View)
Typical Horizontal Machine Tool for the
Selectable Character Multiple Stylus Orbital Engraving Tool

(51) Int. Cl.

| | |
|---|---|
| ***B21C 51/00*** | (2006.01) |
| ***G05B 19/401*** | (2006.01) |
| ***G03B 11/06*** | (2006.01) |
| ***G03B 17/56*** | (2006.01) |
| ***G06K 7/10*** | (2006.01) |

(52) U.S. Cl.

CPC ......... *G05B 19/182* (2013.01); *G05B 19/401* (2013.01); *G06K 7/10564* (2013.01); *G06K 7/10881* (2013.01); *G05B 2219/37555* (2013.01); *G05B 2219/45212* (2013.01); *G05B 2219/50042* (2013.01)

(56) References Cited

U.S. PATENT DOCUMENTS

| | | | | | |
|---|---|---|---|---|---|
| 4,687,390 | A * | 8/1987 | Samis | B23Q 35/20 | 33/24.2 |
| 4,752,166 | A * | 6/1988 | Lehmkuhl | G01B 5/012 | 33/504 |
| 4,834,595 | A * | 5/1989 | Cacciotti | B44B 3/009 | 409/80 |
| 5,339,188 | A * | 8/1994 | Fritzel | G02B 26/10 | 250/236 |
| 5,731,881 | A * | 3/1998 | Buechler | B06B 1/08 | 310/26 |
| 5,775,215 | A * | 7/1998 | Hirate | G01D 9/40 | 101/35 |
| 6,059,702 | A * | 5/2000 | Winkler | B23Q 3/157 | 408/56 |
| 6,099,177 | A * | 8/2000 | Ito | B44B 5/0019 | 101/3.1 |
| 6,533,181 | B1 * | 3/2003 | Roxby | G06K 1/121 | 235/462.01 |
| 6,802,128 | B1 * | 10/2004 | Yang | B44B 3/001 | 33/18.1 |
| 7,093,368 | B1 * | 8/2006 | Nelson | B44B 3/063 | 33/18.1 |
| 7,143,489 | B1 * | 12/2006 | Giebmanns | B23P 15/32 | 29/38 A |
| 7,191,529 | B2 * | 3/2007 | Phipps | B44B 3/009 | 101/3.1 |
| 7,270,277 | B1 | 9/2007 | Koziol | | |
| 7,423,734 | B1 * | 9/2008 | Luik | B23B 31/00 | 356/141.1 |
| 7,866,641 | B1 * | 1/2011 | Switzer | B23B 31/16291 | 269/20 |
| 8,096,736 | B2 * | 1/2012 | Migliore | B23B 29/0345 | 408/161 |
| 8,953,034 | B1 * | 2/2015 | Milosevic | B23Q 17/2409 | 348/92 |
| 9,573,181 | B2 | 2/2017 | Costa | | |
| 2002/0002885 | A1 * | 1/2002 | Luik | B23B 31/00 | 82/118 |
| 2004/0022430 | A1 * | 2/2004 | Franssen | B21B 38/00 | 382/152 |
| 2005/0079812 | A1 * | 4/2005 | Bechtold | B24B 13/01 | 451/504 |
| 2006/0174531 | A1 * | 8/2006 | Lizotte | F41A 21/12 | 42/1.01 |
| 2007/0128739 | A1 * | 6/2007 | Wilson | B23H 9/00 | 438/14 |
| 2008/0061473 | A1 * | 3/2008 | Laracey | B44B 5/00 | 264/293 |
| 2009/0263199 | A1 * | 10/2009 | Wang | B23Q 15/22 | 408/16 |
| 2010/0028097 | A1 * | 2/2010 | Luepke | B23B 31/083 | 408/180 |
| 2010/0051683 | A1 * | 3/2010 | Kudo | G06K 1/02 | 235/375 |
| 2010/0096460 | A1 * | 4/2010 | Carlson | G06K 7/0004 | 235/462.07 |
| 2012/0321401 | A1 * | 12/2012 | Johnson | B23B 31/083 | 408/18 |
| 2012/0325781 | A1 * | 12/2012 | Gneiting | B23K 37/00 | 219/78.01 |
| 2014/0134932 | A1 * | 5/2014 | Nusslein | B24B 29/00 | 451/446 |
| 2015/0073584 | A1 * | 3/2015 | Goodale | G05B 19/4097 | 700/186 |
| 2015/0094844 | A1 * | 4/2015 | Kim | G05B 19/401 | 700/160 |
| 2015/0172520 | A1 * | 6/2015 | Lindman | H04N 5/2252 | 382/190 |
| 2015/0185592 | A1 * | 7/2015 | Eineren | G03B 17/02 | 348/375 |
| 2016/0097967 | A1 * | 4/2016 | Costa | B21O 51/005 | 235/462.01 |
| 2016/0219192 | A1 * | 7/2016 | Rosenberry et al. | H04N 5/2251 | |

FOREIGN PATENT DOCUMENTS

| | | | |
|---|---|---|---|
| JP | 2000153698 | A | 6/2000 |
| JP | 2002263976 | A | 9/2002 |
| JP | 2002347394 | A | 12/2002 |
| JP | 2008269219 | A | 11/2008 |
| JP | 2009196003 | A | 9/2009 |

OTHER PUBLICATIONS

Notification of Transmittal of the International Search Report and the Written Opinion of the International Searching Authority, or the Declaration, issued by the Korean Intellectual Property Office for PCT/US2015/054041 dated Dec. 23, 2015, 11 pages.

Notification of Transmittal of the International Search Report and the Written Opinion of the International Searching Authority, or the Declaration, issued by the Korean Intellectual Property Office for PCT/US2015/054044 dated Jan. 18, 2016, 14 pages.

U.S. Appl. No. 14/875,284, filed on Oct. 5, 2015, titled "Method and Apparatus for Encoding Data on a Work Piece".

U.S. Appl. No. 14/875,317, filed on Oct. 5, 2015, now U.S. Appl. No. 9,573,181, titled "Spindle Mountable Camera System".

U.S. Appl. No. 15/435,855, filed on Feb. 17, 2017, titled "Harsh Environment Vision Camera System".

U.S. Appl. No. 15/480,594, filed Apr. 6, 2017, titled "Controlled Camera Off-Axis Alignment for the Dynamic Bore-Surface-Structure Inspections Via Rotational/Orbital/Rotational Orbiting Angular Off-Axis Controlled Vision Camera Systems and Their Corresponding Optical Positional/Angular Alignment Datum".

Wordupmag. "3-axis Synchronous Belt Drive Carbon Fiber Camera Mount with GS-9257MG Servos" YourTube (https//www.youtub.com/watch?v=jCeMGGZ17Pk>), Apr. 12, 2013.

Notification of Transmittal of the International Search Report and Written Opinion of the International Searching Authority, or the Declaration, issued by the Korean Intellectual Property Office for PCT/US2017/026460 dated Aug. 11, 2017, 9 pages.

* cited by examiner

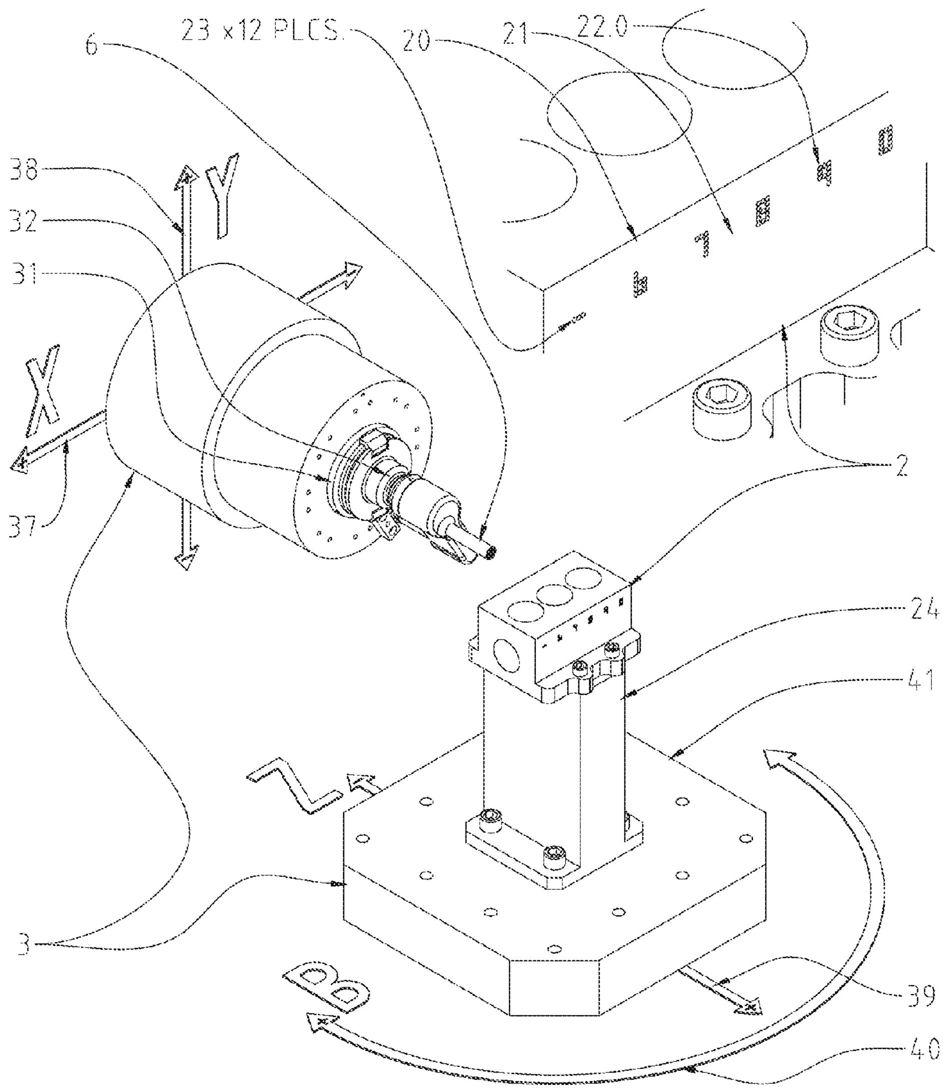
FIGURE 1 (X+ Iso. View)
Typical Horizontal Machine Tool for the
Selectable Character Multiple Stylus Orbital Engraving Tool

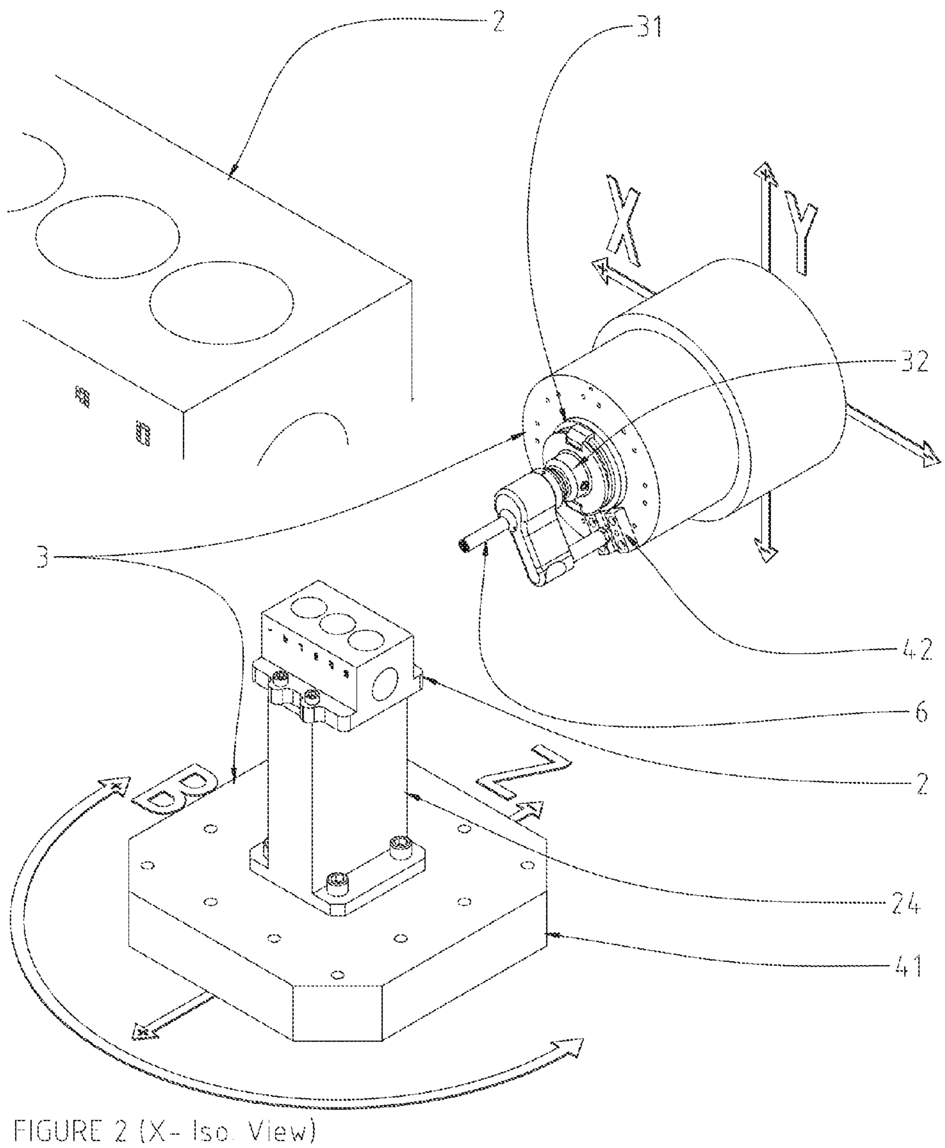
FIGURE 2 (X- Iso. View)
Typical Horizontal Machine Tool for the
Selectable Character Multiple Stylus Orbital Engraving Tool

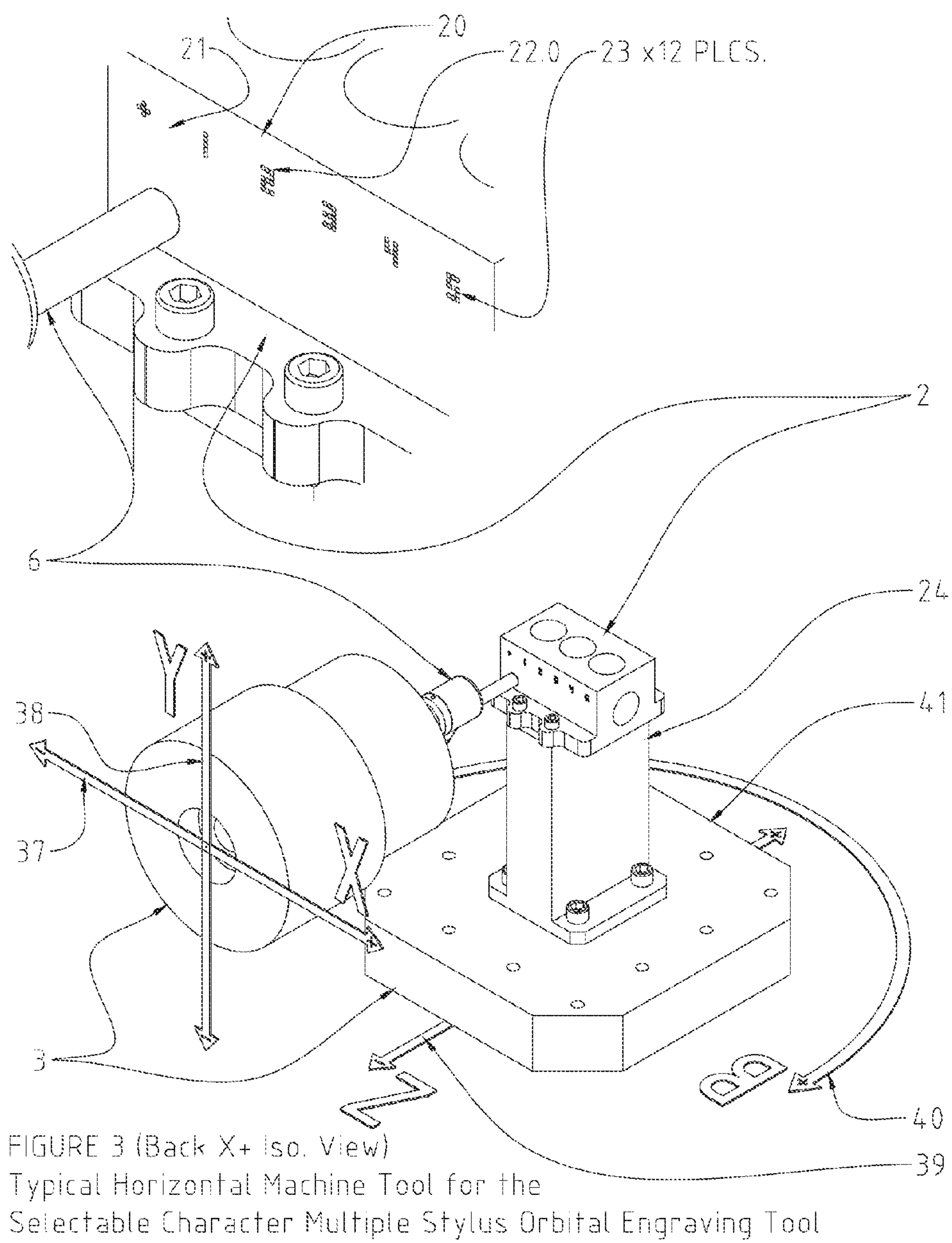
FIGURE 3 (Back X+ Iso. View)
Typical Horizontal Machine Tool for the
Selectable Character Multiple Stylus Orbital Engraving Tool

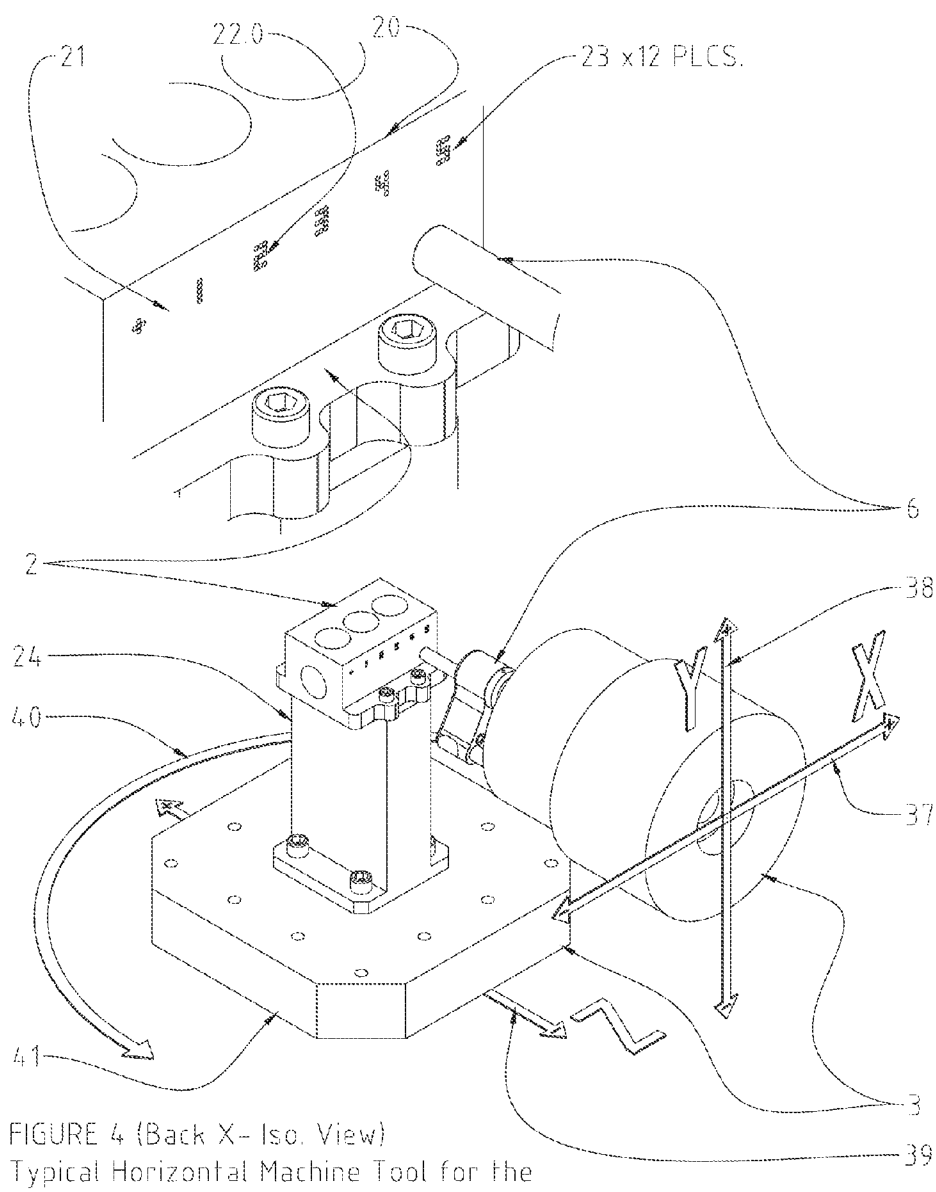
FIGURE 4 (Back X- Iso. View)
Typical Horizontal Machine Tool for the
Selectable Character Multiple Stylus Orbital Engraving Tool

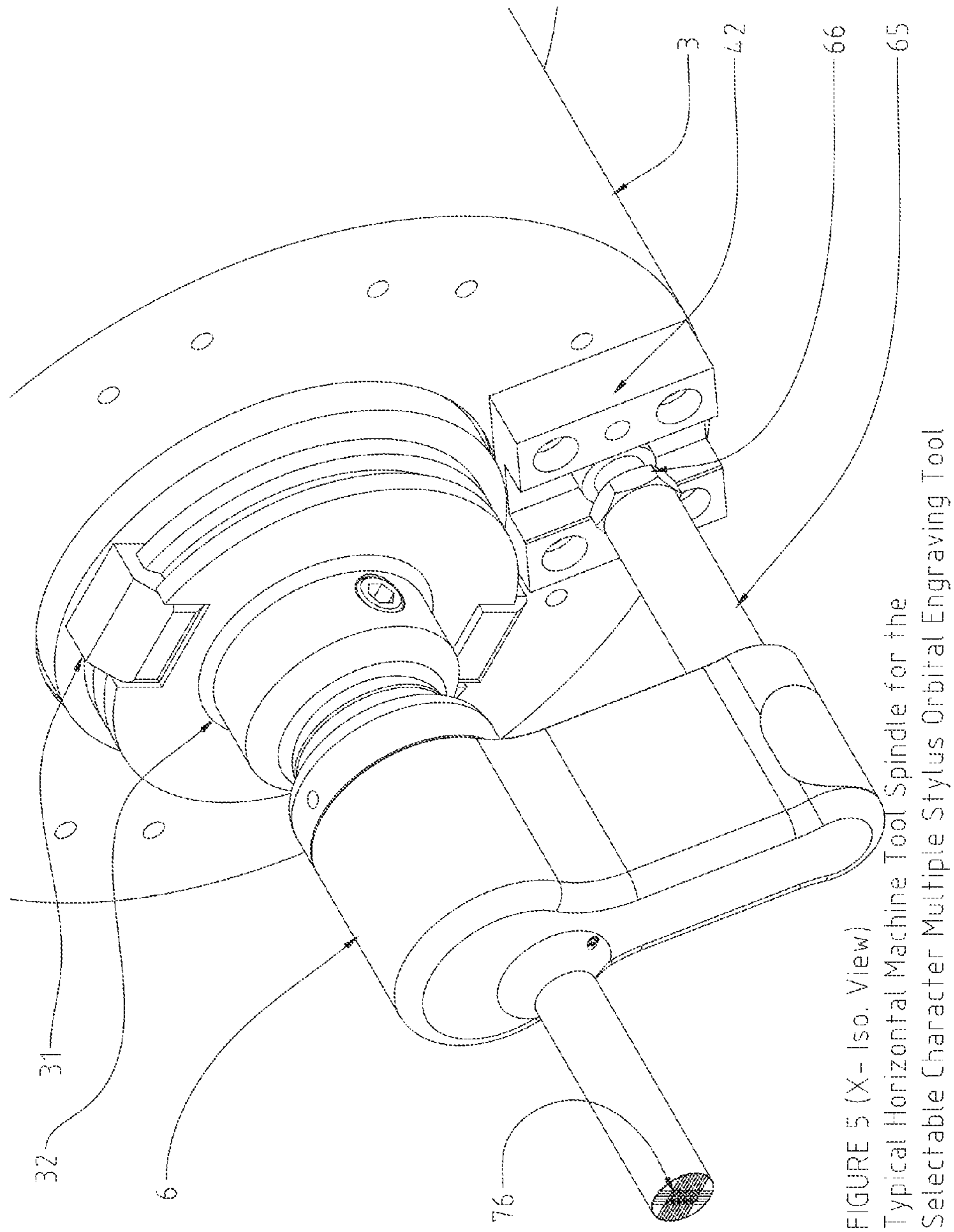
FIGURE 5 (X- Iso. View)
Typical Horizontal Machine Tool Spindle for the Selectable Character Multiple Stylus Orbital Engraving Tool

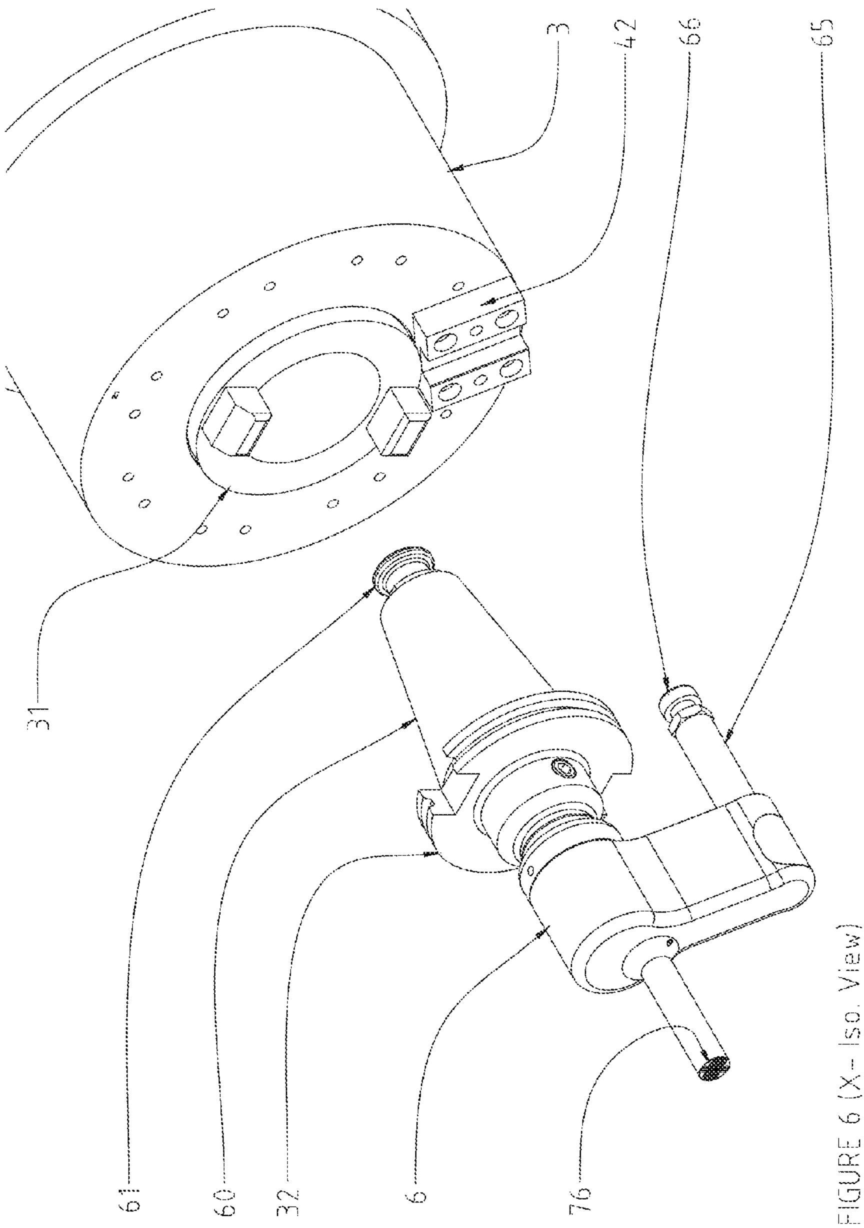
FIGURE 6 (X– Iso. View)
Typical Horizontal Machine Tool Spindle for the Interchangeable
Selectable Character Multiple Stylus Orbital Engraving Tool

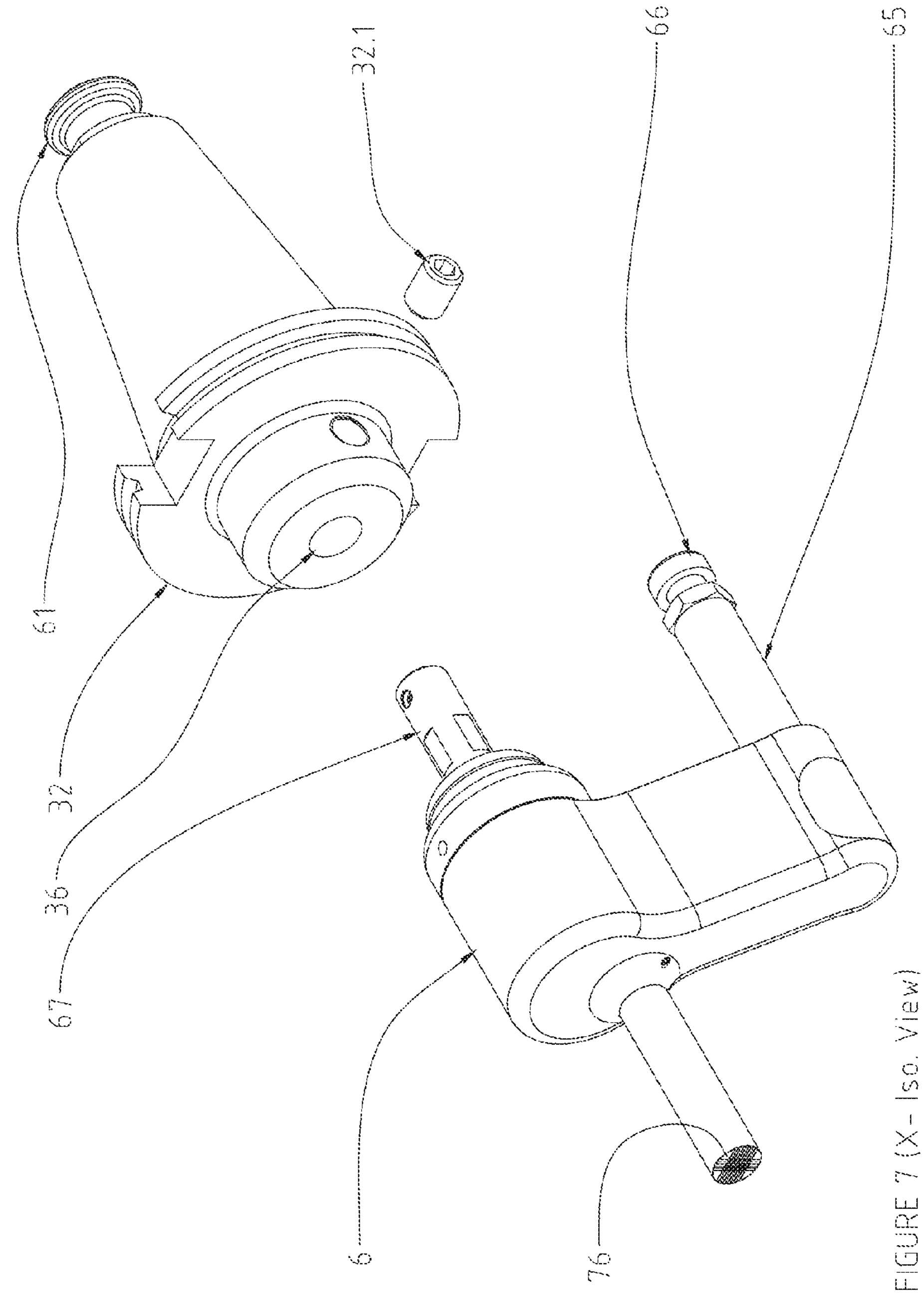
FIGURE 7 (X- Iso. View)
Typical Interchangeable Tool Holder for the
Selectable Character Multiple Stylus Orbital Engraving Tool

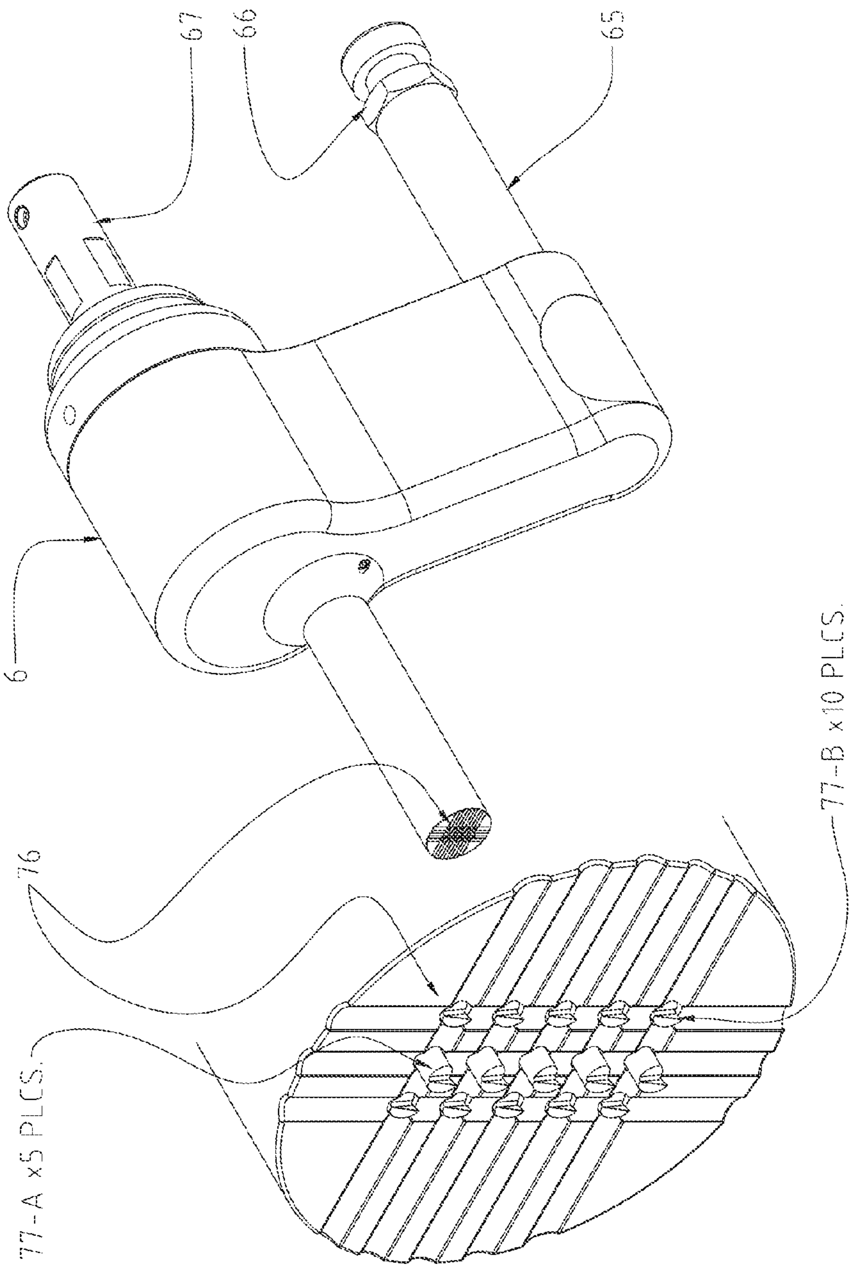
FIGURE 8 (X- Iso. View)
Character "1" Selected for the
Selectable Character Multiple Stylus Orbital Engraving Tool

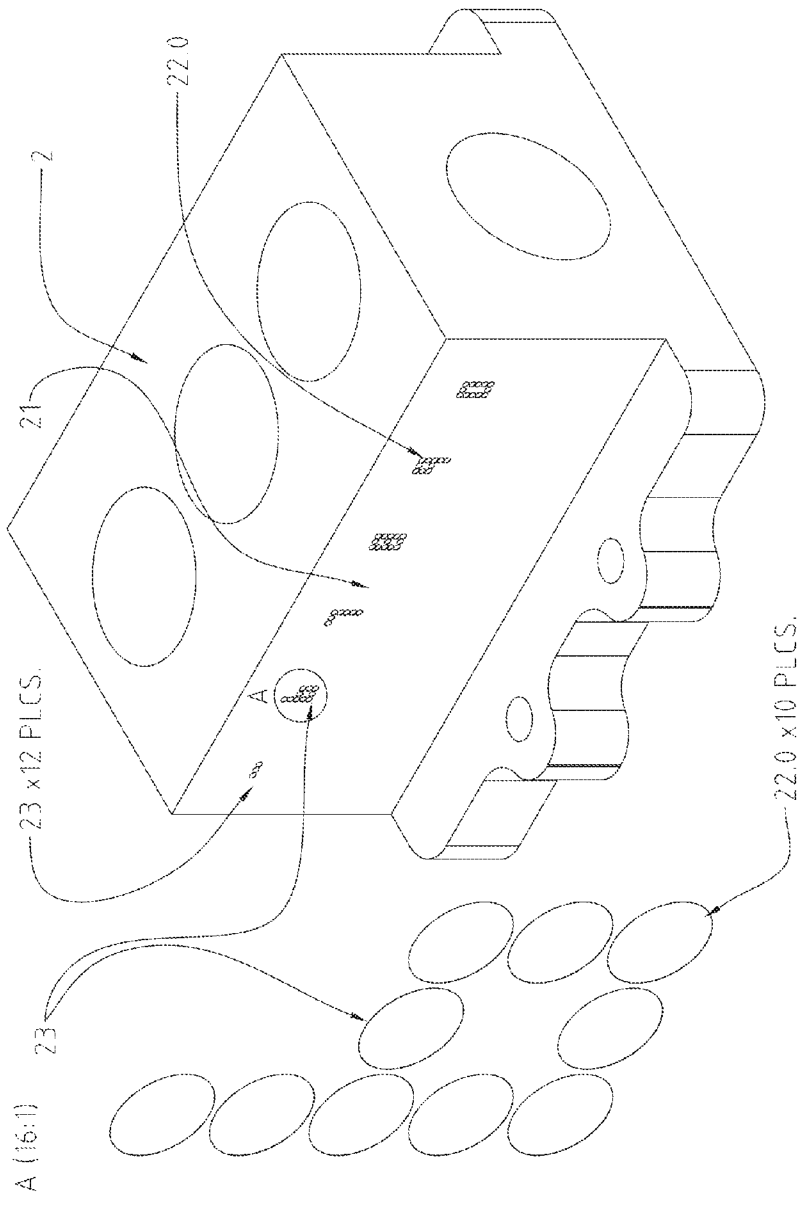
FIGURE 9 (X- Iso. View)
Character " 6 " Stylus Engraved Round Indention Pattern via the Selectable Character Multiple Stylus Orbital Engraving Tool

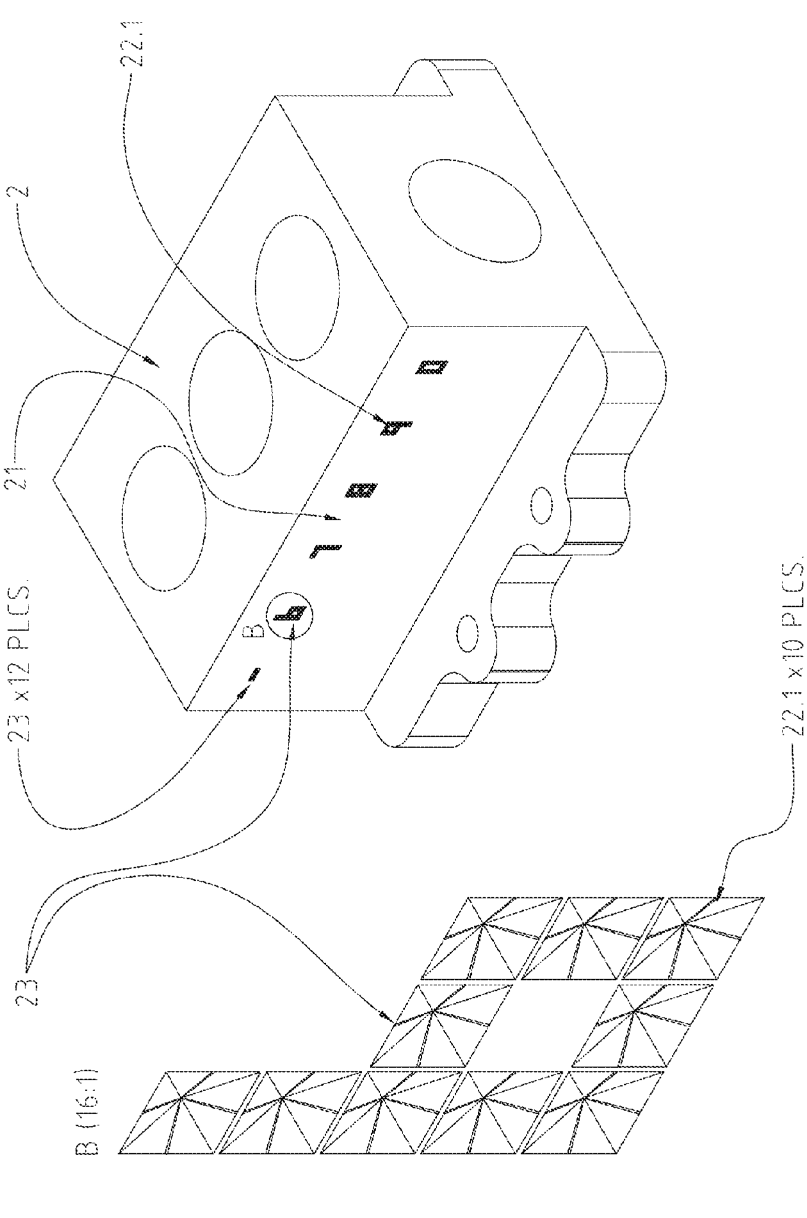
FIGURE 10 (X - Iso. View)
Character " 6 " Stylus Engraved Orthogonal Indention Pattern via the Selectable Character Multiple Stylus Orbital Engraving Tool

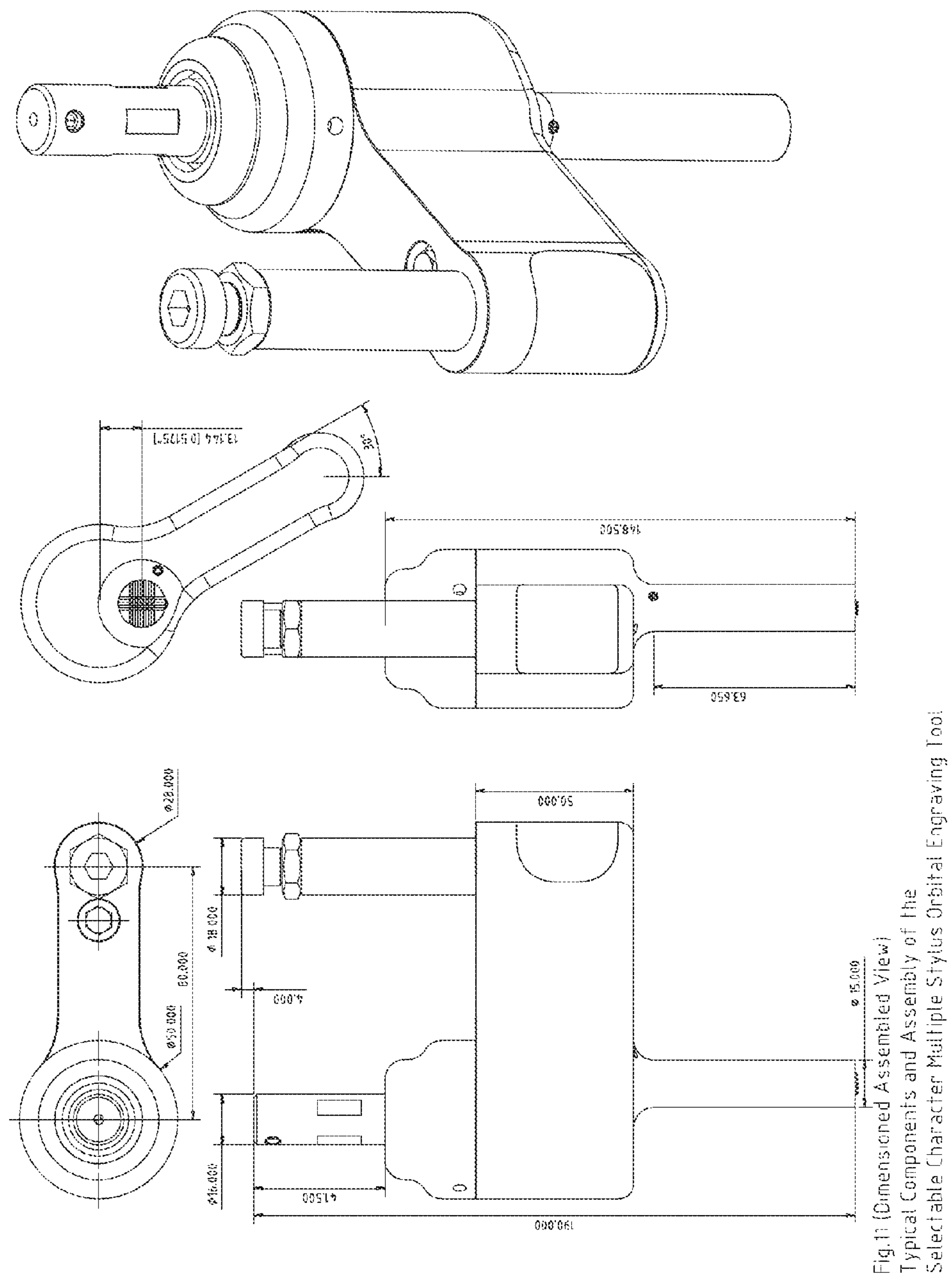
Fig.11 (Dimensioned Assembled View)
Typical Components and Assembly of the
Selectable Character Multiple Stylus Orbital Engraving Tool

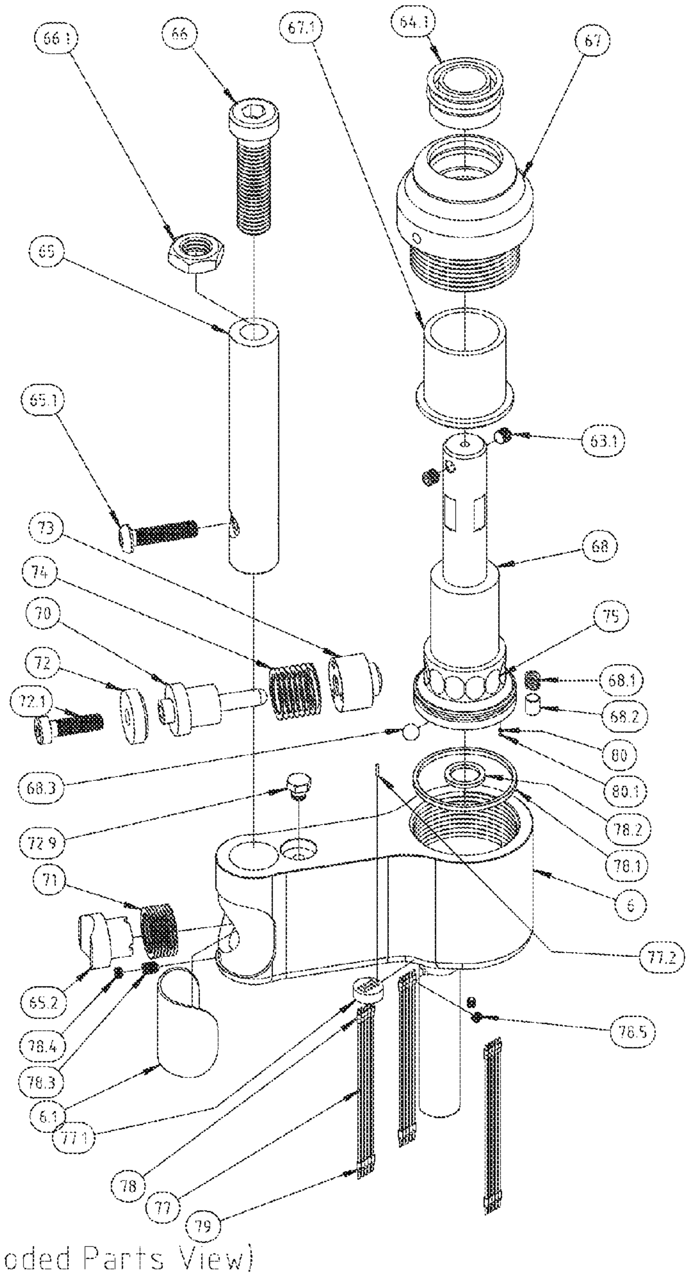
Fig.12 (Exploded Parts View)
Typical Components and Assembly of the
Selectable Character Multiple Stylus Orbital Engraving Tool

| Item | Qty | Name |
|---|---|---|
| 6 | 1 | MSOET_MAIN_HOUSING |
| 6.1 | 1 | MSOET_HOUSING_SNAP_COVER |
| 22.0 | 1 | ROUND-HOLE_ENGRAVED_SAMPLE_WORK_PIECE |
| 22.1 | 1 | ORTHOGONAL-HOLE_ENGRAVED_SAMPLE_WORK_PIECE |
| 63.1 | 2 | MAIN_PNEUMATIC_FLOW_CONTROL_HSSS-ISO-4027-M5X6 |
| 64.1 | 1 | PNEUMATIC_SHAFT_SEAL_E7-1626-Z4017 |
| 65 | 1 | MSOET_HOUSING_ANTI-ROTATION_POST |
| 65.1 | 1 | ANTI-ROTATION_BHCS-ISO-7380-M6X25 |
| 65.2 | 1 | PATTERN_INDEX_PISTON_RETAINER |
| 66 | 1 | ANTI-ROTATION_CHCS-DIN-7984-M12X45 |
| 66.1 | 1 | ANTI-ROTATION_NUT-ISO-4035-M12 |
| 67 | 1 | MSOET_MAIN_HOUSING_SHAFT_COLLAR |
| 67.1 | 1 | MSOET_MAIN_SHAFT_BEARING_PSFM2530-32 |
| 68 | 1 | MSOET_STYLUS_PATTERN_DISK |
| 68.1 | 1 | PATTERN_DISK_CLEARANCE_SPRING-0.8X4.4X5.1 |
| 68.2 | 1 | PATTERN_DISK_CLEARANCE_PUSHER_CL-4-8D |
| 68.3 | 1 | DISK_PATTERN_CLEARANCE_BEARING_6MM_SPHERE |
| 70 | 1 | PATTERN_INDEX-PISTON_LOCKING_SHAFT |
| 71 | 1 | PATTERN_LOCKING_SPRING_LWM20 |
| 72 | 1 | INTEGRATED_PISTON_DE-2005-Z5117 |
| 72.1 | 1 | ADJUATABLE_ANTI-ROTATION_CHCS-DIN-7984-M6X20 |
| 72.9 | 1 | VENT_MBO-1032M-10-SS |
| 73 | 1 | PATTERN_INDEX-DETENT_PLUNGER |
| 74 | 1 | PATTERN_DETENT_SPRING_LWM20 |
| 77 | 15 | 0.8_SINGLE_POINT_STYLUS |
| 77.1 | 1 | STYLUS_GUIDE |
| 77.2 | 1 | STYLUS_GUIDE_ALIGNMENT_PIN |
| 78 | 15 | STYLUS_PNEUMATIC_RETRACTION_COLLAR |
| 78.1 | 1 | PATTERN_DISK_PERIPHERIAL_SEAL_QRAR04013 |
| 78.2 | 1 | PATTERN_DISK_FACE_SEAL_QRAR04013 |
| 78.3 | 1 | STYLUS_RETRACTION_FLOW_CONTROL_HSSS-ISO-4027-M4X6 |
| 78.4 | 1 | FLOW_CONTROL_LOCK_ISO-4026-M4X2.5 |
| 78.5 | 2 | STYLUS_RETRACTION_SEQUENCING_PORTAL_ISO-4026-M3X3 |
| 79 | 15 | STYLUS_STROKE_LIMIT_COLLAR |
| 80 | 107 | ELASTOMERIC_COMPLIANCE_0.85X0.775 |
| 80.1 | 107 | STYLUS_BEARING_0.8_SPHERE |

Fig.13 (Bill of Material)
Typical Components and Assembly of the
Selectable Character Multiple Stylus Orbital Engraving Tool

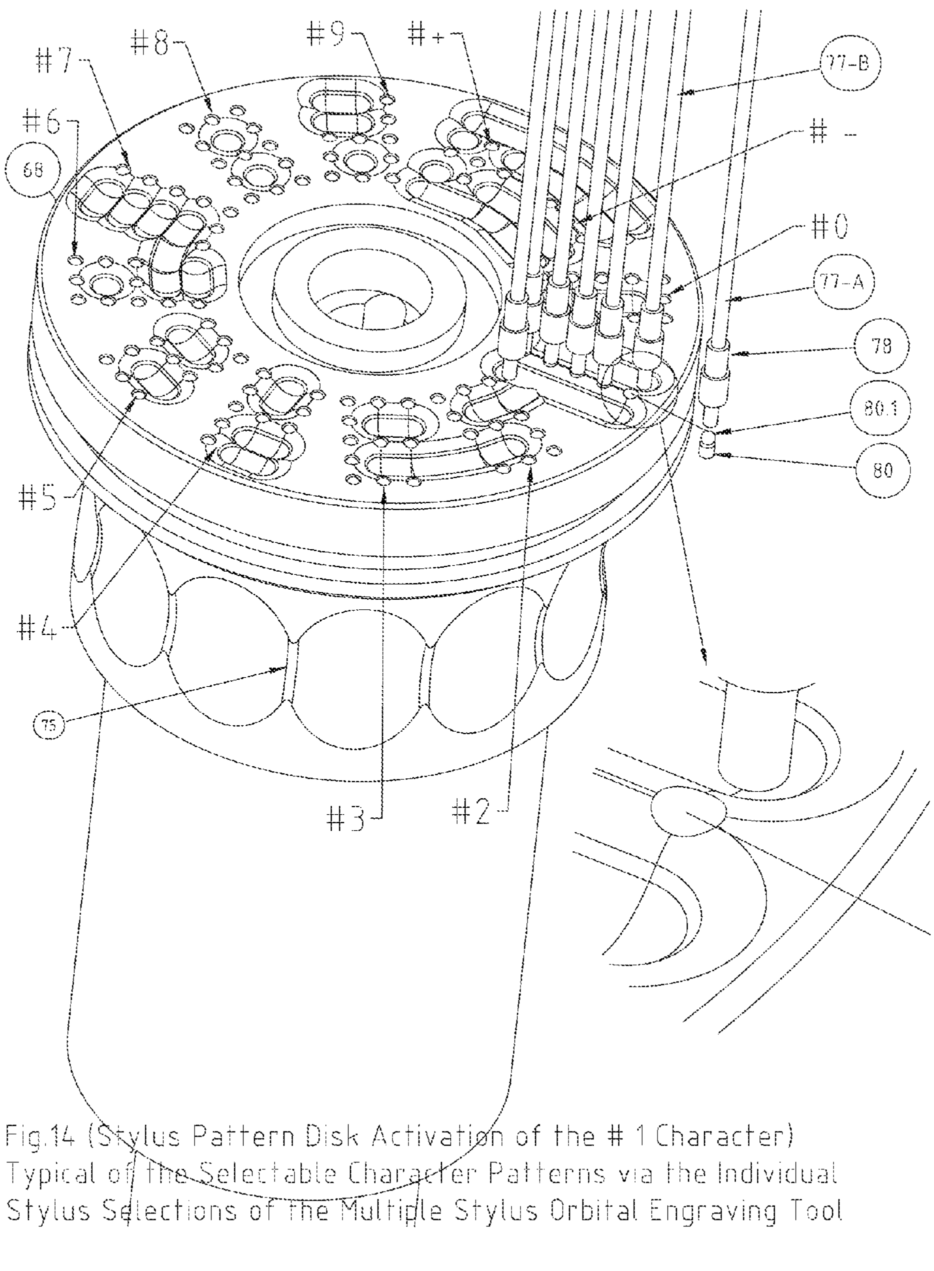
Fig.14 (Stylus Pattern Disk Activation of the # 1 Character)
Typical of the Selectable Character Patterns via the Individual
Stylus Selections of the Multiple Stylus Orbital Engraving Tool

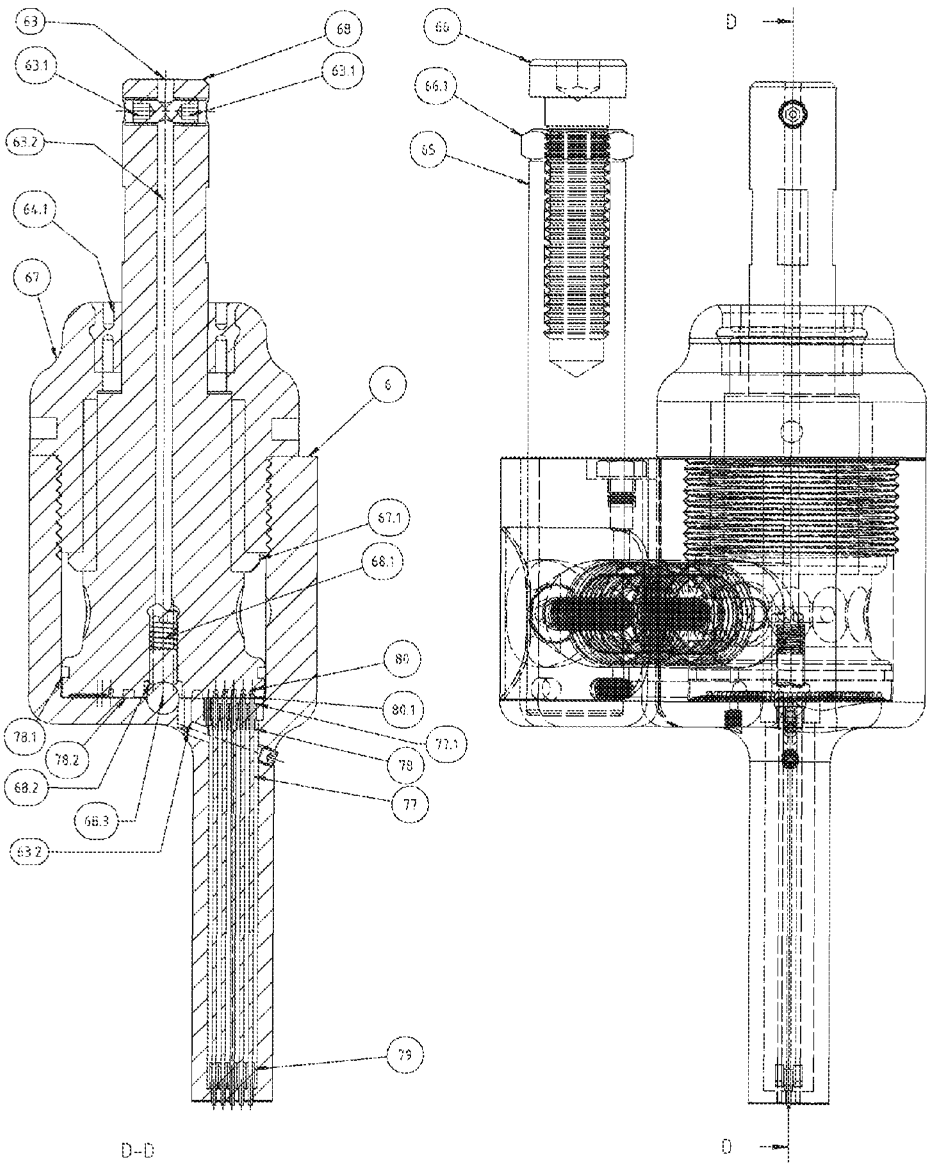
Fig. 15 (Stylus Center Line Section View)
Character Pattern #1 Stylus Activation of the
Selectable Character Multiple Stylus Orbital Engraving Tool

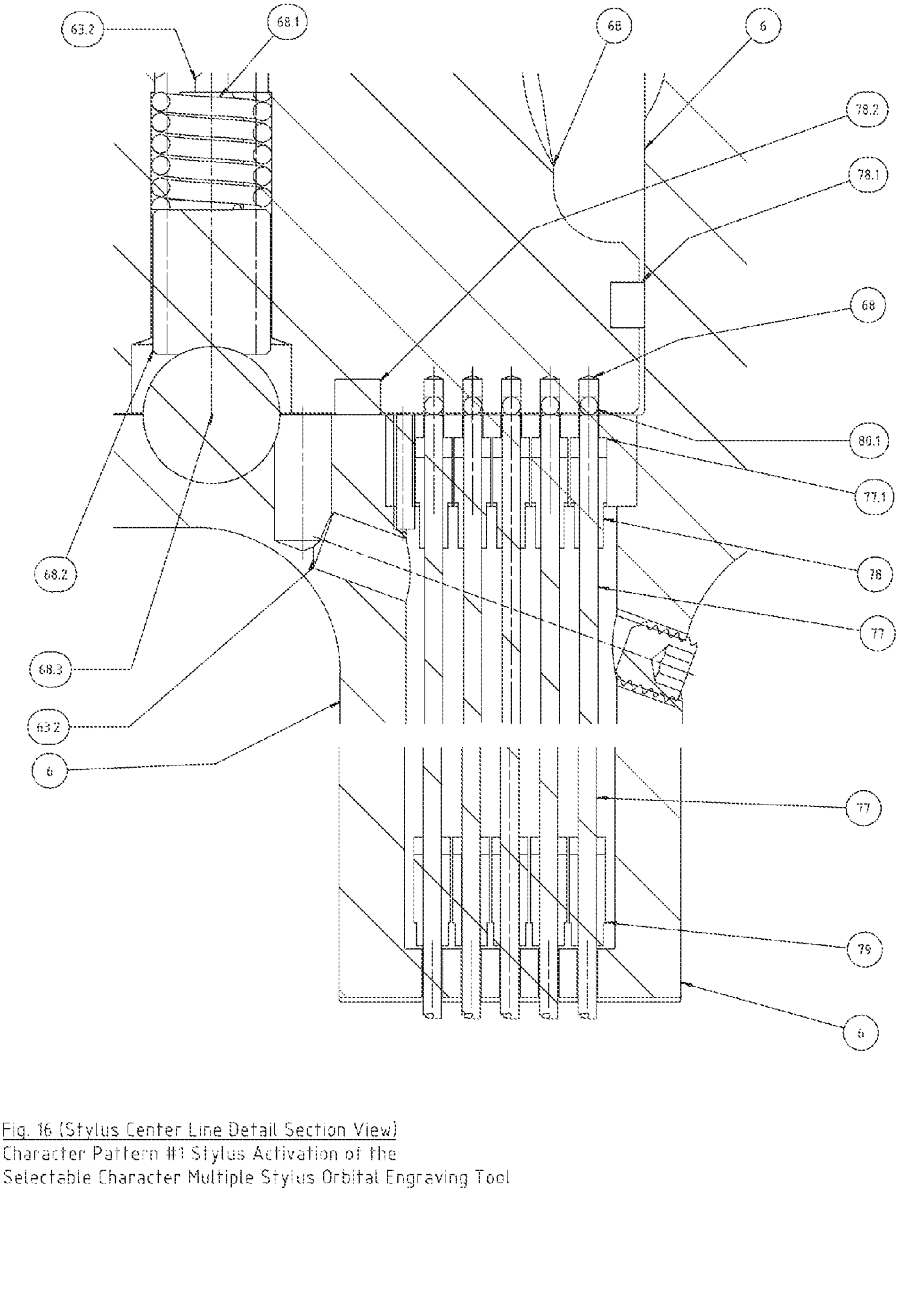
Fig. 16 (Stylus Center Line Detail Section View)
Character Pattern #1 Stylus Activation of the
Selectable Character Multiple Stylus Orbital Engraving Tool

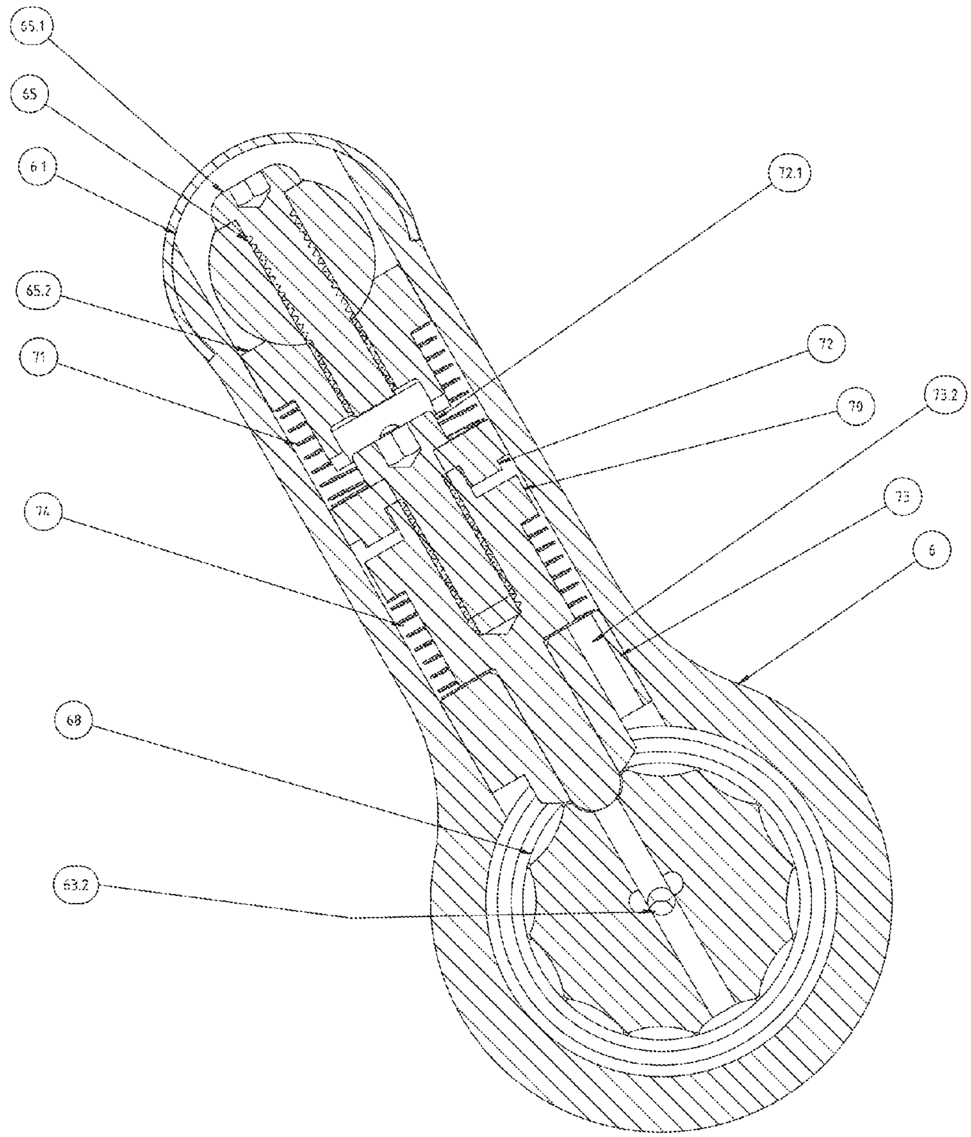
Fig. 17 (Index Lock Center Line Section View)
Character Pattern Selection Disk in the Locked Position for the Selectable Character Multiple Stylus Orbital Engraving Tool

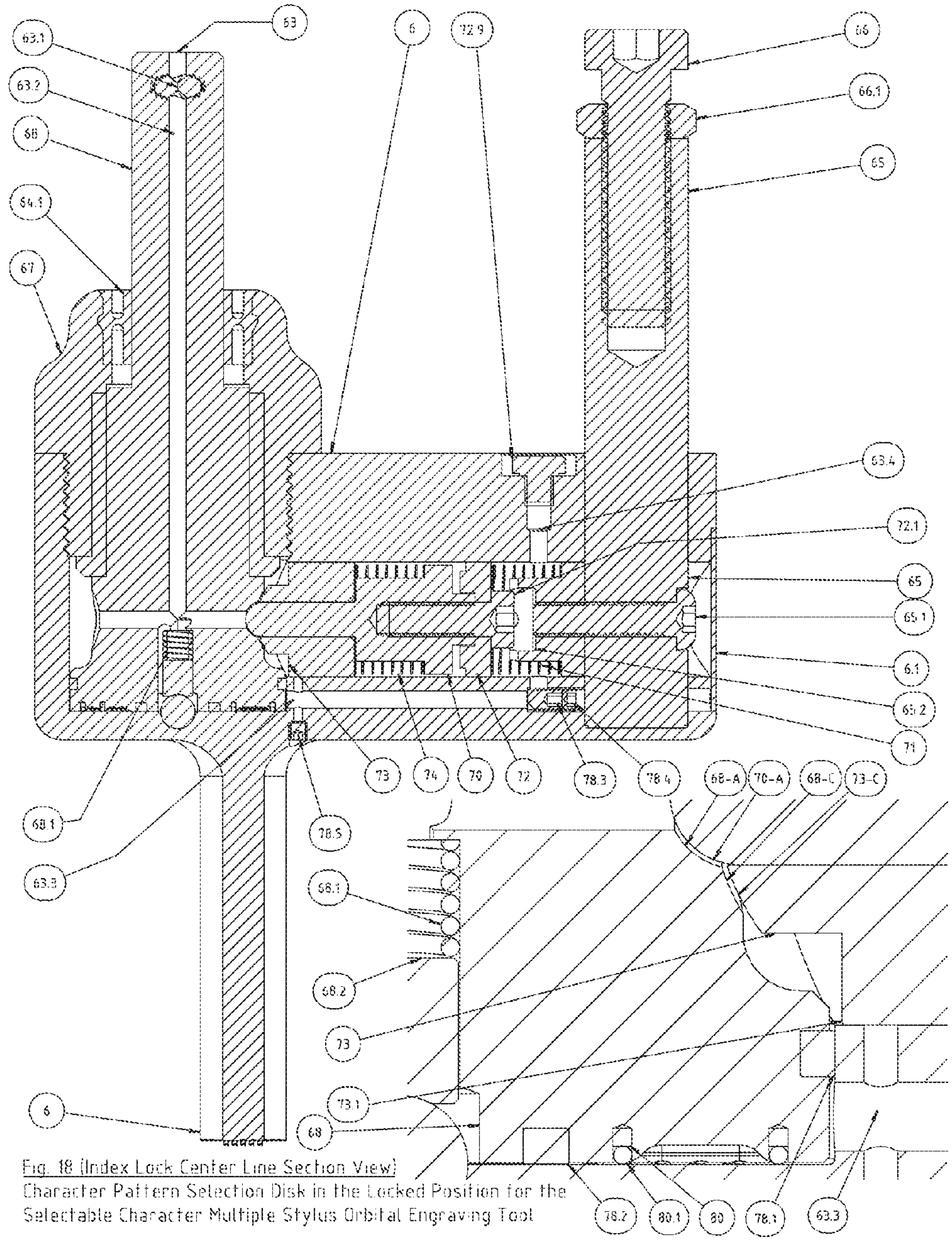
Fig. 18 (Index Lock Center Line Section View)
Character Pattern Selection Disk in the Locked Position for the Selectable Character Multiple Stylus Orbital Engraving Tool

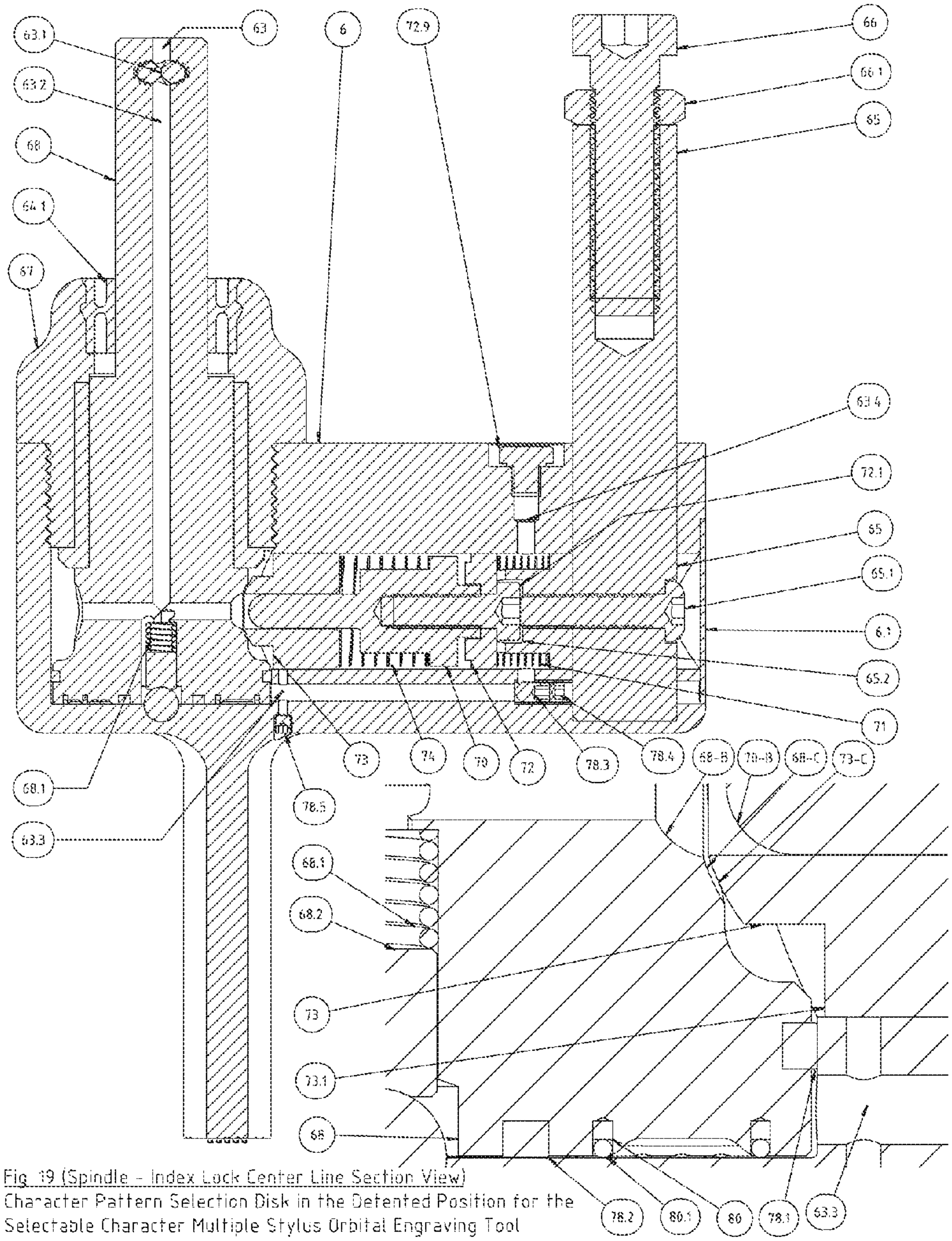
Fig. 19 (Spindle - Index Lock Center Line Section View)
Character Pattern Selection Disk in the Detented Position for the Selectable Character Multiple Stylus Orbital Engraving Tool

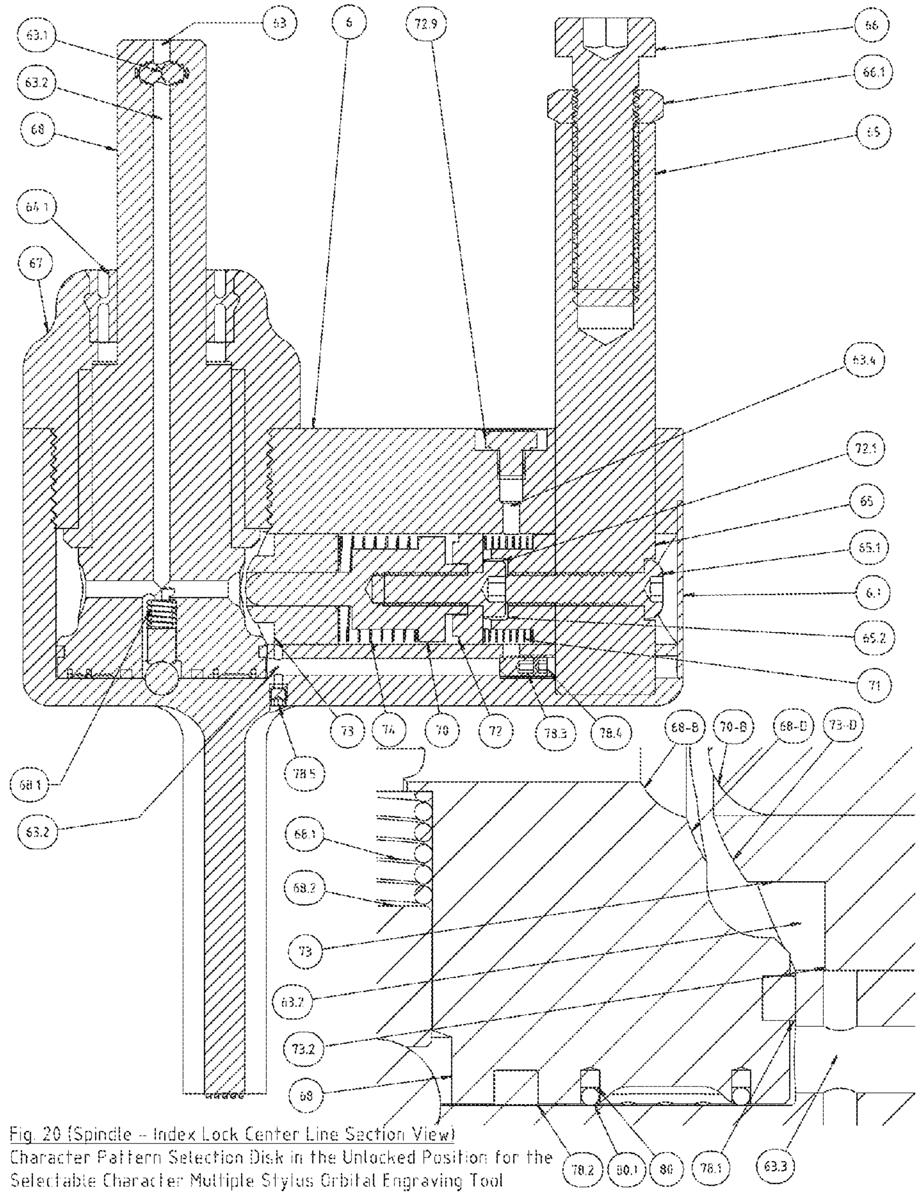
Fig. 20 (Spindle – Index Lock Center Line Section View)
Character Pattern Selection Disk in the Unlocked Position for the Selectable Character Multiple Stylus Orbital Engraving Tool

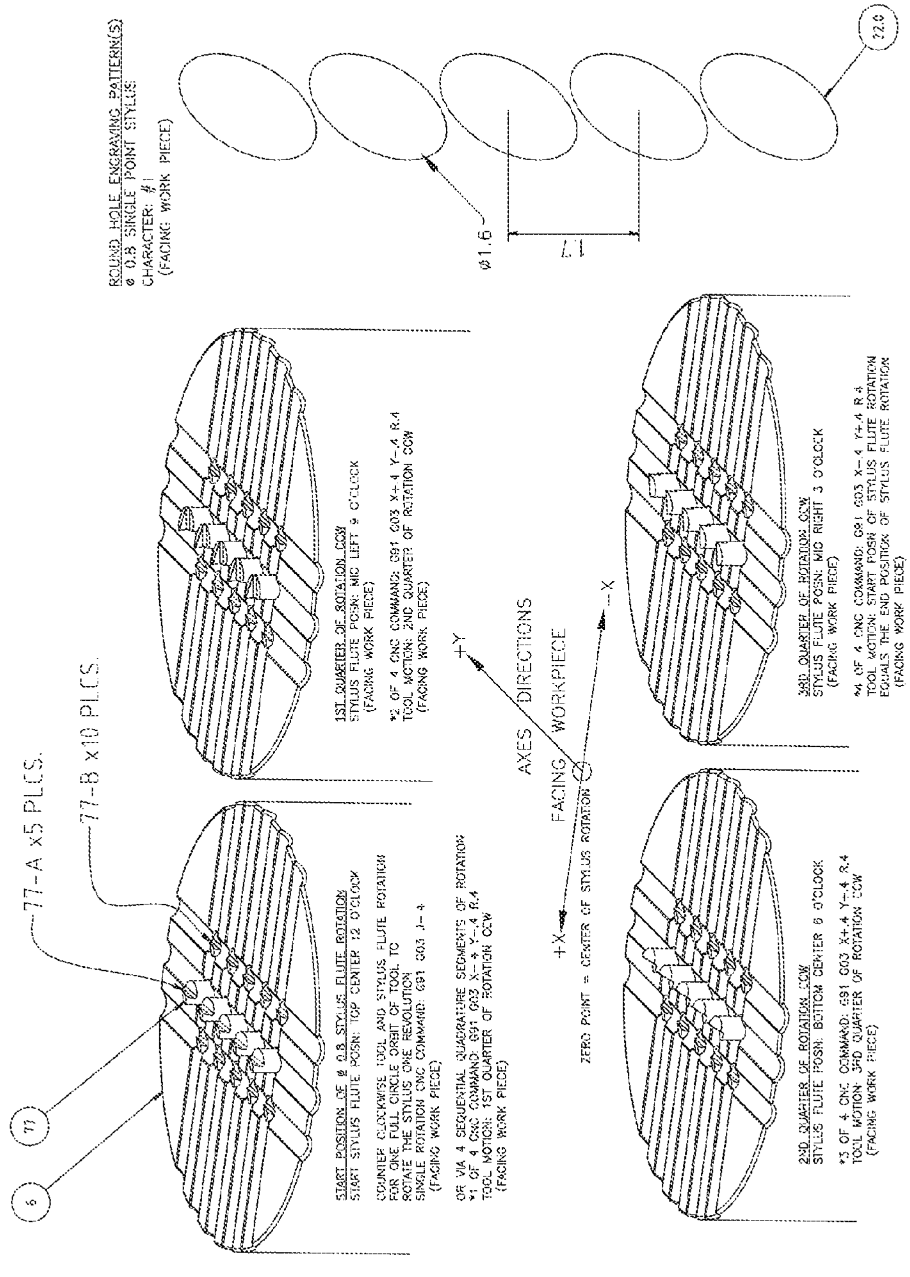
Fig. 21 (φ 0.8mm Single Stylus Round Hole)
Round Hole #1 Character Pattern for the
Selectable Character Multiple Stylus Orbital Engraving Tool

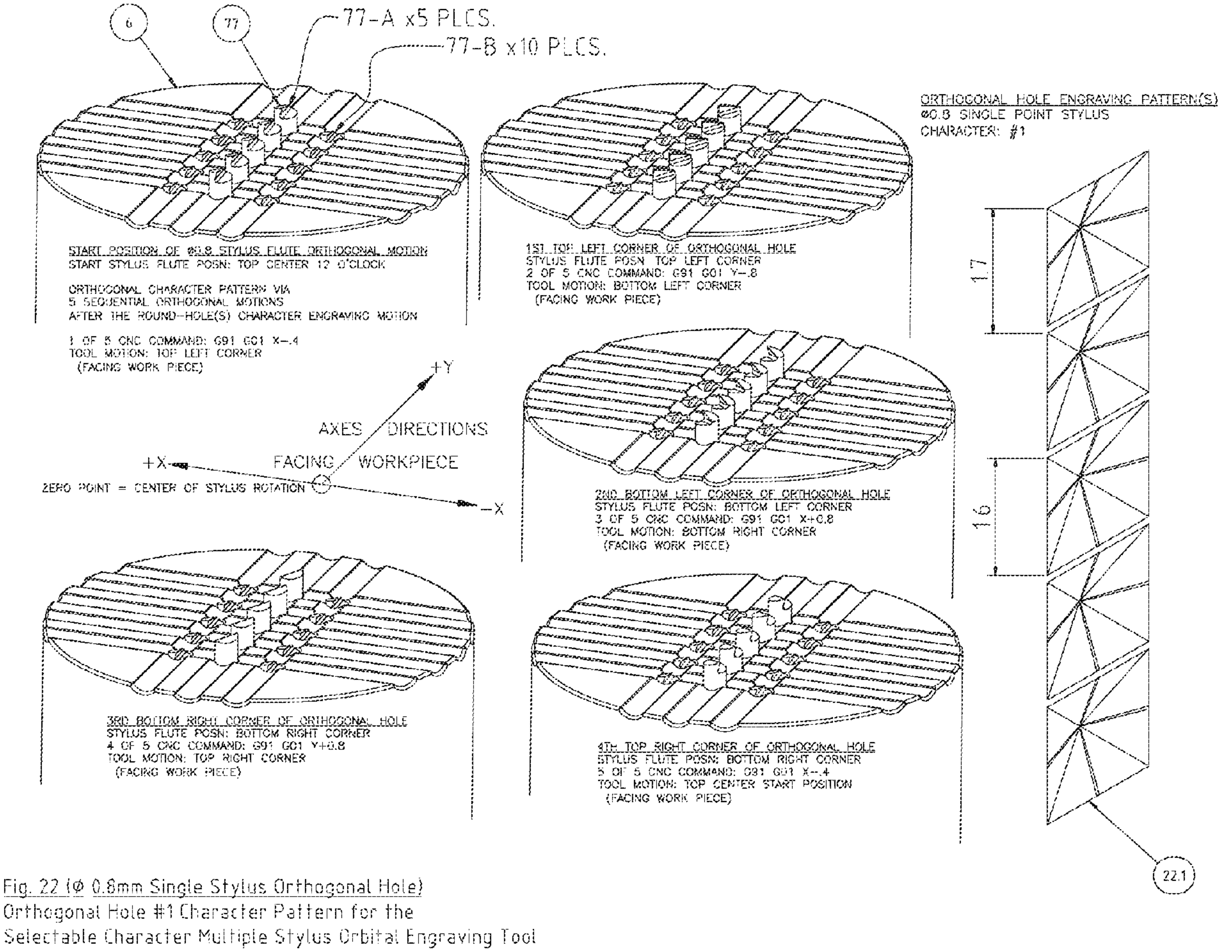
Fig. 22 (Ø 0.8mm Single Stylus Orthogonal Hole)
Orthogonal Hole #1 Character Pattern for the
Selectable Character Multiple Stylus Orbital Engraving Tool

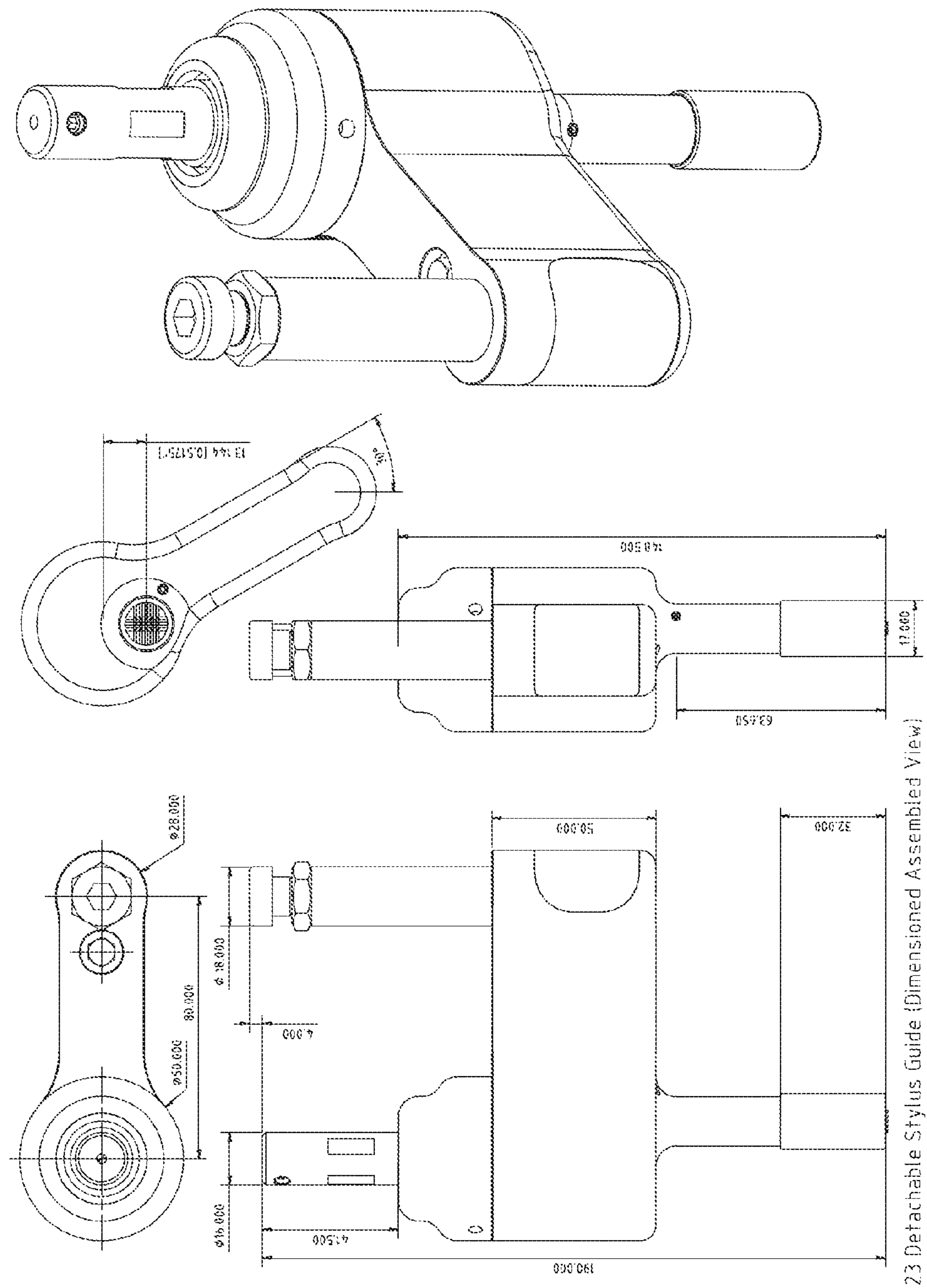
Fig.23 Detachable Stylus Guide (Dimensioned Assembled View)
Typical Components and Assembly of the
Selectable Character Multiple Stylus Orbital Engraving Tool / MSOET Main Housing Part 6.90

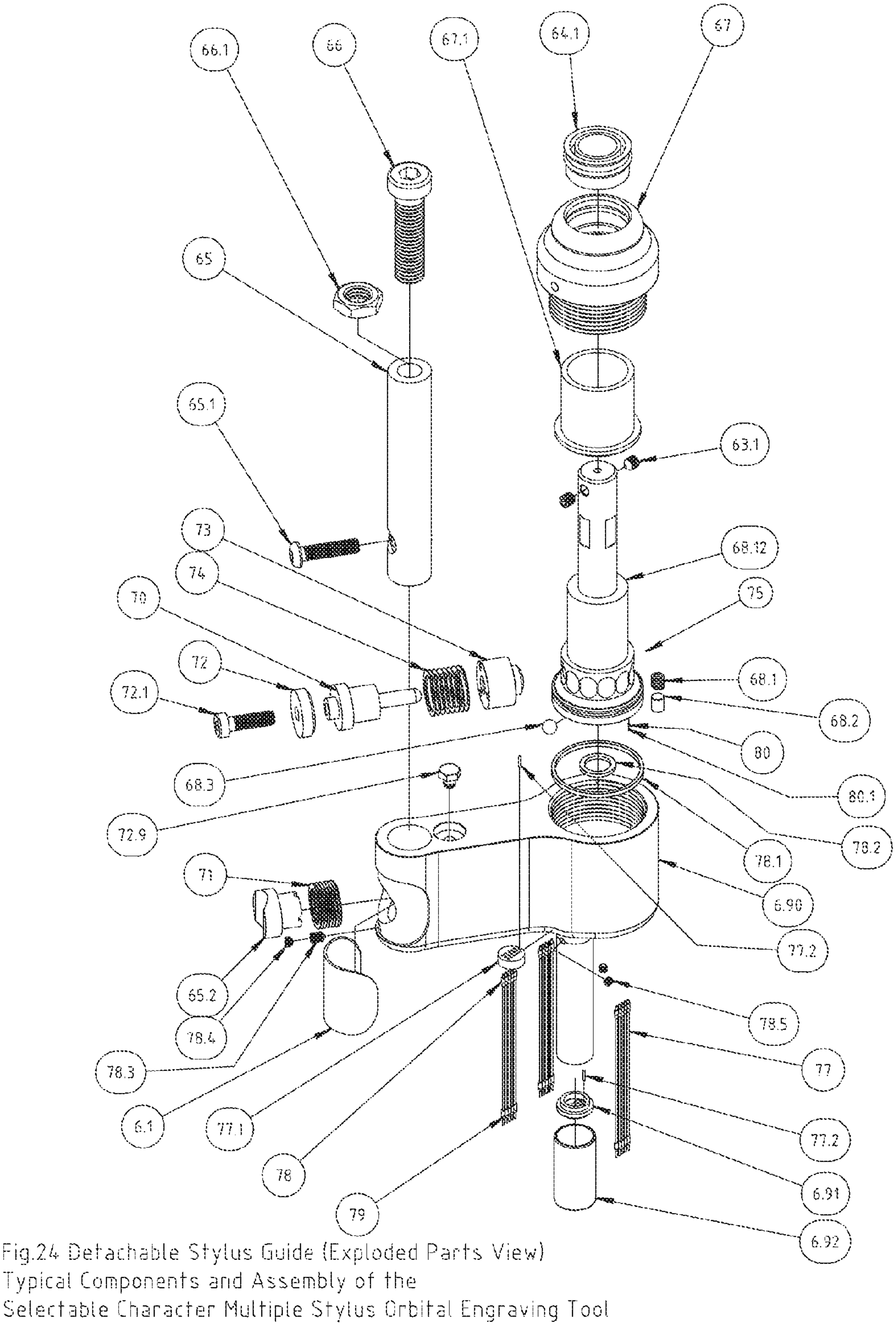
Fig.24 Detachable Stylus Guide (Exploded Parts View)
Typical Components and Assembly of the
Selectable Character Multiple Stylus Orbital Engraving Tool

| Item | Qty | Name |
|---|---|---|
| 6.90 | 1 | 6.90_MSOET_MAIN_HOUSING |
| 6.1 | 1 | MSOET_HOUSING_SNAP_COVER |
| 22.0 | 1 | ROUND-HOLE_ENGRAVED_SAMPLE_WORK_PIECE |
| 22.1 | 1 | ORTHOGONAL-HOLE_ENGRAVED_SAMPLE_WORK_PIECE |
| 63.1 | 2 | MAIN_PNEUMATIC_FLOW_CONTROL_HSSS- ISO-4027-M5X6 |
| 64.1 | 1 | PNEUMATIC_SHAFT_SEAL_E7-1626-Z4017 |
| 65 | 1 | MSOET_HOUSING_ANTI-ROTATION_POST |
| 65.1 | 1 | ANTI-ROTATION_BHCS-ISO-7380-M6X25 |
| 65.2 | 1 | PATTERN_INDEX_PISTON_RETAINER |
| 66 | 1 | ANTI-ROTATION_CHCS-DIN-7984-M12X45 |
| 66.1 | 1 | ANTI-ROTATION_NUT-ISO-4035-M12 |
| 67 | 1 | MSOET_MAIN_HOUSING_SHAFT_COLLAR |
| 67.1 | 1 | MSOET_MAIN_SHAFT_BEARING_PSFM2530-32 |
| 68.12 | 1 | MSOET_12-CHAR_STYLUS_PATTERN_DISK |
| 68.1 | 1 | PATTERN_DISK_CLEARANCE_SPRING-0.8X4.4X5.1 |
| 68.2 | 1 | PATTERN_DISK_CLEARANCE_PUSHER_CL-4-BD |
| 68.3 | 1 | DISK_PATTERN_CLEARANCE_BEARING_6MM_SPHERE |
| 70 | 1 | PATTERN_INDEX-PISTON_LOCKING_SHAFT |
| 71 | 1 | PATTERN_LOCKING_SPRING_LWM20 |
| 72 | 1 | INTEGRATED_PISTON_DE-2005-Z5117 |
| 72.1 | 1 | ADJUATABLE_ANTI-ROTATION_CHCS-DIN-7984-M6X20 |
| 72.9 | 1 | VENT_MBO-1032M-10-SS |
| 73 | 1 | PATTERN_INDEX-DETENT_PLUNGER |
| 74 | 1 | PATTERN_DETENT_SPRING_LWM20 |
| 77 | 15 | 0.8_SINGLE_POINT_STYLUS |
| 77.1 | 1 | STYLUS_GUIDE |
| 77.2 | 2 | STYLUS_GUIDE_ALIGNMENT_PIN |
| 78 | 15 | STYLUS_PNEUMATIC_RETRACTION_COLLAR |
| 78.1 | 1 | PATTERN_DISK_PERIPHERIAL_SEAL_QRAR04013 |
| 78.2 | 1 | PATTERN_DISK_FACE_SEAL_QRAR04013 |
| 78.3 | 1 | STYLUS_RETRACTION_FLOW_CONTROL_HSSS-ISO-4027-M4X6 |
| 78.4 | 1 | FLOW_CONTROL_LOCK_ISO-4026-M4X2.5 |
| 78.5 | 2 | STYLUS_RETRACTION_SEQUENCING_PORTAL_ISO-4026-M3X3 |
| 79 | 15 | STYLUS_STROKE_LIMIT_COLLAR |
| 80 | 107 | ELASTOMERIC_COMPLIANCE_0.85X0.775 |
| 80.1 | 107 | STYLUS_BEARING_0.8_SPHERE |
| 68.5 | 1 | MSOET_5X32-CHAR_STYLUS_PATTERN_DISK |
| 6.91 | 1 | 6.91_DETACHABLE_STYLUS_GUIDE |
| 6.92 | 1 | STYLUS_GUIDE_RETENTION_COLLAR |

Fig.25 Detachable Stylus Guide (Bill of Material)
Typical Components and Assembly of the
Selectable Character Multiple Stylus Orbital Engraving Tool Hardware Parts Components for the Selectable Character Multiple Stylus Orbital Engraving Tool Part-6.00
Standard MSOET Main Housing Component for the
Selectable Character Multiple Stylus Orbital Engraving Tool Part-6.1
MSOET Housing Snap Cover Component for the
Selectable Character Multiple Stylus Orbital Engraving Tool Part-6.91
Detachable Stylus Guide Component for the
Selectable Character Multiple Stylus Orbital Engraving Tool Part-65.2
Pattern Index Piston Retainer Component for the
Selectable Character Multiple Stylus Orbital Engraving Tool Part-65
MSOET Housing Anti-Rotation Post Component for the
Selectable Character Multiple Stylus Orbital Engraving Tool Part-67
MOSET Main Housing Shaft Collar Component for the
Selectable Character Multiple Stylus Orbital Engraving Tool Part-68.5

5X-Squared Character Sets for 32-Position Stylus Pattern Disk Component for the Selectable Character Multiple Stylus Orbital Engraving Tool to Engrave 2D Bar Code in a Binary Character Format Part-68.12
12-Character for 12-Position Stylus Pattern Disk Component for the Selectable Character Multiple Stylus Orbital Engraving Tool Part-68
Main Shaft Stylus Pattern Disk Component for the Selectable Character Multiple Stylus Orbital Engraving Tool Part-70
Pattern Index-Piston Locking Shaft Component for the
Selectable Character Multiple Stylus Orbital Engraving Tool Part-73
Pattern Index-Detent Plunger Component for the
Selectable Character Multiple Stylus Orbital Engraving Tool Part 77
⌀ 0.8mm Single Point Orbital Stylus Component for the Selectable Character Multiple Stylus Orbital Engraving Tool Part-78
Stylus Pneumatic Retraction Collar Component for the Selectable Character Multiple Stylus Orbital Engraving Tool Part-79
Stylus Stroke Limit Collar Component for the
Selectable Character Multiple Stylus Orbital Engraving Tool Spindle Selectable Two Flute 12 Characters 3X5 Detachable Stylus Guide
(ø 0.8mm Multiple Two Flute Stylus Round Hole)
Round Hole #1 Character Pattern for the Selectable Character Multiple Stylus Orbital Engraving Tool's Typical Components and Assembly Part-6.91
Two Flute Ø0.8 3X5 Detachable Stylus Guide component for the Selectable Character Multiple Stylus Orbital Engraving Tool CNC HMC with Chain Tool Storage Pocket System
3x5 12-Character Spindle Selectable Multiple Orbital Stylus Engraving Tool in the Tool Storage,
Top-Left ISO View CNC HMC with Chain Tool Storage Pocket System
3x5 13-Character Spindle Selectable Multiple Orbital Stylus Engraving Tool in the Tool Storage,
Top-Right ISO View CNC HMC with Chain Tool Storage Pocket System
3x5 12-Character Spindle Selectable Multiple Orbital Stylus Engraving Tool in the Spindle,
Top-Right ISO View CNC HMC with Magazine Tool Storage Pocket System
3x5 12-Character Spindle Selectable Multiple Orbital Stylus Engraving Tool in the Tool Storage, Top-Left ISO View CNC HMC with Magazine Tool Storage Pocket System
3x5 12-Character Spindle Selectable Multiple Critical Stylus Engraving Tool in the Tool Storage,
Top-Right ISO View CNC HMC with Magazine Tool Storage Pocket System
3x5 12-Character Spindle Selectable Multiple Orbital Stylus Engraving Tool in the Spindle,
Top-Right ISO View Programmable 2X11 STYLUS ACTUATION MODULE (ACTUATED STYLUS TEST PATTERN #1 SHOWN)
For the Selectable Character Multiple Stylus Orbital Engraving Tool Programmable 2X1 STYLUS PAIRED ADVANCE AND RETRACT ACTUATION (ACTUATED STYLUS TEST PATTERN #1 SHOWN)
For the Selectable Character Multiple Stylus Orbital Engraving Tool Operational Sequence for the Programmable 2x11 Selectable Styluses Modular (PMOSET)

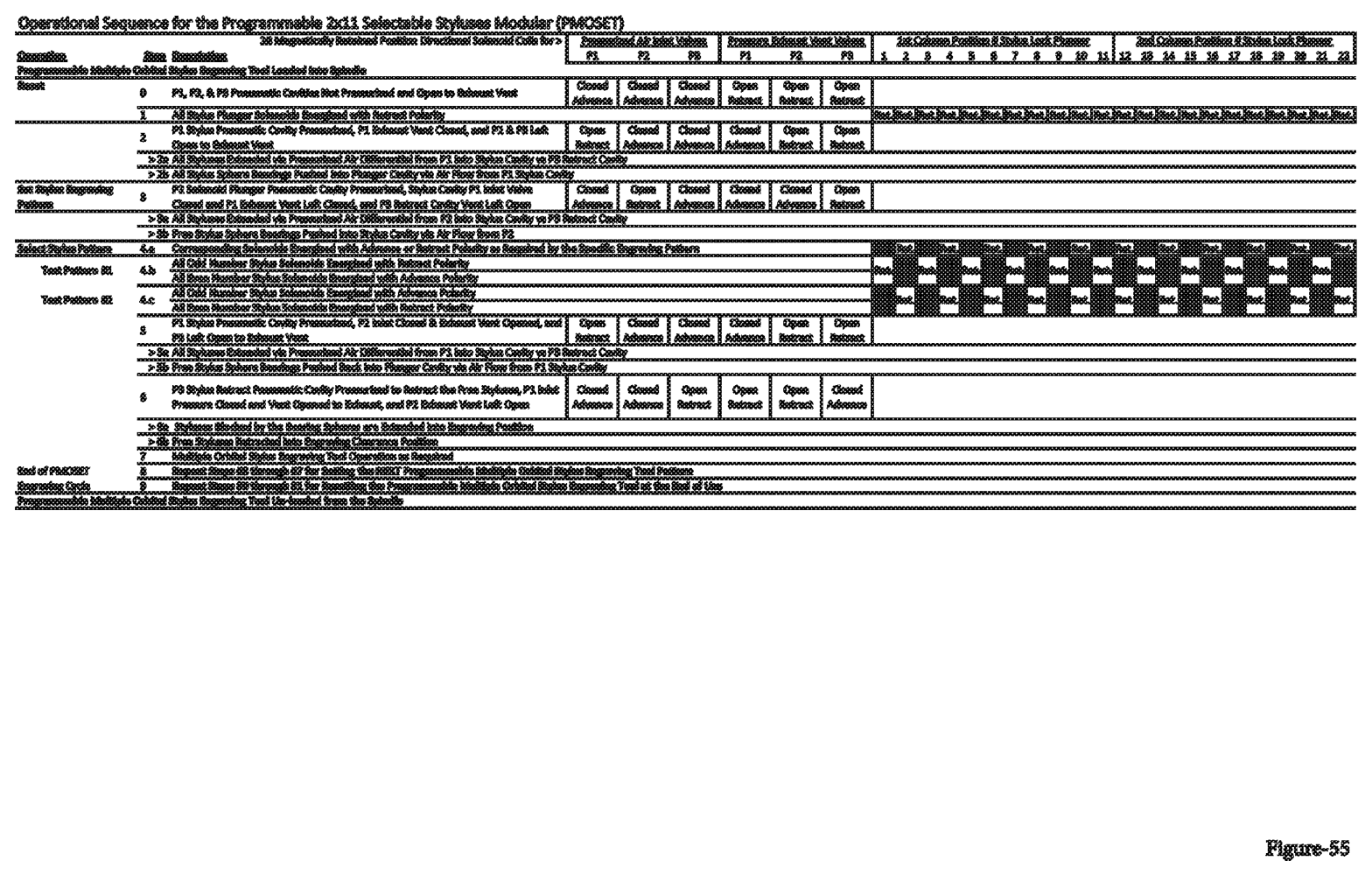

| Operation | Step | Description | Pressurized Air Inlet Valves P1 | P2 | P3 | Pressure Exhaust Vent Valves P1 | P2 | P3 |
|---|---|---|---|---|---|---|---|---|
| Programmable Multiple Orbital Stylus Engraving Tool Loaded into Spindle | | | | | | | | |
| Reset | 0 | P1, P2, & P3 Pneumatic Cavities Not Pressurized and Open to Exhaust Vent | Closed Advance | Closed Advance | Closed Advance | Open Retract | Open Retract | Open Retract |
| | 1 | All Stylus Plunger Solenoids Energized with Retract Polarity | | | | | | |
| | 2 | P1 Stylus Pneumatic Cavity Pressurized, P1 Exhaust Vent Closed, and P2 & P3 Left Open to Exhaust Vent | Open Retract | Closed Advance | Closed Advance | Closed Advance | Open Retract | Open Retract |
| | > 2a | All Styluses Extended via Pressurized Air Differential from P1 into Stylus Cavity vs P3 Retract Cavity | | | | | | |
| | > 2b | All Stylus Sphere Bearings Pushed into Plunger Cavity via Air Flow from P1 Stylus Cavity | | | | | | |
| Set Stylus Engraving Pattern | 3 | P2 Solenoid Plunger Pneumatic Cavity Pressurized, Stylus Cavity P1 Inlet Valve Closed and P1 Exhaust Vent Left Closed, and P3 Retract Cavity Vent Left Open | Closed Advance | Open Retract | Closed Advance | Closed Advance | Closed Advance | Open Retract |
| | > 3a | All Styluses Extended via Pressurized Air Differential from P2 into Stylus Cavity vs P3 Retract Cavity | | | | | | |
| | > 3b | Free Stylus Sphere Bearings Pushed into Stylus Cavity via Air Flow from P2 | | | | | | |
| Select Stylus Pattern | 4.a | Corresponding Solenoids Energized with Advance or Retract Polarity as Required by the Specific Engraving Pattern | | | | | | |
| Test Pattern #1 | 4.b | All Odd Number Stylus Solenoids Energized with Retract Polarity<br>All Even Number Stylus Solenoids Energized with Advance Polarity | | | | | | |
| Test Pattern #2 | 4.c | All Odd Number Stylus Solenoids Energized with Advance Polarity<br>All Even Number Stylus Solenoids Energized with Retract Polarity | | | | | | |
| | 5 | P1 Stylus Pneumatic Cavity Pressurized, P2 Inlet Closed & Exhaust Vent Opened, and P3 Left Open to Exhaust Vent | Open Retract | Closed Advance | Closed Advance | Closed Advance | Open Retract | Open Retract |
| | > 5a | All Styluses Extended via Pressurized Air Differential from P1 into Stylus Cavity vs P3 Retract Cavity | | | | | | |
| | > 5b | Free Stylus Sphere Bearings Pushed Back into Plunger Cavity via Air Flow from P1 Stylus Cavity | | | | | | |
| | 6 | P3 Stylus Retract Pneumatic Cavity Pressurized to Retract the Free Styluses, P1 Inlet Pressure Closed and Vent Opened to Exhaust, and P2 Exhaust Vent Left Open | Closed Advance | Closed Advance | Open Retract | Open Retract | Open Retract | Closed Advance |
| | > 6a | Styluses Blocked by the Bearing Spheres are Extended into Engraving Position | | | | | | |
| | > 6b | Free Styluses Retracted into Engraving Clearance Position | | | | | | |
| | 7 | Multiple Orbital Stylus Engraving Tool Operation as Required | | | | | | |
| End of PMOSET | 8 | Repeat Steps #0 through #7 for Setting the NEXT Programmable Multiple Orbital Stylus Engraving Tool Pattern | | | | | | |
| Engraving Cycle | 9 | Repeat Steps #0 through #1 for Resetting the Programmable Multiple Orbital Stylus Engraving Tool at the End of Use | | | | | | |
| Programmable Multiple Orbital Stylus Engraving Tool Un-loaded from the Spindle | | | | | | | | |

22 Magnetically Retained Position Directional Solenoid Coils — 1st Column Position # Stylus Lock Plunger (1–11), 2nd Column Position # Stylus Lock Plunger (12–22)

| Step | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|---|---|---|---|---|---|---|---|---|---|---|---|---|
| 1 | Ret. | Ret. | Ret. | Ret. | Ret. | Ret. | Ret. | Ret. | Ret. | Ret. | Ret. | Ret. | Ret. | Ret. | Ret. | Ret. | Ret. | Ret. | Ret. | Ret. | Ret. | Ret. |
| 4.a | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] |
| 4.b | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] |
| 4.c | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] |

Figure-55

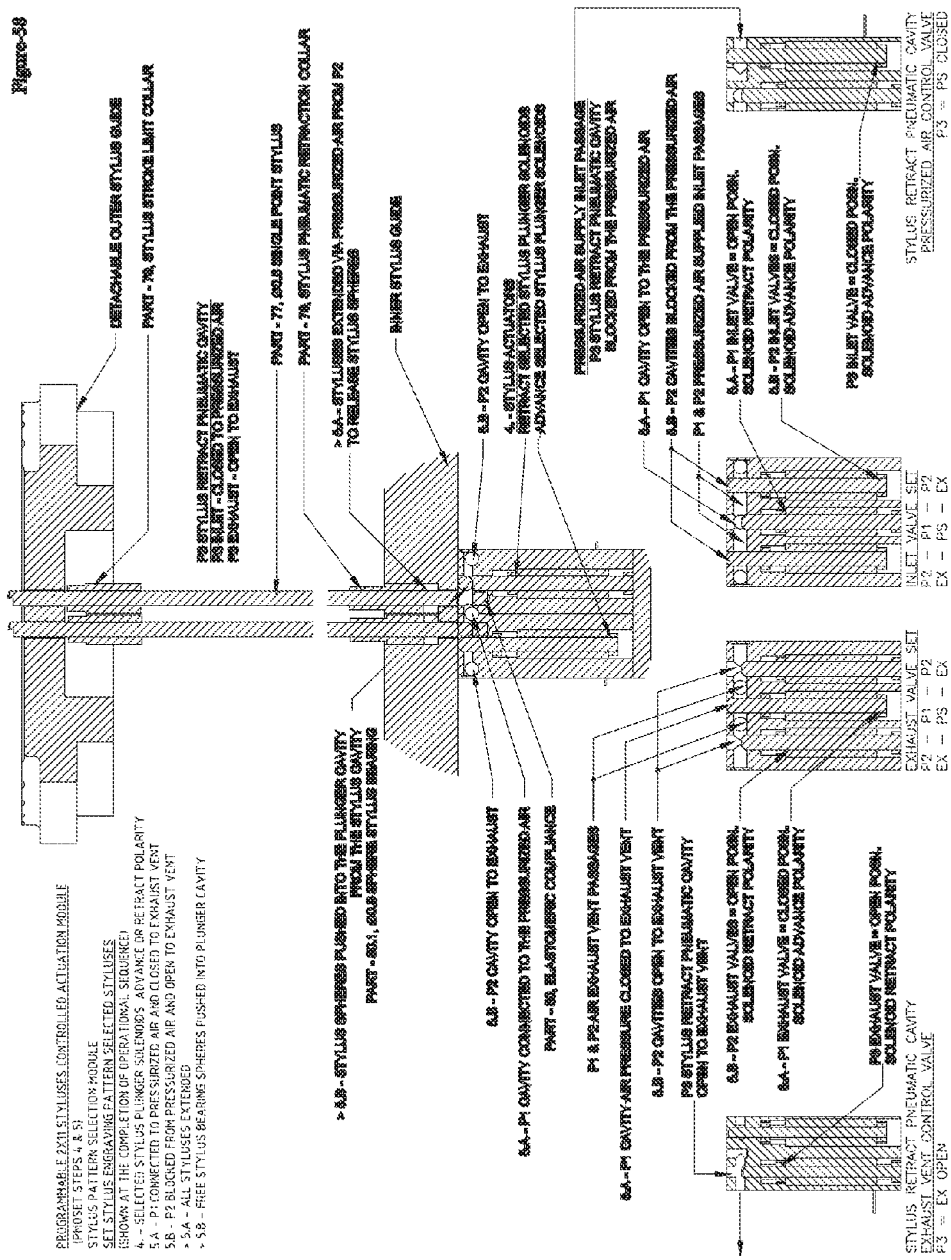
Figure-58
PROGRAMMABLE 2X11 STYLUSES CONTROLLED ACTUATION MODULE
(PRESET STEPS 4 & 5)
STYLUS PATTERN SELECTION MODULE
SET STYLUS ENGRAVING PATTERN SELECTED STYLUSES
(SHOWN AT THE COMPLETION OF OPERATIONAL SEQUENCE)
4. - SELECTED STYLUS PLUNGER SOLENOIDS ADVANCE OR RETRACT POLARITY
5.A - P1 CONNECTED TO PRESSURIZED AIR AND CLOSED TO EXHAUST VENT
5.B - P2 BLOCKED FROM PRESSURIZED AIR AND OPEN TO EXHAUST VENT
> 5.A - ALL STYLUSES EXTENDED
> 5.B - FREE STYLUS BEARING SPHERES PUSHED INTO PLUNGER CAVITY
DETACHABLE OUTER STYLUS GUIDE
PART - 79, STYLUS STROKE LIMIT COLLAR
P3 STYLUS RETRACT PNEUMATIC CAVITY
P3 INLET - CLOSED TO PRESSURIZED AIR
P3 EXHAUST - OPEN TO EXHAUST
PART - 77, Ø0.8 SINGLE POINT STYLUS
PART - 78, STYLUS PNEUMATIC RETRACTION COLLAR
> 5.B - STYLUS SPHERES PUSHED INTO THE PLUNGER CAVITY
FROM THE STYLUS CAVITY
PART - 80.1, Ø0.8 SPHERE STYLUS BEARING
> 5.A - STYLUSES EXTENDED VIA PRESSURIZED AIR FROM P2
TO RELEASE STYLUS SPHERES
INNER STYLUS GUIDE
5.B - P2 CAVITY OPEN TO EXHAUST
5.A - P1 CAVITY CONNECTED TO THE PRESSURIZED AIR
PART - 80, ELASTOMERIC COMPLIANCE
5.B - P2 CAVITY OPEN TO EXHAUST
4. - STYLUS ACTUATORS
RETRACT SELECTED STYLUS PLUNGER SOLENOIDS
ADVANCE SELECTED STYLUS PLUNGER SOLENOIDS
P1 & P2 AIR EXHAUST VENT PASSAGES
5.A - P1 CAVITY AIR PRESSURE CLOSED TO EXHAUST VENT
5.B - P2 CAVITIES OPEN TO EXHAUST VENT
P3 STYLUS RETRACT PNEUMATIC CAVITY
OPEN TO EXHAUST VENT
5.B - P2 EXHAUST VALVES = OPEN POSN.
SOLENOID RETRACT POLARITY
5.A - P1 EXHAUST VALVE = CLOSED POSN.
SOLENOID ADVANCE POLARITY
P3 EXHAUST VALVE = OPEN POSN.
SOLENOID RETRACT POLARITY
PRESSURIZED AIR SUPPLY INLET PASSAGE
P3 STYLUS RETRACT PNEUMATIC CAVITY
BLOCKED FROM THE PRESSURIZED AIR
5.A - P1 CAVITY OPEN TO THE PRESSURIZED AIR
5.B - P2 CAVITIES BLOCKED FROM THE PRESSURIZED AIR
P1 & P2 PRESSURIZED AIR SUPPLIED INLET PASSAGES
5.A - P1 INLET VALVE = OPEN POSN.
SOLENOID RETRACT POLARITY
5.B - P2 INLET VALVES = CLOSED POSN.
SOLENOID ADVANCE POLARITY
P3 INLET VALVE = CLOSED POSN.
SOLENOID ADVANCE POLARITY
STYLUS RETRACT PNEUMATIC CAVITY
EXHAUST VENT CONTROL VALVE
P3 = EX OPEN
EXHAUST VALVE SET
P2 - P1 - P2
EX - PS - EX
INLET VALVE SET
P2 - P1 - P2
EX - PS - EX
STYLUS RETRACT PNEUMATIC CAVITY
PRESSURIZED AIR CONTROL VALVE
P3 = PS CLOSED

Figure-60

Programmable 2011 MOSET Character Pattern Selection via Directional Spindle Rotation and Step Angle

[illegible]

DIRECT PART MARKING DIRECT CONTROL MODULE AND DATA EXCHANGE SCHEMAS
PROGRAMMABLE OR SELECTABLE MULTIPLE ORBITAL STYLUS ENGRAVING TOOL
(PMOSET) OR (MOSET) CONTROLS AND DATA EXCHANGE SCHEMAS
FOR THE STRAIGHT OR ENCODED LAND, SINGLE OR MULTI FLUTE STYLUS

DIRECT PART MARKING OPTIC CONTROL MODULE AND DATA EXCHANGE SCHEMAS
PROGRAMMABLE OR SELECTABLE MULTIPLE ORBITAL STYLUS ENGRAVING TOOL
(PMOSET) OR (MOSET) CONTROLS AND DATA EXCHANGE SCHEMAS
FOR THE STRAIGHT OR ENCODED LAND, SINGLE OR MULTI FLUTE STYLUS

DIRECT PART MARKING RADIO CONTROL MODULE AND DATA EXCHANGE SCHEMAS
PROGRAMMABLE OR SELECTABLE MULTIPLE ORBITAL STYLUS ENGRAVING TOOL
(PMOSET) OR (MOSET) CONTROLS AND DATA EXCHANGE SCHEMAS
FOR THE STRAIGHT OR ENCODED LAND, SINGLE OR MULTI FLUTE STYLUS

DIRECT PART MARKING WIRED CONTROL MODULE AND DATA EXCHANGE SCHEMAS
PROGRAMMABLE OR SELECTABLE MULTIPLE ORBITAL STYLUS ENGRAVING TOOL
(PMOSET) OR (MOSET) CONTROLS AND DATA EXCHANGE SCHEMAS
FOR THE STRAIGHT OR ENCODED LAND, SINGLE OR MULTI FLUTE STYLUS

Wireless Programmable 2X11 Detachable Stylus Guide (Dimensioned Assembled View)
Selectable Character Multiple Stylus Orbital Engraving Tool's
Typical Components and Assembly

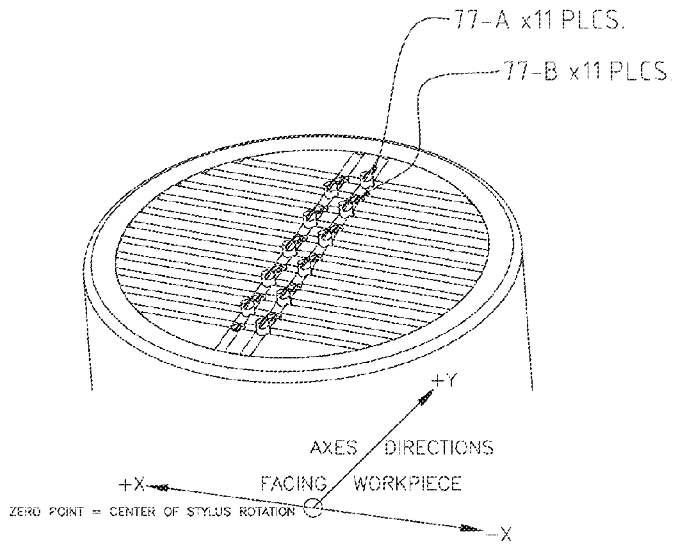

ROUND HOLE ENGRAVING PATTERN(S)
ø 0.8 SINGLE FLUTE STYLUS
ALTERNATING STYLUS TEST PATTERN
(FACING WORK PIECE)

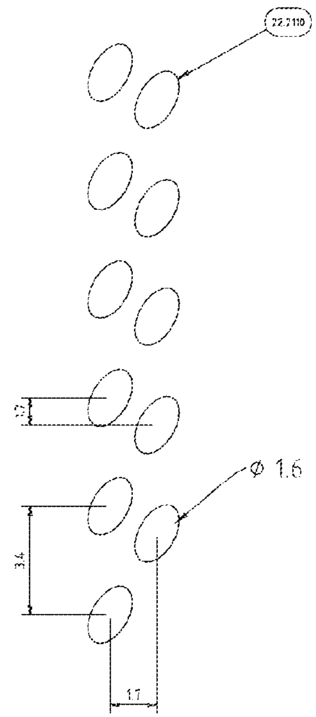

START POSITION OF ø 0.8 STYLUS FLUTE ROTATION
START STYLUS FLUTE POSN TOP CENTER 12 O'CLOCK

COUNTER CLOCKWISE TOOL AND STYLUS FLUTE ROTATION
FOR ONE FULL CIRCLE ORBIT OF TOOL TO
ROTATE THE STYLUS ONE REVOLUTION
SINGLE ROTATION CNC COMMAND: G91 G03 J–.4
(FACING WORK PIECE)

OR VIA 4 SEQUENTIAL QUADRATURE SEGMENTS OF ROTATION
*1 OF 4 CNC COMMAND: G91 G03 K–.4 Y–.4 R.4
TOOL MOTION: 1ST QUARTER OF ROTATION CCW
(FACING WORK PIECE)

1ST QUARTER OF ROTATION CCW
STYLUS FLUTE POSN: MID LEFT 9 O'CLOCK
(FACING WORK PIECE)

*2 OF 4 CNC COMMAND: G91 G03 X+.4 Y–.4 R.4
TOOL MOTION: 2ND QUARTER OF ROTATION CCW
(FACING WORK PIECE)

2ND QUARTER OF ROTATION CCW
STYLUS FLUTE POSN BOTTOM CENTER 6 O'CLOCK

*3 OF 4 CNC COMMAND: G91 G03 X+.4 Y+.4 R.4
TOOL MOTION: 3RD QUARTER OF ROTATION CCW
(FACING WORK PIECE)

3RD QUARTER OF ROTATION CCW
STYLUS FLUTE POSN: MID RIGHT 3 O'CLOCK
(FACING WORK PIECE)

*4 OF 4 CNC COMMAND: G91 G03 K–.4 Y+.4 R.4
TOOL MOTION: START POSN OF STYLUS FLUTE ROTATION
EQUALS THE END POSITION OF STYLUS FLUTE ROTATION
(FACING WORK PIECE)

Programmable 2X11 Detachable Stylus Guide (Round Hole Single Point Stylus View)
For the Selectable Character Multiple Stylus Orbital Engraving Tool

Figure-66

Programmable 2X11 Detachable Stylus Guide (Orthogonal Hole Single Flute Stylus View)
For the Selectable Character Multiple Stylus Orbital Engraving Tool Wireless Programmable 2X11 Detachable Stylus Guide (Exploded Parts View)
Selectable Character Multiple Stylus Orbital Engraving Tool's
Typical Components and Assembly Wireless Programmable 2X11 Detachable Stylus Guide (Exploded Electrical Module View)
Wireless Selectable Character Multiple Stylus Orbital Engraving Tool's
Typical Components and Assembly Wireless Programmable 2X11 Detachable Stylus Guide (Arm – Stylus Center Line Section View)
Selectable Character Multiple Stylus Orbital Engraving Tool's
Typical Components and Assembly Wireless Programmable 7X11 Detachable Stylus Guide (Horizontal Stylus Center Line Section View)
Selectable Character Multiple Stylus Orbital Engraving Tool's
Typical Components and Assembly Wireless Programmable 2X11 Detachable Stylus Guide (Vertical Stylus Center Line Section View)
Selectable Character Multiple Stylus Orbital Engraving Tool's
Typical Components and Assembly Part 6.211 (2X11 Main Housing)
For the Wireless, Programmable 2X11 Detachable Stylus Guide Version
of the Selectable Character Multiple Stylus Orbital Engraving Tool
B-B
A-A Part 67.211 (2X11 Main Housing Shaft Collar)
Typical Component for the Programmable 2X11 Detachable Stylus Guide Version
of the Selectable Character Multiple Stylus Orbital Engraving Tool Part 6.211.90 (2X11 Detachable Stylus Guide Retention Collar)
Typical Component for the Programmable 2X11 Detachable Stylus Guide Version
of the Selectable Character Multiple Stylus Orbital Engraving Tool Part 6.2.11 (Prog. 2X11 3X Manifold)
Typical Component for the Programmable 2X11 Detachable Stylus Guide Version
of the Selectable Character Multiple Stylus Orbital Engraving Tool Part 65.2 (2X11 Index Post Retainer)
Typical Component for the Programmable 2X11 Detachable Stylus Guide Version of the Selectable Character Multiple Stylus Orbital Engraving Tool

| Item | Qty | Name |
|---|---|---|
| 6.1 | 1 | MSOET_HOUSING_SNAP_COVER |
| 6.211 | 1 | PROG.2X11_MAIN_HOUSING |
| 6.211.90 | 1 | 2X11_STYLUS_GUIDE_RETENTION_COLLAR |
| 22.101 | 1 | EXTERNAL_2X11_STYLUS_GUIDE |
| 22.2110 | 1 | ROUND-HOLE_ENGRAVED_SAMPLE_WORK_PIECE |
| 22.2111 | 1 | ORTHOGONAL-HOLE_ENGRAVED_SAMPLE_WORK_PIECE |
| 22.2112 | 2 | STYLUS_SPHERE_RET-ADV_VALVE |
| 22.2114 | 28 | COIL |
| 22.2115 | 4 | 1.0_PLUG |
| 22.2116 | 2 | M-COIL |
| 22.2117 | 22 | STYLUS_PNEUMATIC_RETRACTION_COLLAR |
| 22.2118 | 22 | 0.8_SINGLE_POINT_STYLUS |
| 22.2119 | 22 | STYLUS_STROKE_LIMIT_COLLAR |
| 22.2120 | 22 | ACTUATOR_SECTION |
| 22.2121 | 11 | RETRACTED_0.8_SPHERE_MOVABLE_PART-80.11 |
| 22.2122 | 22 | STYLUS_COMPLIANCE_PART-80 |
| 22.2123 | 22 | .75_PLUG |
| 22.2124 | 11 | 0.8_SPHERE_MAIN_PART-80.10 |
| 22.2125 | 30 | SOLENOID_PLUNGER |
| 22.2126 | 60 | MAGNET |
| 22.2127 | 2 | PROG._2X11_3X_MANIFOLD |
| 22.2128 | 2 | HEXAGON SOCKET SET SCREW - ISO 4026 - M4X4 |
| 22.2129 | 1 | VENT_MBC-1032M-10-SS |
| 22.95 | 1 | INTERNAL_2X11_STYLUS_GUIDE |
| 22.98 | 1 | 2X11_VALVE_CAP |
| 63.1 | 2 | MAIN_PNEUMATIC_FLOW_CONTROL_HSSS- ISO-4027-M5X6 |
| 65 | 1 | MSOET_HOUSING_ANTI-ROTATION_POST |
| 65.1 | 1 | ANTI-ROTATION_BHCS-ISO-7380-M6X25 |
| 65.2 | 1 | PROG._2X11_INDEX_POST_RETAINER |
| 66 | 1 | ANTI-ROTATION_CHCS-DIN-7984-M12X45 |
| 66.1 | 1 | ANTI-ROTATION_NUT-ISO-4035-M12 |
| 67.211 | 1 | PROG.2X11_MAIN_HOUSING_SHAFT_COLLAR |
| 77.211 | 2 | STYLUS_GUIDE_ALIGNMENT_PIN |
| 81.102 | 1 | PROG._2X11_BATTERY |
| 81.103 | 1 | PROG._2X11_CPU-INTERFACE_MODULE |
| 81.104 | 2 | PROG._2X11_DIGITAL_I-O |

Wireless Programmable 2X11 Detachable Stylus Guide (Bill of Material)
Selectable Character Multiple Stylus Orbital Engraving Tool's
Typical Components and Assembly

Figure-78

Spindle Rotation Programmable 2X11 Detachable Stylus Guide
(Exploded Parts View)
Selectable Character Multiple Stylus Orbital Engraving Tool's
Typical Components and Assembly Spindle Rotation Programmable 2X11 Detachable Stylus Guide (Exploded Electrical Module View)
Selectable Character Multiple Stylus Orbital Engraving Tool's
Typical Components and Assembly Spindle Rotation Programmable 2X11 Detachable Stylus Guide
(Arm - Stylus Center Line Section View)
Selectable Character Multiple Stylus Orbital Engraving Tool's
Typical Components and Assembly Spindle Rotation Programmable 2X11 Detachable Stylus Guide
(Horizontal Stylus Center Line Section View)
Selectable Character Multiple Stylus Orbital Engraving Tool's
Typical Components and Assembly Spindle Rotation Programmable 2X1 Detachable Styles Guide
(Vertical Stylus Center Line Section View)
Selectable Character Multiple Stylus Orbital Engraving Tool's
Typical Components and Assembly Part 6.21 (2X11 Main Housing)
For the Spindle Rotation Programmable 2X11 Detachable Stylus Guide Version
of the Selectable Character Multiple Stylus Orbital Engraving Tool Part 67.211 (Spindle Rotation Programmable 2X11 Main Housing Shaft Collar)
Typical Component for the Spindle Rotation Programmable 2X11 Detachable Stylus Guide Version
of the Selectable Character Multiple Stylus Orbital Engraving Tool Part 22.2136 (Spindle Rotation Programmable 2x11 Mounting Shaft for Binary Encoder)
Typical Component for the Spindle Rotation Programmable 2X11 Detachable Stylus Guide Version of the Selectable Character Multiple Stylus Orbital Engraving Tool

| Item | Qty | Name |
|---|---|---|
| 6.1211 | 1 | MSOET_HOUSING_SNAP_COVER |
| 6.211 | 1 | SPINDLE-BINARY_2X11_MAIN_HOUSING |
| 6.211.90 | 1 | 2X11_STYLUS_GUIDE_RETENTION_COLLAR |
| 22.101 | 1 | EXTERNAL_2X11_STYLUS_GUIDE |
| 22.2110 | 1 | ROUND-HOLE_ENGRAVED_SAMPLE_WORK_PIECE |
| 22.2111 | 1 | ORTHOGONAL-HOLE_ENGRAVED_SAMPLE_WORK_PIECE |
| 22.2112 | 2 | STYLUS_SPHERE_RET-ADV_VALVE |
| 22.2114 | 28 | COIL |
| 22.2115 | 4 | 1.0_PLUG |
| 22.2116 | 2 | M-COIL |
| 22.2117 | 22 | STYLUS_PNEUMATIC_RETRACTION_COLLAR |
| 22.2118 | 22 | 0.8_SINGLE_POINT_STYLUS |
| 22.2119 | 22 | STYLUS_STROKE_LIMIT_COLLAR |
| 22.2120 | 22 | ACTUATOR_SECTION |
| 22.2121 | 11 | RETRACTED_0.8_SPHERE_MOVABLE_PART-80.11 |
| 22.2122 | 22 | STYLUS_COMPLIANCE_PART-80 |
| 22.2123 | 22 | .75_PLUG |
| 22.2124 | 11 | 0.8_SPHERE_MAIN_PART-80.10 |
| 22.2125 | 30 | SOLENOID_PLUNGER |
| 22.2126 | 60 | MAGNET |
| 22.2127 | 2 | 2X11_PNEUMATIC_SENSOR_3X_MANIFOLD |
| 22.2128 | 1 | HEXAGON SOCKET SET SCREW - ISO 4026 - M4X4 |
| 22.2129 | 1 | VENT_MBO-1032M-10-SS |
| 22.95 | 1 | INTERNAL_2X11_STYLUS_GUIDE |
| 22.98 | 1 | 2X11_VALVE_CAP |
| 63.1 | 2 | MAIN_PNEUMATIC_FLOW_CONTROL_HSSS-ISO-4027-M5X6 |
| 65 | 1 | MSOET_HOUSING_ANTI-ROTATION_POST |
| 65.1 | 1 | ANTI-ROTATION_BHCS-ISO-7380-M6X25 |
| 65.2 | 1 | PROG._2X11_INDEX_POST_RETAINER |
| 66 | 1 | ANTI-ROTATION_CHCS-DIN-7984-M12X45 |
| 66.1 | 1 | ANTI-ROTATION_NUT-ISO-4035-M12 |
| 77.211 | 2 | STYLUS_GUIDE_ALIGNMENT_PIN |
| 81.102 | 1 | ON-BOARD_BATTERY |
| 81.103 | 1 | SPINDLE_ROTATION-PROG._2X11_CPU |
| 81.104 | 2 | 2X11_DIGITAL_I-O_MODULE |
| 22.2131 | 1 | ROTATION_HOLD_DETENT |
| 22.2132 | 1 | 10MM_X_1.5 |
| 22.2133 | 1 | ROTATION_HOLD_SPRING_REST |
| 22.2134 | 1 | COMPRESSION SPRING - 1.000000 X 9.000000 X 29.000000 |
| 22.2135 | 1 | ROTARY_POSITION_ENCODER_MODULE |
| 22.2136 | 1 | MSOET_BINARY_STYLUS_PATTERN_ENCODER_DISK |
| 22.2137 | 1 | MSOET_MAIN_SHAFT_BEARING_PSFM2025-30 |
| 22.2138 | 1 | PNEUMATIC_SHAFT_SEAL_E7-1626-Z4017 |
| 22.2139 | 1 | MSOET_MAIN_HOUSING_SHAFT_COLLAR |
| 22.2140 | 1 | SPINDLE_RETAINER_COLLAR |
| 22.2141 | 4 | HEXAGON SOCKET SET SCREW - ISO 4026 - M4X10 |
| 22.2142 | 1 | ROTARY_POSITION_ENCODER_DISK |
| 22.2143 | 1 | WASHER - ISO 8738 - 4 - 140 HV |
| 22.2144 | 1 | HEXAGON SOCKET BUTTON HEAD SCREW - ISO 7380 - M4X8 |

Spindle Rotation Programmable 2X11 Detachable Stylus Guide
(Bill of Material)
Selectable Character Multiple Stylus Orbital Engraving Tool's
Typical Components and Assembly

Figure-88

Tool Rotation Programmable 2X11 Detachable Stylus Guide (Dimensioned Assembled View)
Selectable Character Multiple Stylus Orbital Engraving Tool's
Typical Components and Assembly Tool Rotation Programmable 2X11 Detachable Stylus Guide (Exploded Parts View)
Selectable Character Multiple Stylus Orbital Engraving Tool's
Typical Components and Assembly Tool Rotation Programmable 2X11 Detachable Stylus Guide (Exploded Electrical Module View)
Selectable Character Multiple Stylus Orbital Engraving Tool's
Typical Components and Assembly Tool Rotation Programmable 2X11 Detachable Stylus Guide (Arm - Stylus Center Line Section View)
Selectable Character Multiple Stylus Orbital Engraving Tool's
Typical Components and Assembly Tool Rotation Programmable 2X11 Detachable Stylus Guide (Horizontal Stylus Center Line Section View)
Selectable Character Multiple Stylus Orbital Engraving Tool's
Typical Components and Assembly Tool Rotation Programmable 2X11 Detachable Stylus Guide (Vertical Stylus Center Line Section View)
Selectable Character Multiple Stylus Orbital Engraving Tool's
Typical Components and Assembly Part 6.211 (2X11 Main Housing)
For the Tool Rotation Programmable 2X11 Detachable Stylus Guide Version
of the Selectable Character Multiple Stylus Orbital Engraving Tool Part 67.211 (Tool Rotation Programmable 2X11 Main Housing Shaft Collar)
Typical Component for the Tool Rotation Programmable 2X11 Detachable Stylus Guide Version
of the Selectable Character Multiple Stylus Orbital Engraving Tool Part 65 (2X11 Tool Rotation Post Mounting Hole Plug)
Typical Component for the Programmable 2X11 Detachable Stylus Guide Version
of the Selectable Character Multiple Stylus Orbital Engraving Tool

| Item | Qty | Name |
|---|---|---|
| 6.1 | 1 | MSOET_HOUSING_SNAP_COVER |
| 6.211 | 1 | PROG.2X11_MAIN_HOUSING |
| 6.211.90 | 1 | 2X11_STYLUS_GUIDE_RETENTION_COLLAR |
| 22.101 | 1 | EXTERNAL_2X11_STYLUS_GUIDE |
| 22.2110 | 1 | ROUND-HOLE_ENGRAVED_SAMPLE_WORK_PIECE |
| 22.2111 | 1 | ORTHOGONAL-HOLE_ENGRAVED_SAMPLE_WORK_PIECE |
| 22.2112 | 2 | STYLUS_SPHERE_RET-ADV_VALVE |
| 22.2114 | 28 | COIL |
| 22.2115 | 4 | 1.0_PLUG |
| 22.2116 | 2 | M-COIL |
| 22.2117 | 22 | STYLUS_PNEUMATIC_RETRACTION_COLLAR |
| 22.2118 | 22 | 0.8_SINGLE_POINT_STYLUS |
| 22.2119 | 22 | STYLUS_STROKE_LIMIT_COLLAR |
| 22.2120 | 22 | ACTUATOR_SECTION |
| 22.2121 | 11 | RETRACTED_0.8_SPHERE_MOVABLE_PART-80.11 |
| 22.2122 | 22 | STYLUS_COMPLIANCE_PART-80 |
| 22.2123 | 22 | .75_PLUG |
| 22.2124 | 11 | 0.8_SPHERE_MAIN_PART-80.10 |
| 22.2125 | 30 | SOLENOID_PLUNGER |
| 22.2126 | 60 | MAGNET |
| 22.2127 | 2 | PROG._2X11_3X_MANIFOLD |
| 22.2128 | 2 | HEXAGON SOCKET SET SCREW - ISO 4026 - M4X4 |
| 22.2129 | 1 | VENT_MBO-1032M-10-SS |
| 22.95 | 1 | INTERNAL_2X11_STYLUS_GUIDE |
| 22.98 | 1 | 2X11_VALVE_CAP |
| 63.1 | 2 | MAIN_PNEUMATIC_FLOW_CONTROL_HSSS-ISO-4027-M5X6 |
| 65 | 1 | MSOET_HOUSING_PLUG |
| 65.1 | 1 | ANTI-ROTATION_BHCS-ISO-7380-M6X25 |
| 65.2 | 1 | PROG._2X11_INDEX_POST_RETAINER |
| 67.211 | 1 | PROG.2X11_MAIN_HOUSING_SHAFT_COLLAR |
| 77.211 | 2 | STYLUS_GUIDE_ALIGNMENT_PIN |
| 81.102 | 1 | PROG._2X11_BATTERY |
| 81.103.1 | 1 | TOOL_ROTATION-PROG._2X11_CPU |
| 81.104 | 2 | PROG._2X11_DIGITAL_I-O |

Tool Rotation Programmable 2X11 Detachable Stylus Guide (Bill of Material)
Selectable Character Multiple Stylus Orbital Engraving Tool's
Typical Components and Assembly

Figure-98

Rechargeable Contact Programmable 2X11 Detachable Stylus Guide (Dimensioned Assembled View)
Selectable Character Multiple Stylus Orbital Engraving Tool's
Typical Components and Assembly Rechargeable Contact Programmable 2X11 Detachable Stylus Guide
(Exploded Parts View)
Selectable Character Multiple Stylus Orbital Engraving Tool's
Typical Components and Assembly Rechargeable Contact Programmable 2X11 Detachable Stylus Guide
(Exploded Electrical Module View)
Selectable Character Multiple Stylus Orbital Engraving Tool's
Typical Components and Assembly

A-A

Rechargeable Contact Programmable 2X11 Detachable Stylus Guide (Arm - Stylus Center Line Section View)
Selectable Character Multiple Stylus Orbital Engraving Tool's
Typical Components and Assembly Rechargeable Contact Programmable 2X11 Detachable Stylus Guide (Horizontal Stylus Center Line Section View)
Selectable Character Multiple Stylus Orbital Engraving Tool's
Typical Components and Assembly Rechargeable Contact Programmable 2X11 Detachable Stylus Guide (Vertical Stylus Center Line Section View)
Selectable Character Multiple Stylus Orbital Engraving Tool's
Typical Components and Assembly Part 6.2.4.1 (2X11 Main Housing)
For the Rechargeable Contact Programmable 2X11 Detachable Stylus Guide Version
of the Selectable Character Multiple Stylus Orbital Engraving Tool

| Item | Qty | Name |
|---|---|---|
| 6.1 | 1 | MSOET_HOUSING_SNAP_COVER |
| 6.211 | 1 | RECH-PROG.2X11_MAIN_HOUSING |
| 6.211.90 | 1 | 2X11_STYLUS_GUIDE_RETENTION_COLLAR |
| 22.101 | 1 | EXTERNAL_2X11_STYLUS_GUIDE |
| 22.2110 | 1 | ROUND-HOLE_ENGRAVED_SAMPLE_WORK_PIECE |
| 22.2111 | 1 | ORTHOGONAL-HOLE_ENGRAVED_SAMPLE_WORK_PIECE |
| 22.2112 | 2 | STYLUS_SPHERE_RET-ADV_VALVE |
| 22.2114 | 28 | COIL |
| 22.2115 | 4 | 1.0_PLUG |
| 22.2116 | 2 | M-COIL |
| 22.2117 | 22 | STYLUS_PNEUMATIC_RETRACTION_COLLAR |
| 22.2118 | 22 | 0.8_SINGLE_POINT_STYLUS |
| 22.2119 | 22 | STYLUS_STROKE_LIMIT_COLLAR |
| 22.2120 | 22 | ACTUATOR_SECTION |
| 22.2121 | 11 | RETRACTED_0.8_SPHERE_MOVABLE_PART-80.11 |
| 22.2122 | 22 | STYLUS_COMPLIANCE_PART-80 |
| 22.2123 | 22 | .75_PLUG |
| 22.2124 | 11 | 0.8_SPHERE_MAIN_PART-80.10 |
| 22.2125 | 30 | SOLENOID_PLUNGER |
| 22.2126 | 60 | MAGNET |
| 22.2127 | 2 | PROG._2X11_3X_MANIFOLD |
| 22.2128 | 3 | HEXAGON SOCKET SET SCREW - ISO 4026 - M4X4 |
| 22.2129 | 1 | VENT_MBO-1032M-10-SS |
| 22.95 | 1 | INTERNAL_2X11_STYLUS_GUIDE |
| 22.98 | 1 | 2X11_VALVE_CAP |
| 63.1 | 2 | MAIN_PNEUMATIC_FLOW_CONTROL_HSSS-ISO-4027-M5X6 |
| 65 | 1 | MSOET_HOUSING_ANTI-ROTATION_POST |
| 65.1 | 1 | ANTI-ROTATION_BHCS-ISO-7380-M6X25 |
| 65.2 | 1 | PROG._2X11_INDEX_POST_RETAINER |
| 66 | 1 | ANTI-ROTATION_CHCS-DIN-7984-M12X45 |
| 66.1 | 1 | ANTI-ROTATION_NUT-ISO-4035-M12 |
| 67.211 | 1 | RECH-PROG.2X11_MAIN_HOUSING_SHAFT_COLLAR |
| 77.211 | 2 | STYLUS_GUIDE_ALIGNMENT_PIN |
| 81.102 | 1 | PROG._2X11_BATTERY |
| 81.103 | 1 | PROG._2X11_CPU-INTERFACE_MODULE |
| 81.104 | 2 | PROG._2X11_DIGITAL_I-O |
| 22.2145 | 4 | CONTACT_SHOULDER_SCREW_DIN-921_M6X8 |

Rechargeable Contact Programmable 2X11 Detachable Stylus Guide
(Bill of Material)
Selectable Character Multiple Stylus Orbital Engraving Tool's
Typical Components and Assembly

Figure-106

Rechargeable Wireless Programmable 2X11 Detachable Stylus Guide (Dimensioned Assembled View)
Selectable Character Multiple Stylus Orbital Engraving Tool's
Typical Components and Assembly Rechargeable Wireless Programmable 2X11 Detachable Stylus Guide
(Exploded Parts View)
Selectable Character Multiple Stylus Orbital Engraving Tool's
Typical Components and Assembly Rechargeable Wireless Programmable 2X11 Detachable Stylus Guide
(Exploded Electrical Module View)
Selectable Character Multiple Stylus Orbital Engraving Tool's
Typical Components and Assembly

A-A

Rechargeable Wireless Programmable 2X11 Detachable Stylus Guide (Arm - Stylus Center Line Section View)
Selectable Character Multiple Stylus Orbital Engraving Tool's
Typical Components and Assembly Rechargeable Wireless Programmable ZXM Detachable Stylus Guide (Horizontal Stylus Center Line Section View)
Selectable Character Multiple Stylus Orbital Engraving Tool's
Typical Components and Assembly Rechargeable Wireless Programmable 2X11 Detachable Stylus Guide (Vertical Stylus Center Line Section View)
Selectable Character Multiple Stylus Orbital Engraving Tool's
Typical Components and Assembly Part 6.2431 (2X11 Main Housing)
For the Rechargeable Wireless Programmable 2X11 Detachable Stylus Guide Version
of the Selectable Character Multiple Stylus Orbital Engraving Tool

| Item | Qty | Name |
|---|---|---|
| 6.1 | 1 | MSOET_HOUSING_SNAP_COVER |
| 6.211 | 1 | RECH-PROG.2X11_MAIN_HOUSING |
| 6.211.90 | 1 | 2X11_STYLUS_GUIDE_RETENTION_COLLAR |
| 22.101 | 1 | EXTERNAL_2X11_STYLUS_GUIDE |
| 22.2110 | 1 | ROUND-HOLE_ENGRAVED_SAMPLE_WORK_PIECE |
| 22.2111 | 1 | ORTHOGONAL-HOLE_ENGRAVED_SAMPLE_WORK_PIECE |
| 22.2112 | 2 | STYLUS_SPHERE_RET-ADV_VALVE |
| 22.2114 | 28 | COIL |
| 22.2115 | 4 | 1.0_PLUG |
| 22.2116 | 2 | M-COIL |
| 22.2117 | 22 | STYLUS_PNEUMATIC_RETRACTION_COLLAR |
| 22.2118 | 22 | 0.8_SINGLE_POINT_STYLUS |
| 22.2119 | 22 | STYLUS_STROKE_LIMIT_COLLAR |
| 22.2120 | 22 | ACTUATOR_SECTION |
| 22.2121 | 11 | RETRACTED_0.8_SPHERE_MOVABLE_PART-80.11 |
| 22.2122 | 22 | STYLUS_COMPLIANCE_PART-80 |
| 22.2123 | 22 | .75_PLUG |
| 22.2124 | 11 | 0.8_SPHERE_MAIN_PART-80.10 |
| 22.2125 | 30 | SOLENOID_PLUNGER |
| 22.2126 | 60 | MAGNET |
| 22.2127 | 2 | PROG._2X11_3X_MANIFOLD |
| 22.2128 | 3 | HEXAGON SOCKET SET SCREW - ISO 4026 - M4X4 |
| 22.2129 | 1 | VENT_MBO-1032M-10-SS |
| 22.95 | 1 | INTERNAL_2X11_STYLUS_GUIDE |
| 22.98 | 1 | 2X11_VALVE_CAP |
| 63.1 | 2 | MAIN_PNEUMATIC_FLOW_CONTROL_HSSS-ISO-4027-M5X6 |
| 65 | 1 | MSOET_HOUSING_ANTI-ROTATION_POST |
| 65.1 | 1 | ANTI-ROTATION_BHCS-ISO-7380-M6X25 |
| 65.2 | 1 | PROG._2X11_INDEX_POST_RETAINER |
| 66 | 1 | ANTI-ROTATION_CHCS-DIN-7984-M12X45 |
| 66.1 | 1 | ANTI-ROTATION_NUT-ISO-4035-M12 |
| 67.211 | 1 | RECH-PROG.2X11_MAIN_HOUSING_SHAFT_COLLAR |
| 77.211 | 2 | STYLUS_GUIDE_ALIGNMENT_PIN |
| 81.102 | 1 | PROG._2X11_BATTERY |
| 81.103 | 1 | PROG._2X11_CPU-INTERFACE_MODULE |
| 81.104 | 2 | PROG._2X11_DIGITAL_I-O |
| 22.2145 | 2 | CONTACT_SHOULDER_SCREW_DIN-921_M6X8 |

Rechargeable Wireless Programmable 2X11 Detachable Stylus Guide
(Bill of Material)
Selectable Character Multiple Stylus Orbital Engraving Tool's
Typical Components and Assembly

Figure-114

Optical Programmable 2X11 Detachable Stylus Guide (Dimensioned Assembled View)
Selectable Character Multiple Stylus Orbital Engraving Tool's
Typical Components and Assembly Optical Programmable 2X11 Detachable Stylus Guide (Exploded Parts View)
Selectable Character Multiple Stylus Orbital Engraving Tool's
Typical Components and Assembly Optical Programmable 2X11 Detachable Stylus Guide (Exploded Electrical Module View)
Selectable Character Multiple Stylus Orbital Engraving Tool's
Typical Components and Assembly <u>Optical Programmable 2X11 Detachable Stylus Guide</u> (Arm - Stylus Center Line Section View)
Selectable Character Multiple Stylus Orbital Engraving Tool's
Typical Components and Assembly Optical Programmable 2X11 Detachable Stylus Guide (Horizontal Stylus Center Line Section View)
Selectable Character Multiple Stylus Orbital Engraving Tool's
Typical Components and Assembly Optical Programmable 2X11 Detachable Stylus Guide (Vertical Stylus Center Line Section View)
Selectable Character Multiple Stylus Orbital Engraving Tool's
Typical Components and Assembly Part 6.2110 (Optical Programmable 2X11 Main Housing)
For the Optical Programmable 2X11 Detachable Stylus Guide Version
of the Selectable Character Multiple Stylus Orbital Engraving Tool

| Item | Qty | Name |
|---|---|---|
| 6.1 | 1 | MSOET_HOUSING_SNAP_COVER |
| 6.2110 | 1 | OPTIC.2X11_MAIN_HOUSING |
| 6.211.90 | 1 | 2X11_STYLUS_GUIDE_RETENTION_COLLAR |
| 22.101 | 1 | EXTERNAL_2X11_STYLUS_GUIDE |
| 22.118 | 1 | TRANSMIT_IR-LED |
| 22.119 | 1 | RECEIVE_IR-SENSOR |
| 22.2110 | 1 | ROUND-HOLE_ENGRAVED_SAMPLE_WORK_PIECE |
| 22.2111 | 1 | ORTHOGONAL-HOLE_ENGRAVED_SAMPLE_WORK_PIECE |
| 22.2112 | 2 | STYLUS_SPHERE_RET-ADV_VALVE |
| 22.2114 | 28 | COIL |
| 22.2115 | 4 | 1.0_PLUG |
| 22.2116 | 2 | M-COIL |
| 22.2117 | 22 | STYLUS_PNEUMATIC_RETRACTION_COLLAR |
| 22.2118 | 22 | 0.8_SINGLE_POINT_STYLUS |
| 22.2119 | 22 | STYLUS_STROKE_LIMIT_COLLAR |
| 22.2120 | 22 | ACTUATOR_SECTION |
| 22.2121 | 11 | RETRACTED_0.8_SPHERE_MOVABLE_PART-80.11 |
| 22.2122 | 22 | STYLUS_COMPLIANCE_PART-80 |
| 22.2123 | 22 | .75_PLUG |
| 22.2124 | 11 | 0.8_SPHERE_MAIN_PART-80.10 |
| 22.2125 | 30 | SOLENOID_PLUNGER |
| 22.2126 | 60 | MAGNET |
| 22.2127 | 2 | PROG._2X11_3X_MANIFOLD |
| 22.2128 | 2 | HEXAGON SOCKET SET SCREW - ISO 4026 - M4X4 |
| 22.2129 | 1 | VENT_MB0-1032M-10-SS |
| 22.95 | 1 | INTERNAL_2X11_STYLUS_GUIDE |
| 22.98 | 1 | 2X11_VALVE_CAP |
| 63.1 | 2 | MAIN_PNEUMATIC_FLOW_CONTROL_HSSS-ISO-4027-M5X6 |
| 65 | 1 | MSOET_HOUSING_ANTI-ROTATION_POST |
| 65.1 | 1 | ANTI-ROTATION_BHCS-ISO-7380-M6X25 |
| 65.2 | 1 | PROG._2X11_INDEX_POST_RETAINER |
| 66 | 1 | ANTI-ROTATION_CHCS-DIN-7984-M12X45 |
| 66.1 | 1 | ANTI-ROTATION_NUT-ISO-4035-M12 |
| 67.211 | 1 | PROG.2X11_MAIN_HOUSING_SHAFT_COLLAR |
| 77.211 | 2 | STYLUS_GUIDE_ALIGNMENT_PIN |
| 81.102 | 1 | PROG._2X11_BATTERY |
| 81.103 | 1 | PROG._2X11_CPU-INTERFACE_MODULE |
| 81.104 | 2 | PROG._2X11_DIGITAL_I-O |

Optical Programmable 2X11 Detachable Stylus Guide (Bill of Material)
Selectable Character Multiple Stylus Orbital Engraving Tool's
Typical Components and Assembly

Figure-122

Rechargeable Optical Programmable 2X11 Detachable Stylus Guide (Dimensioned Assembled View)
Selectable Character Multiple Stylus Orbital Engraving Tool's
Typical Components and Assembly Rechargeable Optical Programmable 2X11 Detachable Stylus Guide
(Exploded Parts View)
Selectable Character Multiple Stylus Orbital Engraving Tool's
Typical Components and Assembly Rechargeable Optical Programmable 2X11 Detachable Stylus Guide
(Exploded Electrical Module View)
Selectable Character Multiple Stylus Orbital Engraving Tool's
Typical Components and Assembly

A-A

Rechargeable Optical Programmable 2X11 Detachable Stylus Guide (Arm – Stylus Center Line Section View)
Selectable Character Multiple Stylus Orbital Engraving Tool's
Typical Components and Assembly Rechargeable Optical Programmable 2X11 Detachable Stylus Guide (Horizontal Stylus Center Line Section View)
Selectable Character Multiple Stylus Orbital Engraving Tool's
Typical Components and Assembly

A-A

Rechargeable Optical Programmable 2X1) Detachable Stylus Guide (Vertical Stylus Center Line Section View)
Selectable Character Multiple Stylus Orbital Engraving Tool's
Typical Components and Assembly Part 6.24.110 (2X11 Main Housing)
For the Rechargeable Optical Programmable 2X11 Detachable Stylus Guide Version
of the Selectable Character Multiple Stylus Orbital Engraving Tool

| Item | Qty | Name |
|---|---|---|
| 6.1 | 1 | MSOET_HOUSING_SNAP_COVER |
| 6.211.90 | 1 | 2X11_STYLUS_GUIDE_RETENTION_COLLAR |
| 6.2110 | 1 | RECH-OPTICAL_2X11_MAIN_HOUSING |
| 22.101 | 1 | EXTERNAL_2X11_STYLUS_GUIDE |
| 22.118 | 1 | TRANSMIT_IR-LED |
| 22.119 | 1 | RECEIVE_IR-SENSOR |
| 22.2110 | 1 | ROUND-HOLE_ENGRAVED_SAMPLE_WORK_PIECE |
| 22.2111 | 1 | ORTHOGONAL-HOLE_ENGRAVED_SAMPLE_WORK_PIECE |
| 22.2112 | 2 | STYLUS_SPHERE_RET-ADV_VALVE |
| 22.2114 | 28 | COIL |
| 22.2115 | 4 | 1.0_PLUG |
| 22.2116 | 2 | M-COIL |
| 22.2117 | 22 | STYLUS_PNEUMATIC_RETRACTION_COLLAR |
| 22.2118 | 22 | 0.8_SINGLE_POINT_STYLUS |
| 22.2119 | 22 | STYLUS_STROKE_LIMIT_COLLAR |
| 22.2120 | 22 | ACTUATOR_SECTION |
| 22.2121 | 11 | RETRACTED_0.8_SPHERE_MOVABLE_PART-80.11 |
| 22.2122 | 22 | STYLUS_COMPLIANCE_PART-80 |
| 22.2123 | 22 | .75_PLUG |
| 22.2124 | 11 | 0.8_SPHERE_MAIN_PART-80.10 |
| 22.2125 | 30 | SOLENOID_PLUNGER |
| 22.2126 | 60 | MAGNET |
| 22.2127 | 2 | PROG._2X11_3X_MANIFOLD |
| 22.2128 | 3 | HEXAGON SOCKET SET SCREW - ISO 4026 - M4X4 |
| 22.2129 | 1 | VENT_MBO-1032M-10-SS |
| 22.2145 | 2 | CONTACT_SHOULDER_SCREW_DIN-921_M6X8 |
| 22.95 | 1 | INTERNAL_2X11_STYLUS_GUIDE |
| 22.98 | 1 | 2X11_VALVE_CAP |
| 63.1 | 2 | MAIN_PNEUMATIC_FLOW_CONTROL_HSSS-ISO-4027-M5X6 |
| 65 | 1 | MSOET_HOUSING_ANTI-ROTATION_POST |
| 65.1 | 1 | ANTI-ROTATION_BHCS-ISO-7380-M6X25 |
| 65.2 | 1 | PROG._2X11_INDEX_POST_RETAINER |
| 66 | 1 | ANTI-ROTATION_CHCS-DIN-7984-M12X45 |
| 66.1 | 1 | ANTI-ROTATION_NUT-ISO-4035-M12 |
| 67.211 | 1 | RECH-PROG 2X11_MAIN_HOUSING_SHAFT_COLLAR |
| 77.211 | 2 | STYLUS_GUIDE_ALIGNMENT_PIN |
| 81.102 | 1 | PROG._2X11_BATTERY |
| 81.103 | 1 | PROG._2X11_CPU-INTERFACE_MODULE |
| 81.104 | 2 | PROG._2X11_DIGITAL_I-O |

Rechargeable Optical Programmable 2X11 Detachable Stylus Guide (Bill of Material)
Selectable Character Multiple Stylus Orbital Engraving Tool's
Typical Components and Assembly

Figure-130

Rechargeable Spindle Rotation Programmable Programmable 2X11 Detachable Stylus Guide
(Exploded Parts View)
Selectable Character Multiple Stylus Orbital Engraving Tool's
Typical Components and Assembly Rechargeable Spindle Rotation Programmable Programmable 2X11 Detachable Stylus Guide
(Exploded Electrical Module View)
Selectable Character Multiple Stylus Orbital Engraving Tool's
Typical Components and Assembly Rechargeable Spindle Rotation Programmable Programmable 2X11 Detachable Stylus Guide
(Arm – Stylus Center Line Section View)
Selectable Character Multiple Stylus Orbital Engraving Tool's
Typical Components and Assembly Rechargeable Spindle Rotation Programmable Programmable 2X11 Detachable Stylus Guide
(Horizontal Stylus Center Line Section View)
Selectable Character Multiple Stylus Orbital Engraving Tools
Typical Components and Assembly Rechargeable Spindle Rotation Programmable Programmable 2X9 Detachable Stylus Guide
(Vertical Stylus Center Line Section View)
Selectable Character Multiple Stylus Orbital Engraving Tool's
Typical Components and Assembly Part 6.21 (2X11 Main Housing)
For the Rechargeable Spindle Rotation Programmable 2X11 Detachable Stylus Guide Version
of the Selectable Character Multiple Stylus Orbital Engraving Tool

| Item | Qty | Name |
|---|---|---|
| 6.1211 | 1 | MSOET_HOUSING_SNAP_COVER |
| 6.2110 | 1 | REC.SPINDLE-BINARY_2X11_MAIN_HOUSING |
| 6.211 90 | 1 | 2X11_STYLUS_GUIDE_RETENTION_COLLAR |
| 22 101 | 1 | EXTERNAL_2X11_STYLUS_GUIDE |
| 22.2110 | 1 | ROUND-HOLE_ENGRAVED_SAMPLE_WORK_PIECE |
| 22.2111 | 1 | ORTHOGONAL-HOLE_ENGRAVED_SAMPLE_WORK_PIECE |
| 22.2112 | 2 | STYLUS_SPHERE_RET-ADV_VALVE |
| 22.2114 | 28 | COIL |
| 22.2115 | 4 | 1.0_PLUG |
| 22.2116 | 2 | M-COIL |
| 22.2117 | 22 | STYLUS_PNEUMATIC_RETRACTION_COLLAR |
| 22.2118 | 22 | 0.8_SINGLE_POINT_STYLUS |
| 22.2119 | 22 | STYLUS_STROKE_LIMIT_COLLAR |
| 22 2120 | 22 | ACTUATOR_SECTION |
| 22 2121 | 11 | RETRACTED_0.8_SPHERE_MOVABLE_PART-80.11 |
| 22 2122 | 22 | STYLUS_COMPLIANCE_PART-80 |
| 22.2123 | 22 | .75_PLUG |
| 22.2124 | 11 | 0.8_SPHERE_MAIN_PART-80.10 |
| 22.2125 | 30 | SOLENOID_PLUNGER |
| 22.2126 | 60 | MAGNET |
| 22.2127 | 2 | 2X11_PNEUMATIC_SENSOR_3X_MANIFOLD |
| 22.2128 | 2 | HEXAGON SOCKET SET SCREW - ISO 4026 - M4X4 |
| 22 2129 | 1 | VENT_MBO-1032M-10-SS |
| 22.95 | 1 | INTERNAL_2X11_STYLUS_GUIDE |
| 22 98 | 1 | 2X11_VALVE_CAP |
| 63 1 | 2 | MAIN_PNEUMATIC_FLOW_CONTROL_HSSS-ISO-4027-M5X6 |
| 65 | 1 | MSOET_HOUSING_ANTI-ROTATION_POST |
| 65 1 | 1 | ANTI-ROTATION_BHCS-ISO-7380-M6X25 |
| 65.2 | 1 | PROG._2X11_INDEX_POST_RETAINER |
| 66 | 1 | ANTI-ROTATION_CHCS-DIN-7984-M12X45 |
| 66.1 | 1 | ANTI-ROTATION_NUT-ISO-4035-M12 |
| 77.211 | 2 | STYLUS_GUIDE_ALIGNMENT_PIN |
| 81.102 | 1 | ON-BOARD_BATTERY |
| 81.103 | 1 | SPINDLE_SELECTABLE-PROG._2X11_CPU |
| 81.104 | 2 | 2X11_DIGITAL_I-O_MODULE |
| 22.2131 | 1 | ROTATION_HOLD_DETENT |
| 22.2132 | 1 | 10MM_X_1.5 |
| 22 2133 | 1 | ROTATION_HOLD_SPRING_REST |
| 22.2134 | 1 | COMPRESSION SPRING - 1.000000 X 9.000000 X 29.000000 |
| 22.2135 | 1 | ROTARY_POSITION_ENCODER_MODULE |
| 22.2136 | 1 | MSOET_BINARY_STYLUS_PATTERN_ENCODER_DISK |
| 22.2137 | 1 | MSOET_MAIN_SHAFT_BEARING_PSFM2025-30 |
| 22.2138 | 1 | PNEUMATIC_SHAFT_SEAL_E7-1626-Z4017 |
| 22.2139 | 1 | MSOET_MAIN_HOUSING_SHAFT_COLLAR |
| 22.2140 | 1 | SPINDLE_RETAINER_COLLAR |
| 22.2141 | 4 | HEXAGON SOCKET SET SCREW - ISO 4026 - M4X10 |
| 22.2142 | 1 | ROTARY_POSITION_ENCODER_DISK |
| 22.2143 | 1 | WASHER - ISO 8738 - 4 - 140 HV |
| 22.2144 | 1 | HEXAGON SOCKET BUTTON HEAD SCREW - ISO 7380 - M4X8 |
| 22.2145 | 2 | CONTACT_SHOULDER_SCREW_DIN-921_M6X8 |

Rechargeable Spindle Rotation Programmable Programmable 2X11 Detachable Stylus Guide
(Bill of Material)
Selectable Character Multiple Stylus Orbital Engraving Tool's
Typical Components and Assembly

Figure-138

Rechargeable Tool Rotational Programmable 2X11 Detachable Stylus Guide (Dimensioned Assembled View)
Selectable Character Multiple Stylus Orbital Engraving Tool's
Typical Components and Assembly Rechargeable Tool Rotational Programmable 2X11 Detachable Stylus Guide (Exploded Parts View)
Selectable Character Multiple Stylus Orbital Engraving Tool's
Typical Components and Assembly Rechargeable Tool Rotational Programmable 2X11 Detachable Stylus Guide
(Exploded Electrical Module View)
Selectable Character Multiple Stylus Orbital Engraving Tool's
Typical Components and Assembly

A-A

Rechargeable Tool Rotational Programmable 2X11 Detachable Stylus Guide (Arm - Stylus Center Line Section View)
Selectable Character Multiple Stylus Orbital Engraving Tool's
Typical Components and Assembly A–A
Rechargeable Tool Rotational Programmable 2X11 Detachable Stylus Guide (Horizontal Stylus Center Line Section View)
Selectable Character Multiple Stylus Orbital Engraving Tool's
Typical Components and Assembly Rechargeable Tool Rotational Programmable 2X11 Detachable Stylus Guide (Vertical Stylus Center Line Section View)
Selectable Character Multiple Stylus Orbital Engraving Tool's
Typical Components and Assembly Part 6.2130 (2X11 Main Housing)
For the Rechargeable Tool Rotational Programmable 2X11 Detachable Stylus Guide Version
of the Selectable Character Multiple Stylus Orbital Engraving Tool

| Item | Qty | Name |
|---|---|---|
| 6.1 | 1 | MSOET_HOUSING_SNAP_COVER |
| 6.2110 | 1 | RECH-ROTATION_2X11_MAIN_HOUSING |
| 6.211.90 | 1 | 2X11_STYLUS_GUIDE_RETENTION_COLLAR |
| 22.101 | 1 | EXTERNAL_2X11_STYLUS_GUIDE |
| 22.2110 | 1 | ROUND-HOLE_ENGRAVED_SAMPLE_WORK_PIECE |
| 22.2111 | 1 | ORTHOGONAL-HOLE_ENGRAVED_SAMPLE_WORK_PIECE |
| 22.2112 | 2 | STYLUS_SPHERE_RET-ADV_VALVE |
| 22.2114 | 28 | COIL |
| 22.2115 | 4 | 1.0_PLUG |
| 22.2116 | 2 | M-COIL |
| 22.2117 | 22 | STYLUS_PNEUMATIC_RETRACTION_COLLAR |
| 22.2118 | 22 | 0.8_SINGLE_POINT_STYLUS |
| 22.2119 | 22 | STYLUS_STROKE_LIMIT_COLLAR |
| 22.2120 | 22 | ACTUATOR_SECTION |
| 22.2121 | 11 | RETRACTED_0.8_SPHERE_MOVABLE_PART-80.11 |
| 22.2122 | 22 | STYLUS_COMPLIANCE_PART-80 |
| 22.2123 | 22 | .75_PLUG |
| 22.2124 | 11 | 0.8_SPHERE_MAIN_PART-80.10 |
| 22.2125 | 30 | SOLENOID_PLUNGER |
| 22.2126 | 60 | MAGNET |
| 22.2127 | 2 | PROG._2X11_3X_MANIFOLD |
| 22.2128 | 3 | HEXAGON SOCKET SET SCREW - ISO 4026 - M4X4 |
| 22.2129 | 1 | VENT_MBO-1032M-10-SS |
| 22.95 | 1 | INTERNAL_2X11_STYLUS_GUIDE |
| 22.98 | 1 | 2X11_VALVE_CAP |
| 63.1 | 2 | MAIN_PNEUMATIC_FLOW_CONTROL_HSSS- ISO-4027-M5X6 |
| 65 | 1 | MSOET_HOUSING_PLUG |
| 65.1 | 1 | ANTI-ROTATION_BHCS-ISO-7380-M6X25 |
| 65.2 | 1 | PROG._2X11_INDEX_POST_RETAINER |
| 67.211 | 1 | PROG.2X11_MAIN_HOUSING_SHAFT_COLLAR |
| 77.211 | 2 | STYLUS_GUIDE_ALIGNMENT_PIN |
| 81.102 | 1 | PROG._2X11_BATTERY |
| 81.103.1 | 1 | TOOL_ROTATION-PROG._2X11_CPU |
| 81.104 | 2 | PROG._2X11_DIGITAL_I-O |
| 22.2145 | 2 | CONTACT_SHOULDER_SCREW_DIN-921_M6X8 |

Rechargeable Tool Rotational Programmable 2X11 Detachable Stylus Guide (Bill of Material)
Selectable Character Multiple Stylus Orbital Engraving Tool's
Typical Components and Assembly

Figure-146

Rechargeable Contact and Wireless Programmable 2X11 Detachable Stylus Guide (Dimensioned Assembled View)
Selectable Character Multiple Stylus Orbital Engraving Tool's
Typical Components and Assembly Rechargeable Contact and Wireless Programmable 2X11 Detachable Stylus Guide
(Exploded Parts View)
Selectable Character Multiple Stylus Orbital Engraving Tool's
Typical Components and Assembly Rechargeable Contact and Wireless Programmable 2X11 Detachable Stylus Guide
(Exploded Electrical Module View)
Selectable Character Multiple Stylus Orbital Engraving Tool's
Typical Components and Assembly Rechargeable Contact and Wireless Programmable 2X11 Detachable Stylus Guide (Arm - Stylus Center Line Section View)
Selectable Character Multiple Stylus Orbital Engraving Tool's
Typical Components and Assembly Rechargeable Contact and Wireless Programmable 2X11 Detachable Stylus Guide (Horizontal Stylus Center Line Section View)
Selectable Character Multiple Stylus Orbital Engraving Tool's
Typical Components and Assembly Rechargeable Contact and Wireless Programmable 2X11 Detachable Stylus Guide (Vertical Stylus Center Line Section View)
Selectable Character Multiple Stylus Orbital Engraving Tools
Typical Components and Assembly Part 6.2.4.11 (2X11 Main Housing)
For the Rechargeable Contact and Wireless Programmable 2X11 Detachable Stylus Guide Version
of the Selectable Character Multiple Stylus Orbital Engraving Tool

| Item | Qty | Name |
|---|---|---|
| 6.1 | 1 | MSOET_HOUSING_SNAP_COVER |
| 6.211 | 1 | RECH-PROG.2X11_MAIN_HOUSING |
| 6.211.90 | 1 | 2X11_STYLUS_GUIDE_RETENTION_COLLAR |
| 22.101 | 1 | EXTERNAL_2X11_STYLUS_GUIDE |
| 22.2110 | 1 | ROUND-HOLE_ENGRAVED_SAMPLE_WORK_PIECE |
| 22.2111 | 1 | ORTHOGONAL-HOLE_ENGRAVED_SAMPLE_WORK_PIECE |
| 22.2112 | 2 | STYLUS_SPHERE_RET-ADV_VALVE |
| 22.2114 | 28 | COIL |
| 22.2115 | 4 | 1.0_PLUG |
| 22.2116 | 2 | M-COIL |
| 22.2117 | 22 | STYLUS_PNEUMATIC_RETRACTION_COLLAR |
| 22.2118 | 22 | 0.8_SINGLE_POINT_STYLUS |
| 22.2119 | 22 | STYLUS_STROKE_LIMIT_COLLAR |
| 22.2120 | 22 | ACTUATOR_SECTION |
| 22.2121 | 11 | RETRACTED_0.8_SPHERE_MOVABLE_PART-80.11 |
| 22.2122 | 22 | STYLUS_COMPLIANCE_PART-80 |
| 22.2123 | 22 | .75_PLUG |
| 22.2124 | 11 | 0.8_SPHERE_MAIN_PART-80.10 |
| 22.2125 | 30 | SOLENOID_PLUNGER |
| 22.2126 | 60 | MAGNET |
| 22.2127 | 2 | PROG._2X11_3X_MANIFOLD |
| 22.2128 | 3 | HEXAGON SOCKET SET SCREW - ISO 4026 - M4X4 |
| 22.2129 | 1 | VENT_MBO-1032M-10-SS |
| 22.95 | 1 | INTERNAL_2X11_STYLUS_GUIDE |
| 22.98 | 1 | 2X11_VALVE_CAP |
| 63.1 | 2 | MAIN_PNEUMATIC_FLOW_CONTROL_HSSS- ISO-4027-M5X6 |
| 65 | 1 | MSOET_HOUSING_ANTI-ROTATION_POST |
| 65.1 | 1 | ANTI-ROTATION_BHCS-ISO-7380-M6X25 |
| 65.2 | 1 | PROG._2X11_INDEX_POST_RETAINER |
| 66 | 1 | ANTI-ROTATION_CHCS-DIN-7984-M12X45 |
| 66.1 | 1 | ANTI-ROTATION_NUT-ISO-4035-M12 |
| 67.211 | 1 | RECH-PROG.2X11_MAIN_HOUSING_SHAFT_COLLAR |
| 77.211 | 2 | STYLUS_GUIDE_ALIGNMENT_PIN |
| 81.102 | 1 | PROG._2X11_BATTERY |
| 81.103 | 1 | PROG._2X11_CPU-INTERFACE_MODULE |
| 81.104 | 2 | PROG._2X11_DIGITAL_I-O |
| 22.2145 | 4 | CONTACT_SHOULDER_SCREW_DIN-921_M6X8 |

Rechargeable Contact and Wireless Programmable 2X11 Detachable Stylus Guide
(Bill of Material)
Selectable Character Multiple Stylus Orbital Engraving Tool's
Typical Components and Assembly

Figure-154

Rechargeable Contact and Optical Programmable 2X11 Detachable Stylus Guide (Dimensioned Assembled View)
Selectable Character Multiple Stylus Orbital Engraving Tool's
Typical Components and Assembly Rechargeable Contact and Optical Programmable 2X11 Detachable Stylus Guide
(Exploded Parts View)
Selectable Character Multiple Stylus Orbital Engraving Tool's
Typical Components and Assembly Rechargeable Contact and Optical Programmable 2X11 Detachable Stylus Guide
(Exploded Electrical Module View)
Selectable Character Multiple Stylus Orbital Engraving Tool's
Typical Components and Assembly

A-A

Rechargeable Contact and Optical Programmable 2X11 Detachable Stylus Guide (Arm - Stylus Center Line Section View)
Selectable Character Multiple Stylus Orbital Engraving Tool's
Typical Components and Assembly

A-A

Rechargeable Contact and Optical Programmable 2X11 Detachable Stylus Guide (Horizontal Stylus Center Line Section View)
Selectable Character Multiple Stylus Orbital Engraving Tool's
Typical Components and Assembly Rechargeable Contact and Optical Programmable 2X11 Detachable Stylus Guide (Vertical Stylus Center Line Section View)
Selectable Character Multiple Stylus Orbital Engraving Tool's
Typical Components and Assembly

| Item | Qty | Name |
|---|---|---|
| 6.1 | 1 | MSOET_HOUSING_SNAP_COVER |
| 6.211.90 | 1 | 2X11_STYLUS_GUIDE_RETENTION_COLLAR |
| 6.2110 | 1 | RECH-OPTICAL_2X11_MAIN_HOUSING |
| 22.101 | 1 | EXTERNAL_2X11_STYLUS_GUIDE |
| 22.118 | 1 | TRANSMIT_IR-LED |
| 22.119 | 1 | RECEIVE_IR-SENSOR |
| 22.2110 | 1 | ROUND-HOLE_ENGRAVED_SAMPLE_WORK_PIECE |
| 22.2111 | 1 | ORTHOGONAL-HOLE_ENGRAVED_SAMPLE_WORK_PIECE |
| 22.2112 | 2 | STYLUS_SPHERE_RET-ADV_VALVE |
| 22.2114 | 28 | COIL |
| 22.2115 | 4 | 1.0_PLUG |
| 22.2116 | 2 | M-COIL |
| 22.2117 | 22 | STYLUS_PNEUMATIC_RETRACTION_COLLAR |
| 22.2118 | 22 | 0.8_SINGLE_POINT_STYLUS |
| 22.2119 | 22 | STYLUS_STROKE_LIMIT_COLLAR |
| 22.2120 | 22 | ACTUATOR_SECTION |
| 22.2121 | 11 | RETRACTED_0.8_SPHERE_MOVABLE_PART-80.11 |
| 22.2122 | 22 | STYLUS_COMPLIANCE_PART-80 |
| 22.2123 | 22 | .75_PLUG |
| 22.2124 | 11 | 0.8_SPHERE_MAIN_PART-80.10 |
| 22.2125 | 30 | SOLENOID_PLUNGER |
| 22.2126 | 60 | MAGNET |
| 22.2127 | 2 | PROG._2X11_3X_MANIFOLD |
| 22.2128 | 3 | HEXAGON SOCKET SET SCREW - ISO 4026 - M4X4 |
| 22.2129 | 1 | VENT_MBO-1032M-10-SS |
| 22.2145 | 4 | CONTACT_SHOULDER_SCREW_DIN-921_M6X8 |
| 22.95 | 1 | INTERNAL_2X11_STYLUS_GUIDE |
| 22.98 | 1 | 2X11_VALVE_CAP |
| 63.1 | 2 | MAIN_PNEUMATIC_FLOW_CONTROL_HSSS- ISO-4027-M5X6 |
| 65 | 1 | MSOET_HOUSING_ANTI-ROTATION_POST |
| 65.1 | 1 | ANTI-ROTATION_BHCS-ISO-7380-M6X25 |
| 65.2 | 1 | PROG._2X11_INDEX_POST_RETAINER |
| 66 | 1 | ANTI-ROTATION_CHCS-DIN-7984-M12X45 |
| 66.1 | 1 | ANTI-ROTATION_NUT-ISO-4035-M12 |
| 67.211 | 1 | RECH-PROG.2X11_MAIN_HOUSING_SHAFT_COLLAR |
| 77.211 | 2 | STYLUS_GUIDE_ALIGNMENT_PIN |
| 81.102 | 1 | PROG._2X11_BATTERY |
| 81.103 | 1 | PROG._2X11_CPU-INTERFACE_MODULE |
| 81.104 | 2 | PROG._2X11_DIGITAL_I-O |

Rechargeable Contact and Optical Programmable 2X11 Detachable Stylus Guide (Bill of Material)
Selectable Character Multiple Stylus Orbital Engraving Tool's
Typical Components and Assembly

Figure-162

MULTI-STYLUS ORBITAL ENGRAVING TOOL

CROSS-REFERENCE TO RELATED APPLICATIONS

This application claims the benefit of U.S. Provisional Application No. 62/059,692, filed Oct. 3, 2014, the disclosure of which is hereby incorporated by reference in its entirety. This application is related to U.S. patent application Ser. No. 14/875,284, titled "METHOD AND APPARATUS FOR ENCODING DATA ON A WORK PIECE," filed concurrently herewith, and which is hereby incorporated by reference in its entirety. This application is related to U.S. patent application Ser. No. 14/875,317, titled "SPINDLE MOUNTABLE CAMERA SYSTEM," filed concurrently herewith, and which is hereby incorporated by reference in its entirety.

BACKGROUND

The identification means of work pieces utilized for its identification and traceability throughout the manufacturing process and product life cycle has become a necessity for the high productivity required by the increasingly competitive global manufacturing operations having multiple part variants within a products' family, using multiple work-piece part work holding fixtures, and at multiple manufacturing locations, being produced via sequential machining-manufacturing operations, and manufacturing processes. As the work-piece part's identification data is frequently required by the Manufacturer's Quality Plan, Industrial Standards Organizations, Regulatory Agencies, customer(s) specifications, etc., such as for patient specific replacement(s), the work-piece part's design revisions, the product's assembly of multiple work-piece parts having a combined tolerance stack-up, a work-piece part's/Article's certificate of origin, Department of Defense components, product recall campaigns, forensic identification, etc.

Traditional Direct Part Marking Via the Manual Direct Work-Piece Marking and Identification Via Impacting Stamps Manual work-piece direct part marking may not be desirable, and or suitable, for most modern manufacturing processes. Because it is susceptible to human error(s) for correctly marking the work-piece part/article, with errors negating the intended purpose of the work-piece parts'/articles' identification, and potentially injurious to personnel, via using a hammer to impact the hardened steel character forming stamp(s) onto the work piece's surface, to a semi-controlled depth, to indent and displace the surface material of the work-piece part/article to create a readable character and or symbol causing the displaced material to project above the previously smooth surface.

As a Secondary Operation Via the Semi-Automatic Direct Work-Piece Marking and Identification Semi-automatic work-piece direct part marking can be done as a secondary operation to the primary manufacturing process that may not be desirable, and or suitable, for manufacturing processes that requires integrity of the data because it is susceptible to error(s) for correctly marking the corresponding work-piece part/article with the required data, with errors negating the intended purpose of the work-piece part's/article's identification.

Automatic Point-of-Manufacture Work-Piece Marking and Identification

Automatic point-of-manufacture work-piece part/article engraving for marking/identification minimizes the opportunities for data error(s) and eliminates the potential for injuring personnel.

Automatic point-of-manufacture Work-piece Engraving is desirable at the point of manufacturing the work-piece part/article because of its being an integral operation of the production process to ensure the product's work-piece part/article marking and identification data integrity.

Automatic Work-piece Engraving is desirable to reduce the operator's potential for injury by eliminating the use of having to manually impact the hardened character forming stamp(s) against the work-piece part/article.

Existing Engraving Methods:

Currently, there are two common methodologies for Automatic point-of-manufacture direct work-piece marking spindle tooling used within Computer Numerically Controlled (CNC) Machine Tools, both having a different single point tool for either cutting material from the work-piece surface or impacting the work-piece part/article to indent and displace the work-piece part's/article's base material to create a readable character and or symbol:

Single Point Cutting Tools:

Cutting material from the work-piece surface using one rotating fluted cutting tool being plunged into the work-piece to a specific depth for the tool's cutting land(s) to remove the material from the work-piece surface while it's being moved parallel to the work-piece part's/article's surface by the motion of the CNC machine tool, to "write" the segments of a character via the removed material of the work piece's cutout profile cross section at specific location(s) and or along a path of lines and or curves on the work-piece part's surface to engrave a readable character and or symbol.

Single Point Impacting Tools:

Impacting via the "dot-peen" or scribing via the "Square-Dot" methodologies onto the work-piece part to indent and displace the work-piece material using a percussion motion to plunge a single point stylus into the work-piece to a depth to displace the material of the work piece's surface with the tool being lifted from the work-piece part's/article's surface as the tool is being moved parallel to the work-piece surface by the CNC machine tool to the next specific location(s) to "write" the character via the visually contiguous/adjacent pointed stylus at a specific location(s) or along a path of lines and or curves on the work-piece part's surface making a readable character and or symbol.

Multiple Point Impacting Tools:

Impacting the work-piece to indent and displace the work-piece material using a percussion motion to plunge multiple single point styluses into the work-piece to a depth to displace the material of the work piece's surface with the tool being lifted from the work-piece surface to "write" the next character via the visually contiguous/adjacent multiple pointed styluses impact "dots or dot-peen" at a specific location(s), or along a path of lines and or curves on the work-piece part's surface making a readable character and or symbol.

Disadvantages of the Existing Work-Piece Part Engraving Methods:

Both of the single stylus direct part marking processes described above have the same initial limitation for the Automatic point-of-manufacture work-piece direct part marking and identification operation, as that of being a time consuming operation for an expensive machine tool and manufacturing process via being constrained by their respective single point tooling for the work-piece part's surface material displacement.

The higher manufacturing costs and reduced tool life for the rotating Cutting tool method of engraving are comparable to the standard single point CNC cutting tools.

The Impacting pointed stylus direct part marking devices are more expensive and potentially damaging to the CNC machine tool's precision spindle bearings. While the smoothness of the work-piece surface is disrupted by the impacting of the pointed stylus potentially affecting its assembly to an adjacent work-piece part, while the displaced work-piece surface material can become a source of contamination in the application of the work-piece part(s) in its assembly.

Disadvantages of Marking Inks and Printed Labels:

The use of a "permanent" marking pens and inks to mark/identify the work-piece has multiple limitations such as:

A) The manual method of pen marking the readable character and or symbol to the corresponding work-piece part is subject to human operator error and the readers' interpretation of the data.

B) The marking ink may not adhere to the machined work-piece part's surface because of the machine tool's cutting fluid and or protective coating on the work-piece part.

C) The vibratory fluidic and or aggregate stone processes used to de-burr/remove the sharp edges of the machined work-piece part can also remove the marking ink from the work piece, requiring the remarking of the work-piece after its de-burring operation.

D) The agitated and or high pressure washing and rinsing processing operation(s) of the machined work-piece part can remove the marking ink from the work-piece part.

E) The corrosion resistant/preservative coating fluid used for storing and shipping the work-piece part can remove the marking ink from the work-piece part.

F) The marking ink may need to be removed from the work-piece part at the components' assembly point to prevent contamination of the assembled product.

G) The marking ink would not be readily detectable on the work-piece part beneath the assembled components' painted surface.

H) The initial marking ink's information prior to the machining operation may be critical to the documentation required for the traceability of the work-piece part and its data that may need to be captured before its removal from the work-piece part.

I) The marking ink's information after the machining operation may be critical to the documentation required for the traceability of the work-piece part and its data that may need to be captured before its removal from the work-piece part.

The use of an adhesive backed printed label to mark/identify the work-piece has multiple limitations such as:

A) The manual application of the correct adhesive backed printed label to the corresponding work-piece part is subject to human operator error.

B) The adhesive backed printed label may not adhere to the machined work-piece part because of the machine tool's cutting fluid on the work-piece part.

C) The vibratory fluidic and or aggregate stone processes used to de-burr/remove the sharp edges of the machined work-piece part can also remove the adhesive backed printed label from the work-piece part.

D) The agitated and or high pressure washing and rinsing processing operation(s) of the machined work-piece part can also remove the adhesive backed printed label from the work-piece part.

E) The corrosion resistant/preservative coating fluid used for storing and shipping the work-piece part can remove the adhesive backed printed label from the work-piece part.

F) The adhesive backed printed label may need to be removed from the work-piece part for the assembly of the components as required to prevent contamination of the assembled product part.

G) The adhesive backed printed label may need to be removed from the work-piece part for the assembly of the components as required for the proper fit-up with the adjacent components.

H) The adhesive backed printed label may need to be removed from the work-piece part after the components' assembly to facilitate painting.

I) The adhesive backed printed label would not be readily detectable beneath the surface of the components' painted surface.

J) The initial printed label's information prior to the machining operation may be critical to the documentation required for the traceability of the work-piece part and its data that may need to be captured before its removal from the work-piece part.

K) The printed label's information after the machining operation may be critical to the documentation required for the traceability of the work-piece part and its data that may need to be captured before its removal from the work-piece part.

Considerations for the productive machining of work piece parts and the increased necessity for the automatic point-of-manufacture Direct Work-piece Marking and Identification:

The automatic point-of-manufacture direct work-piece part marking operation is an additional machining operation that requires its minimization to reduce the CNC machine's overall cycle time to a minimum, as the cost basis for CNC Machining is a combination of cost effective equipment utilization, the quality, and the quantity of work-piece parts/articles being produced in the shortest time possible.

A. The higher quantity of work-piece parts increases the opportunities for manual work-piece part marking operation errors and operator injuries using impacting stamps.

B. The higher productivity of the high speed/high production output advanced machine tools' increases the opportunities for manufacturing defects via increasing the quantity of defective work-piece parts that could be produced in a shorter time span.

C. The higher productivity of machine tools increases the quantity of work-piece parts that need to be identified via the work-piece part marking operation of the manufacturing process.

D. The higher productivity of the high speed machining for advanced machine tools can be attributed to a combination of advances in (a) cutting tool technologies (materials, designs, & coatings) to facilitate rough machining in only one pass for the maximum work-piece material stock removal and then using the same cutting tool for the finishing pass for a "mirror like" surface finish or one pass for the maximum work-piece material stock removal and simultaneously producing a "mirror like" surface finish, (b) the higher speed computer processors, digital inputs, and outputs directly increasing the speed of the machine tools' driven axes and spindles, (c) the improved machine tool designs' utilization of full-time pressure lubricated recirculating bearings ways, ceramic elements, closed loop liquid temperature management, and thermal compensating algorithms to manage its heat generating mechanisms, (d) the machine tools' NC-Programming productivity simulation software and "chip thinning" machining methodologies being utilized to increase cutting feed rates within a tool's operational machining path, etc.

E. The high speed machining of multiple work-piece parts causes heating of the work-piece part that in turn causes dimensional changes from work-piece to work-piece over a period of time and or within a group of multiple work-piece parts being machined via the same machining cycle.

F. The machining of work pieces, especially at high speed, causes heating of the work-piece that causes dimensional changes from work-piece to work-piece over a period of time being caused by changing ambient and work-piece temperatures and the stress-relief/normalization caused by the removal of the raw work-piece material. This can necessitate the Coordinate Measurement Machine's dimensional inspection of the machined work-piece part being delayed, 22 hours or more for some applications.

G. The higher productivity of high speed machining increases the opportunities for manufacturing defects via increasing the thermal dimensional changes of the finished work pieces. These errors are corrected by the Coordinate Measurement Machine's dimensional inspection of the work-piece part(s) having been machined at a specific time and fixture location(s), then using the corresponding work piece's CMM inspection data for correcting the corresponding machine tools' work-piece part machining NC-Program as required. The improved high speed machining of aluminum work-piece parts has resulted in the machining cycle time for 4 parts being machined in one operation on 2 sides being reduced from 97 minutes when the manufacturing operations were developed in the 1990s, to 9:36 minutes in 2013 via the NC-Program O0602.

H. The dimensional changes of the finished work-piece part caused by thermal changes during machining can be combined with those caused by the stress-relief/normalization of the raw work-piece material that are then corrected by the Coordinate Measurement Machine's dimensional inspection of the work-piece part having been machined at a specific time and fixture location(s), then using the corresponding work piece's CMM inspection data for correcting the corresponding machine tools' work-piece part machining NC-Program as required. The improved high speed 6 sided machining of one cast iron work-piece part "317" has resulted in the machining cycle time being reduced from 390 minutes being done via 4 machining operations on a 4 work-piece part locating fixtures on 3 different CNC machines when the manufacturing process was developed in the 1990s, to 112 minutes on 2 work-piece part locating fixtures on 1 CNC machine in 2011 via the NC-Programs O3170, O3171, and O3173.

I. The specific work-piece part being sequentially machined at specific location(s) of a high density multiple position work-piece holding fixture need to be uniquely and correctly identified to facilitate that work-piece parts' correct sequential transfer to the next subsequent machining location(s) of the fixture and for the appropriate and corresponding corrective action(s).

J. The multiple sources and suppliers for the incoming raw work-piece parts to be machined increases the opportunities for manufacturing defects via the increasing variability of the raw work-piece parts coming from multiple casting patterns and or suppliers such as those having a specific date stamp identification for a specific group of raw work-piece parts and or having various suppliers for those work-piece parts.

K. Multiple work-piece parts having been potentially machined at numerous locations of a multiple position work-piece holding fixture, having the variables as in paragraph J above, will need to be uniquely and correctly identified to facilitate the corresponding work-piece parts' correlation to the specific machine tool(s) used for machining, the cutting tool(s) that were used, and the specific location(s) of the work holding fixture(s) for the corresponding corrective action(s) that may be required for that specific work-piece part.

L. The cell of multiple automatic machine tools, which includes the transferring of multiple pre-loaded work pieces pallets, and the machine tools' specific pre-installed initial and sometimes multiple backup tools that are automatically selected after the initial tools' specific operational usage limit is reached to facilitate automated manufacturing operations, relies on the tracking and serialization data of the work-piece parts for the traceability of defects and for the corresponding corrective action(s).

M. The automatic point-of-manufacture direct work-piece part marking/engraving operation within the machine tool becomes a portion of the machine's cycle time, increasing the machine's overall cycle time, and increases the machining cost of the work-piece part/article.

However, the total manufacturing costs for the high productivity sequential machining of multiple work-piece parts will increase when the shorter cycle time of not marking the work-piece parts causes the erroneous sequential transferring of work-piece parts between the sequential machining operations and the increased difficulty for the root cause defect analysis and the corresponding corrective action required for eliminating defective and out of tolerance work pieces. The sequential machining of multiple work-piece parts, correctly via multiple operations, can be dependent upon using the same manual transfer sequence for the work-piece parts from one of the previous sequential work-piece parts' fixture location to the next sequential work-piece parts' fixture location for the next machining/manufacturing operation.

SUMMARY

This Summary is provided to introduce a selection of concepts in a simplified form that are further described below in the Detailed Description. This Summary, and the foregoing Background, is not intended to identify key aspects or essential aspects of the claimed subject matter. Moreover, this Summary is not intended for use as an aid in determining the scope of the claimed subject matter.

The technologies disclosed encompass a selectable character Multiple Orbital Stylus Engraving Tool (MOSET), also referred to herein as Multiple Stylus Orbital Engraving Tool (MSOET). The Selectable Character Multiple Stylus Orbital Engraving Tool is a multiple stylus engraving device, with the styluses being individually selectable, and operatively coupled to an orbital motion of the machine tool causing the selected stylus(es) to engrave in either a dot or dot-matrix pattern of alpha numeric and or symbol and or machine readable characters and or code. The Selectable Character Multiple Stylus Orbital Engraving Tool is more productive and cost effective than the conventional engraving operation of using a Single Cutting Stylus.

A selectable symbol engraving tool for use with a CNC machine is disclosed. In an embodiment, the engraving tool includes a housing and an array of styluses supported in the housing. A pattern disk is rotatably supported in the housing and is connectable to a spindle of the CNC machine. The pattern disk includes a plurality of hole patterns, each selectable via rotation of the spindle and including one or more clearance holes corresponding to a symbol. The array of styluses is positioned to confront a selected one of the plurality of hole patterns such that styluses corresponding to the clearance holes are retracted and the remaining styluses are extended. The extended styluses are operative to engrave the symbol corresponding to the selected hole pattern in a work piece via orbiting about a virtual axis of rotation when the selectable character engraving tool is moved in a circular motion by the CNC machine.

These and other aspects of the present system and method will be apparent after consideration of the Detailed Description and Figures herein. It is to be understood, however, that the scope of the invention shall be determined by the claims as issued and not by whether given subject matter addresses any or all issues noted in the Background or includes any features or aspects recited in this Summary.

DRAWINGS

Non-limiting and non-exhaustive embodiments of the present invention, including the preferred embodiment, are described with reference to the following figures, wherein like reference numerals refer to like parts throughout the various views unless otherwise specified.

FIG. 1 (X+ Isometric) depicts a Horizontal Machine Center with Multiple Orbital Stylus Engraving Tool 3×5—Ø0.8×1.7×12-Characters is a Spindle Facing X+ Left Top Isometric View of a typical horizontal spindle CNC Machine Tool (3) having the Selectable Character Multiple Stylus Orbital Engraving Tool device (6) installed into the spindle tool holder (32) being secured into the machine tool's spindle (31) while the work piece (2) is secured for engraving characters (23) onto its surface (21).

FIG. 2 (X− Isometric) depicts a Horizontal Machine Center with Multiple Orbital Stylus Engraving Tool 3×5—Ø0.8×1.7×12-Characters is a Spindle Facing X− Right Top Isometric View of a typical horizontal spindle CNC Machine Tool (3) having the Selectable Character Multiple Stylus Orbital Engraving Tool device (6) installed into the spindle tool holder (32) being secured into the machine tool's spindle (31) while the work piece (2) is secured for engraving.

FIG. 3 (Back X+ Isometric) depicts a Horizontal Machine Center with Multiple Orbital Stylus Engraving Tool 3×5—Ø0.8×1.7×12-Characters is a Work Piece Surface Facing X+ Left Top Isometric as Viewed from the spindle side of a typical horizontal spindle CNC Machine Tool (3) having the Selectable Character Multiple Stylus Orbital Engraving Tool device (6) installed into the spindle tool holder (32) being secured into the machine tool's spindle (31) while the work piece (2) is secured for engraving characters (23) onto its surface (21).

FIG. 4 (Back X− Isometric) depicts a Horizontal Machine Center with Multiple Orbital Stylus Engraving Tool 3×5—Ø0.8×1.7×12-Characters is a Work Piece Surface Facing X− Right Top Isometric as Viewed from the spindle side of a typical horizontal spindle CNC Machine Tool (3) having the Selectable Character Multiple Stylus Orbital Engraving Tool device (6) installed into the spindle tool holder (32) being secured into the machine tool's spindle (31) while the work piece (2) is secured for engraving characters (23) onto its surface (21).

FIG. 5 (X− Isometric) depicts a Horizontal Machine Center with Multiple Orbital Stylus Engraving Tool 3×5—Ø0.8×1.7×12-Characters is a Spindle Facing X− Right Top Isometric View of a typical horizontal spindle (31) of the CNC Machine Tool (3) having the Selectable Character Multiple Stylus Orbital Engraving Tool device (6) installed into the spindle tool holder (32) being secured into the machine tool's spindle (31) while the anti-rotation post (65) is operatively connected to the spindle-nose anti-rotation block (42) having the engraving stylus (76) facing outward.

FIG. 6 (X− Isometric) depicts a Horizontal Machine Center with Multiple Orbital Stylus Engraving Tool 3×5—Ø0.8×1.7×12-Characters is a Spindle Facing X− Right Top Isometric View of a typical horizontal spindle (31) of the CNC Machine Tool (3) having the Selectable Character Multiple Stylus Orbital Engraving Tool device (6) removed from the spindle tool holder (32) being released by the Tool holder retention means (61) and its positioning via the mating shank (60) showing the tool in its locked position having the styluses selected for the "1" character.

FIG. 7 (X− Isometric) depicts a Horizontal Machine Center with Multiple Orbital Stylus Engraving Tool 3×5—Ø0.8×1.7×12-Characters is a Tool Facing X− Right Top Isometric View of the Selectable Character Multiple Stylus Orbital Engraving Tool device (6) having been removed from the spindle tool holder (32) with it being released by the removal of the set screw(s) (32.1) from against the stylus pattern disk (68) shaft flanks (67).

FIG. 8 (X− Isometric) depicts a Horizontal Machine Center with Multiple Orbital Stylus Engraving Tool 3×5—Ø0.8×1.7×12-Characters is a Tool Facing X− Right Top Isometric View of the Selectable Character Multiple Stylus Orbital Engraving Tool device (6) showing the tool in its locked position having the styluses selected for the "1" character.

FIG. 9 (X− Isometric) depicts a Horizontal Machine Center with Multiple Orbital Stylus Engraving Tool 3×5—Ø0.8×1.7×12-Characters is a Work Piece Surface Facing Right Top Isometric View of the work piece (2) having the characters (23) engraved into work piece surface (21) via the round hole engraving indentions (22.0) showing in detail the character "6" via the pattern of ten round holes (22.0) of the twelve selectable characters (23).

FIG. 10 (X− Isometric) depicts a Horizontal Machine Center with Multiple Orbital Stylus Engraving Tool 3×5—Ø0.8×1.7×12-Characters is a Work Piece Surface Facing Right Top Isometric View of the work piece (2) having the characters (23) engraved into work piece surface (21) via the orthogonal hole engraving indentions (22.1) showing in detail the character "6" via the pattern of ten orthogonal holes (22.1) of the twelve selectable characters (23).

FIG. 11 MOSET-MSOET dimensioned assembled views is an Orthogonal Overall Dimensioned View of the Selectable Character Multiple Stylus Orbital Engraving Tool (6) for mounting into a Ø16.0 mm spindle tool holder (32) with the Ø18.0 mm anti-rotation orientation means (65)&(66).

FIG. 12 MOSET-MSOET exploded parts view is an Isometric Exploded Parts View of the Selectable Character Multiple Stylus Orbital Engraving Tool (6) having the components listed in the Bill of Materials in FIG. 13.

FIG. 13 MOSET-MSOET bill of material is the Bill of Material list for both the Standard/Integral Stylus Guide and the Detachable Stylus Guide versions of the Selectable Character Multiple Stylus Orbital Engraving Tools (6.00 and 6.90).

FIG. 14 Stylus activation #1 Character is the Isometric View of the 1-9, +, –, and 0 Characters Stylus Pattern Disk's Activation of the #1 Character of the Selectable Character Multiple Stylus Orbital Engraving Tool (6) showing the retracted position of the engraving stylus (77-B) and the extended position of the engraving stylus (77-A) along with the locations of the engraving stylus elastomeric compliance members (80), engraving stylus Bearing Sphere (80.1), engraving stylus pneumatic retraction collar (78), the stylus pattern disk (68), and its detent detail (75) for its 12 character positions.

FIG. 15 Stylus center line section view Character #1 is an Orthogonal Sectional View of the Stylus Centerline through the Pattern Disk Centerline of the #1 Character of the Selectable Character Multiple Stylus Orbital Engraving Tool (6) showing the pressurized air flow from the spindle tool holder (32) into the inlet port (63) of the stylus pattern disk (68) being controlled by the pneumatic flow control means (63.1) into the pneumatic passage (63.2) where it can exhaust the MSOET Main Housing (6) where the single point stylus (77) passes through.

FIG. 16 Stylus center line detail section view Character #1 is a Detail Sectional View of the Stylus Centerline through the Pattern Disk Centerline of the #1 Character of the Selectable Character Multiple Stylus Orbital Engraving Tool (6) showing the pressurized air flow through the stylus pattern disk (68) via the pneumatic passage (63.2) where it can exhaust the MSOET Main Housing (6) where the single point stylus (77) passes through.

FIG. 17 Index lock center line section view pattern disk locked is a Planar Detail Sectional View of the Index Lock Centerline of the Selectable Character Multiple Stylus Orbital Engraving Tool (6) showing the locked position of the stylus pattern disk (68) as being in the same operational state as shown in FIG. 18, having no pressurized air flow via the pneumatic passage (63.2) for unlocking the pattern index-position locking shaft (70).

FIG. 18 Character pattern disk in the locked position is of the Character Pattern Selection Disk in the Locked Position as shown via the Sectional and Detail Views of the Index Lock Centerline through the Pattern Disk Centerline of the #1 Character of the Selectable Character Multiple Stylus Orbital Engraving Tool (6) showing the pattern index-position locking shaft (70) in the locked position (70-A) into the corresponding pocket (68-A) of the stylus pattern disk (68) as being in the same operational state as shown in FIG. 17, having no pressurized air flow via the pneumatic passage (63.2) for unlocking the pattern index-position locking shaft (70).

FIG. 19 Character pattern disk in the detented position is of the Character Pattern Selection Disk in the Detented Position as shown via the Sectional and Detail Views of the Index Lock Centerline through the Pattern Disk Centerline of the #1 Character of the Selectable Character Multiple Stylus Orbital Engraving Tool (6) showing the pattern index-position locking shaft (70) in the unlocked position (70-B) being retracted from its corresponding pocket (68-B) of stylus pattern disk (68) via the pressurized air flow via (63.2) acting against the piston (72) to compress the single stylus pattern lock position locking spring (71) to permit the rotation of the stylus pattern disk (68) with the Pattern Index-Detent Plunger (73) holding the stylus pattern disk (68) in a stationary position via the round nose detail (73-C) of the Pattern Index-Detent Plunger (73) engaging the pocket detail (68-C) of the stylus pattern disk (68) via the pattern detent spring (74) with the pressurized air flow (63.2) of the stylus pattern disk (68) being shut off (73.1) from pressurizing and reversing the pneumatic stylus retraction vent passage (63.3).

FIG. 20 Character pattern disk in the unlocked position for rotation is of the Character Pattern Selection Disk in the Unlocked Position as shown via the Sectional and Detail Views of the Index Lock Centerline through the Pattern Disk Centerline moving from the #1 Character of the Selectable Character Multiple Stylus Orbital Engraving Tool (6) showing the pattern index-position locking shaft (70) in the unlocked position (70-B) being retracted from its corresponding pocket (68-B) of stylus pattern disk (68) via the pressurized air flow via (63.2) acting against the piston (72) to compress the single stylus pattern lock position locking spring (71) to permit the rotation of the stylus pattern disk (68) with the Pattern Index-Detent Plunger (73) releasing the stylus pattern disk (68) via the machine tool's corresponding rotation of the stylus pattern disk (68) to a new position via compressing the pattern detent spring (74) to retract the round nose detail (73-D) of the Pattern Index-Detent Plunger (73) engaging the pocket detail (68-D) of the stylus pattern disk (68) with the pressurized air flow (63.2) of the stylus pattern disk (68) flowing via passage past the forward edge (73.2) of the Pattern Index-Detent Plunger (73) to pressurize and reverse the pneumatic stylus retraction vent passage (63.3) causing all of the styluses (77) to be pneumatically extended to clear the stylus pattern disk (68) while rotating to a new position.

FIG. 21 Round hole #1 Character pattern are Isometric Views of the Operational Sequence of the CNC Machine Tool (3) to engrave the Round Hole Character Pattern(s) (22.0) of the #1 Character using the Selectable Character Multiple Stylus Orbital Engraving Tool (6) having typical G&M commands for the CNC Machine Tool motion commanding software for using the Automatic Tool Point control methodology.

FIG. 22 Orthogonal hole #1 Character pattern are Isometric Views of the Operational Sequence of the CNC Machine Tool (3) to engrave the Orthogonal Hole Character Pattern(s) (22.1) of the #1 Character using the Selectable Character Multiple Stylus Orbital Engraving Tool (6) having typical G&M commands for the CNC Machine Tool motion commanding software for using the Automatic Tool Point control methodology.

FIG. 23 Detachable MOSET-MSOET dimensioned assembled view for Part 6.90 being the Detachable Stylus Guide of the Dimensioned Assembled View for the MSOET Main Housing of the Selectable Character Multiple Stylus Orbital Engraving Tool (6.90) having a detachable stylus guide for quickly replacing the styluses.

FIG. 24 Detachable MOSET-MSOET exploded parts view for Part 6.90 being the Detachable Stylus Guide's Exploded Parts View for the Selectable Character Multiple Stylus Orbital Engraving Tool, FIG. 25 Detachable MOSET-MSOET bill of material for Part 6.90 being the Detachable Stylus Guide's Bill of Material for the Selectable Character Multiple Stylus Orbital Engraving Tool, FIG. 26 MOSET-MSOET hardware parts for the Hardware Parts for the Selectable Character Multiple Stylus Orbital Engraving Tool (6.##), FIG. 27-45, Component parts for the 3×5 Selectable Character Multiple Stylus Orbital Engraving Tool (MSOET) a.k.a. Selectable Character Multiple Orbital Stylus Engraving Tool (MOSET):

FIG. 27 part 6.00 for the standard Detachable MOSET-MSOET main housing drawing for Part 6.00 being the Standard MSOET Main Housing of the Selectable Character Multiple Stylus Orbital Engraving Tool.

FIG. 28 part 6.1 for the standard MOSET-MSOET housing snap cover drawing for Part 6.1 being the MSOET Housing Snap Cover of the Selectable Character Multiple Stylus Orbital Engraving Tool (6.##).

FIG. 29 part 6.90 Detachable MOSET-MSOET main housing drawing for Part 6.90 being the Detachable Stylus Guide MSOET Main Housing of the Selectable Character Multiple Stylus Orbital Engraving Tool.

FIG. 30 part 6.91 Detachable MOSET-MSOET stylus guide drawing for Part 6.91 being the Detachable Stylus Guide of the Selectable Character Multiple Stylus Orbital Engraving Tool (6.90).

FIG. 31 part 6.92 Detachable MOSET-MSOET stylus guide retention collar drawing for Part 6.92 being the Detachable Stylus Guide Retention Collar of the Selectable Character Multiple Stylus Orbital Engraving Tool (6.90).

FIG. 32 part 65.2 MOSET-MSOET pattern index piston retainer drawing for Part 65.2 being the Pattern Index Piston retainer of the Selectable Character Multiple Stylus Orbital Engraving Tool (6.##).

FIG. 33 part 65 Detachable MOSET-MSOET housing anti-rotation post drawing for Part 65 being the MSOET Housing Anti-Rotation Post of the Selectable Character Multiple Stylus Orbital Engraving Tool (6.##).

FIG. 34 part 67 Detachable MOSET-MSOET main housing shaft collar drawing for Part 67 being the MSOET Main Housing Shaft Collar of the Selectable Character Multiple Stylus Orbital Engraving Tool (6.##).

FIG. 35 part 68.5 Binary 31 Character 32-position 5×-stylus pattern disk drawing for Part 68.5 being the Isometric View of the 5× Squared Character Sets—32 Position Stylus Pattern Disk of the Selectable Character Multiple Stylus Orbital Engraving Tool (6) for engraving the 0-31 Binary character sets for the dot-matrix pattern of alpha numeric and or syntax and or machine readable characters and or code, i.e. 2D Bar Code.

FIG. 36 part 68.12 12 Character-position stylus pattern disk drawing for Part 68.12 being the Isometric View of the 12 Characters—12 Position Stylus Pattern Disk of the Selectable Character Multiple Stylus Orbital Engraving Tool (6) for engraving the characters 0-9, the "plus", and "minus" signs.

FIG. 37 part 68 MOSET-MSOET stylus pattern disk drawing for Part 68 being the Views of the Main Shaft Stylus Pattern Disk of the Selectable Character Multiple Stylus Orbital Engraving Tool (6.##).

FIG. 38 part 70 MOSET-MSOET pattern index-piston locking shaft drawing for Part 70 being the Pattern Index-Piston Locking Shaft of the Selectable Character Multiple Stylus Orbital Engraving Tool (6.##).

FIG. 39 part 73 MOSET-MSOET pattern index detent plunger drawing for Part 73 being the Pattern Index-Detent Plunger of the Selectable Character Multiple Stylus Orbital Engraving Tool (6.##).

FIG. 40 part 77.1 MOSET-MSOET 3×5 stylus guide drawing for Part 77.1 being the Stylus Guide of the Selectable Character Multiple Stylus Orbital Engraving Tool (6).

FIG. 41 part 77 MOSET-MSOET Ø0.8 mm single point stylus drawing for Part 77 being the Ø 0.8 mm Single Point Orbital Stylus of the Selectable Character Multiple Stylus Orbital Engraving Tool (6.##).

FIG. 42 part 78 MOSET-MSOET stylus pneumatic retraction collar drawing for Part 78 being the Stylus Pneumatic Retraction Collar of the Selectable Character Multiple Stylus Orbital Engraving Tool (6.##).

FIG. 43 part 79 MOSET-MSOET stylus stroke limit collar drawing for Part 79 being the Stylus Stroke Limit Collar of the Selectable Character Multiple Stylus Orbital Engraving Tool (6.##).

FIG. 44 Round hole #1 Character pattern via the Detachable MOSET-MSOET 2-flute offset-orbit stylus-drill two-flute 3×5.

FIG. 45 Part 6.91 3×5 Multiple Orbital Stylus Engraving Tool stylus guide for the Detachable MOSET-MSOET 2-flute offset-orbit stylus-drill.

FIG. 46 Chain tool storage CNC Horizontal Machine Center with the 3×5 MOSET-MSOET tool in chain storage CNC Horizontal Machine Center top-1 Isometric.

FIG. 47 Chain tool storage CNC Horizontal Machine Center with the 3×5 MOSET-MSOET tool in chain storage CNC Horizontal Machine Center Top-Right Isometric.

FIG. 48 Chain tool storage CNC Horizontal Machine Center with the 3×5 MOSET-MSOET tool in spindle CNC Horizontal Machine Center Top-Right Isometric.

FIG. 49 Magazine tool storage CNC Horizontal Machine Center with the 3×5 MOSET-MSOET tool in magazine storage CNC Horizontal Machine Center top-1 Isometric.

FIG. 50 Magazine tool storage CNC Horizontal Machine Center with the 3×5 MOSET-MSOET tool in magazine storage CNC Horizontal Machine Center Top-Right Isometric.

FIG. 51 Magazine tool storage CNC Horizontal Machine Center with the 3×5 MOSET-MSOET tool in spindle CNC Horizontal Machine Center Top-Right Isometric.

FIG. 52 Programmable 2×11 module-assembly Ø0.8 Version-6.90 for the MOSET-MSOET Isometric views.

FIG. 53 Programmable 2×11 module-assembly Ø0.8 Version-6.90 for the MOSET-MSOET section views.

FIG. 54 Programmable 2×11 module-assembly Ø0.8 Version-6.90 for the MOSET-MSOET advance-retract paired actuators.

FIG. 55 Operational sequence for the Programmable 2×11 selectable styluses for the MOSET-MSOET module.

FIG. 56 Programmable 2×11 module-assembly Ø0.8 Version-6.90 Operational reset-all, steps-0-1-2.

FIG. 57 Programmable 2×11 module-assembly Ø0.8 Version-6.90 Operational step-3.

FIG. 58 Programmable 2×11 module-assembly Ø0.8 Version-6.90 Operational steps-4-5.

FIG. 59 Programmable 2×11 module-assembly Ø0.8 Version-6.90 Operational steps-6-7-8-9.

FIG. 60 partial table for the Programmable 2×11 Multiple Orbital Stylus Engraving Tool Character pattern selection via directional spindle rotation and stop angle.

For the operation and control of the Programmable 2×11 module-assembly as shown by:

FIG. 61 Programmable 2×11 module-assembly Ø0.8 Version-6.90 for the Programmable module direct control of the Direct Part Marking control and data schemas.

FIG. 62 Programmable 2×11 module-assembly Ø0.8 Version-6.90 for the Programmable module optic control of the Direct Part Marking control and data schemas.

FIG. 63 Programmable 2×11 module-assembly Ø0.8 Version-6.90 for the Programmable module radio control of the Direct Part Marking control and data schemas.

FIG. 64 Programmable 2×11 module-assembly Ø0.8 Version-6.90 for the Programmable module wired control of the Direct Part Marking control and data schemas.

Wireless communication of the Rotationally Secure Battery Operated Multiple Orbital Stylus Engraving Tool for the Programmable Selection of the stylus(es) to be activated for orbital engraving as shown by:

FIG. 65 Wireless Programmable 2×11 Ø0.8 Version-6.90 detachable dimensioned assembled views.

FIG. 66 Wireless Programmable 2×11 Ø0.8 Version-6.90 round hole single flute stylus view.

FIG. 67 Wireless Programmable 2×11 Ø0.8 Version-6.90 orthogonal hole single flute stylus view.

FIG. 68 Wireless Programmable 2×11 Ø0.8 Version-6.90 exploded parts view.

FIG. 69 Wireless Programmable 2×11 Ø0.8 Version-6.90 exploded internal electrical module view.

FIG. 70 Wireless Programmable 2×11 Ø0.8 Version-6.90 arm-stylus center line section views.

FIG. 71 Wireless Programmable 2×11 Ø0.8 Version-6.90 Horizontal stylus center line section views.

FIG. 72 Wireless Programmable 2×11 Ø0.8 Version-6.90 Vertical stylus center line section views.

FIG. 73 Wireless Programmable 2×11 Ø0.8 Version-6.90 part 6.211 main housing.

FIG. 74 Wireless Programmable 2×11 Ø0.8 Version-6.90 part 67.211 main housing shaft collar.

FIG. 75 Wireless Programmable 2×11 Ø0.8 Version-6.90 part 6.211.90 detachable stylus guide retention collar.

FIG. 76 Wireless Programmable 2×11 Ø0.8 Version-6.90 part 22.2127 3× pneumatic manifold.

FIG. 77 Wireless Programmable 2×11 Ø0.8 Version-6.90 part 65.2 index post retainer.

FIG. 78 Wireless Programmable 2×11 Ø0.8 Version-6.90 detachable bill of material.

Spindle Rotation of the Rotationally Secure Battery Operated Multiple Orbital Stylus Engraving Tool for the Programmable Selection of the stylus(es) to be activated for orbital engraving as shown by:

FIG. 79 Spindle-rotation Programmable 2×11 Ø0.8 Version-16.90 detachable dimensioned assembled views.

FIG. 80 Spindle-rotation Programmable 2×11 Ø0.8 Version-16.90 exploded parts view FIG. 81 Spindle-rotation Programmable 2×11 Ø0.8 Version-16.90 exploded internal electrical module view.

FIG. 82 Spindle-rotation Programmable 2×11 Ø0.8 Version-16.90 arm-stylus center line section views.

FIG. 83 Spindle-rotation Programmable 2×11 Ø0.8 Version-16.90 Horizontal stylus center line section views.

FIG. 84 Spindle-rotation Programmable 2×11 Ø0.8 Version-16.90 Programmable 2×11 (Vertical stylus center line section view).

FIG. 85 Spindle-rotation Programmable 2×11 Ø0.8 Version-16.90 part 6.211 main housing.

FIG. 86 Spindle-rotation Programmable 2×11 Ø0.8 Version-16.90 part 67.211 main housing shaft collar.

FIG. 87 Spindle-rotation Programmable 2×11 Ø0.8 Version-16.90 part 22.2136 binary encoder mounting shaft.

FIG. 88 Spindle-rotation Programmable 2×11 Ø0.8 Version-16.90 detachable bill of material.

FIG. 89 Tool-rotation-Programmable 2×11 Ø0.8 Version-6.90 rotation-Programmable detachable dimensioned assembled views.

FIG. 90 Tool-rotation-Programmable 2×11 Ø0.8 Version-6.90 exploded parts view.

FIG. 91 Tool-rotation-Programmable 2×11 Ø0.8 Version-6.90 exploded internal electrical module view.

FIG. 92 Tool-rotation-Programmable 2×11 Ø0.8 Version-6.90 arm-stylus center line section views.

FIG. 93 Tool-rotation-Programmable 2×11 Ø0.8 Version-6.90 Horizontal stylus center line section view.

FIG. 94 Tool-rotation-Programmable 2×11 Ø0.8 Version-6.90 Vertical stylus center line section views.

FIG. 95 Tool-rotation-Programmable 2×11 Ø0.8 Version-6.90 part 6.211 main housing.

FIG. 96 Tool-rotation-Programmable 2×11 Ø0.8 Version-6.90 parts 67.211 main housing shaft collar.

FIG. 97 Tool-rotation-Programmable 2×11 Ø0.8 Version-6.90 part 65 tool rotation post mounting hole plug.

FIG. 98 Tool-rotation-Programmable 2×11 Ø0.8 Version-6.90 detachable bill of material.

FIG. 99 Rechargeable contact Programmable 2×11 Ø0.8 Version-6.90 detachable dimensioned assembled views.

FIG. 100 Rechargeable contact Programmable 2×11 Ø0.8 Version-6.90 exploded parts view.

FIG. 101 Rechargeable contact Programmable 2×11 Ø0.8 Version-6.90 exploded internal electrical module view.

FIG. 102 Rechargeable contact Programmable 2×11 Ø0.8 Version-6.90 arm-stylus center line section views.

FIG. 103 Rechargeable contact Programmable 2×11 Ø0.8 Version-6.90 Horizontal stylus center line section views.

FIG. 104 Rechargeable contact Programmable 2×11 Ø0.8 Version-6.90 Vertical stylus center line section views.

FIG. 105 Rechargeable contact Programmable 2×11 Ø0.8 Version-6.90 part 6.2411 main housing.

FIG. 106 Rechargeable contact Programmable 2×11 Ø0.8 Version-6.90 detachable bill of material.

FIG. 107 Rechargeable wireless Programmable 2×11 Ø0.8 Version-6.90 detachable dimensioned assembled views.

FIG. 108 Rechargeable wireless Programmable 2×11 Ø0.8 Version-6.90 exploded parts views.

FIG. 109 Rechargeable wireless Programmable 2×11 Ø0.8 Version-6.90 exploded internal electrical module view.

FIG. 110 Rechargeable wireless Programmable 2×11 Ø0.8 Version-6.90 arm-stylus center line section views.

FIG. 111 Rechargeable wireless Programmable 2×11 Ø0.8 Version-6.90 Horizontal stylus center line section views.

FIG. 112 Rechargeable wireless Programmable 2×11 Ø0.8 Version-6.90 Vertical stylus center line section views.

FIG. 113 Rechargeable wireless Programmable 2×11 Ø0.8 Version-6.90 part 6.2411 main housing.

FIG. 114 Rechargeable wireless Programmable 2×11 Ø0.8 Version-6.90 detachable bill of material.

FIG. 115 Optical Programmable 2×11 Ø0.8 Version-6.90 detachable dimensioned assembled views.

FIG. 116 Optical Programmable 2×11 Ø0.8 Version-6.90 exploded parts view.

FIG. 117 Optical Programmable 2×11 Ø0.8 Version-6.90 exploded internal electrical module view.

FIG. 118 Optical Programmable 2×11 Ø0.8 Version-6.90 arm-stylus center line section views.

FIG. 119 Optical Programmable 2×11 Ø0.8 Version-6.90 Horizontal stylus center line section views.

FIG. 120 Optical Programmable 2×11 Ø0.8 Version-6.90 Vertical stylus center line section views.

FIG. 121 Optical Programmable 2×11 Ø0.8 Version-6.90 part 6.2110 main housing.

FIG. 122 Optical Programmable 2×11 Ø0.8 Version-6.90 detachable bill of material.

FIG. 123 Rechargeable optical Programmable 2×11 Ø0.8 Version-6.90 detachable dimensioned assembled views.

FIG. 124 Rechargeable optical Programmable 2×11 Ø0.8 Version-6.90 exploded parts view.

FIG. 125 Rechargeable optical Programmable 2×11 Ø0.8 Version-6.90 exploded internal electrical module view.

FIG. 126 Rechargeable optical Programmable 2×11 Ø0.8 Version-6.90 arm-stylus center line section views.

FIG. 127 Rechargeable optical Programmable 2×11 Ø0.8 Version-6.90 Horizontal stylus center line section views.

FIG. 128 Rechargeable optical Programmable 2×11 Ø0.8 Version-6.90 Vertical stylus center line section views.

FIG. 129 Rechargeable optical Programmable 2×11 Ø0.8 Version-6.90 part 6.24110 main housing.

FIG. 130 Rechargeable optical Programmable 2×11 Ø0.8 Version-6.90 detachable bill of material.

FIG. 131 Rechargeable spindle-rotation Programmable 2×11 Ø0.8 Version-16.90 detachable dimensioned assembled views.

FIG. 132 Rechargeable spindle-rotation Programmable 2×11 Ø0.8 Version-16.90 exploded parts view.

FIG. 133 Rechargeable spindle-rotation Programmable 2×11 Ø0.8 Version-16.90 exploded internal electrical module view.

FIG. 134 Rechargeable spindle-rotation Programmable 2×11 Ø0.8 Version-16.90 arm-stylus center line section views.

FIG. 135 Rechargeable spindle-rotation Programmable 2×11 Ø0.8 Version-16.90 Horizontal stylus center line section views.

FIG. 136 Rechargeable spindle-rotation Programmable 2×11 Ø0.8 Version-16.90 Vertical stylus center line section views.

FIG. 137 Rechargeable spindle-rotation Programmable 2×11 Ø0.8 Version-16.90 part 6.211 main housing.

FIG. 138 Rechargeable spindle-rotation Programmable 2×11 Ø0.8 Version-16.90 detachable bill of material.

FIG. 139 Rechargeable tool-rotation-Programmable 2×11 Ø0.8 Version-6.90 detachable dimensioned assembled views.

FIG. 140 Rechargeable tool-rotation-Programmable 2×11 Ø0.8 Version-6.90 exploded parts view.

FIG. 141 Rechargeable tool-rotation-Programmable 2×11 Ø0.8 Version-6.90 exploded internal electrical module view.

FIG. 142 Rechargeable tool-rotation-Programmable 2×11 Ø0.8 Version-6.90 arm-stylus center line section views.

FIG. 143 Rechargeable tool-rotation-Programmable 2×11 Ø0.8 Version-6.90 Horizontal stylus center line section views.

FIG. 144 Rechargeable tool-rotation-Programmable 2×11 Ø0.8 Version-6.90 Vertical stylus center line section views.

FIG. 145 Rechargeable tool-rotation-Programmable 2×11 Ø0.8 Version-6.90 part 6.211 main housing.

FIG. 146 Rechargeable tool-rotation-Programmable 2×11 Ø0.8 Version-6.90 detachable bill of material.

FIG. 147 Rechargeable contact-wireless Programmable 2×11 Ø0.8 Version-6.90 detachable dimensioned assembled views.

FIG. 148 Rechargeable contact-wireless Programmable 2×11 Ø0.8 Version-6.90 exploded parts views.

FIG. 149 Rechargeable contact-wireless Programmable 2×11 Ø0.8 Version-6.90 exploded internal electrical module view.

FIG. 150 Rechargeable contact-wireless Programmable 2×11 Ø0.8 Version-6.90 arm-stylus center line section views.

FIG. 151 Rechargeable contact-wireless Programmable 2×11 Ø0.8 Version-6.90 Horizontal stylus center line section views.

FIG. 152 Rechargeable contact-wireless Programmable 2×11 Ø0.8 Version-6.90 Vertical stylus center line section views.

FIG. 153 Rechargeable contact-wireless Programmable 2×11 Ø0.8 Version-6.90 part 6.2411 main housing.

FIG. 154 Rechargeable contact-wireless Programmable 2×11 Ø0.8 Version-6.90 detachable bill of material.

FIG. 155 Rechargeable contact-optical Programmable 2×11 detachable Ø0.8 Version-6.90 detachable dimensioned assembled views.

FIG. 156 Rechargeable contact-optical Programmable 2×11 detachable Ø0.8 Version-6.90 exploded parts views.

FIG. 157 Rechargeable contact-optical Programmable 2×11 detachable Ø0.8 Version-6.90 exploded internal electrical module view.

FIG. 158 Rechargeable contact-optical Programmable 2×11 detachable Ø0.8 Version-6.90 arm-stylus center line section views.

FIG. 159 Rechargeable contact-optical Programmable 2×11 detachable Ø0.8 Version-6.90 Horizontal stylus center line section views.

FIG. 160 Rechargeable contact-optical Programmable 2×11 detachable Ø0.8 Version-6.90 Vertical stylus center line section views.

FIG. 161 Rechargeable contact-optical Programmable 2×11 detachable Ø0.8 Version-6.90 part 6.24110 main housing.

FIG. 162 Rechargeable contact-optical Programmable 2×11 detachable Ø0.8 Version-6.90 detachable bill of material.

DETAILED DESCRIPTION

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense.

A selectable symbol engraving tool for use with a CNC machine is disclosed. In an embodiment, the engraving tool includes a housing and an array of styluses supported in the housing. A pattern disk is rotatably supported in the housing and is connectable to a spindle of the CNC machine. The pattern disk includes a plurality of hole patterns, each selectable via rotation of the spindle and including one or more clearance holes corresponding to a symbol. The array of styluses is positioned to confront a selected one of the plurality of hole patterns such that styluses corresponding to the clearance holes are retracted and the remaining styluses are extended. The extended styluses are operative to engrave the symbol corresponding to the selected hole pattern in a work piece via orbiting about a virtual axis of rotation when the selectable character engraving tool is moved in a circular motion by the CNC machine.

Operation of the Spindle Tooling for Selectable Character Multiple Stylus Orbital Engraving Tool for Computer Numerically Controlled Machine Tools:

Computer Numerically Controlled (CNC) machine tools typically have three orthogonal linear axes (X, Y, & Z) for the horizontal spindle, a rotary table axis (B) for the work-piece parts' work holding fixture. The interchangeable spindle tool can be used with the Selectable Character Multiple Stylus Orbital Engraving or Multiple Orbital Stylus Engraving Tool, as shown in FIGS. 1-10.

With the conventional three linear axes CNC machine tool (3) having a first X axis (37), a second Y axis (38) perpendicular to the first X axis, and a third Z axis (39) perpendicular to the plane of the first X axis and second Y axis, having either a manual or automatic tool changing function. Optionally, the CNC machine tool can have a fourth axis (40) being a rotary B axis that rotates the work-piece part pallet (41) on an axis that is parallel to the Y axis with optionally having additional rotation and pivoting axes being used for machining the work-piece part as may be required.

The Selectable Character Multiple Stylus Orbital Engraving Tool (6) is placed into the machine's spindle (31) and the through the spindle pressurized air is turned on to enable the Selectable Character Multiple Stylus Orbital Engraving Tool (6).

The "M398" is a NC-Program Macro command developed by the machine tool manufacturer of the CNC machine tool (3) to turn on the pneumatic solenoid valve to direct pressurized air through a pneumatic lubricator that dispenses a metered amount of lubricating oil mist into the passing pressurized air stream into the through spindle pneumatic coupling means (61), for the Selectable Character Multiple Stylus Orbital Engraving Tool (6) via the pneumatic passage (63) where it lubricates the internal components of the tool before being discharged onto the work-piece via the operational clearance between the stylus (77) and the main housing (6).

The Selectable Character Multiple Stylus Orbital Engraving Tool's (6) multiple styluses are operatively selected via rotation of the machine's spindle (31) to a specific orientation angle that corresponds to a specific character or symbol.

The optional B axis (40) positions the work-piece surface (21) toward the machine's spindle (31).

The spindle is positioned via the X (37) and Y (38) axes to a position that corresponds with the work-piece (2) location(s) to be engraved.

The Z axis (39) places the Selectable Character Multiple Stylus Orbital Engraving Tool (6) onto the work-piece (2).

The X (37) and Y axes (38) are circularly interpolated via the CNC machine tool's helical motion command in a helical motion path that causes each of individual multiple styluses to rotate via orbiting about a virtual axis of rotation causing the individually selectable engraving stylus(es) (77-A) to drill into the work-piece part to a specific depth via the Z axis (39), while the Selectable Character Multiple Stylus Orbital Engraving Tool (6) is not rotating.

When the engraving operation is finished, the Z axis (39) retracts the Selectable Character Multiple Stylus Orbital Engraving Tool (6) from the work-piece part (2) for the process to be completed or repeat the process at another X (37) and Y (38) axes position, as or if required.

In an embodiment, the Selectable Character Multiple Stylus Orbital Engraving Tool (6), having the Uniquely Identifiable Engraved Indention Character(s)/Pattern(s) (23) being operatively selectable via the rotation of the machine's spindle (31) to a specific orientation angle, consisting of the Selectable Character Multiple Stylus Orbital Engraving Tool's (6) components as shown in FIG. 1-10 for the Horizontal Machine Tool, FIG. 11-45 for the Standard and Quick Change Stylus Selectable Character Multiple Stylus Orbital Engraving Tool (6) for both the Part-68.12 Stylus Pattern Disk (FIG. 36) for the 12 Characters via the 12 positions and Part 68.5 Stylus Pattern Disk (FIG. 35) for the 5 Bit binary encoded characters via the stylus pattern disk's 32 positions, for the typical Hardware Parts and nominal Component Details, having the general annotation references for the:

1. Machine tool spindle (31).
2. Actuated Interchangeable Tool Retention means (33 and 61).
3. Keyed Interchangeable Spindle Tool Holder means (31, 60, and 32).
4. Machine Tool Spindle Interchangeable Spindle Tool Holder positioning means (31 and 32).
5. Selectable Thru Spindle Pressurized Air for the Interchangeable Tool means (34 and 63).
6. Spindle Interchangeable tool anti-rotation means (42, 65, and 66).
7. Interchangeable Spindle Tool Holder (60).
8. Selectable Character Multiple Stylus Orbital Engraving Tool (6).
9. Three axes CNC Machine Tool control via motion commanding software (3).
10. Work-piece (2).
11. Work-piece surface (21).
12. Round Hole Engraving pattern(s) (22.0).
13. Orthogonal Hole Engraving pattern(s) (22.1).
14. Individually selectable engraving stylus (77) extended for drilling into the work-piece (77-A).
15. Individually selectable engraving stylus (77) retracted for not contacting the work-piece (77-B).

In an embodiment, the selectable symbol engraving tool can be used with a computer CNC machine as shown in FIGS. 1-10. With further reference to FIG. 12, the selectable symbol engraving tool includes a housing (6) and an array of styluses (77) supported in the housing (6). Each stylus (77) is moveable between a retracted position and an extended position. The pattern disk (68) is rotatably supported in the housing (6) and is connectable to the spindle (31) of the CNC machine (See FIG. 2). With reference to FIG. 14, the pattern disk (68) includes a plurality of hole patterns (e.g., #1-#9), each selectable via rotation of the spindle (31) and including one or more clearance holes corresponding to a symbol (e.g., #1). In some embodiments, the holes are in the form of slots or grooves. The array of styluses (77) is positioned to confront a selected one of the plurality of hole patterns (e.g., #1) such that styluses (77) corresponding to the clearance holes are retracted and the remaining styluses (77) are extended and operative to engrave the symbol (e.g., #1) corresponding to the selected hole pattern in a work piece.

Referring again to FIG. 12, in some embodiments, the selectable symbol engraving tool includes an anti-rotation post (65) radially offset from the pattern disk (68) and attached to the housing (6). As shown in FIG. 2, the anti-rotation post (65) is connectable to a spindle-nose of the CNC machine. In some embodiments, the selectable symbol engraving tool includes a detent plunger (73) mated to the pattern disk (68) to help retain the pattern disk in a selected rotational position.

As shown in FIGS. 12 and 14, each stylus (77) includes a retraction collar (78). The pattern disk (68) includes an pneumatic passage (63.2) connectable to the CNC machine to provide pressurized air to the retraction collars (78), as shown in FIGS. 15 and 16. Accordingly, the styluses (77) are constantly urged toward the pattern disk (68). Thus, when a stylus (77) is positioned over a clearance hole it is moved to the retracted position by the air pressure acting on retraction collar (78). In some embodiments, the pattern disk (68) includes a plurality of stylus bearings (80.1) and corresponding elastomeric compliance members (80), as shown in FIG. 14.

With reference to FIG. 21, each stylus (77) is rotatably supported in the housing (6) and operative to drill into a work piece via orbiting about a virtual axis of rotation when the selectable character engraving tool is moved in a circular motion by the CNC machine.

It should be appreciated that various methods are inherent in the disclosed structures. In at least one embodiment, a method for engraving a selected symbol into a work piece with a CNC machine includes supporting an array of styluses on the spindle-nose of a CNC machine. The method can further include selecting a plurality of active styluses corresponding to the selected symbol from the array of styluses. The plurality of active styluses is extended and the spindle-nose is moved toward the work piece causing the plurality of active styluses to contact the work piece. The method further includes moving the spindle-nose in a circular motion thereby causing the plurality of active styluses to orbit about a virtual axis of rotation.

In some embodiments, the method also includes preventing rotation of the array of styluses with respect to the spindle-nose. However, it should be understood that the individual styluses are rotatable within the housing. In some embodiments, the step of selecting the plurality of active styluses comprises rotating a pattern disk with a spindle of the CNC machine. In some embodiments, the method includes urging the styluses toward the pattern disk with, for example, a pneumatic air supply. In some embodiments, the pattern disk includes a plurality of hole patterns, each selectable via rotation of the spindle and including one or more clearance holes corresponding to a symbol and wherein the array of styluses is positioned to confront a selected one of the plurality of hole patterns such that styluses corresponding to the clearance holes are retracted and the plurality of active styluses are extended and operative to engrave the selected symbol corresponding to the selected hole pattern in the work piece.

General Design and Operational Details for the Selectable Character Multiple Stylus Orbital Engraving Tool The Character pattern to be engraved is determined via the stylus pattern disk (68) as shown in FIG. 14, for the stylus pattern disk (68) there can be multiple character sets for this component as required by the application of the Selectable Character Multiple Stylus Orbital Engraving Tool (6) where the selected individually actuated styluses (77-A) contacts the corresponding stylus bearing sphere (80.1) and compresses its corresponding elastomeric compliance member (80) to apply pressure to the leading edge of the stylus (77-A), while the position of the individually retracted styluses (77-B) correspond with the adjacent stylus clearance hole in the stylus pattern disk (68).

The stylus pattern disk (68) Part-68.12 is optimized for 12 characters being the numeric 0-9, the Plus sign "+", and the Minus sign "–" having 12 corresponding character positions.

The stylus pattern disk (68) Part-68.5 is a selectable 5 bit pattern for the binary equivalent 0-31 having 32 corresponding character positions for an unlimited programmable dot-matrix pattern of alphanumeric characters and or syntax and or symbols and or machine readable characters and or 2D barcodes.

The engraving stylus is pneumatically retraced (77-B) into the adjacent stylus clearance hole of the character pattern disk of the Selectable Character Multiple Stylus Orbital Engraving Tool (6) while it is in the stationary position for engraving.

As shown in FIG. 19, the tool's pressurized air is directed via the pneumatic passage (63), being metered by the tool's main inlet flow control means (63.1), into the tool's pneumatic passage (63.2).

As shown in FIG. 16, the tool's pneumatic passage (63.2) is connected to the opening in the stylus (77) cavity of the tool (6), where it pneumatically actuates the stylus pneumatic retraction collar (78) into its corresponding stylus guide (77.1) retracting the stylus (77) back into the tool (6).

As shown in FIG. 19, the tool's pressurized air is vented from the opposite side of the corresponding stylus guide (77.1) via the pneumatic passage (63.2) that is closed off (73.1) from the pneumatic passage (63.2) via the pattern index-detent plunger (73), that is metered by the tool's exhaust flow control means (78.3 & 78.4), into the tool's pneumatic passage (63.4) where it exits the tool's pneumatic exhaust vent (72.9).

The canceling of the pneumatic stylus retraction during the rotation of the stylus pattern disk for the Selectable Character Multiple Stylus Orbital Engraving Tool (6):

A) As shown in FIG. 20, the tool's pressurized air is directed via the pneumatic passage (63), being metered by the tool's main inlet flow control means (63.1), into the tool's pneumatic passage (63.2).

B) As shown in FIG. 16, the tool's pneumatic passage (63.2) is connected to the opening in the stylus (77) cavity of the tool (6), where it could pneumatically actuate the stylus pneumatic retraction collar (78) into its corresponding stylus guide (77.1) retracting the stylus (77) back into the tool (6), if the opposite side of the stylus guide (77.1) were able to flow to where it exits the tool's pneumatic exhaust vent (72.9).

C) As shown in FIG. 20, the tool's pressurized air is pressurized on the opposite side of the corresponding stylus guide (77.1) via the pneumatic passage (63.2) that is open (73.2) to the pneumatic passage (63.2) via the pattern index-detent plunger (73) when the stylus pattern disk (68) is being rotated to a new position to select a different stylus character pattern, with the tool's pneumatic passage (63.2) pressurizing the pneumatic passage (63.3) via a back pressure that is not able to be metered out by the tool's exhaust flow control means (78.3 & 78.4).

The individual stylus self-alignment/orientation is via the orbital motion of the Selectable Character Multiple Stylus Orbital Engraving Tool (6) orbiting about a virtual interpolated axis.

Before engraving/marking the work-piece (2), the actuated styluses (77-A) are positioned adjacent to the work-piece at a clearance plane and are not contacting the work piece, then utilizing the initial interpolated 3 axes, or optionally 2 axes of interpolated motion having the sequential Z–motion, of motion for the self-alignment and uniform orientation of the individual actuated styluses (77-A) as they contact the work-piece part surface (21).

The tools orbital circular interpolated motion of the X and Y axes (37 and 38) as the –Z axis (39) motion cause the leading edge of the stylus (77-A) to contact the work-piece surface (21) causing the stylus to rotate.

The −Z axis (39) motion causes the styles lead edge of the stylus (77-A) to contact the work-piece surface (21) causing the individual actuated styluses (77-A) to contact the corresponding stylus bearing sphere (80.1) and compress its corresponding elastomeric compliance member (80) to apply pressure to the leading edge of the stylus (77-A) as it contacts the work-piece surface (21) with the tools orbital circular interpolated motion of the X and Y axes (37 and 38) causing the stylus to rotate.

The stylus cutting tip could be a replaceable component detail for the Selectable Character Multiple Stylus Orbital Engraving Tool (6) having the styluses (77) being either a solid piece of carbide or other appropriated work-piece part (2) cutting material or a combination of multiple components to create the stylus (77).

The Selectable Character Multiple Stylus Orbital Engraving Tool (6) could utilize self-lubricating components in its construction by having the components fabricated from base materials that are coated with a self-lubricating material and or a combination of self-lubricating base materials.

The Selectable Character Multiple Stylus Orbital Engraving Tool (6) could utilize a CNC Machine Tool Controller having a functional Personal Computer control schema to facilitate an unlimited programmable dot-matrix pattern of alphanumeric characters and or syntax and or symbols and or graphics and or machine readable characters and or 2D barcodes via the Pattern Disk Part 68.5 for selecting the 5 bit pattern for the binary equivalent 0-31.

The Selectable Character Multiple Stylus Orbital Engraving Tool (6) could utilize the specialized main housing (FIG. 29 Part 6.90) having a detachable stylus guide FIG. 30 Part 6.91, that is secured to the main housing (6.90) via a heated-to-release stylus guide retention collar/sleeve FIG. 31 Part 6.92. The induction heating of the stylus guide retention collar/sleeve (6.92) causing it to expand and or its adhesive to soften and be released from the main housing (6.90) to facilitate the removal of the detachable stylus guide (6.91) from the main housing (6.90), which in turn facilitates the replacement of the engraving styluses (77).

The Selectable Character Multiple Stylus Orbital Engraving Tool could utilize the CNC Machine Tool Controller having a Separate Processing Module and or Character Selection Interface to operate the Programmable Selectable Character Multiple Stylus Orbital Engraving Tool to facilitate an unlimited programmable dot-matrix pattern of alphanumeric characters and or syntax and or symbols and or graphics and or machine readable characters and or 2D barcodes via the Pattern Disk Part 68.5 for selecting the 5 bit pattern for the binary equivalent 0-31.

Operation of the Selectable Character Multiple Stylus Orbital Engraving Tool Via a CNC Machine Tool:

The Selectable Character Multiple Stylus Orbital Engraving Tool (6) can be implemented via the use of a keyed and orientable interchangeable spindle tool holder (32) having a selectable, through spindle, pressurized pneumatic passage (63) selectively and operatively coupled with the mating shank (60) having an internal pneumatic passage (63) or an optional external pneumatic passage means (Standard trade item not shown). With the Selectable Character Multiple Stylus Orbital Engraving Tool (6) having an anti-rotation orientation means (65) operatively connected to the spindle-nose anti-rotation block (42), when the tool holder (32) is placed into the Spindle (31) Tool holder retention means (61), while being rotationally aligned via the Spindle Tool holder orientation means (31) and secured via the Spindle's (32) Tool holder retention means (61), to the Machine tool spindle (3.1).

CNC Machine Tool's Selection of the Character to be Engraved and its Engraving

The following example is of the operational segment of NC programming code for the Selectable Character Multiple Stylus Orbital Engraving Tool (6) having the Pattern Disk Part 68.12 for the round hole (22.0) detail selecting and engraving the character "1" via the controller's variable 601 having a value of 1, with FANUC® G&M Code via the CNC Software Commands of a MAKINO® CNC Horizontal Spindle Machine Tool via the following FANUC© NC-Programming Code.

1. N100; (12 CHARACTER ORBITAL ENGRAVING TOOL T100).
2. #601=1 (THE NUMBER 1 POSITION OF THE STYLUS PATTERN DISK IS THE CHARACTER "1").
3. T100; (POSITION TOOL FOR LOADING INTO SPINDLE).
4. M06; (MACRO TO ORIENT SPINDLE TO 0 DEGREE ANGLE AND LOAD TOOL INTO SPINDLE).
5. G90 G00 G54 X100. Y200. B180. M11; (ABSOLUTE MODE AND WORK-PIECE X, Y, & B POSITIONS).
6. M10; (LOCK B AXIS ROTARY TABLE).
7. M398; (MACRO FOR THROUGH SPINDLE MIST ON).
8. #600=#100; (STORE PREVIOUS #100 VALUE).
9. #601=INT [#601]; (1ST SELECTED CHARACTER AND REMOVE LT WHOLE NUMBERS FROM SELECTED CHARACTER).
10. G53; (EFFECTIVELY CANCELS THE CONTROLLER'S LOOK AHEAD FUNCTION TO PREVENT ERRORS).
11. IF #601 LT 1 GOTO 9999; (TEST FOR 0=SKIP CHARACTER).
12. IF #601 LT 13 GOTO 1000; (TEST FOR VALID SELECTED CHARACTERS 1 THROUGH 12).
13. #3000=1 (CHECK FOR VALID SELECTED CHARACTER); (STOP MACHINE ERROR AND MESSAGE).
14. N1000; (SELECTED CHARACTER ENGRAVING SEQUENCE).
15. #100=30*[#601−1]; (SET THE SPINDLE ANGLE TO EQUAL THE SELECTED CHARACTER).
16. G53; (EFFECTIVELY CANCELS THE CONTROLLER'S LOOK AHEAD FUNCTION TO PREVENT ERRORS).
17. M466; (MACRO TO TRANSFER THE #100 VALUE TO THE MACRO 318 READING REGISTER).
18. G53; (EFFECTIVELY CANCELS THE CONTROLLER'S LOOK AHEAD FUNCTION TO PREVENT ERRORS).
19. M318; (MACRO FOR THE SPINDLE ORIENTATION AT THE EXTERNALLY SPECIFIED ANGLE IN DEGREES).
20. G00 G43H151 Z10.0; (WORK-PIECE Z CLEARANCE POSITION).
21. G01 Z.1 F10000; (WORK-PIECE Z CLEARANCE POSITION).
22. G91; (RELATIVE POSITION MODE).
23. G03 J-.4 K-.025 L10; (X&Y 0.4 ORBIT RADIUS WHILE DESCENDING Z-.25 IN 10 REVOLUTIONS=Z-.15 INTO THE WORK PIECE).
24. G90; (ABSOLUTE POSITION MODE).
25. N9999; (TESTED FOR 0=SKIP CHARACTER).
26. #100=#600; (RESTORE PREVIOUS #100 VALUE).

27. G00 Z50. M09; (RETRACT TOOL FROM WORK-PIECE AND SHUT OFF THROUGH SPINDLE MIST).

28. M01; (OPTIONAL STOP).

Round Hole Engraving Detail:

FIG. 21 is of the Selectable Character Multiple Stylus Orbital Engraving Tool (6) having the Pattern Disk Part 68.12 for the round hole (22.0) detail the characters 0-9, the "plus", and "minus" signs, with the CNC Machine Tool (3) spindle (31) being in the #1 Character Position. Having a total of 15 engraving styluses (77) with the Center Column of 5 styluses extended (77-A) into the engraving position and all of the other styluses retracted (77-B). The stylus (77-A) are extended via the spindle's alignment of the pattern disk with corresponding Work-piece Surface Compression Compliance Means (80) and its Stylus Rotational Spherical Bearing (80.1). Having the compliance of the Compression Means (80) absorbing and controlling the compressive cutting force applied to the stylus tip via the Z− axis travel (39) causing the extended stylus (77-A) to contact the work piece. While the X (37) and Y axes (38) are circularly interpolated via the CNC machine tool's helical motion command in a helical motion path that causes each of extended individual multiple styluses (77-A) to rotate via orbiting about a virtual axis of rotation causing the extended individually selectable engraving stylus(es) (77-A) to drill into the work-piece to a specific depth via the Z− axis (39), while the Selectable Character Multiple Stylus Orbital Engraving Tool (6) is not rotating.

There are multiple methods that the G&M Code of the CNC Software Commands can utilize for a specific machine for circular and or helical interpolation. For example, first having the Cutting Feed Rate preset via F 10000; (for 10 kmm/min.=7,958 RPM) that could be used to control the motions of the CNC Machine Tool via the NC commands G91 G03 J-.4; or G91 G03 X-.4 Y-.4 R.4; G91 G03 X+0.4 Y-.4 R.4; G91 G03 X+0.4 Y+0.4 R.4; G91 GO3 X-.4 Y+0.4 R.4; for one rotation of the extended individual multiple styluses (77-A) without lowering the extended stylus during its rotation, that could require a G91 G01 Z-.025 to push the extended stylus (77-A) further into the work-piece surface (21) to drill the extended engraving stylus(es) (77) for the next rotation if required, while there are variations of the above examples that will produce the same results such as FANUC's Helical Interpolation "B" option for the simultaneous helical motion of the 3 X-Y-Z axes.

There are other methods that the G&M Code of the CNC Software Commands can control the orbital CNC motion of the Selectable Character Multiple Stylus Orbital Engraving Tool (6) depending on the manufacturer of the CNC Controller and the manufacturers' installed options. For example a FANUC model of NC controller having the Conical Interpolation option installed could use the single command G91 G03 J-.4 K-.025 L6 F10000 to drill the extended engraving stylus(es) (77-A) toward the work-piece surface (21) Z-0.25 via 10 revolutions of the stylus(es), if required, while there are variations of the above example that will produce the same results.

Orthogonal Hole Engraving Detail:

FIG. 22 is the Selectable Character Multiple Stylus Orbital Engraving Tool (6) having the Pattern Disk Part 68.12 for the orthogonal hole (22.1) engraving the characters 0-9, the "plus", and "minus" signs, with the CNC Machine Tool (3) spindle (31) being in the #1 Character Position. Having a total of 15 engraving styluses (77) with all 5 Center styluses extended (77-A) into the engraving position and all of the other styluses retracted (77-B). The stylus (77-A) is extended via the spindle's alignment of the pattern disk with corresponding Work-piece Surface Compression Compliance Means (80) and its Stylus Rotational Spherical Bearing (80.1). Having the compliance of the Compression Means (80) absorbing and controlling the compressive force applied to the stylus tip via the Z− axis travel (39) causing the extended stylus (77-A) to contact the work piece.

There are multiple methods to engrave the orthogonal hole detail (22.1) consisting of first drilling down the round hole detail (22.0) then using the orthogonal X (37) and Y axes (38) motions to create the 4 squared corners of the orthogonal hole (22.1), drilling down one round hole detail (22.0) then using the orthogonal X (37) and Y axes (38) motions to create the 4 squared corners of the orthogonal hole (22.1), using the orthogonal X (37) and Y axes (38) motions to create the 4 squared corners of the orthogonal hole (22.1) while lowering the Z axis (39) toward the work piece, or any combination and or variations of the fore mentioned engraving detail methods.

3×5 Stylus Array, 12 Character Patterns Disk:

Via the 15 selectable styluses via 12 Positions for 12 pre-defined numeric characters and symbols of the Pattern Disk Part 68.12 as shown in FIG. 36 Part 68.12 is operated as follows:

| | Character Set Position # | | | | | | | | | | | | | | | | | |
|---|---|---|---|---|---|---|---|---|---|---|---|---|---|---|---|---|---|---|
| | | 1 | | | 2 | | | 3 | | | 4 | | | 5 | | | 6 | |
| | Degrees between Character Positions 30 | | | | | | | | | | | | | | | | | |
| | Spindle Position in Degree(s) | | | | | | | | | | | | | | | | | |
| | | 0 | | | 30 | | | 60 | | | 90 | | | 120 | | | 150 | |
| | Character Set | | | | | | | | | | | | | | | | | |
| | | 1 | | | 2 | | | 3 | | | 4 | | | 5 | | | 6 | |
| Stylus # | X+ | CNT. | X− | X+ | CNT. | X− | X+ | CNT. | X− | X+ | CNT. | X− | X+ | CNT. | X− | X+ | CNT. | X− |
| 5 | | 1 | | 1 | 1 | 1 | 1 | 1 | 1 | 1 | | 1 | 1 | 1 | 1 | | | 1 |
| 4 | | 1 | | 1 | | | 1 | | | 1 | | 1 | | | 1 | | | 1 |
| 3 | | 1 | | 1 | 1 | 1 | 1 | 1 | 1 | 1 | 1 | 1 | 1 | 1 | 1 | 1 | 1 | 1 |
| 2 | | 1 | | | | 1 | 1 | | | 1 | | | 1 | | | 1 | | 1 |
| 1 | | 1 | | 1 | 1 | 1 | 1 | 1 | 1 | 1 | | | 1 | 1 | 1 | 1 | 1 | 1 |

-continued

| | Character Set Position # | | | | | | | | | | | | | | | | | |
|---|---|---|---|---|---|---|---|---|---|---|---|---|---|---|---|---|---|---|
| | 7 | | | 8 | | | 9 | | | 10 | | | 11 | | | 12 | | |
| | Degrees between Character Positions 30 Spindle Position in Degree(s) | | | | | | | | | | | | | | | | | |
| | 180 | | | 210 | | | 240 | | | 270 | | | 300 | | | 330 | | |
| | Character Set | | | | | | | | | | | | | | | | | |
| | 7 | | | 8 | | | 9 | | | + | | | − | | | 0 | | |
| Stylus # | X+ | CNT. | X− | X+ | CNT. | X− | X+ | CNT. | X− | X+ | CNT. | X− | X+ | CNT. | X− | X+ | CNT. | X− |
| 5 | 1 | 1 | 1 | 1 | 1 | 1 | 1 | 1 | 1 | | | | | | | 1 | 1 | 1 |
| 4 | 1 | | | 1 | | 1 | 1 | | 1 | | 1 | | | | | 1 | | 1 |
| 3 | 1 | | | 1 | 1 | 1 | 1 | 1 | 1 | 1 | 1 | 1 | 1 | 1 | 1 | 1 | | 1 |
| 2 | 1 | | | 1 | | 1 | 1 | | | | 1 | | | | | 1 | | 1 |
| 1 | 1 | | | 1 | 1 | 1 | 1 | | | | | | | | | 1 | 1 | 1 |

For the numeric characters 0, 1, 2, 3, 4, 5, 6, 7, 8, 9, with the "+" and "−" symbols, and optionally additional tools having the alphabetic characters A-Z.

1×5 Stylus Array, 32 Binary Character Sets Disk:

Via 32 Character sets using the 5 selectable styluses via 32 Pattern Disk Positions for an unlimited programmable dot-matrix pattern of alphanumeric characters and or syntax and or symbols and or graphics and or machine readable characters and or 2D barcodes as shown in the Pattern Disk Part 68.5 via FIG. 35 is operated as follows:

Increased Stylus Engraving Point Density:

Via utilizing the NC Program's operation of the engraving stylus to a reduced depth that is proportional to the diameter of the "dot" and its spacing, then repeating the operation of the engraving stylus at the corresponding adjacent stylus point locations of the X and Y axes at the same reduced depth, i.e. for a double stylus point density using a Selectable Character Multiple Stylus Orbital Engraving Tool (6) with a Pattern Disk Part 68.5 having a 1.7 mm stylus point

| | | | Character Set Position # | | | | | | | | | | | | | | | | | | |
|---|---|---|---|---|---|---|---|---|---|---|---|---|---|---|---|---|---|---|---|---|---|
| | | | 1 | 2 | 3 | 4 | 5 | 6 | 7 | 8 | 9 | 10 | 11 | 12 | 13 | 14 | 15 | 16 | 17 | 18 | 19 |
| | | | Degrees between Character Positions 10 Spindle Position in Degree(s) | | | | | | | | | | | | | | | | | | |
| Stylus # | Bit | Binary Value | 0 31 | 10 Not Used | 20 Not Used | 30 1 | 40 2 | 50 3 | 60 4 | 70 5 | 80 6 | 90 7 | 100 8 | 110 9 | 120 10 | 130 11 | 140 12 | 150 13 | 160 14 | 170 15 | 180 16 |
| 5 | 5 | 16 | 1 | | | | | | | | | | | | | | | | | | 1 |
| 4 | 4 | 8 | 1 | | | | | | | | | | 1 | 1 | 1 | 1 | 1 | 1 | 1 | 1 | |
| 3 | 3 | 4 | 1 | | | | | | 1 | 1 | 1 | 1 | | | | | 1 | 1 | 1 | 1 | |
| 2 | 2 | 2 | 1 | | | | 1 | 1 | | | 1 | 1 | | | 1 | 1 | | | 1 | 1 | |
| 1 | 1 | 1 | 1 | | | 1 | | 1 | | 1 | | 1 | | 1 | | 1 | | 1 | | 1 | |

| | | | Character Set Position # | | | | | | | | | | | | | | | | |
|---|---|---|---|---|---|---|---|---|---|---|---|---|---|---|---|---|---|---|---|
| | | | 20 | 21 | 22 | 23 | 24 | 25 | 26 | 27 | 28 | 29 | 30 | 31 | 32 | 33 | 34 | 35 | 36 |
| | | | Degrees between Character Positions 10 Spindle Position in Degree(s) | | | | | | | | | | | | | | | | |
| Stylus # | Bit | Binary Value | 190 17 | 200 18 | 210 19 | 220 20 | 230 21 | 240 22 | 250 23 | 260 24 | 270 25 | 280 26 | 290 27 | 300 28 | 310 29 | 320 30 | 330 0 | 340 Not Used | 350 Not Used |
| 5 | 5 | 16 | 1 | 1 | 1 | 1 | 1 | 1 | 1 | 1 | 1 | 1 | 1 | 1 | 1 | 1 | 0 | | |
| 4 | 4 | 8 | | | | | | | | 1 | 1 | 1 | 1 | 1 | 1 | 1 | 0 | | |
| 3 | 3 | 4 | | | | 1 | 1 | 1 | 1 | | | | | 1 | 1 | 1 | 0 | | |
| 2 | 2 | 2 | | 1 | 1 | | | 1 | 1 | | | 1 | 1 | | | 1 | 0 | | |
| 1 | 1 | 1 | 1 | | 1 | | 1 | | 1 | | 1 | | 1 | | 1 | | 0 | | |

spacing would use an X and Y axes offsets of [1.7/2] for the 2nd, 3rd, and 4th adjacent stylus point locations as required.

Reduce Stylus Engraving Point Density:

Via utilizing the NC Program's operation of the engraving tool having an increased spacing between the styluses having a specific offset that cause the stylus to rotate about its parallel virtual axis to engrave the work piece. (FIGS. 44 and 45)

Enhanced Graphics and Encoding:

Via utilizing NC Program's operation of the engraving stylus to various reduced depths that is proportional to the diameter of the "dot" and its spacing.

Multiple Flute Engraving Styluses for the Selectable Character Multiple Stylus Orbital Engraving Tool:

The MOSET can be fitted with styluses having two or more cutting flutes utilizing a specific offset that cause the stylus to rotate about its parallel virtual axis to engrave the work-piece as shown in FIGS. 44 and 45.

2×11 Programmable Stylus Section Actuation Module:

For the Selectable Character Multiple Stylus Orbital Engraving Tool via electro pneumatic actuators for the individual styluses having 2 columns of 11 styluses being individually selectable, as shown in FIGS. 52-59, via the stylus activation module's components for an unlimited programmable dot-matrix pattern of alphanumeric characters and or syntax and or symbols and or graphics and or machine readable characters and or 2D barcodes being configured and operated optionally having the spindle rotation controlling the Programmable 2×11 MOSET for the character pattern selection via its directional spindle rotation and stop angle as shown in the following partial table FIG. 60 below for the 0.1 increments of the rotational angles and in FIGS. 79-98 and 131-146, or being operated by the bi-directional wired or wireless or optical communications to the machine tool's control system and or external data exchange schemas for its control, coordination, and comparison as shown in FIGS. 61-64.

FIGS. 52 through 162 show the 2×11 programmable embodiment of the selectable stylus engraving tool that utilizes multiple independently actuated styluses being electro mechanically controlled via a 2 position direct acting solenoid plunger valve having its 2 position directional control means being controlled via the polarity of the current being applied to the solenoid coil windings causing the plunger to move in its appropriate direction based on the polarity of the DC current with the residual magnetism of the solenoid plunger retaining it in the last directional position when the electrical current is removed in order to reduce the need for the coil windings electrical current being applied continuously to hold that solenoid plunger's directional position. Optionally the solenoid coil's plunger could be of any functionally operational design such as having its directional position being retained by requiring the coil windings electrical current be continuously applied, or having a pneumatically pilot valve operate the 2 position plunger valve, or any other means as required for the basic actuation control of the plunger valve.

For the 2×11 embodiment being shown in FIGS. 52 through 162 having 22 selectable styluses being actuated and functionally operated via the same operable motions and pneumatics as the spindle selectable character embodiment of the orbital engraving tool as shown in FIGS. 1 through 51. The 2 position plunger valve is shown in this embodiment as that for its respective stylus 77 it has a stylus actuation sphere 80.1 and its corresponding stylus actuation cushion 68 as shown in FIG. 16. With each of their equivalent styluses 77 having an equivalent outer stop collar 79 and an equivalent inner stop collar 78 as shown in FIG. 16.

FIG. 52 is of the internal components of the Programmable 2×11 engraving stylus module having the individual selection of the styluses 77 being activated for engraving by their corresponding actuator assemblies' repositionable actuation sphere 8.10 that is selectively repositionable in each actuation module as required for engraving with that stylus. This Programmable 2×11 Engraving module consist of an outer stylus guide plate 6.98 that guides the 22 individual styluses 77 that are routed through the internal stylus guide plate 77.98, with the individual stylus having an outer collar assembly 79 and an inner collar assembly 78 being assembled onto each stylus 77.

FIG. 53 is of the multiple orthogonal views of the 2×11 styluses controlled actuation module (PMOSET) having twenty two 2 position pneumatic solenoid valves and their respective features and details being actuated in the #1 of 2 stylus test actuation patterns where the odd number addressed stylus actuators are selectively activated for their subsequent engraving of a test pattern for those selected styluses. Showing that in cross section view C-C where the left side pneumatic plunger or equivalent is extended to position the repositionable actuation sphere 8.10 in line with the centerline of the corresponding stylus 77 for its activation in the extended position for engraving the work piece at that location. Having the right side pneumatic plunger or equivalent is retracted to allow the corresponding repositionable actuation sphere 8.10 to be displaced by the controlled pressurized air within the stylus actuation module to position the repositionable actuation sphere 8.10 its position adjacent to the corresponding stylus 77 for the stylus's retraction into the engraving tool to prevent that specific stylus 77 from engraving the work piece at that location. With cross section view D-D showing the opposite stylus's operational actuation having the left side plunger's sphere 8.10 being deactivated for retraction with the right side being activated for engraving. Having the cross section view E-E showing the pressurized air inlet valves set consisting of three 2 position pneumatic solenoid valves for controlling the extension or retraction of the 22 styluses 77 and the repositioning the corresponding repositionable actuation sphere(s) 8.10 as required, being utilized in conjunction pneumatic exhaust vent outlet valves set consisting of three 2 position pneumatic solenoid valves being shown in cross-section view F-F. With the 2×11 styluses actuation module (PMOSET) being directly controlled by having the 28 individual 2 position pneumatic solenoid valves being operably selected for actuation or refraction by a controlled means.

FIG. 55 is for the operational sequence of the Programmable 2×11 Engraving module showing the various modes of actuation for the individual styluses for the selection of the engraving tests patterns, and operable control of the individual styluses, and their respective solenoids valves for the functional operation of the programmable engraving tool.

FIGS. 56 through 59 shows the step-by-step operable pneumatic solenoid valve positions' and sequential operations, pneumatic pressurizations and exhausts, for the corresponding stylus activations and retractions as required for the functional operation of the programmable engraving tool.

Figure 26:
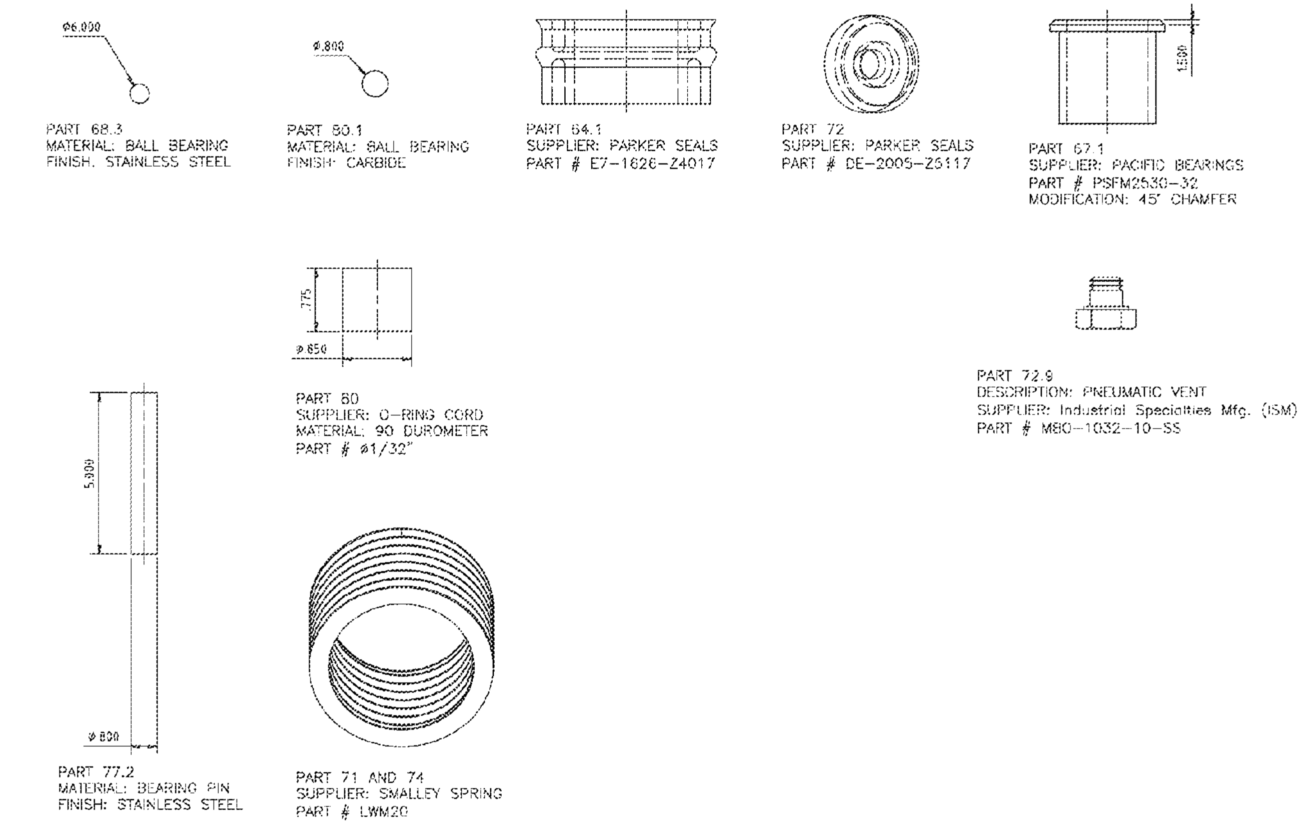
Figure 27:
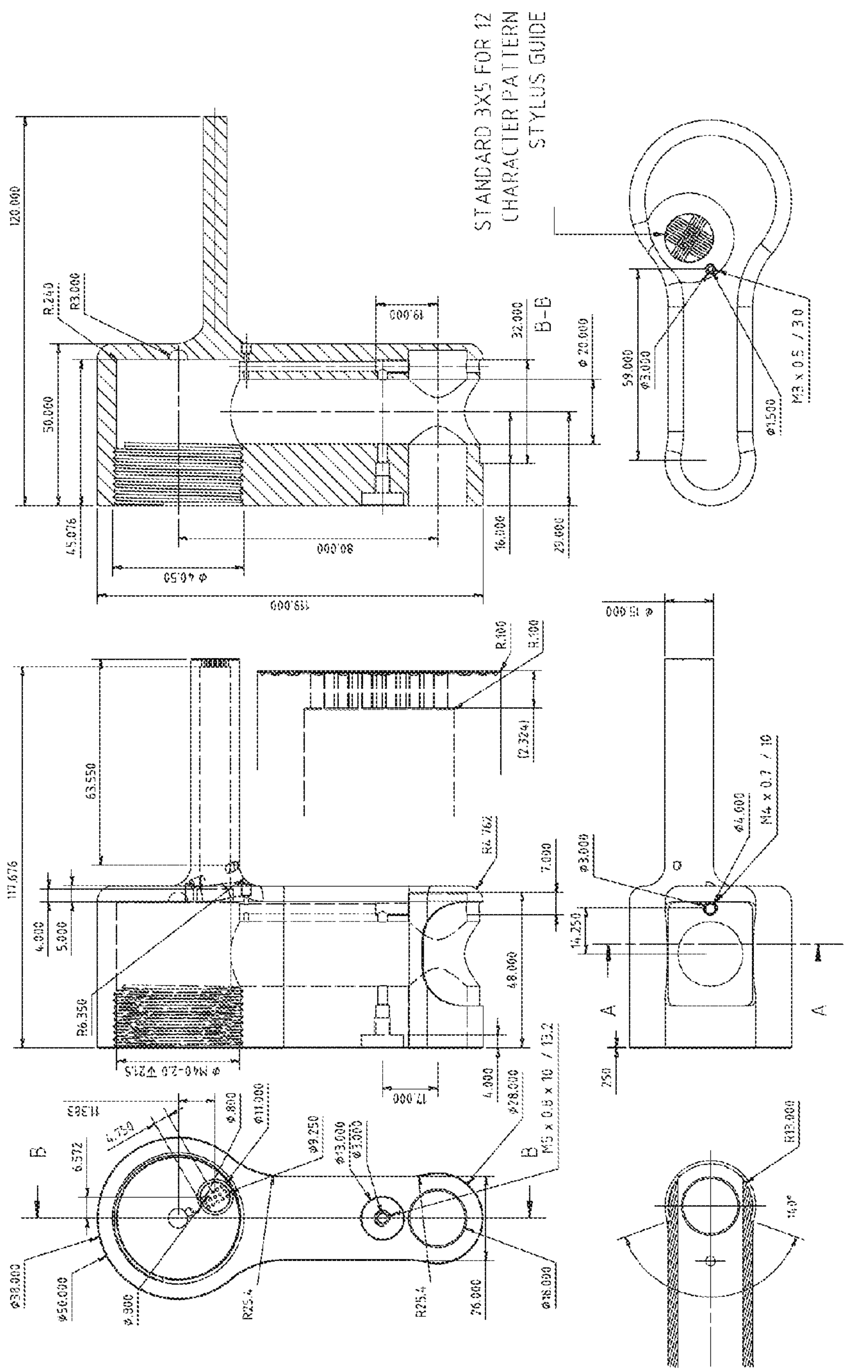
Figure 28:
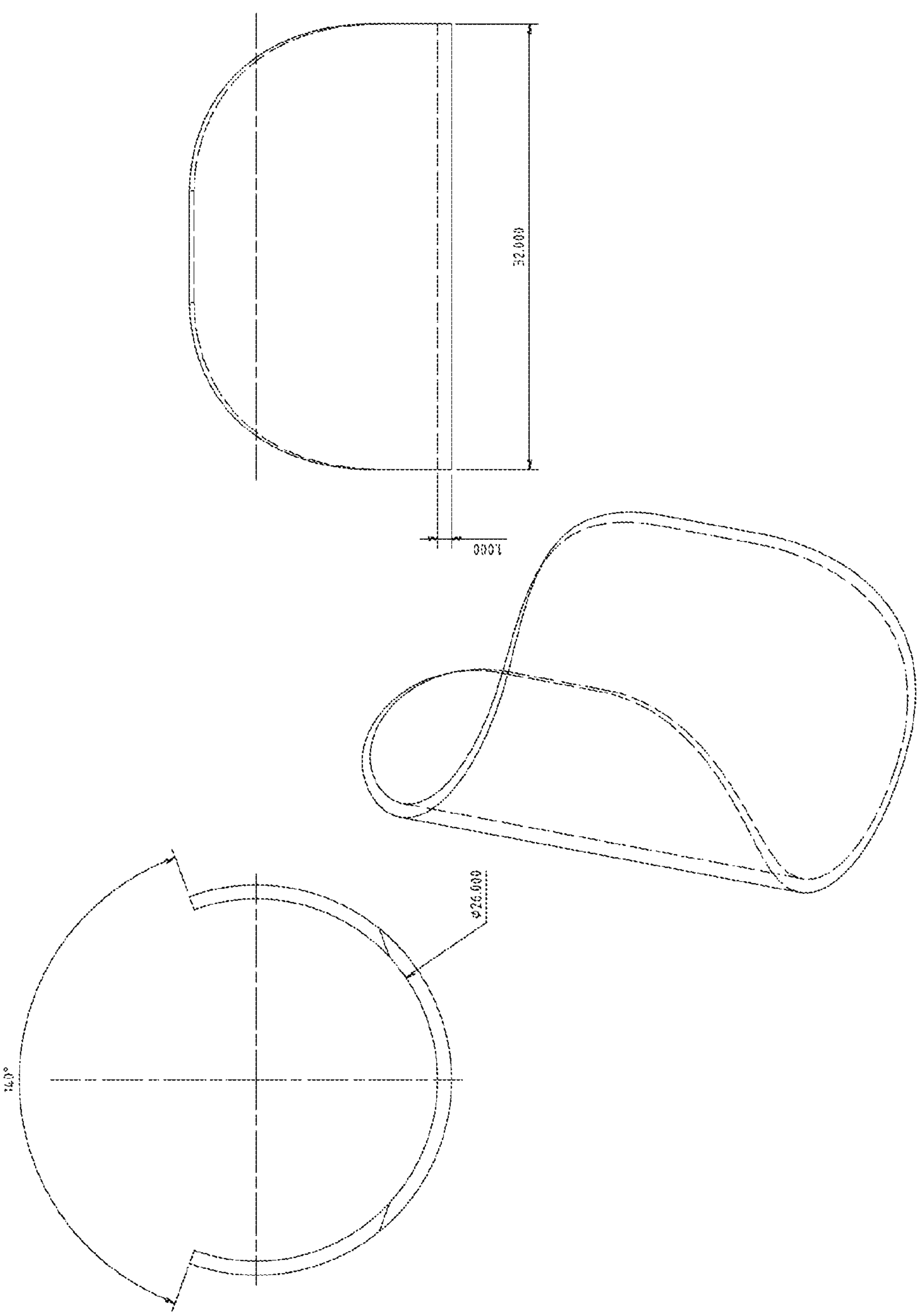
Figure 29:
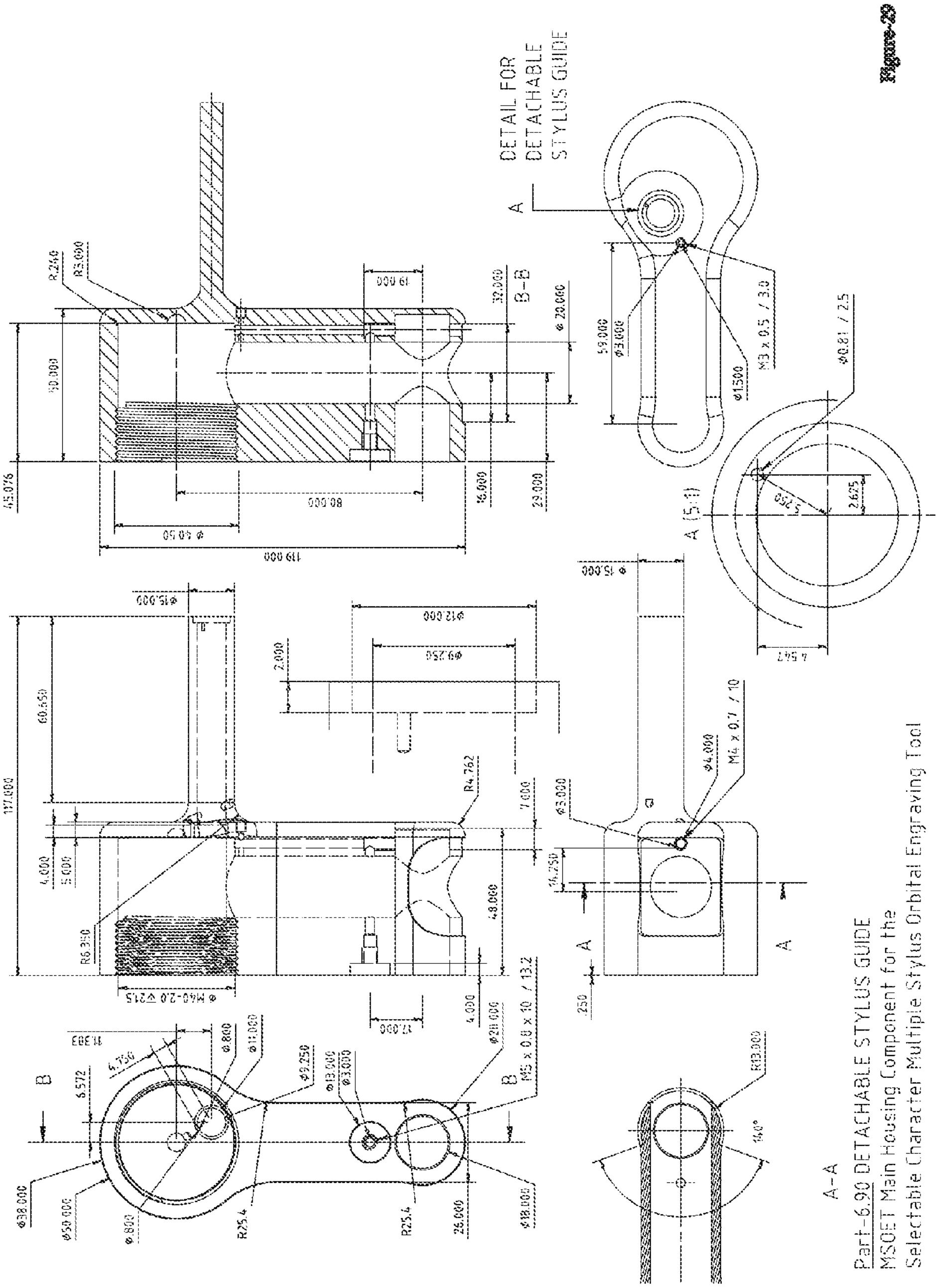
Figure 30:
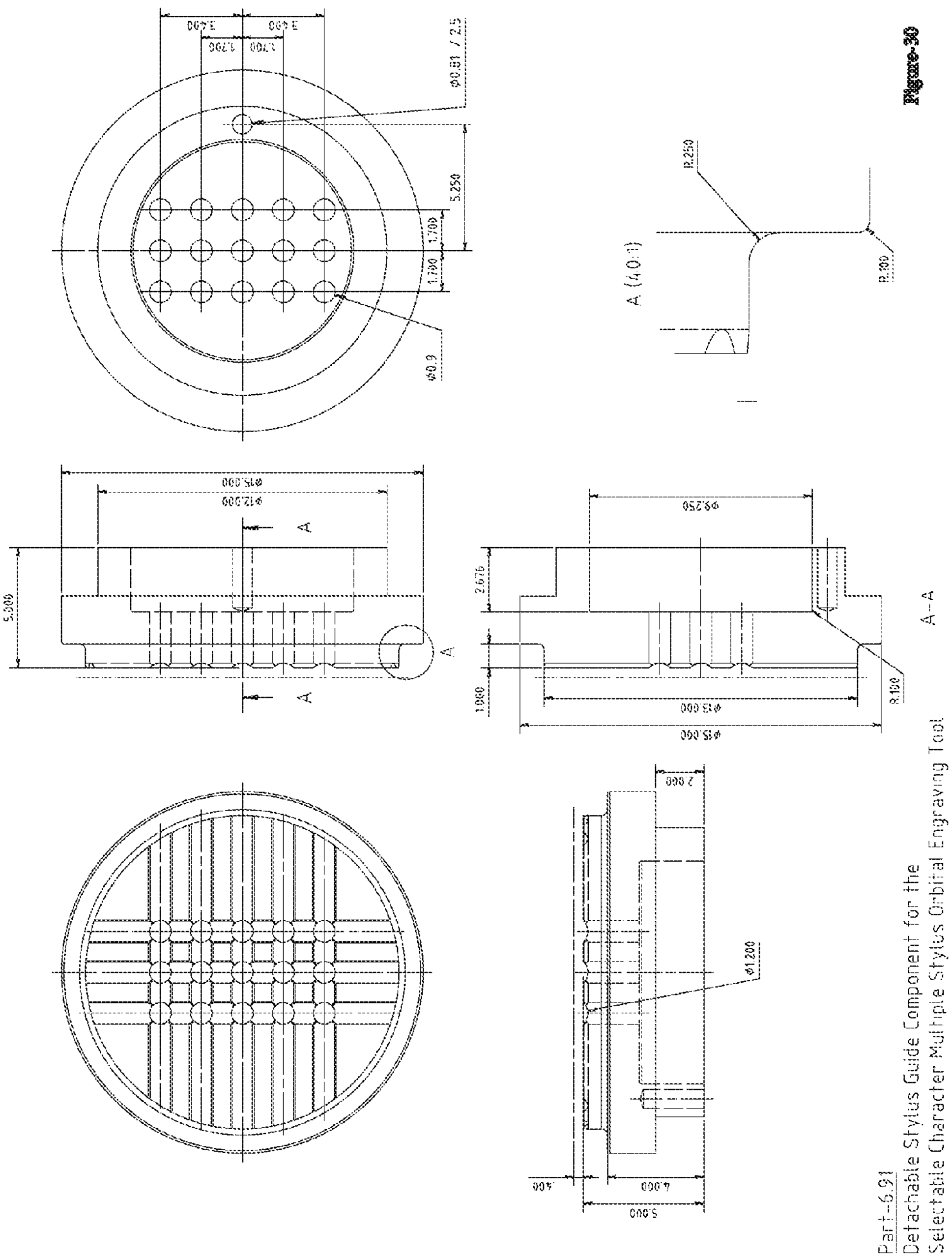
Figure 31:
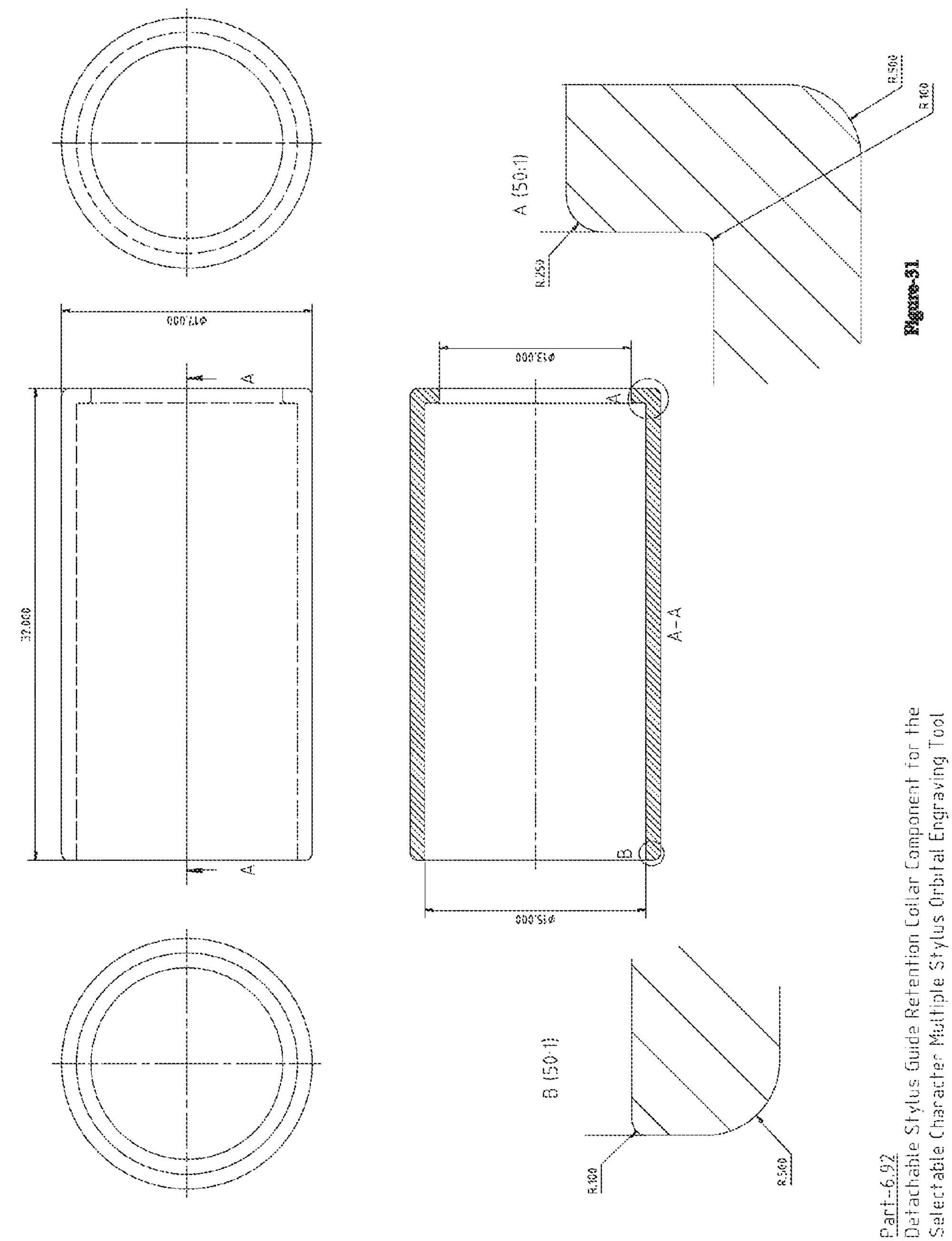
Figure 32:
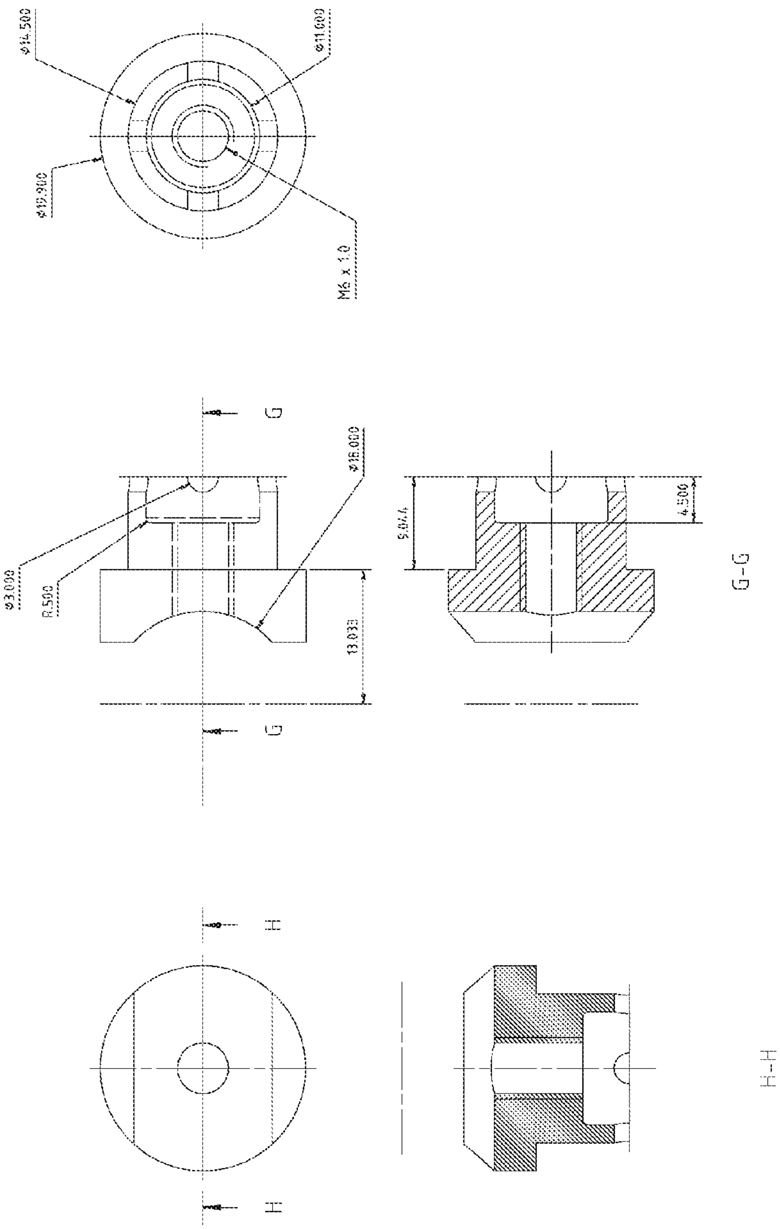
Figure 33:
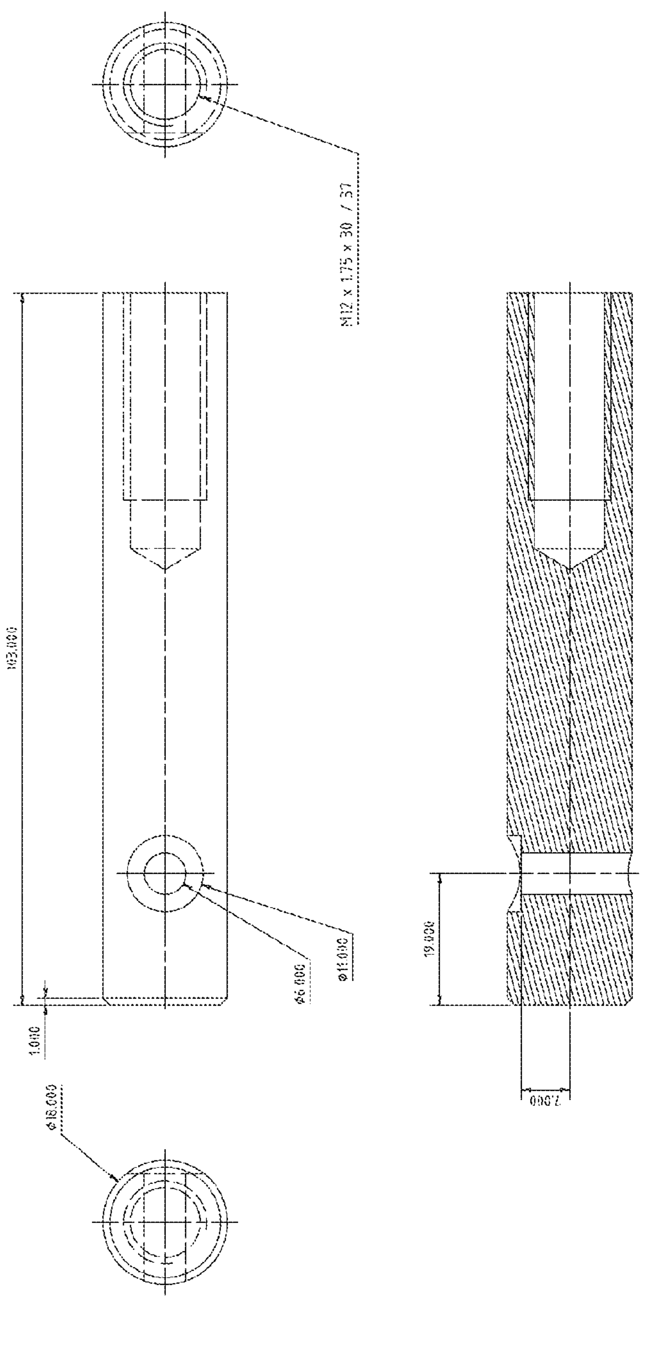
Figure 34:
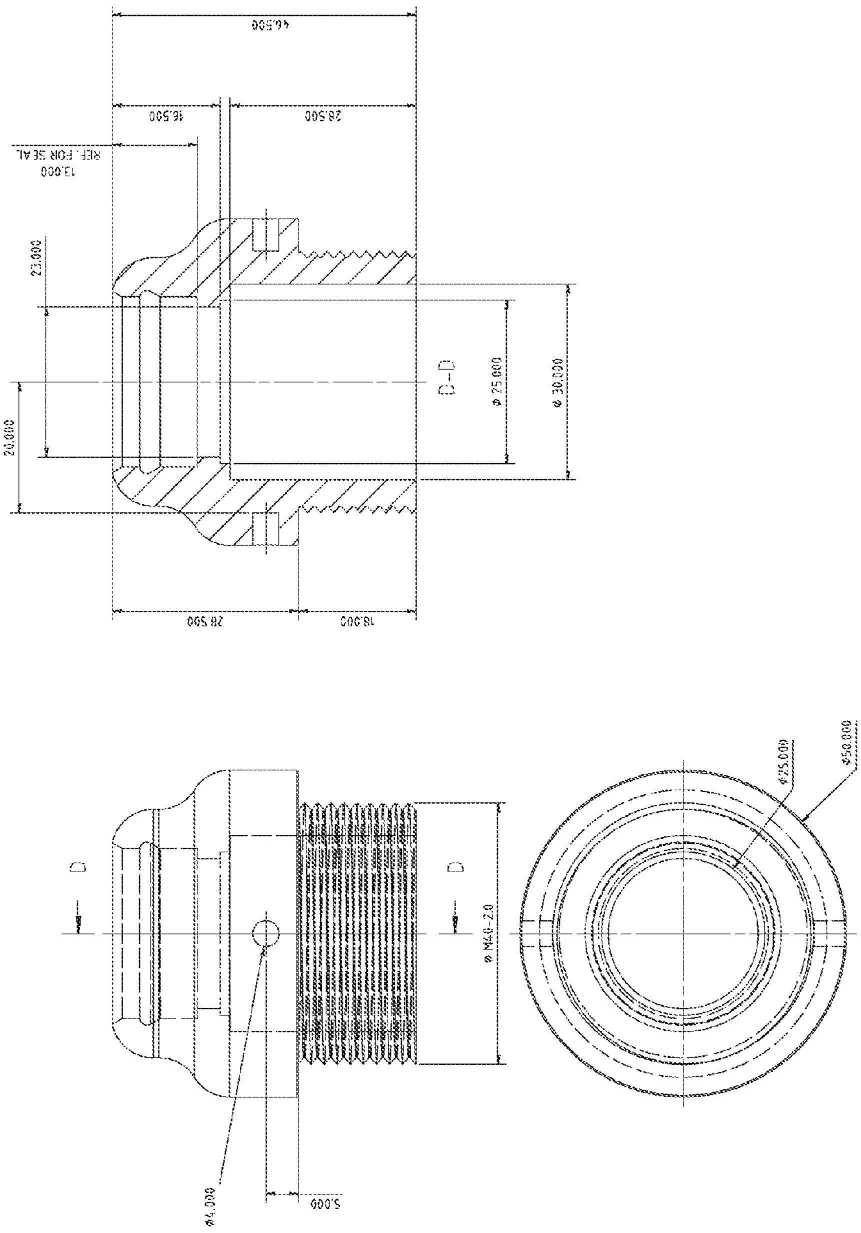
Figure 35:
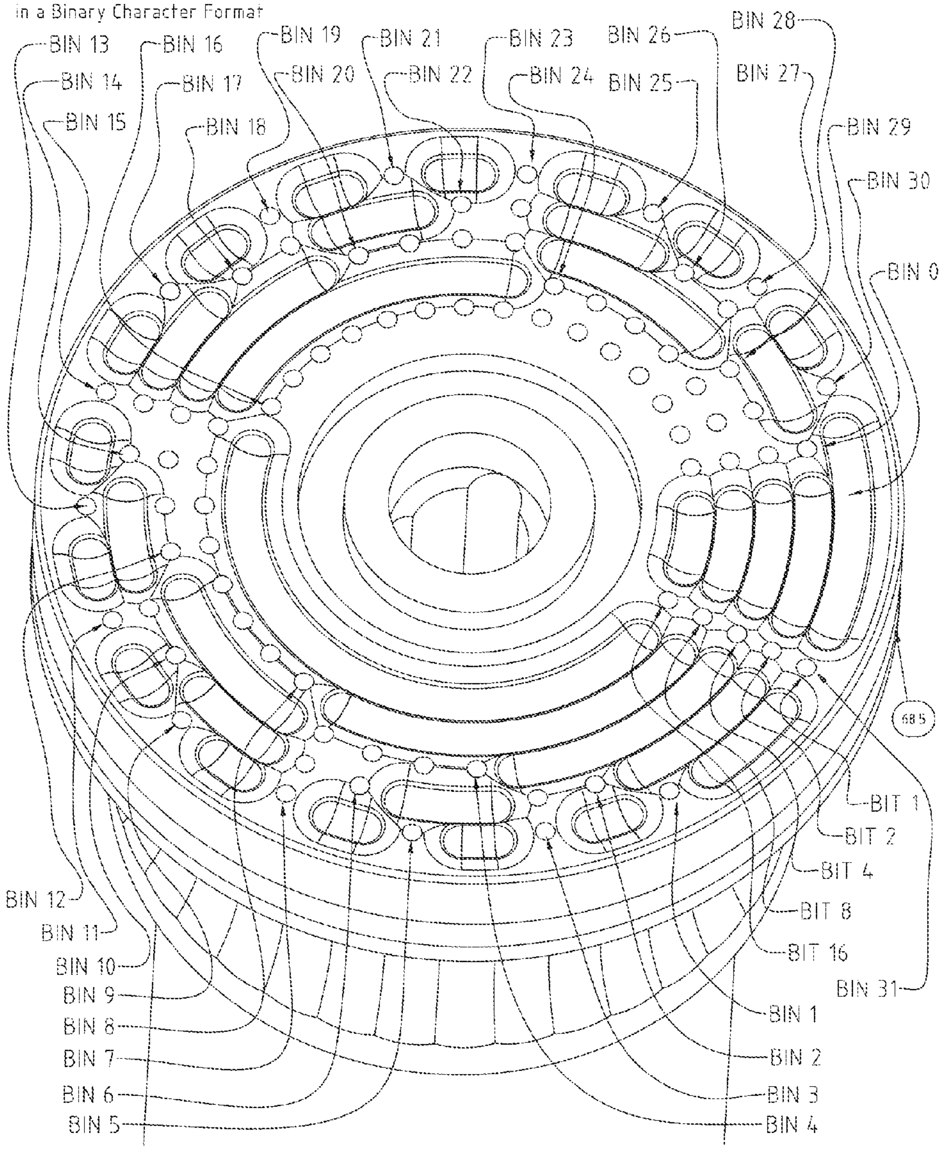
Figure 36:
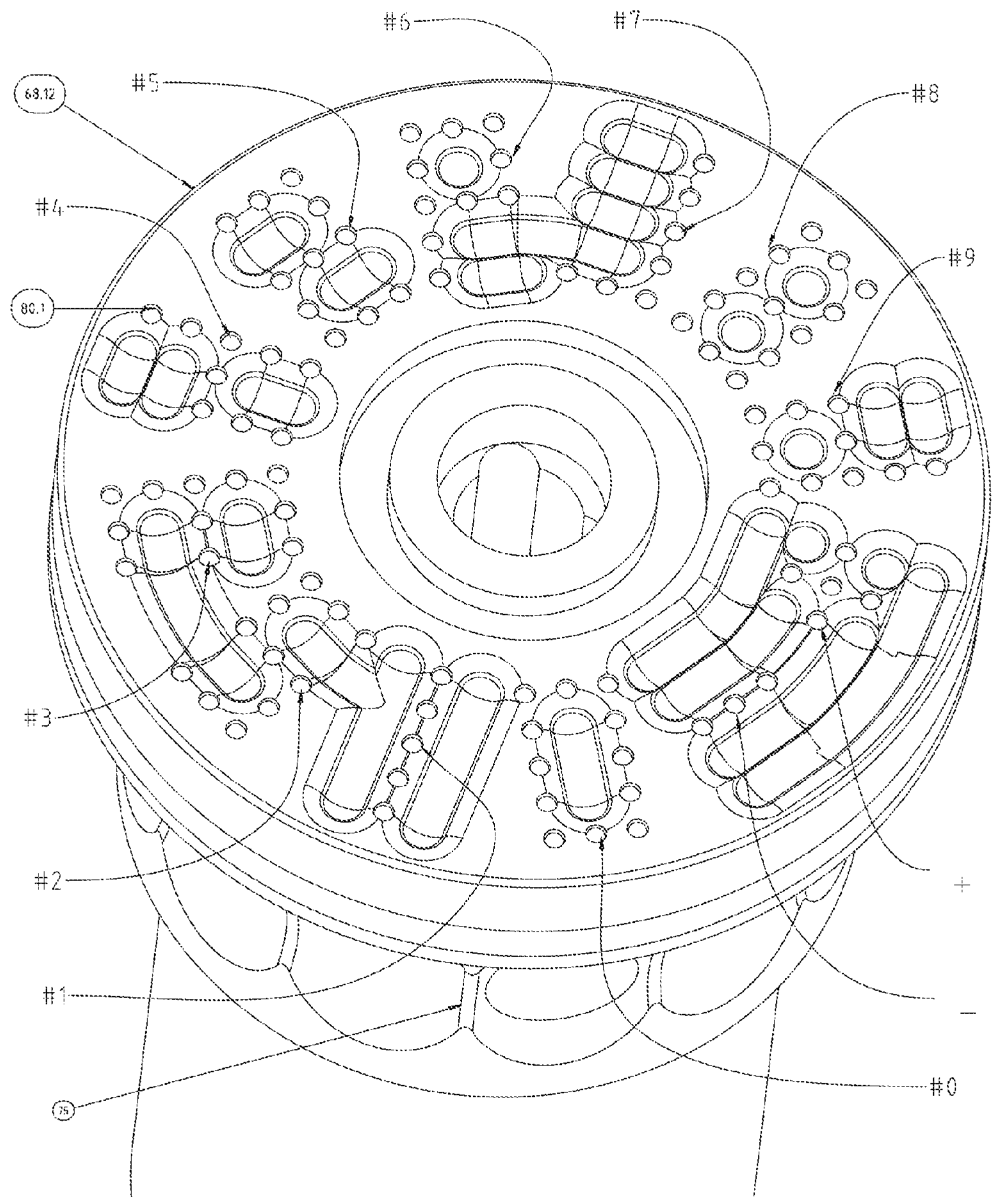
Figure 37:
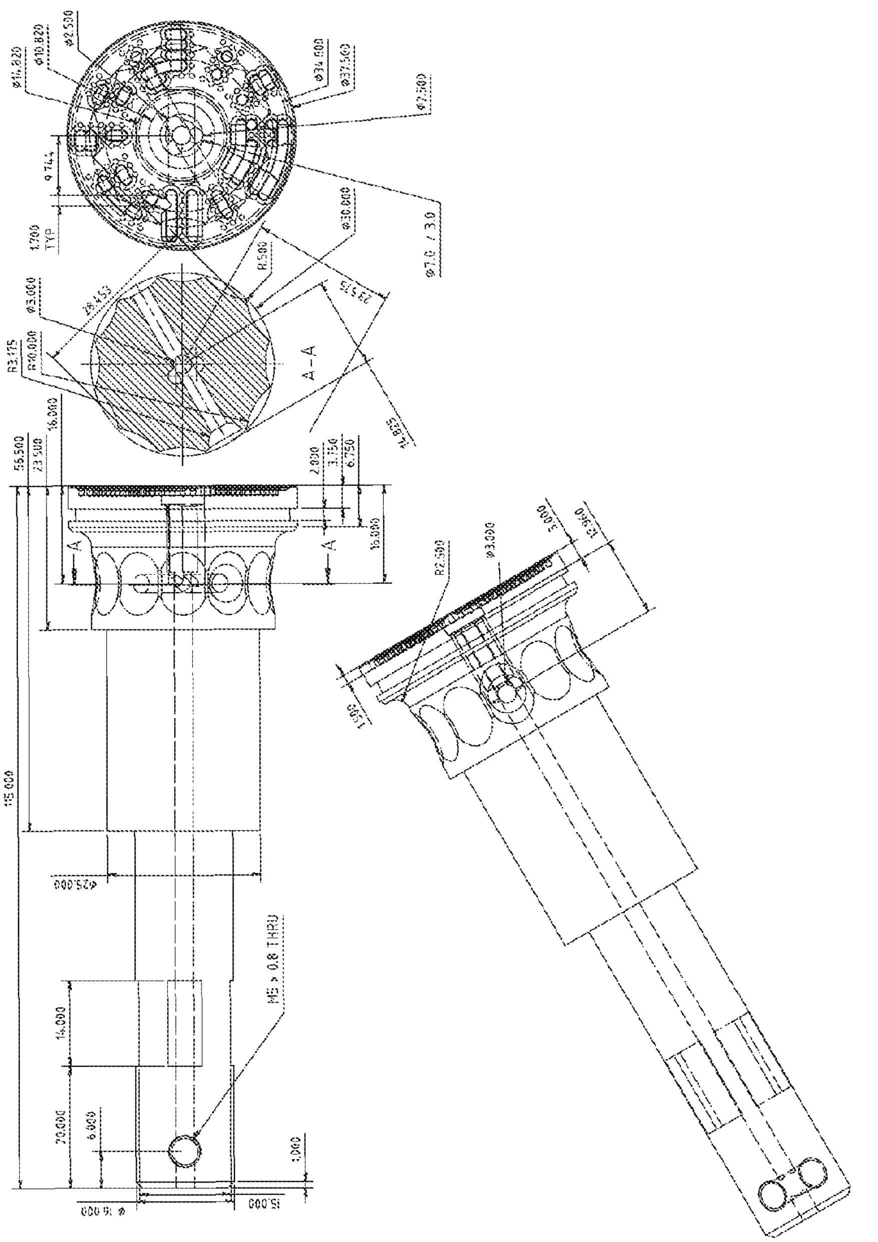
Figure 38:
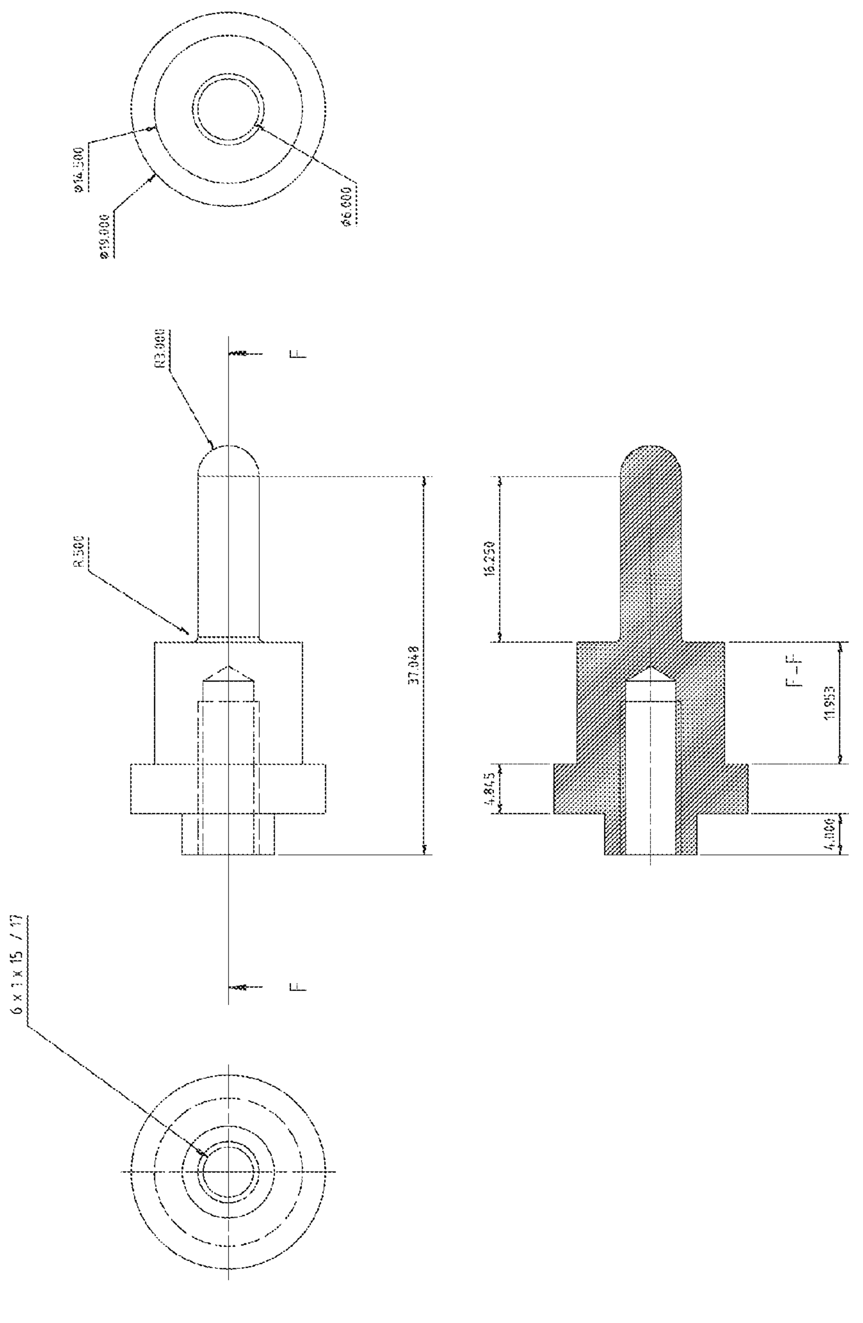
Figure 39:
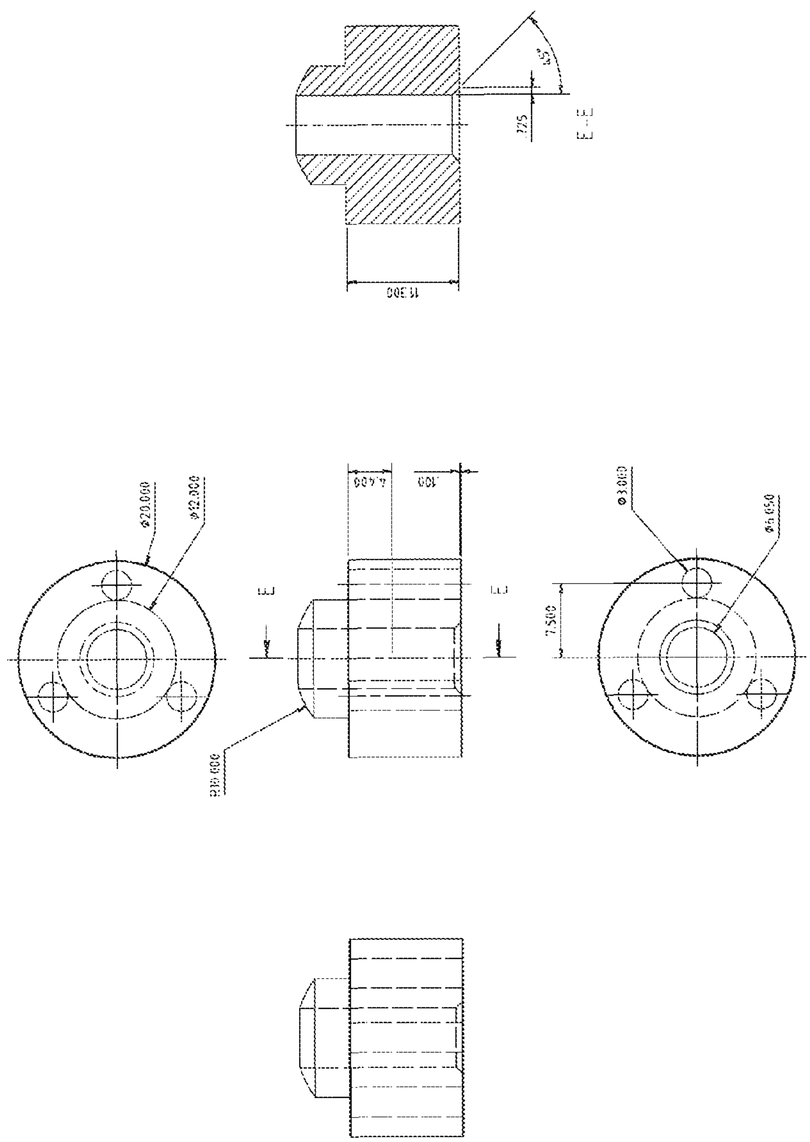
Figure 40:
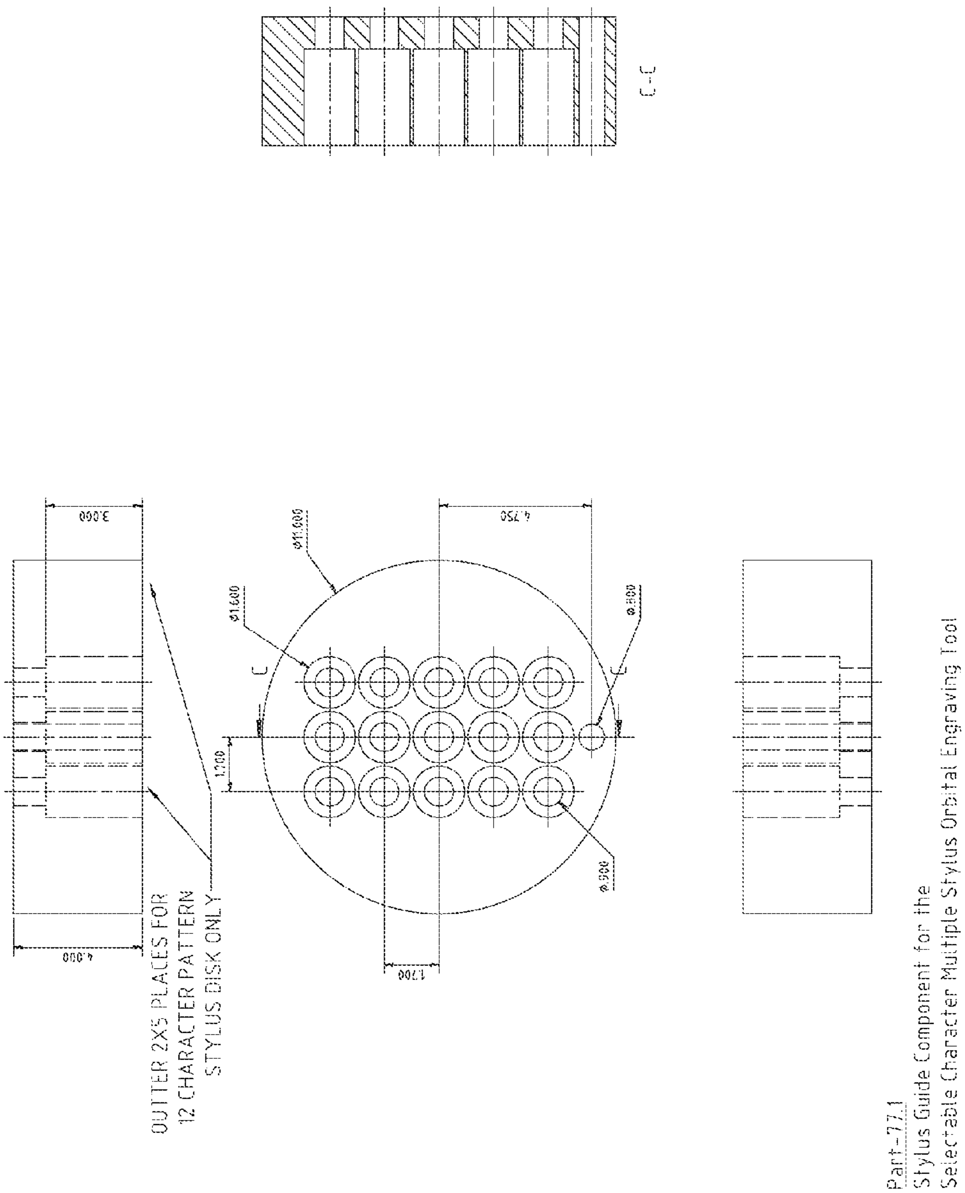
Figure 41:
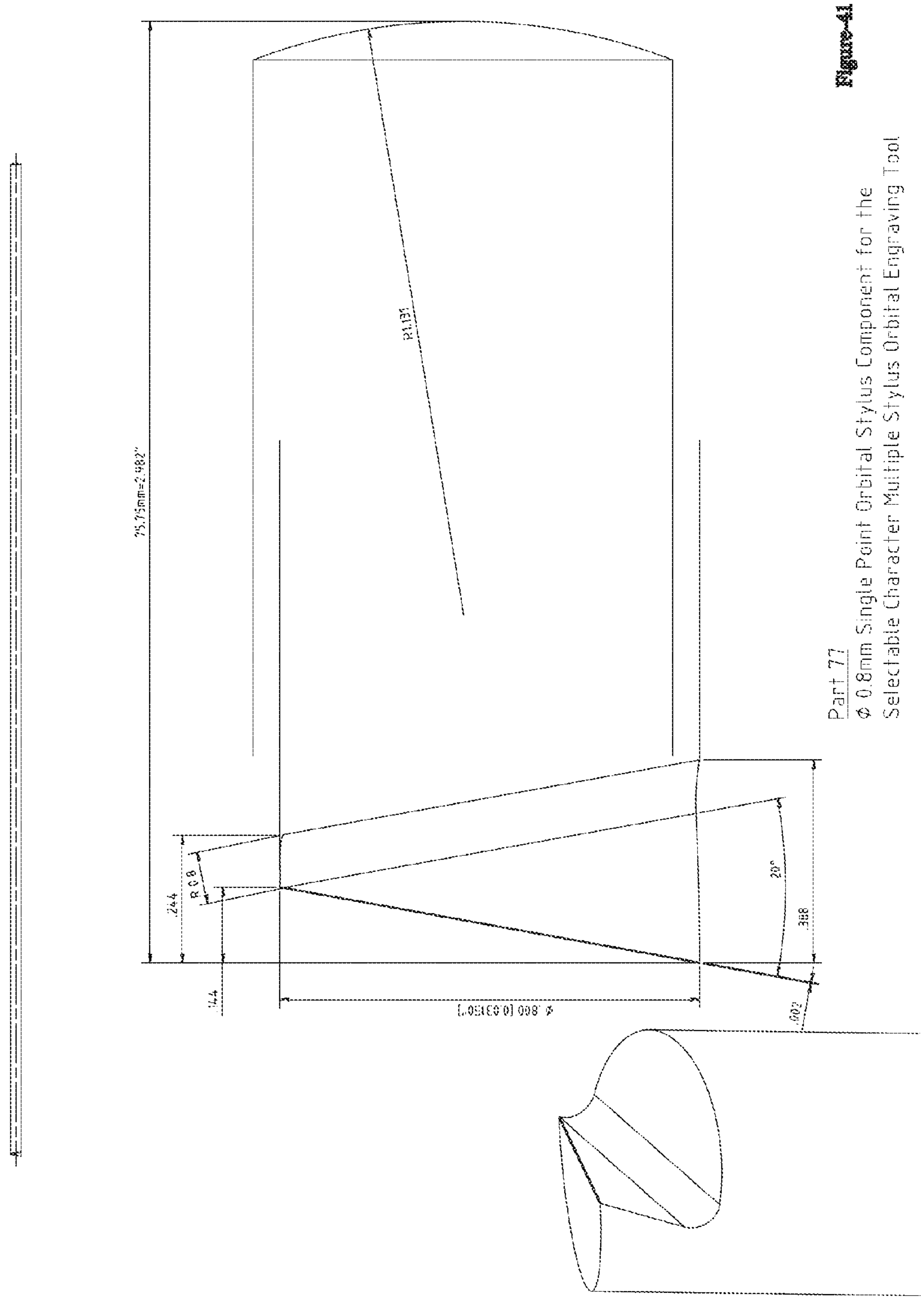
Figure 42:
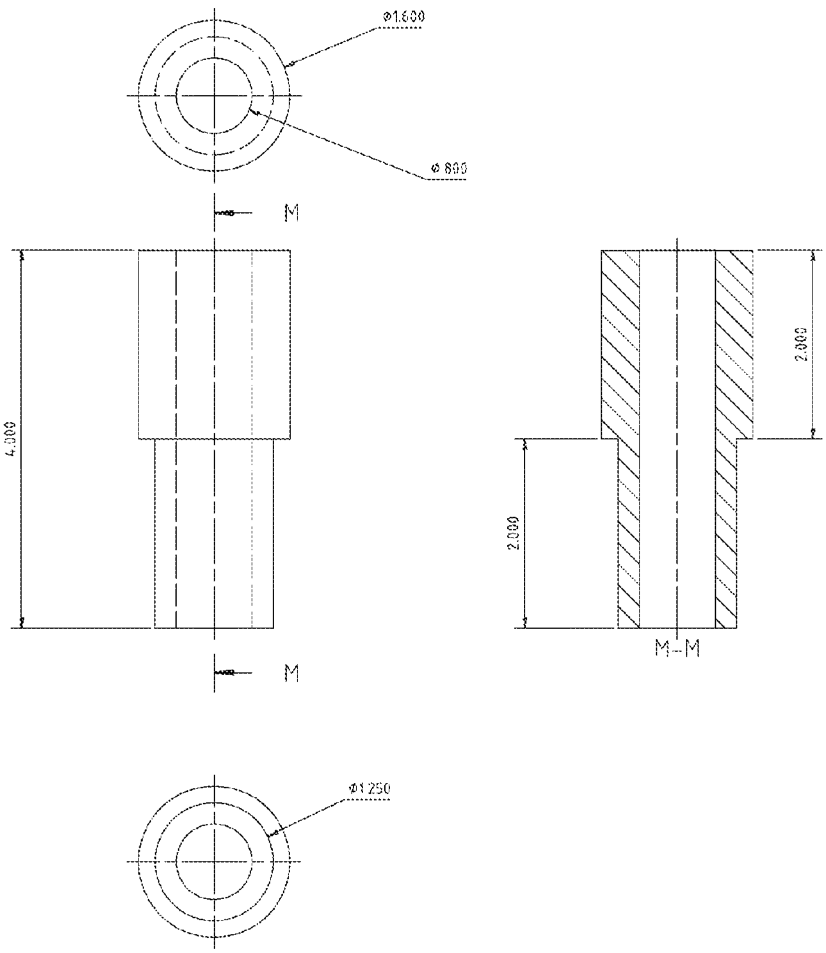
Figure 43:
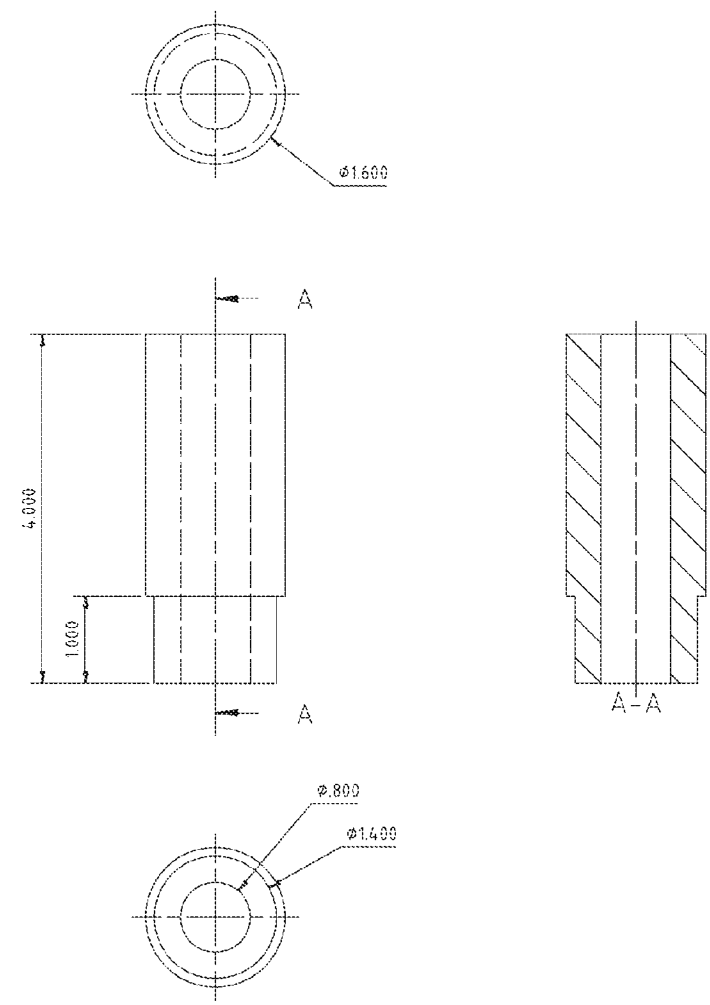
Figure 44:
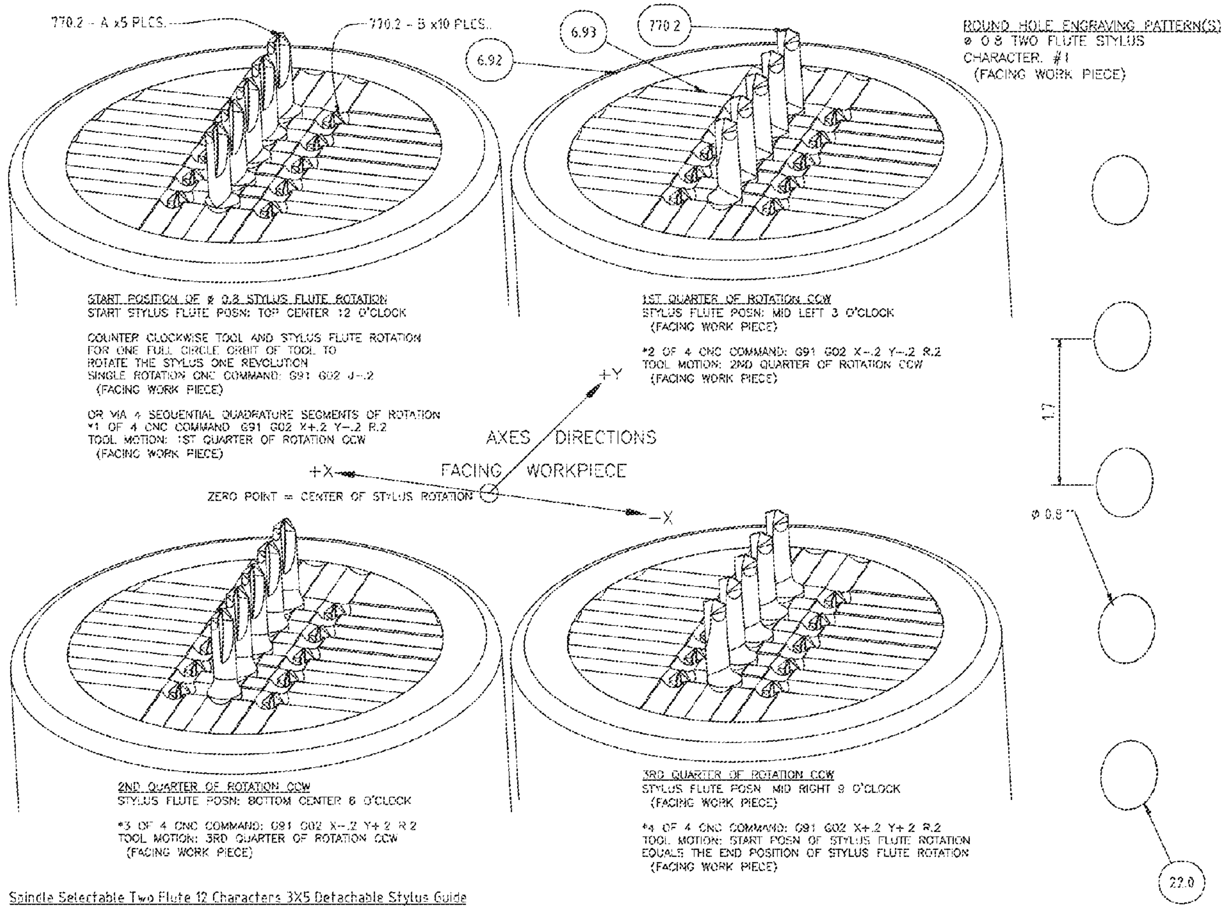
Figure 45:
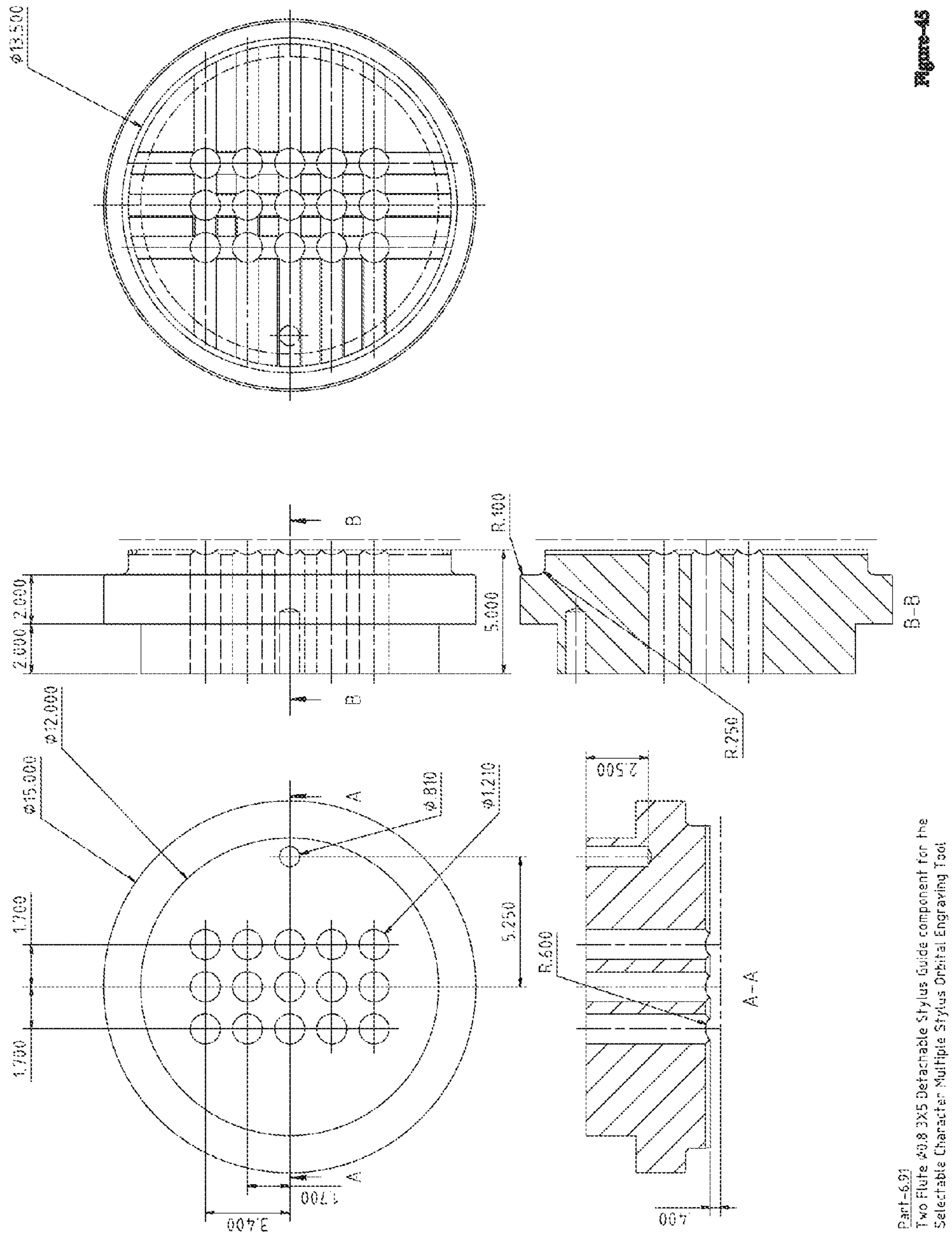
Figure 46:
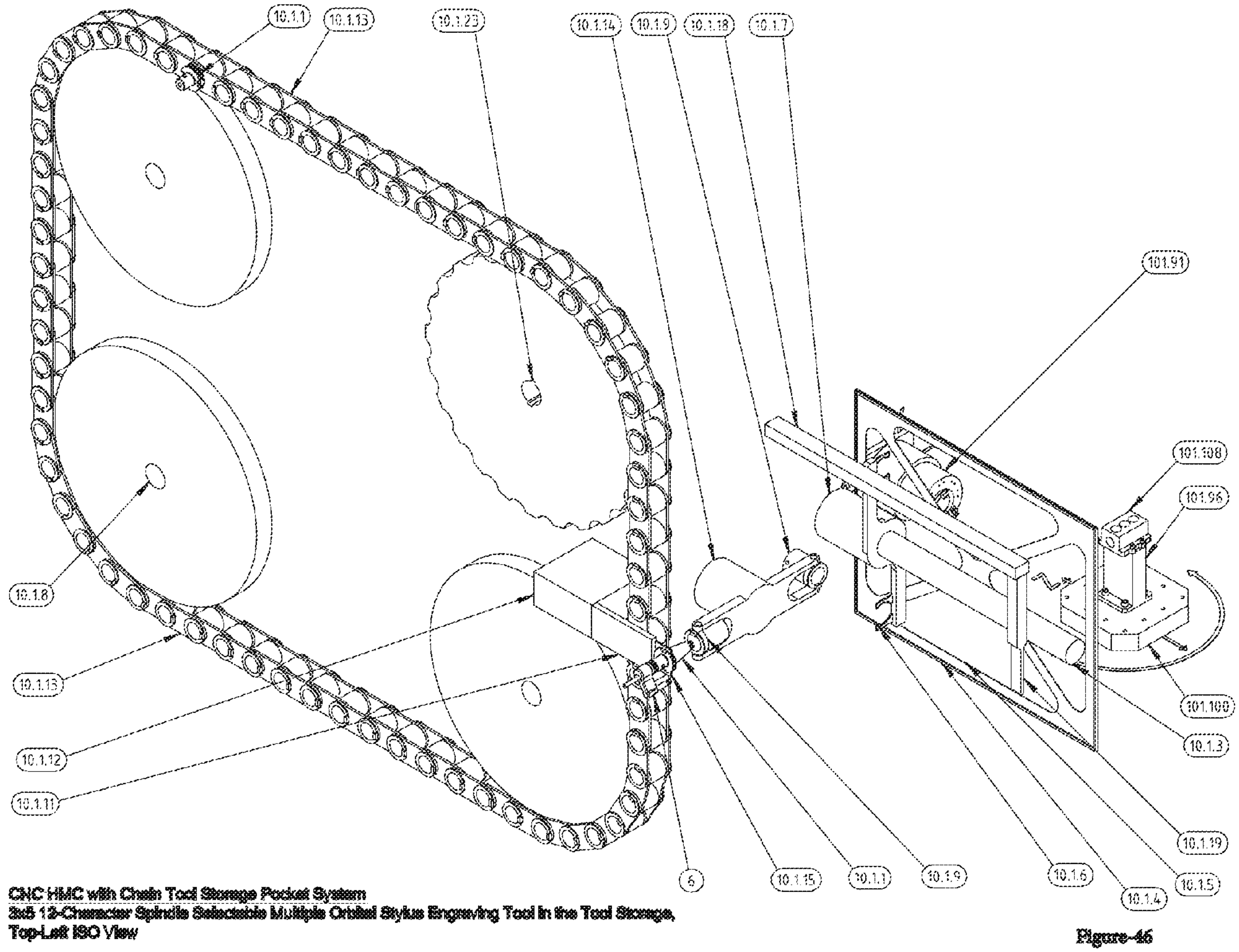
Figure 47:
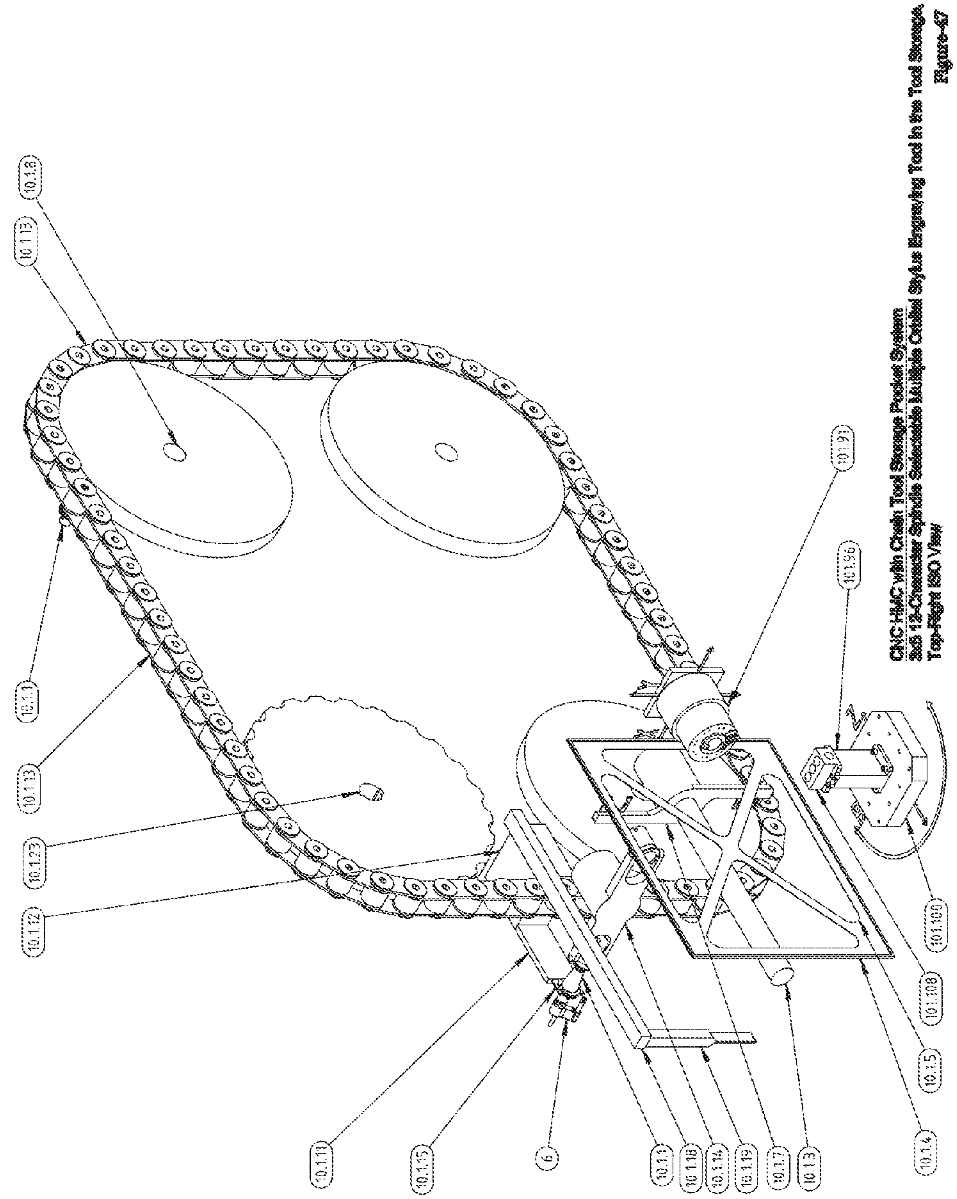
Figure 48:
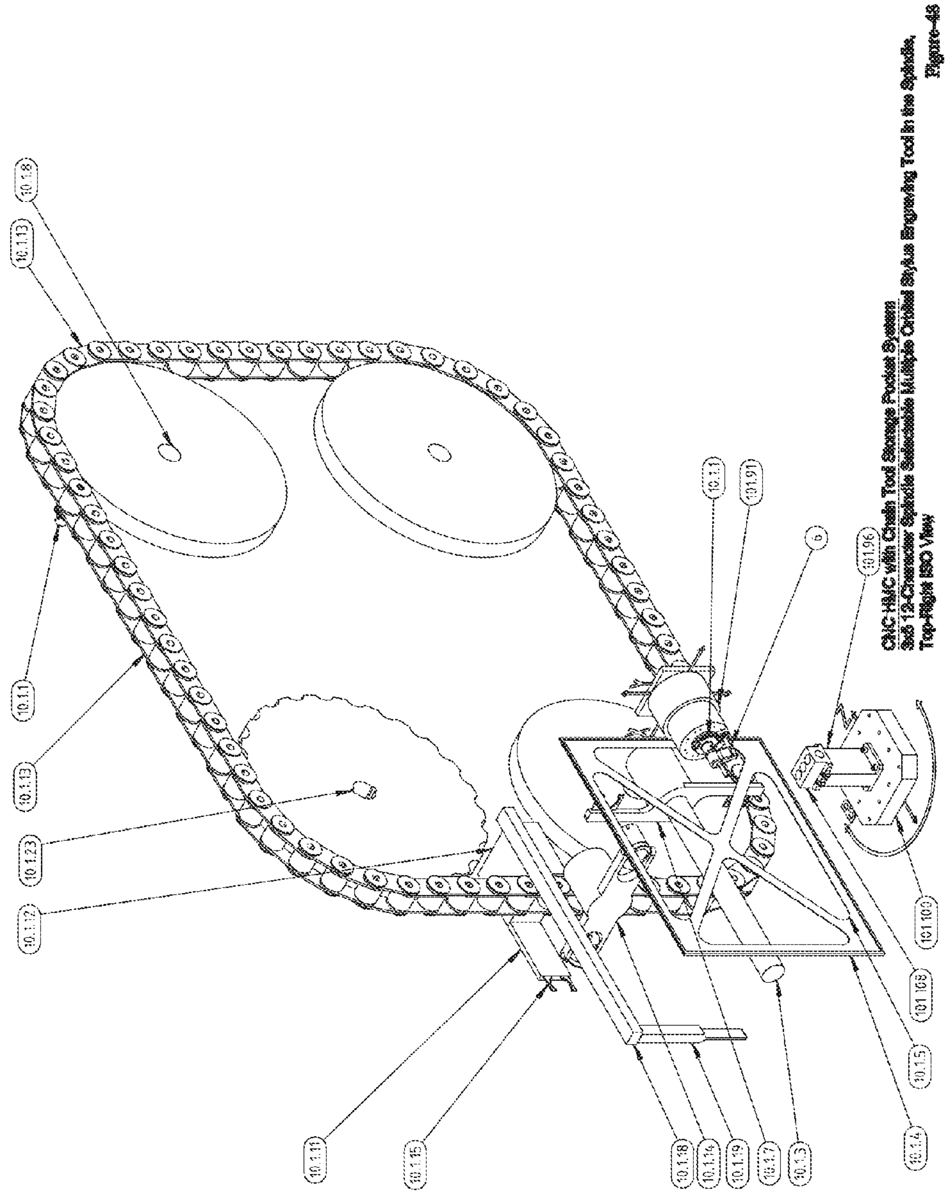
Figure 49:
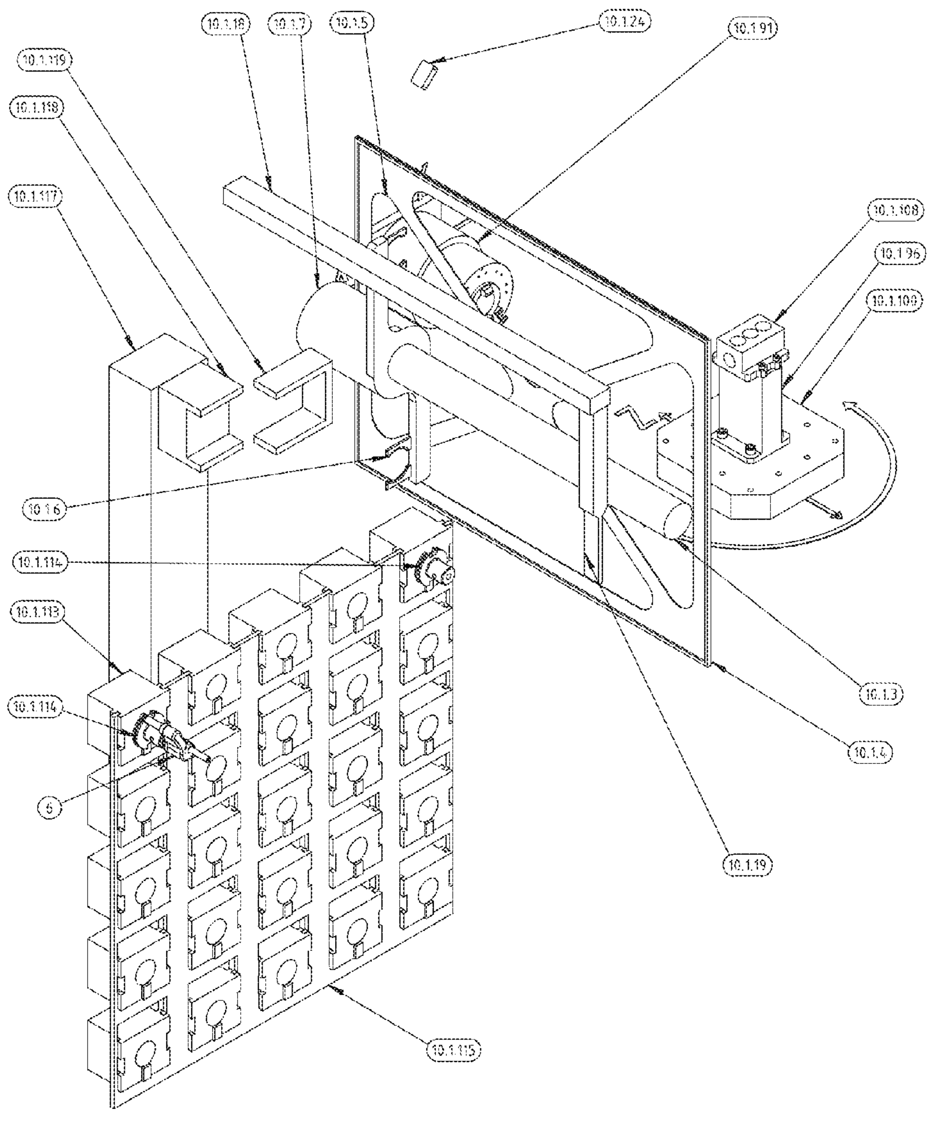
Figure 50:
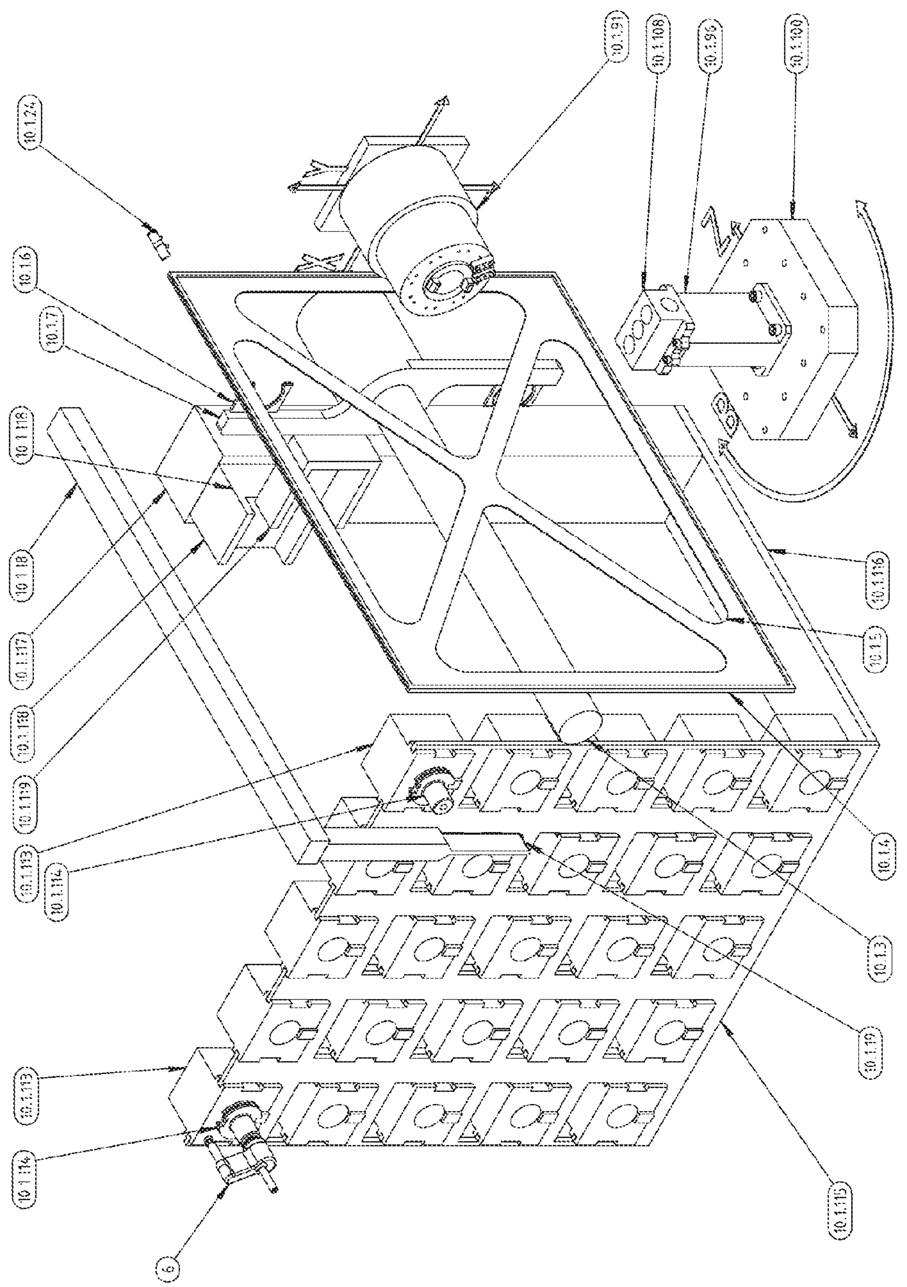
Figure 51:
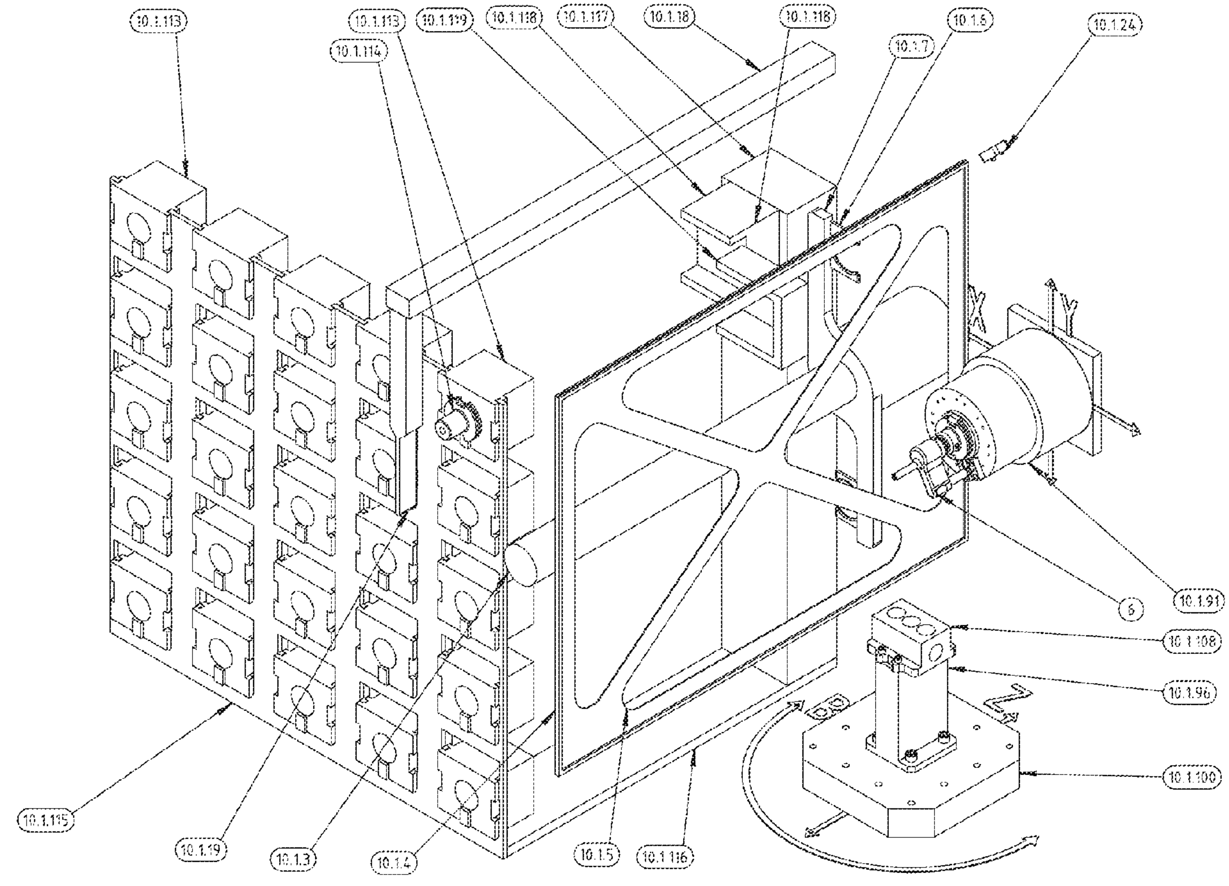
Figure 52:
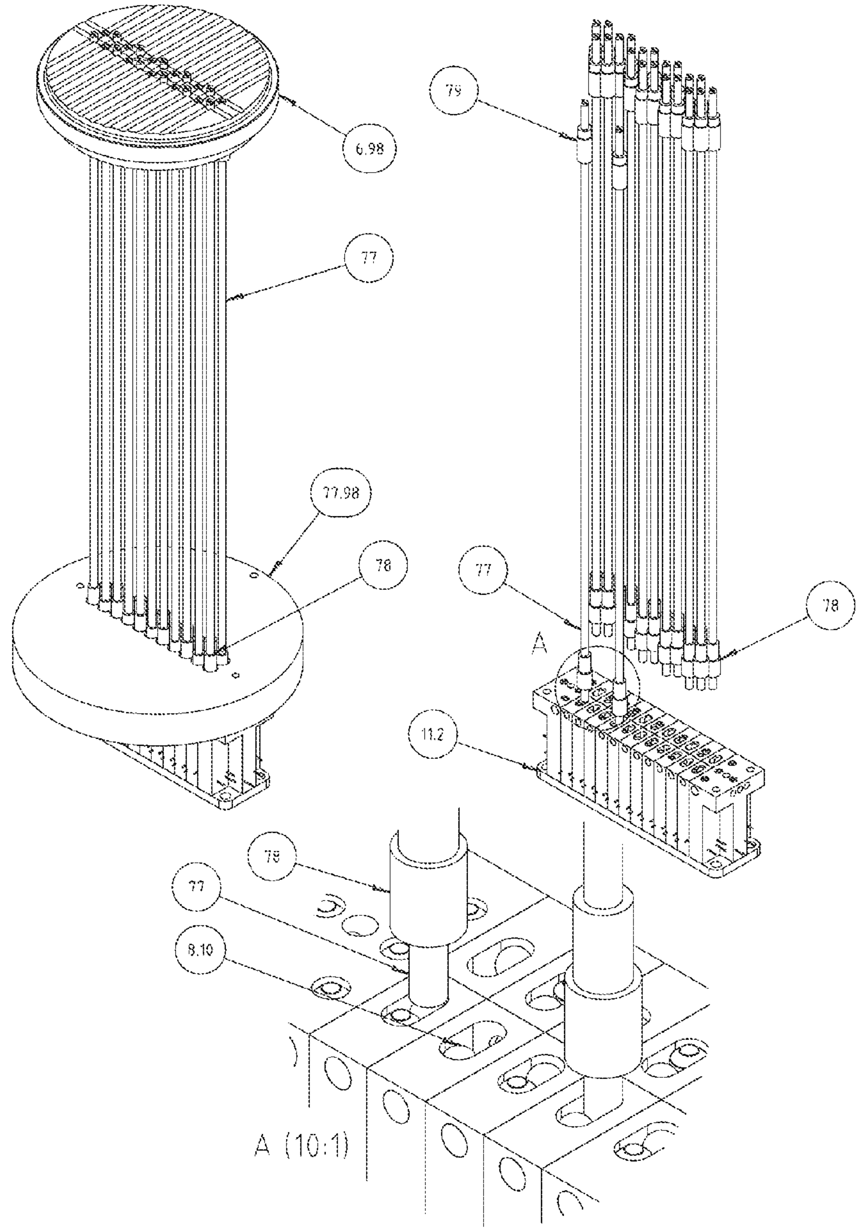
Figure 53:
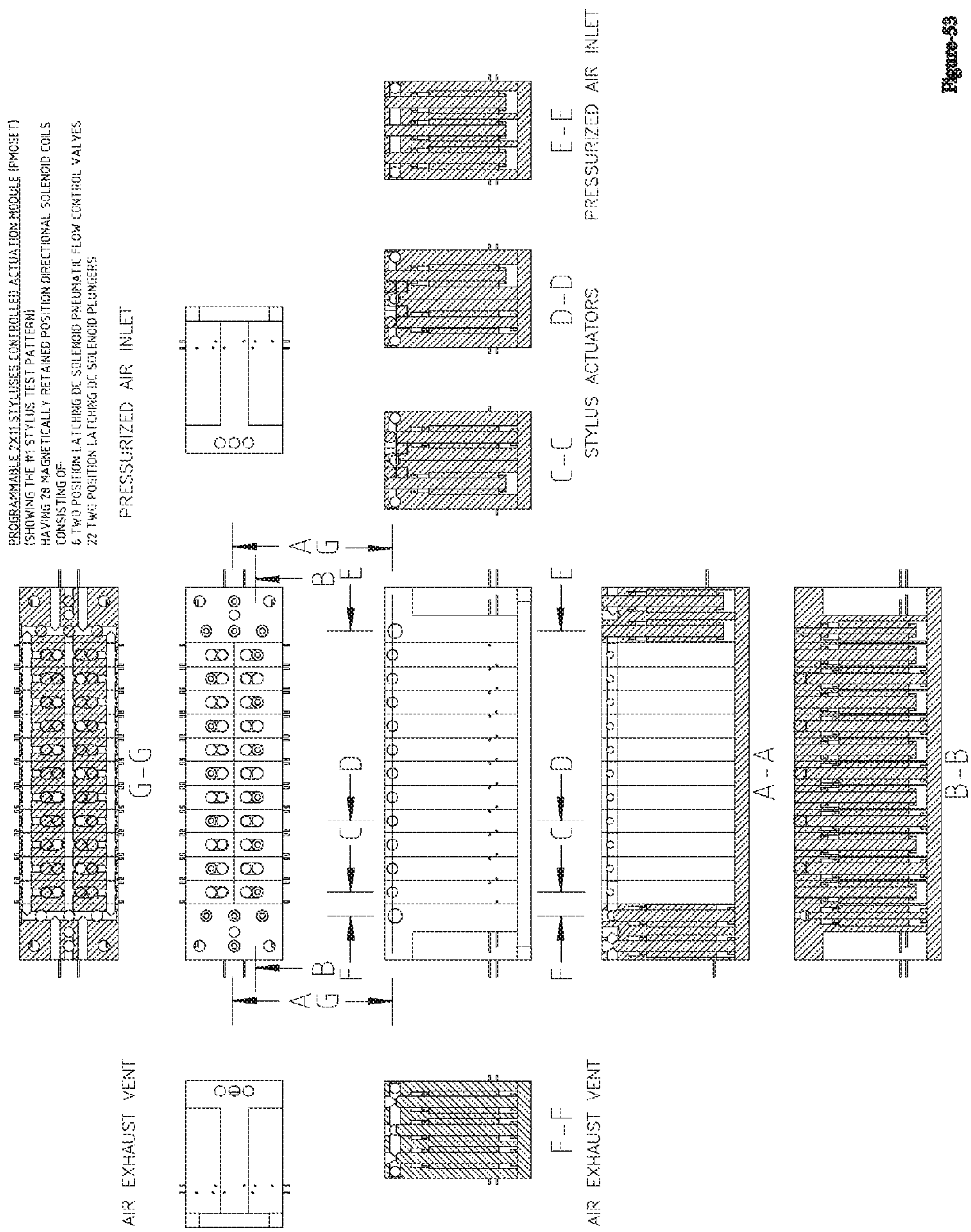
Figure 54:
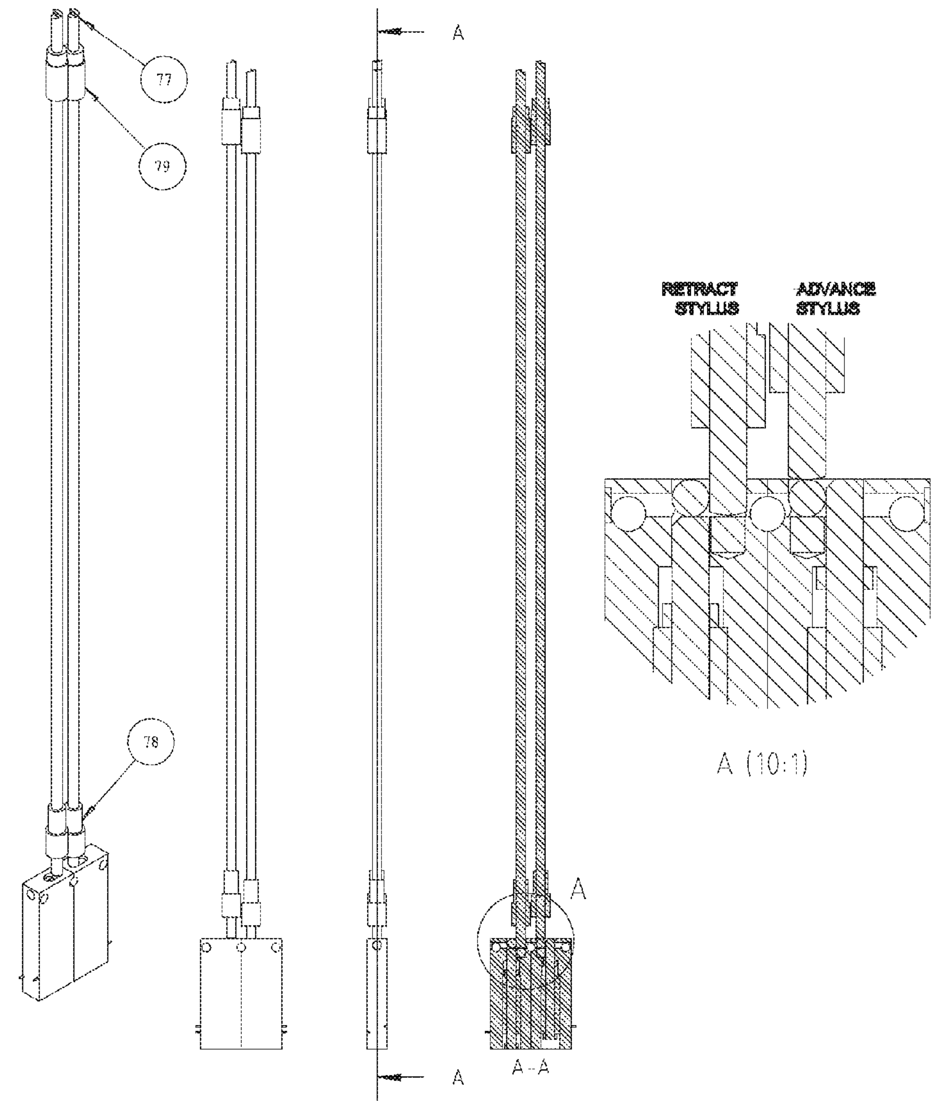
FIG. 54 is the paired individual stylus pneumatic activation valve assemblies for the cross-section view D-D of FIG. 53 with the corresponding individual styluses of FIG. 52.
Figure 56:
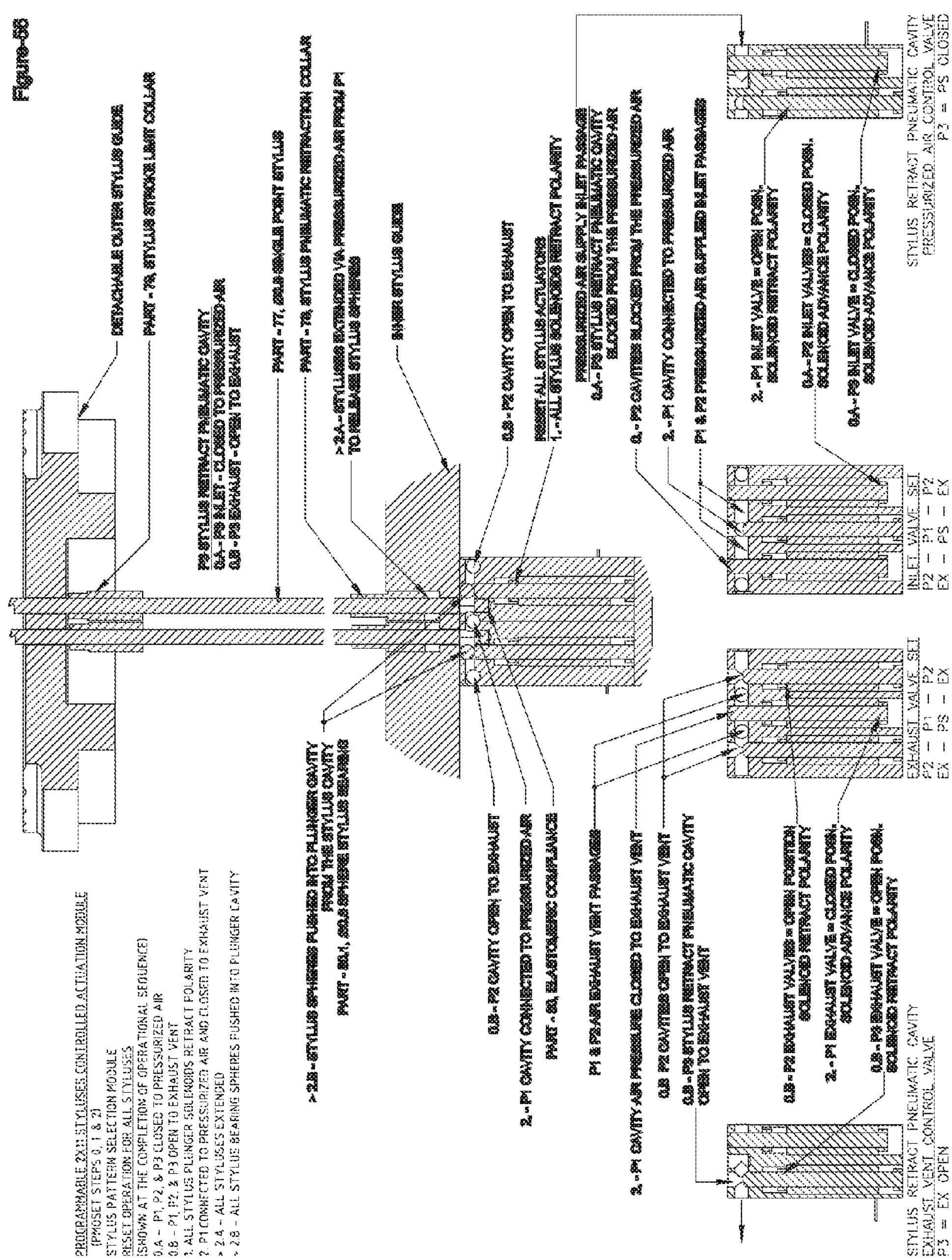
Figure 57:
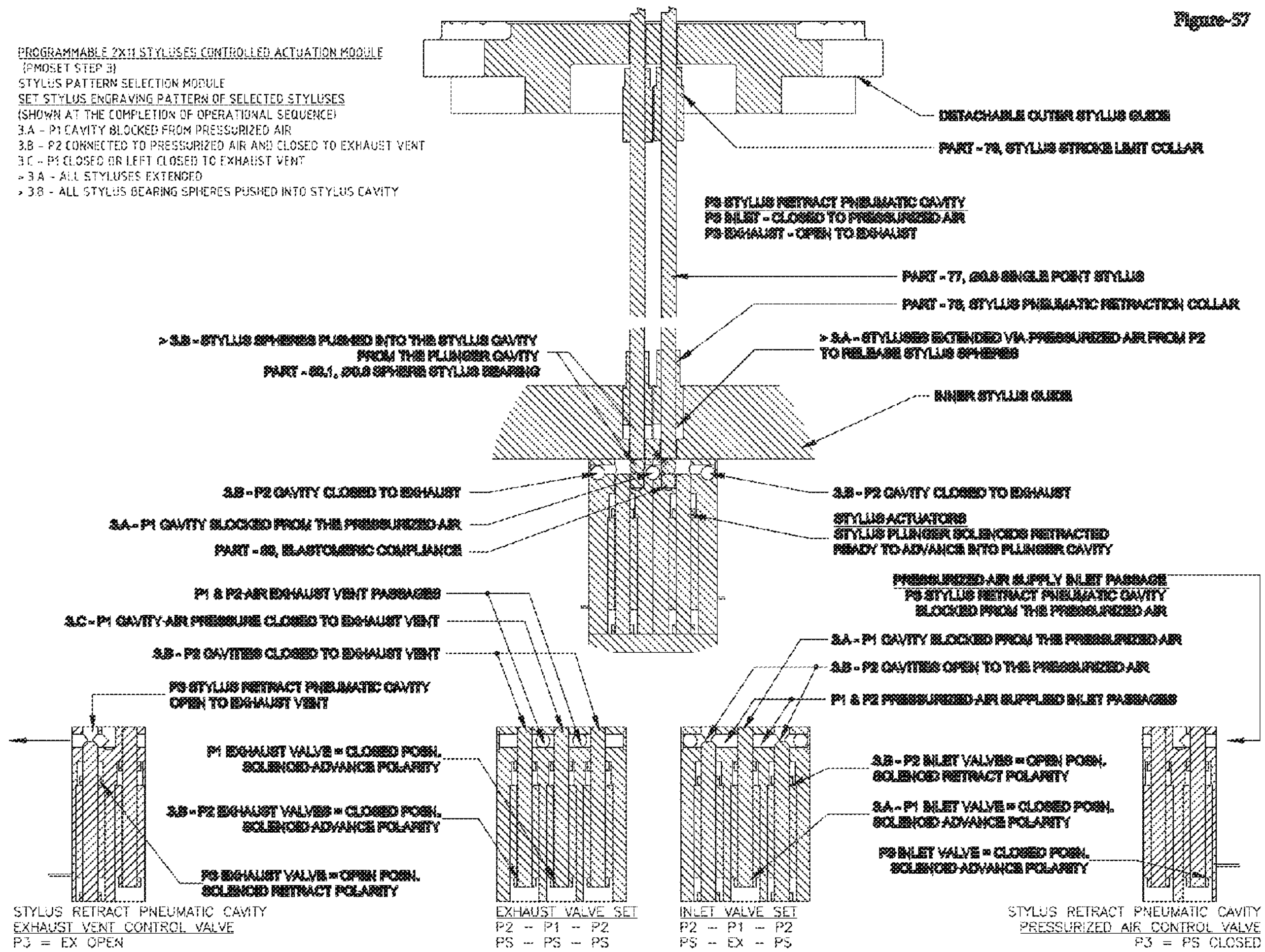
Figure 59:
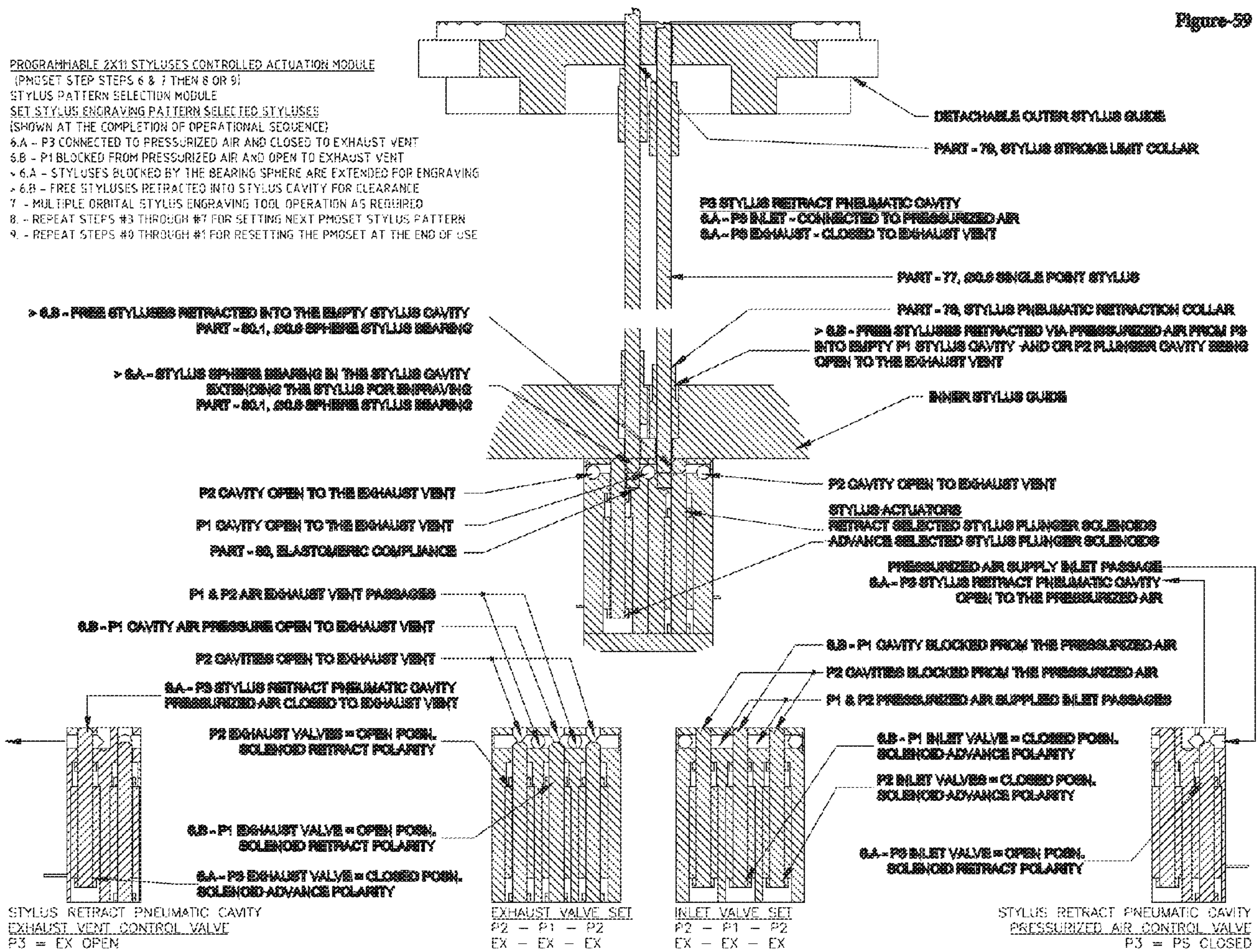
Figure 61:
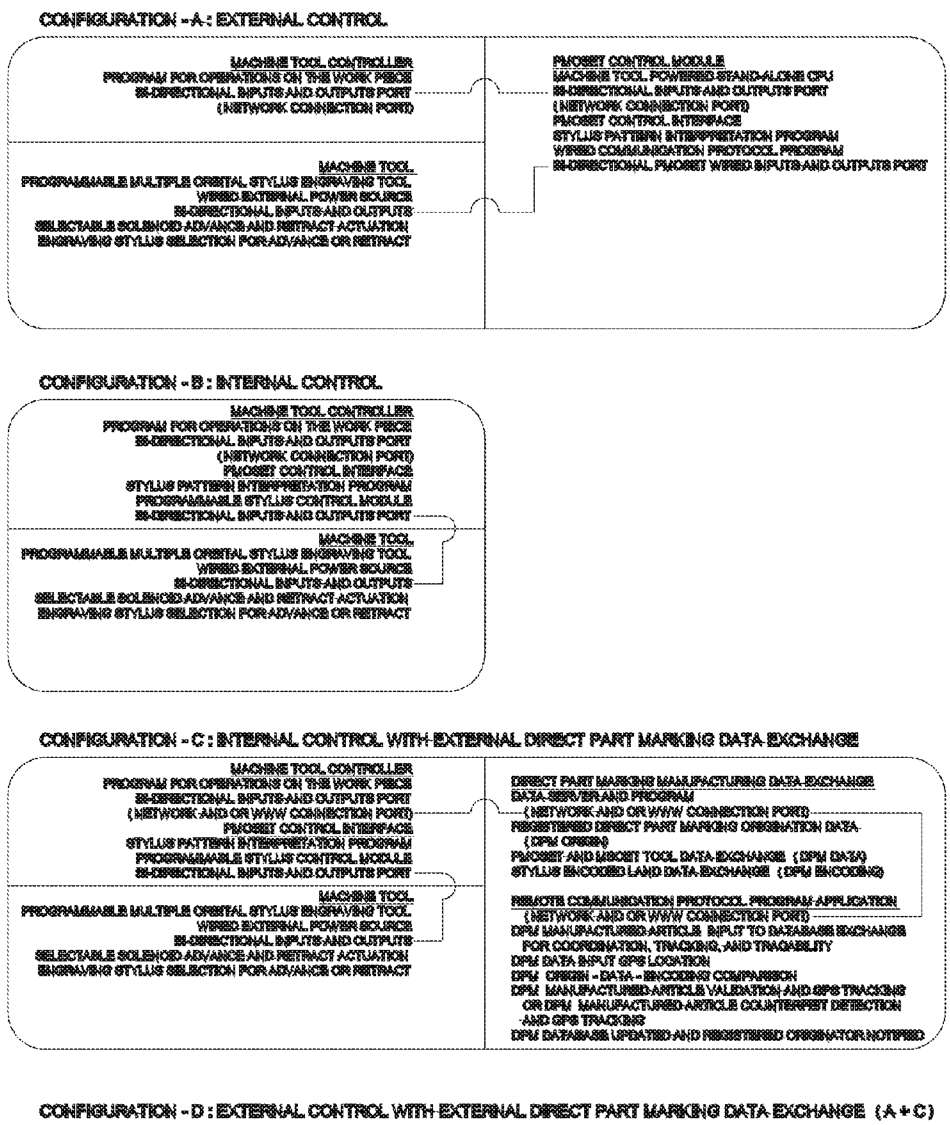
Figure 62:
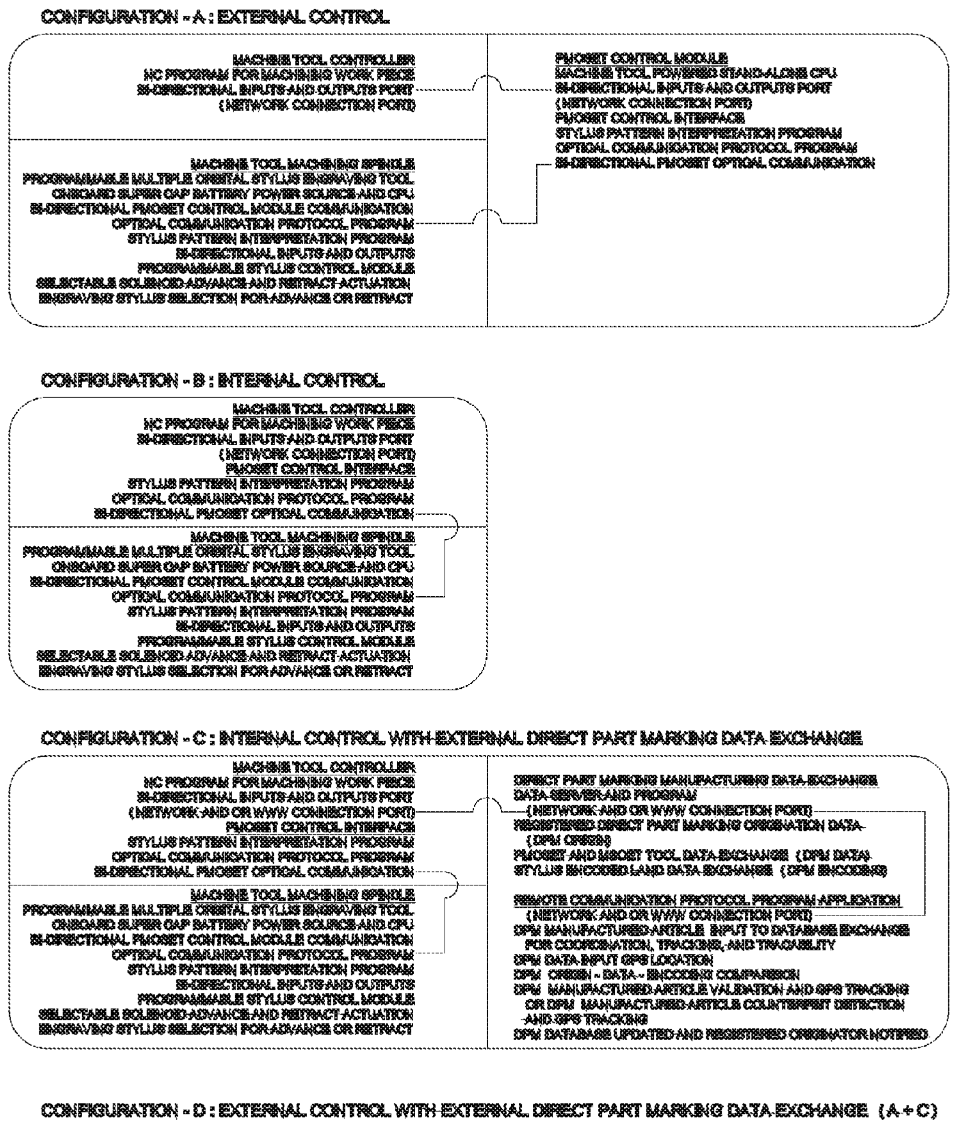
Figure 63:
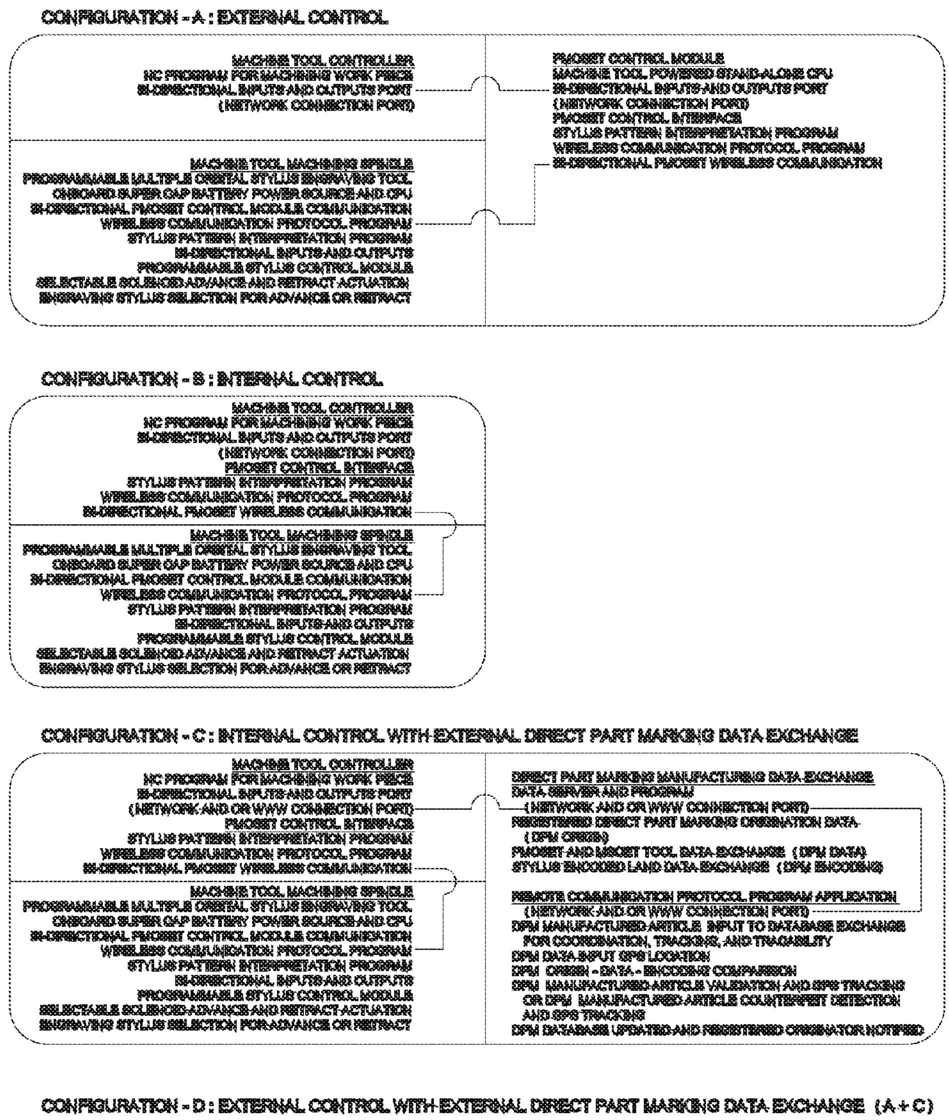
Figure 64:
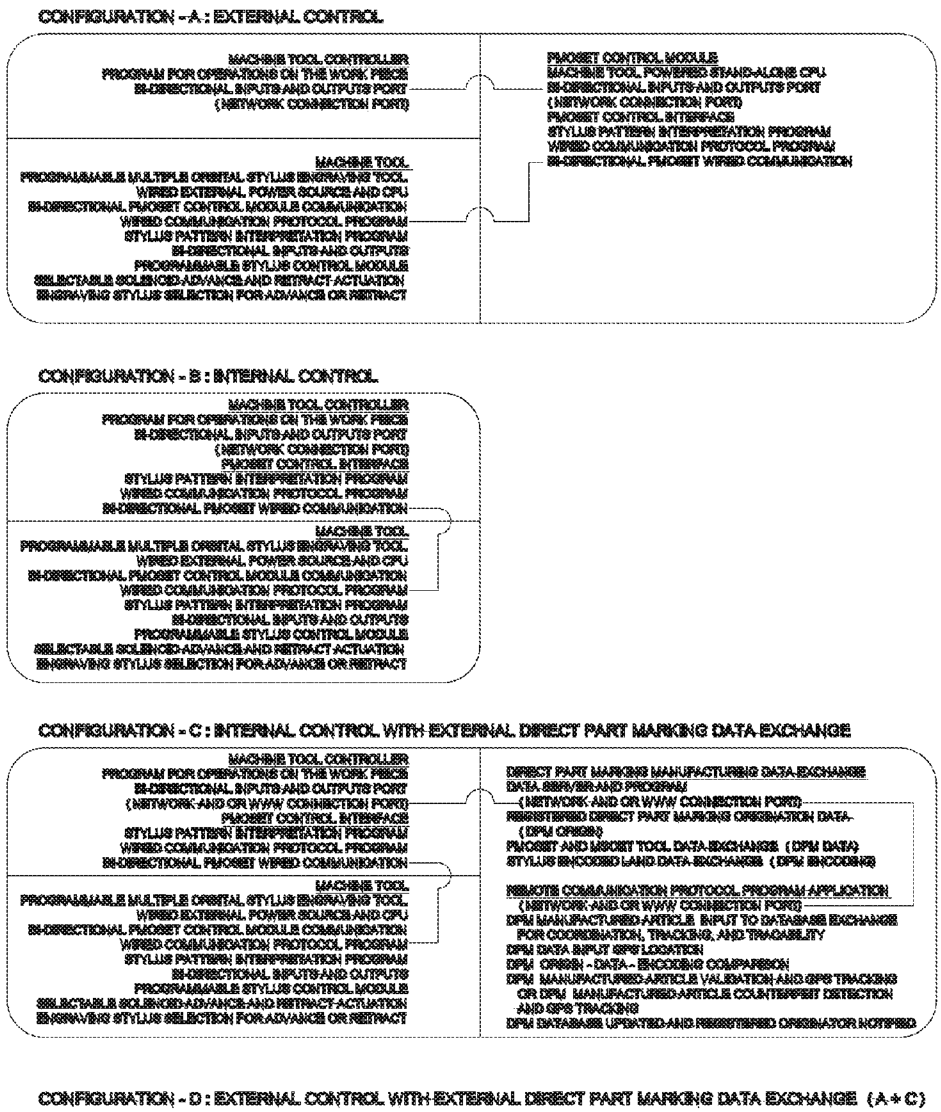

FIG. 60 shows the partial table for the engraved character pattern selection schema via the spindle rotation direction and its stop angle for the rotationally Programmable 2×11 Engraving module being controlled by the counterclockwise rotation of the engraving tool for the spindle having its stop angle of the spindle for a controlled period of time to determine the left column of 11 styluses to be selected to be activated for the subsequent engraving pattern on the work piece and then having the clockwise rotation of the engraving tool of the spindle having its stop angle of the spindle for a controlled period of time to determine the right column of 11 styluses to be selected to be activated for the subsequent engraving pattern on the work piece during the engraving tool's subsequent engraving operation via the machine tool or equivalent means.

Programmable 2X11 MOSET Character Pattern Selection via Directional Spindle Rotation and Stop Angle

| | | | | | | | | | | | | | | | | | | | | | | | | | | |
|---|---|---|---|---|---|---|---|---|---|---|---|---|---|---|---|---|---|---|---|---|---|---|---|---|---|---|
| | | | | | Stylus Position and Binary Value for the 2X11 Character Pattern | | | | | | | | | | | | | | | | | | | | | |
| | | | Spindle Rotation | | Left Bottom | | | | | | | | | | Left Top | Right Bottom | | | | | | | | | | Right Top |
| Spindle Resolution 0.1 Degrees | | | CW | CCW | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
| Ref. # | Left Binary Value | Character # | Stop Angle | Stop Angle | 1 | 2 | 4 | 8 | 16 | 32 | 64 | 128 | 256 | 512 | 1024 | 1 | 2 | 4 | 8 | 16 | 32 | 64 | 128 | 256 | 512 | 1024 |
| 1 | 0 | 1 | 100.0 | −100.0 | | | | | | | | | | | | | | | | | | | | | | |
| 2 | 1 | 2 | 100.0 | −100.1 | 1 | | | | | | | | | | | | | | | | | | | | | |
| 3 | 2 | 3 | 100.0 | −100.2 | | 1 | | | | | | | | | | | | | | | | | | | | |
| 4 | 3 | 4 | 100.0 | −100.3 | 1 | 1 | | | | | | | | | | | | | | | | | | | | |
| 5 | 4 | 5 | 100.0 | −100.4 | | | 1 | | | | | | | | | | | | | | | | | | | |
| 6 | 5 | 6 | 100.0 | −100.5 | 1 | | 1 | | | | | | | | | | | | | | | | | | | |
| 7 | 6 | 7 | 100.0 | −100.6 | | 1 | 1 | | | | | | | | | | | | | | | | | | | |
| 8 | 7 | 8 | 100.0 | −100.7 | 1 | 1 | 1 | | | | | | | | | | | | | | | | | | | |
| 9 | 8 | 9 | 100.0 | −100.8 | | | | 1 | | | | | | | | | | | | | | | | | | |
| 10 | 9 | 10 | 100.0 | −100.9 | 1 | | | 1 | | | | | | | | | | | | | | | | | | |
| 11 | 10 | 11 | 100.0 | −101.0 | | 1 | | 1 | | | | | | | | | | | | | | | | | | |
| 12 | 11 | 12 | 100.0 | −101.1 | 1 | 1 | | 1 | | | | | | | | | | | | | | | | | | |
| 13 | 12 | 13 | 100.0 | −101.2 | | | 1 | 1 | | | | | | | | | | | | | | | | | | |
| 14 | 13 | 14 | 100.0 | −101.3 | 1 | | 1 | 1 | | | | | | | | | | | | | | | | | | |
| 15 | 14 | 15 | 100.0 | −101.4 | | 1 | 1 | 1 | | | | | | | | | | | | | | | | | | |
| 16 | 15 | 16 | 100.0 | −101.5 | 1 | 1 | 1 | 1 | | | | | | | | | | | | | | | | | | |
| 17 | 16 | 17 | 100.0 | −101.6 | | | | | 1 | | | | | | | | | | | | | | | | | |
| 18 | 2032 | 2033 | 100.0 | −303.2 | | | | | 1 | 1 | 1 | 1 | 1 | 1 | 1 | | | | | | | | | | | |
| 19 | 2033 | 2034 | 100.0 | −303.3 | 1 | | | | 1 | 1 | 1 | 1 | 1 | 1 | 1 | | | | | | | | | | | |
| 20 | 2034 | 2035 | 100.0 | −303.4 | | 1 | | | 1 | 1 | 1 | 1 | 1 | 1 | 1 | | | | | | | | | | | |
| 21 | 2035 | 2036 | 100.0 | −303.5 | 1 | 1 | | | 1 | 1 | 1 | 1 | 1 | 1 | 1 | | | | | | | | | | | |
| 22 | 2036 | 2037 | 100.0 | −303.6 | | | 1 | | 1 | 1 | 1 | 1 | 1 | 1 | 1 | | | | | | | | | | | |
| 23 | 2037 | 2038 | 100.0 | −303.7 | 1 | | 1 | | 1 | 1 | 1 | 1 | 1 | 1 | 1 | | | | | | | | | | | |
| 24 | 2038 | 2039 | 100.0 | −303.8 | | 1 | 1 | | 1 | 1 | 1 | 1 | 1 | 1 | 1 | | | | | | | | | | | |
| 25 | 2039 | 2040 | 100.0 | −303.9 | 1 | 1 | 1 | | 1 | 1 | 1 | 1 | 1 | 1 | 1 | | | | | | | | | | | |
| 26 | 2040 | 2041 | 100.0 | −304.0 | | | | 1 | 1 | 1 | 1 | 1 | 1 | 1 | 1 | | | | | | | | | | | |
| 27 | 2041 | 2042 | 100.0 | −304.1 | 1 | | | 1 | 1 | 1 | 1 | 1 | 1 | 1 | 1 | | | | | | | | | | | |
| 28 | 2042 | 2043 | 100.0 | −304.2 | | 1 | | 1 | 1 | 1 | 1 | 1 | 1 | 1 | 1 | | | | | | | | | | | |
| 29 | 2043 | 2044 | 100.0 | −304.3 | 1 | 1 | | 1 | 1 | 1 | 1 | 1 | 1 | 1 | 1 | | | | | | | | | | | |
| 30 | 2044 | 2045 | 100.0 | −304.4 | | | 1 | 1 | 1 | 1 | 1 | 1 | 1 | 1 | 1 | | | | | | | | | | | |
| 31 | 2045 | 2046 | 100.0 | −304.5 | 1 | | 1 | 1 | 1 | 1 | 1 | 1 | 1 | 1 | 1 | | | | | | | | | | | |
| 32 | 2046 | 2047 | 100.0 | −304.6 | | 1 | 1 | 1 | 1 | 1 | 1 | 1 | 1 | 1 | 1 | | | | | | | | | | | |
| 33 | 2047 | 2048 | 100.0 | −304.7 | 1 | 1 | 1 | 1 | 1 | 1 | 1 | 1 | 1 | 1 | 1 | | | | | | | | | | | |
| Ref. # | Right Binary Value | Character # | CW Stop Angle | CCW Stop Angle | | | | | | | | | | | | | | | | | | | | | | |
| 34 | 0 | 1 | 100.0 | −100.0 | | | | | | | | | | | | | | | | | | | | | | |
| 35 | 1 | 2 | 100.1 | −100.0 | | | | | | | | | | | | 1 | | | | | | | | | | |
| 36 | 2 | 3 | 100.2 | −100.0 | | | | | | | | | | | | | 1 | | | | | | | | | |
| 37 | 3 | 4 | 100.3 | −100.0 | | | | | | | | | | | | 1 | 1 | | | | | | | | | |

-continued

| Programmable 2X11 MOSET Character Pattern Selection via Directional Spindle Rotation and Stop Angle | | | | | | | | | | | | | | | | | | | | | | | | | | |
|---|---|---|---|---|---|---|---|---|---|---|---|---|---|---|---|---|---|---|---|---|---|---|---|---|---|---|
| 38 | 4 | 5 | 100.4 | −100.0 | | | | | | | | | | | | | | 1 | | | | | | | | |
| 39 | 5 | 6 | 100.5 | −100.0 | | | | | | | | | | | | 1 | | 1 | | | | | | | | |
| 40 | 6 | 7 | 100.6 | −100.0 | | | | | | | | | | | | | 1 | 1 | | | | | | | | |
| 41 | 7 | 8 | 100.7 | −100.0 | | | | | | | | | | | | 1 | 1 | 1 | | | | | | | | |
| 42 | 8 | 9 | 100.8 | −100.0 | | | | | | | | | | | | | | | 1 | | | | | | | |
| 43 | 9 | 10 | 100.9 | −100.0 | | | | | | | | | | | | 1 | | | 1 | | | | | | | |
| 44 | 10 | 11 | 101.0 | −100.0 | | | | | | | | | | | | | 1 | | 1 | | | | | | | |
| 45 | 11 | 12 | 101.1 | −100.0 | | | | | | | | | | | | 1 | 1 | | 1 | | | | | | | |
| 46 | 12 | 13 | 101.2 | −100.0 | | | | | | | | | | | | | | 1 | 1 | | | | | | | |
| 47 | 13 | 14 | 101.3 | −100.0 | | | | | | | | | | | | 1 | | 1 | 1 | | | | | | | |
| 48 | 14 | 15 | 101.4 | −100.0 | | | | | | | | | | | | | 1 | 1 | 1 | | | | | | | |
| 49 | 15 | 16 | 101.5 | −100.0 | | | | | | | | | | | | 1 | 1 | 1 | 1 | | | | | | | |
| 50 | 16 | 17 | 101.6 | −100.0 | | | | | | | | | | | | | | | | 1 | | | | | | |
| 51 | 2032 | 2033 | 303.2 | −100.0 | | | | | | | | | | | | | | | | 1 | 1 | 1 | 1 | 1 | 1 | 1 |
| 52 | 2033 | 2034 | 303.3 | −100.0 | | | | | | | | | | | | 1 | | | | 1 | 1 | 1 | 1 | 1 | 1 | 1 |
| 53 | 2034 | 2035 | 303.4 | −100.0 | | | | | | | | | | | | | 1 | | | 1 | 1 | 1 | 1 | 1 | 1 | 1 |
| 54 | 2035 | 2036 | 303.5 | −100.0 | | | | | | | | | | | | 1 | 1 | | | 1 | 1 | 1 | 1 | 1 | 1 | 1 |
| 55 | 2036 | 2037 | 303.6 | −100.0 | | | | | | | | | | | | | | 1 | | 1 | 1 | 1 | 1 | 1 | 1 | 1 |
| 56 | 2037 | 2038 | 303.7 | −100.0 | | | | | | | | | | | | 1 | | 1 | | 1 | 1 | 1 | 1 | 1 | 1 | 1 |
| 57 | 2038 | 2039 | 303.8 | −100.0 | | | | | | | | | | | | | 1 | 1 | | 1 | 1 | 1 | 1 | 1 | 1 | 1 |
| 58 | 2039 | 2040 | 303.9 | −100.0 | | | | | | | | | | | | 1 | 1 | 1 | | 1 | 1 | 1 | 1 | 1 | 1 | 1 |
| 59 | 2040 | 2041 | 304.0 | −100.0 | | | | | | | | | | | | | | | 1 | 1 | 1 | 1 | 1 | 1 | 1 | 1 |
| 60 | 2041 | 2042 | 304.1 | −100.0 | | | | | | | | | | | | 1 | | | 1 | 1 | 1 | 1 | 1 | 1 | 1 | 1 |
| 61 | 2042 | 2043 | 304.2 | −100.0 | | | | | | | | | | | | | 1 | | 1 | 1 | 1 | 1 | 1 | 1 | 1 | 1 |
| 62 | 2043 | 2044 | 304.3 | −100.0 | | | | | | | | | | | | 1 | 1 | | 1 | 1 | 1 | 1 | 1 | 1 | 1 | 1 |
| 63 | 2044 | 2045 | 304.4 | −100.0 | | | | | | | | | | | | | | 1 | 1 | 1 | 1 | 1 | 1 | 1 | 1 | 1 |
| 64 | 2045 | 2046 | 304.5 | −100.0 | | | | | | | | | | | | 1 | | 1 | 1 | 1 | 1 | 1 | 1 | 1 | 1 | 1 |
| 65 | 2046 | 2047 | 304.6 | −100.0 | | | | | | | | | | | | | 1 | 1 | 1 | 1 | 1 | 1 | 1 | 1 | 1 | 1 |
| 66 | 2047 | 2048 | 304.7 | −100.0 | | | | | | | | | | | | 1 | 1 | 1 | 1 | 1 | 1 | 1 | 1 | 1 | 1 | 1 |
| | Binary Values | | CW | CCW | | | | | | | | | | | | | | | | | | | | | | |
| Ref. # | Left | Right | Stop Angle | Stop Angle | | | | | | | | | | | | | | | | | | | | | | |
| 67 | 0 | 0 | 100.0 | −100.0 | | | | | | | | | | | | | | | | | | | | | | |
| 68 | 1 | 1 | 100.1 | −100.1 | 1 | | | | | | | | | | | 1 | | | | | | | | | | |
| 69 | 2 | 2 | 100.2 | −100.2 | | 1 | | | | | | | | | | | 1 | | | | | | | | | |
| 70 | 3 | 3 | 100.3 | −100.3 | 1 | 1 | | | | | | | | | | 1 | 1 | | | | | | | | | |
| 71 | 4 | 4 | 100.4 | −100.4 | | | 1 | | | | | | | | | | | 1 | | | | | | | | |
| 72 | 5 | 5 | 100.5 | −100.5 | 1 | | 1 | | | | | | | | | 1 | | 1 | | | | | | | | |
| 73 | 6 | 6 | 100.6 | −100.6 | | 1 | 1 | | | | | | | | | | 1 | 1 | | | | | | | | |
| 74 | 7 | 7 | 100.7 | −100.7 | 1 | 1 | 1 | | | | | | | | | 1 | 1 | 1 | | | | | | | | |
| 75 | 8 | 8 | 100.8 | −100.8 | | | | 1 | | | | | | | | | | | 1 | | | | | | | |
| 76 | 9 | 9 | 100.9 | −100.9 | 1 | | | 1 | | | | | | | | 1 | | | 1 | | | | | | | |
| 77 | 10 | 10 | 101.0 | −101.0 | | 1 | | 1 | | | | | | | | | 1 | | 1 | | | | | | | |
| 78 | 11 | 11 | 101.1 | −101.1 | 1 | 1 | | 1 | | | | | | | | 1 | 1 | | 1 | | | | | | | |
| 79 | 12 | 12 | 101.2 | −101.2 | | | 1 | 1 | | | | | | | | | | 1 | 1 | | | | | | | |
| 80 | 13 | 13 | 101.3 | −101.3 | 1 | | 1 | 1 | | | | | | | | 1 | | 1 | 1 | | | | | | | |
| 81 | 14 | 14 | 101.4 | −101.4 | | 1 | 1 | 1 | | | | | | | | | 1 | 1 | 1 | | | | | | | |
| 82 | 15 | 15 | 101.5 | −101.5 | 1 | 1 | 1 | 1 | | | | | | | | 1 | 1 | 1 | 1 | | | | | | | |
| 83 | 16 | 16 | 101.6 | −101.6 | | | | | 1 | | | | | | | | | | | 1 | | | | | | |

-continued

| Programmable 2X11 MOSET Character Pattern Selection via Directional Spindle Rotation and Stop Angle | | | | | | | | | | | | | | | | | | | | | | | | | | |
|---|---|---|---|---|---|---|---|---|---|---|---|---|---|---|---|---|---|---|---|---|---|---|---|---|---|---|
| 84 | 2032 | 2032 | 303.2 | −303.2 | | | | | 1 | 1 | 1 | 1 | 1 | 1 | 1 | | | | | 1 | 1 | 1 | 1 | 1 | 1 | 1 |
| 85 | 2033 | 2033 | 303.3 | −303.3 | 1 | | | | 1 | 1 | 1 | 1 | 1 | 1 | 1 | 1 | | | | 1 | 1 | 1 | 1 | 1 | 1 | 1 |
| 86 | 2034 | 2034 | 303.4 | −303.4 | | 1 | | | 1 | 1 | 1 | 1 | 1 | 1 | 1 | | 1 | | | 1 | 1 | 1 | 1 | 1 | 1 | 1 |
| 87 | 2035 | 2035 | 303.5 | −303.5 | 1 | 1 | | | 1 | 1 | 1 | 1 | 1 | 1 | 1 | 1 | 1 | | | 1 | 1 | 1 | 1 | 1 | 1 | 1 |
| 88 | 2036 | 2036 | 303.6 | −303.6 | | | 1 | | 1 | 1 | 1 | 1 | 1 | 1 | 1 | | | 1 | | 1 | 1 | 1 | 1 | 1 | 1 | 1 |
| 89 | 2037 | 2037 | 303.7 | −303.7 | 1 | | 1 | | 1 | 1 | 1 | 1 | 1 | 1 | 1 | 1 | | 1 | | 1 | 1 | 1 | 1 | 1 | 1 | 1 |
| 90 | 2038 | 2038 | 303.8 | −303.8 | | 1 | 1 | | 1 | 1 | 1 | 1 | 1 | 1 | 1 | | 1 | 1 | | 1 | 1 | 1 | 1 | 1 | 1 | 1 |
| 91 | 2039 | 2039 | 303.9 | −303.9 | 1 | 1 | 1 | | 1 | 1 | 1 | 1 | 1 | 1 | 1 | 1 | 1 | 1 | | 1 | 1 | 1 | 1 | 1 | 1 | 1 |
| 92 | 2040 | 2040 | 304.0 | −304.0 | | | | 1 | 1 | 1 | 1 | 1 | 1 | 1 | 1 | | | | 1 | 1 | 1 | 1 | 1 | 1 | 1 | 1 |
| 93 | 2041 | 2041 | 304.1 | −304.1 | 1 | | | 1 | 1 | 1 | 1 | 1 | 1 | 1 | 1 | 1 | | | 1 | 1 | 1 | 1 | 1 | 1 | 1 | 1 |
| 94 | 2042 | 2042 | 304.2 | −304.2 | | 1 | | 1 | 1 | 1 | 1 | 1 | 1 | 1 | 1 | | 1 | | 1 | 1 | 1 | 1 | 1 | 1 | 1 | 1 |
| 95 | 2043 | 2043 | 304.3 | −304.3 | 1 | 1 | | 1 | 1 | 1 | 1 | 1 | 1 | 1 | 1 | 1 | 1 | | 1 | 1 | 1 | 1 | 1 | 1 | 1 | 1 |
| 96 | 2044 | 2044 | 304.4 | −304.4 | | | 1 | 1 | 1 | 1 | 1 | 1 | 1 | 1 | 1 | | | 1 | 1 | 1 | 1 | 1 | 1 | 1 | 1 | 1 |
| 97 | 2045 | 2045 | 304.5 | −304.5 | 1 | | 1 | 1 | 1 | 1 | 1 | 1 | 1 | 1 | 1 | 1 | | 1 | 1 | 1 | 1 | 1 | 1 | 1 | 1 | 1 |
| 98 | 2046 | 2046 | 304.6 | −304.6 | | 1 | 1 | 1 | 1 | 1 | 1 | 1 | 1 | 1 | 1 | | 1 | 1 | 1 | 1 | 1 | 1 | 1 | 1 | 1 | 1 |
| 99 | 2047 | 2047 | 304.7 | −304.7 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |

With the 2×11 Programmable stylus section actuation version of the MOSET-MSOET having multiple configuration examples partially being shown in the following:

FIG. 65-78 for the wireless communication of the rotationally secure tool being battery operated.

Figure 65:
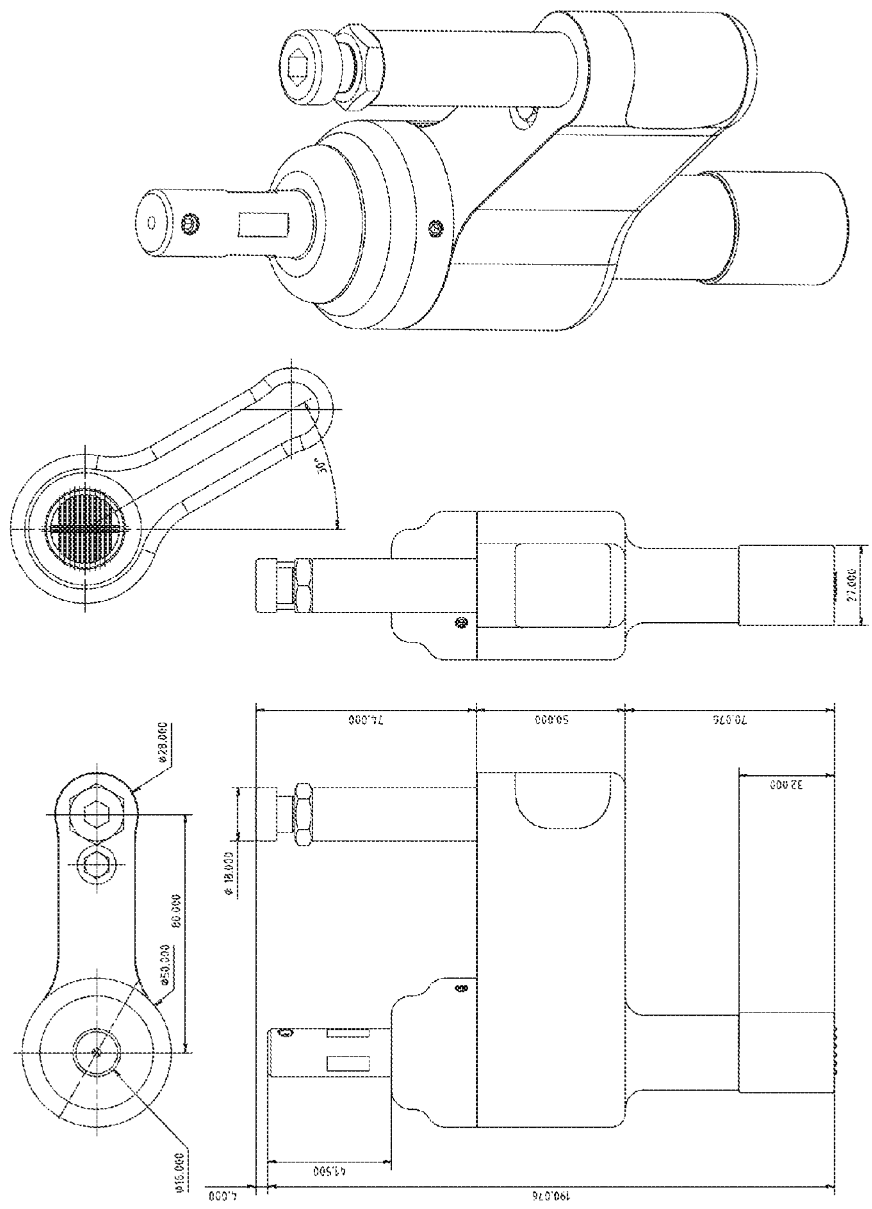

FIG. 65 shows the orthogonal and isometric views for the assembled wireless programmable 2×11 detachable stylus guide engraving tool where the engraving tool's=ØØ16 mm mounting shaft is operably connected to the machine tool's rotatable spindle having the Ø 18 mm rotational stop being operably connected to the machine tool's non-rotating spindle face mounted adapter.

FIG. 66 is for the typical 2×11 Programmable stylus engraving tool's round hole operational CNC control from its machine tool via standard CNC commands having various programming techniques as required to rotationally orbit the engraving stylus tool about an axis causing its stylus to rotate for engraving the work piece. Having an alternating stylus activation pattern is shown with its eleven 77-As being activated for engraving the work piece at the corresponding location 22.2110 and its eleven 77-Bs being refracted to not contact the work piece.

Figure 67:
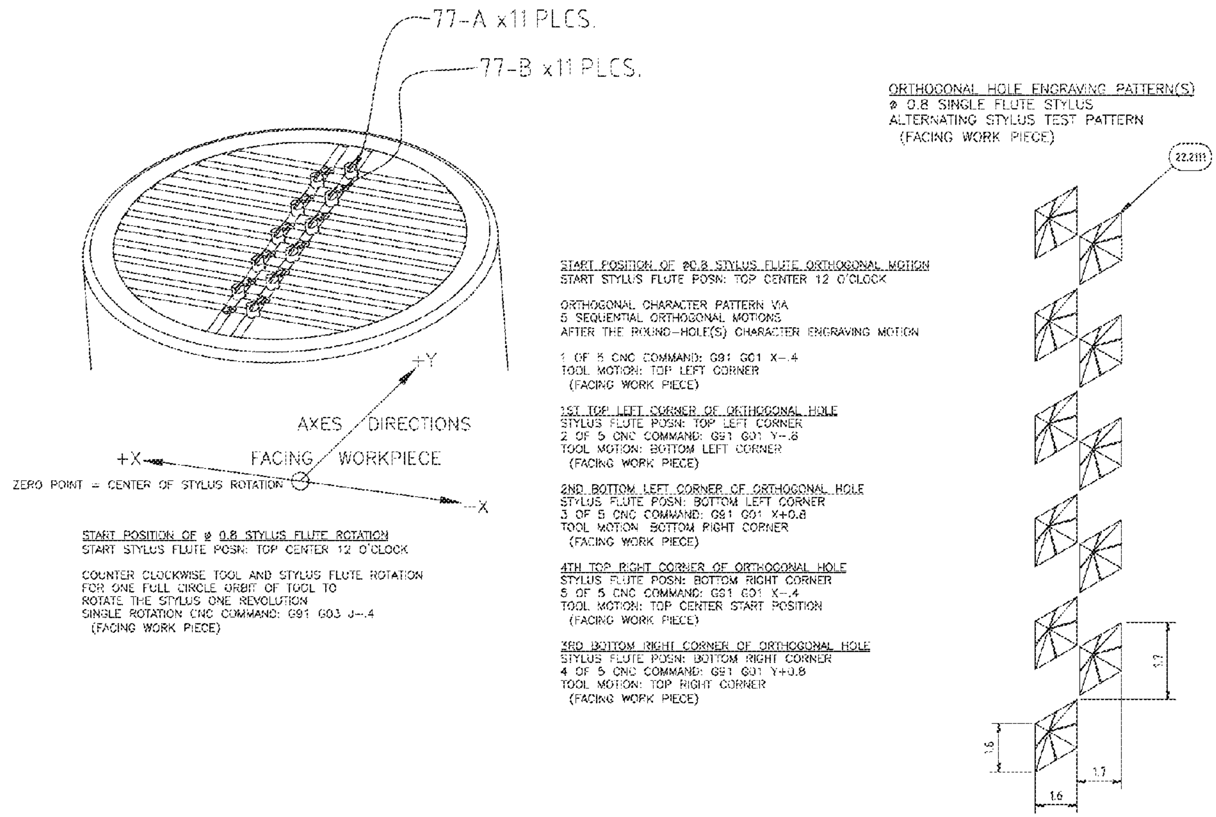

FIG. 67 is for the typical 2×11 Programmable stylus engraving tool's orthogonal hole operational CNC control from its machine tool via standard CNC commands as required to orthogonally orbit the engraving stylus tool about an axis causing its stylus to rotate for engraving the work piece. Having an alternating stylus activation pattern is shown with eleven 77-As being activated for engraving the work piece at the corresponding location 22.2110 and eleven 77-Bs being retracted to not contact the work piece during the engraving tool's subsequent engraving operation via the machine tool or equivalent means.

Figure 68:
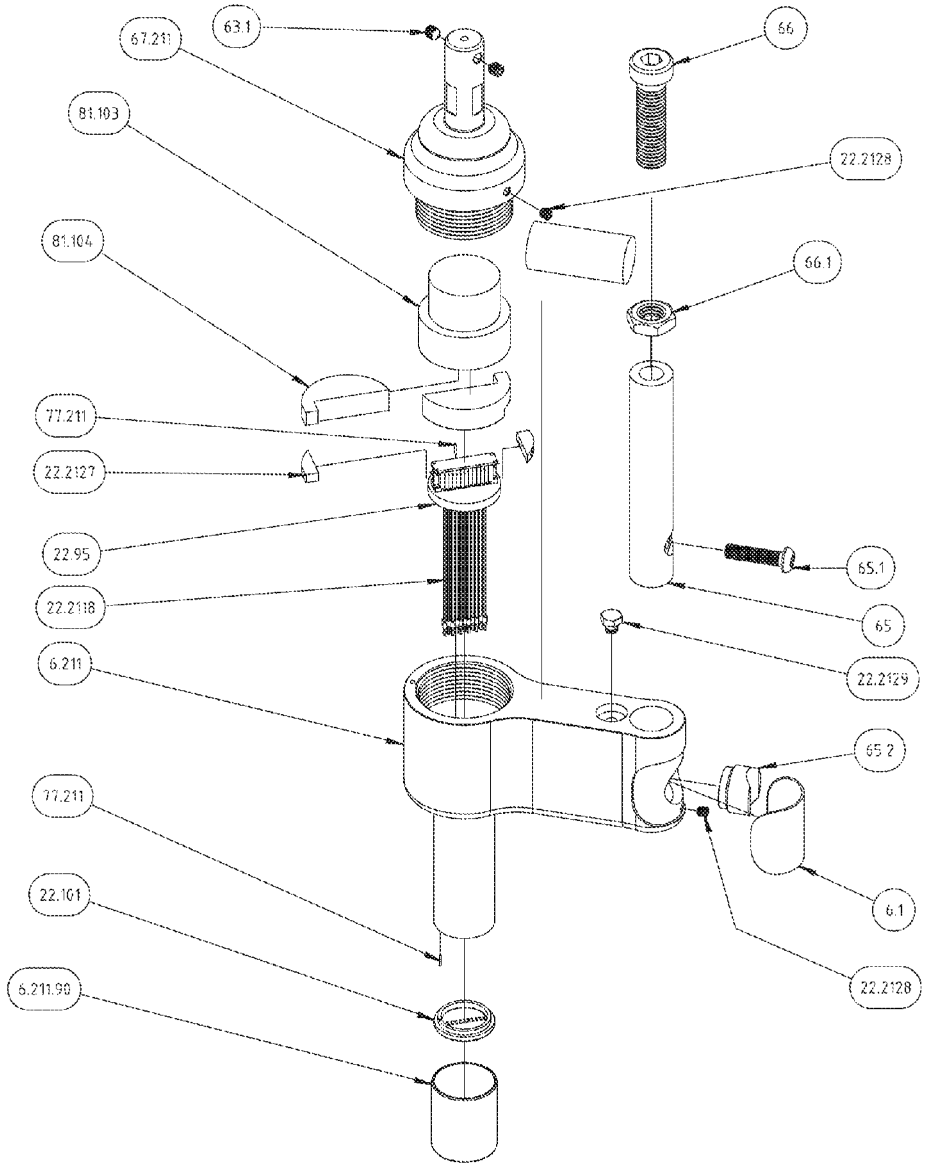
Figure 69:
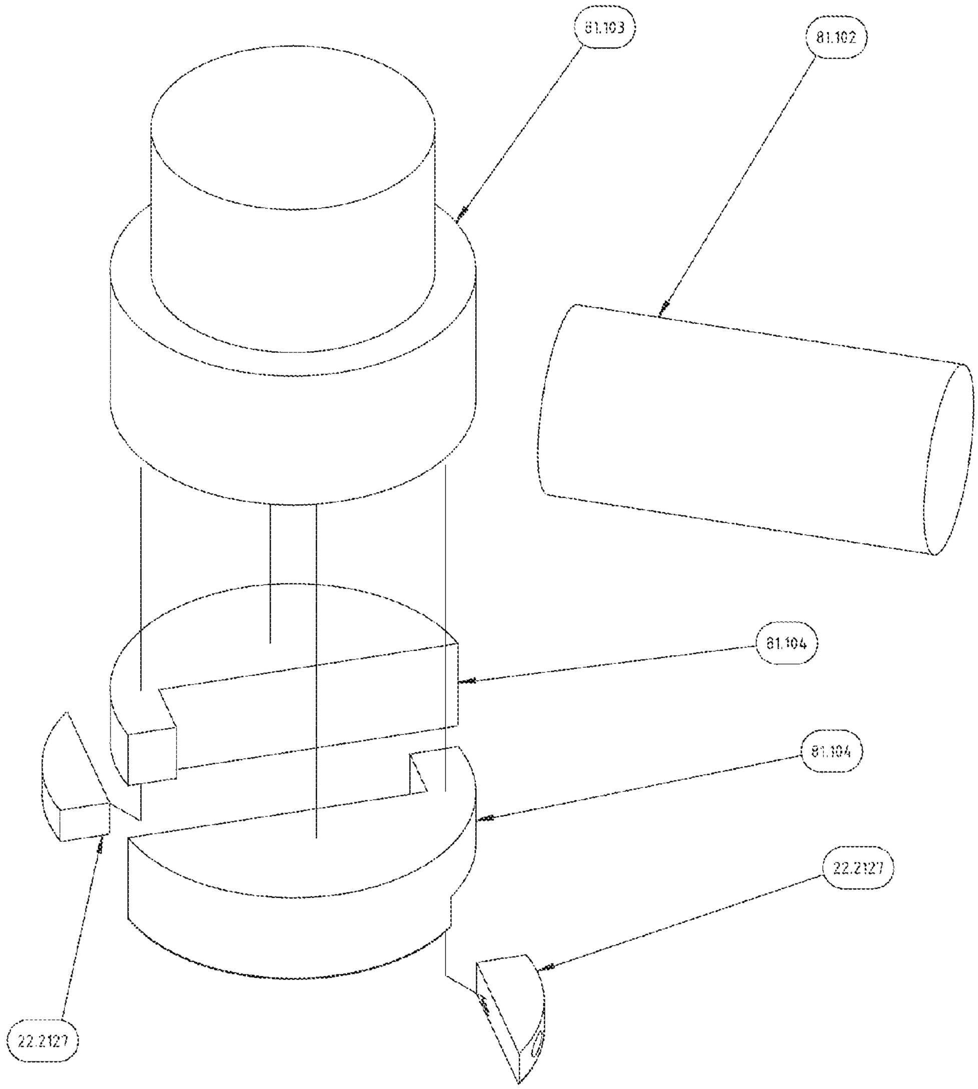

FIG. 68 is the exploded parts isometric view of the wireless programmable 2×11 detachable stylus guide engraving tool having the main body 6.211 enclosing the selectable stylus activation module 22.95 as described in FIGS. 52 through 59 being operably connected and controlled via a wireless means as described in FIGS. 61 through 64 having the engraving tool's internal selective stylus pneumatic valve activation solenoid modules 81.104 being connected to the wireless control module 81.103 while being powered by an internal battery 81.102 as shown in FIG. 69.

Figure 70:
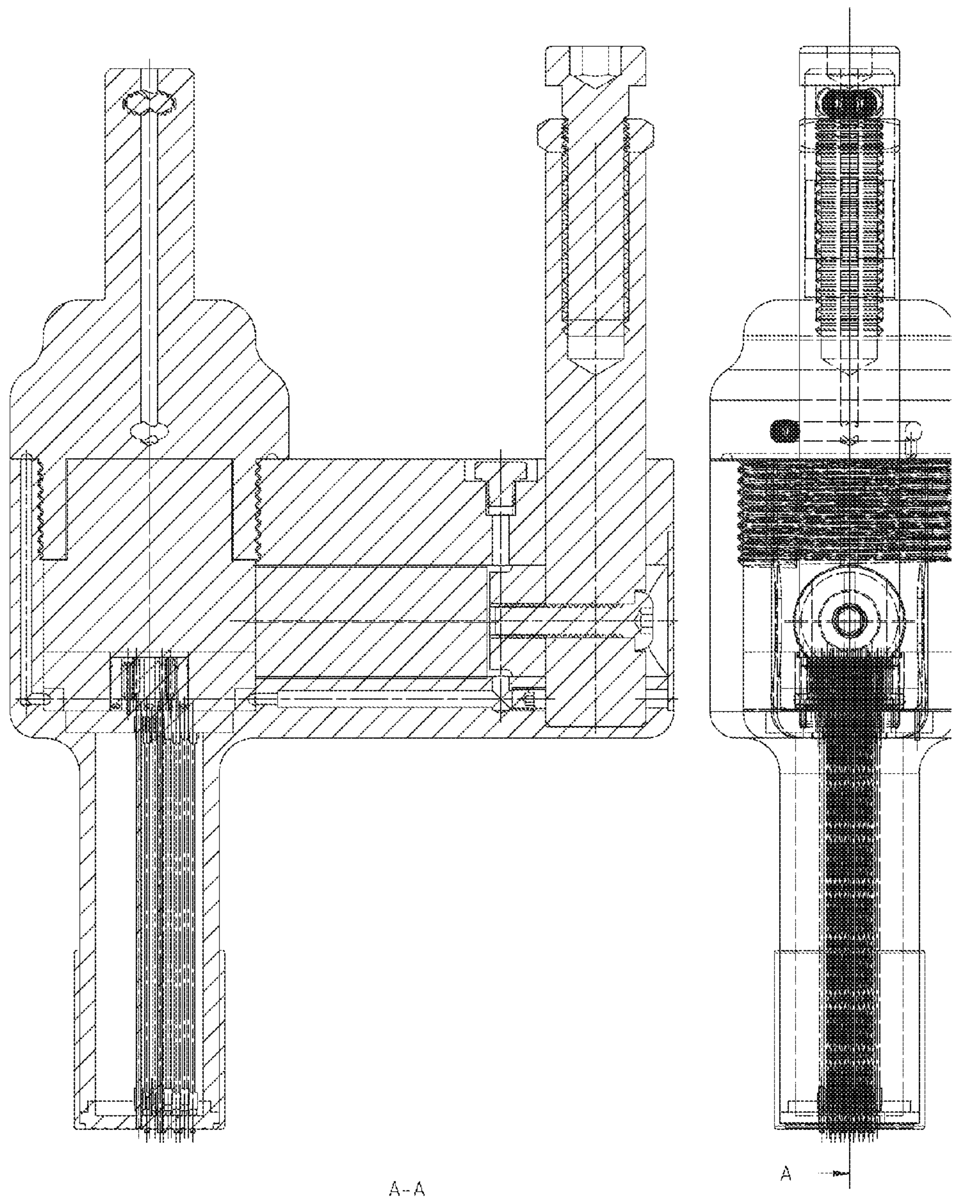
Figure 71:
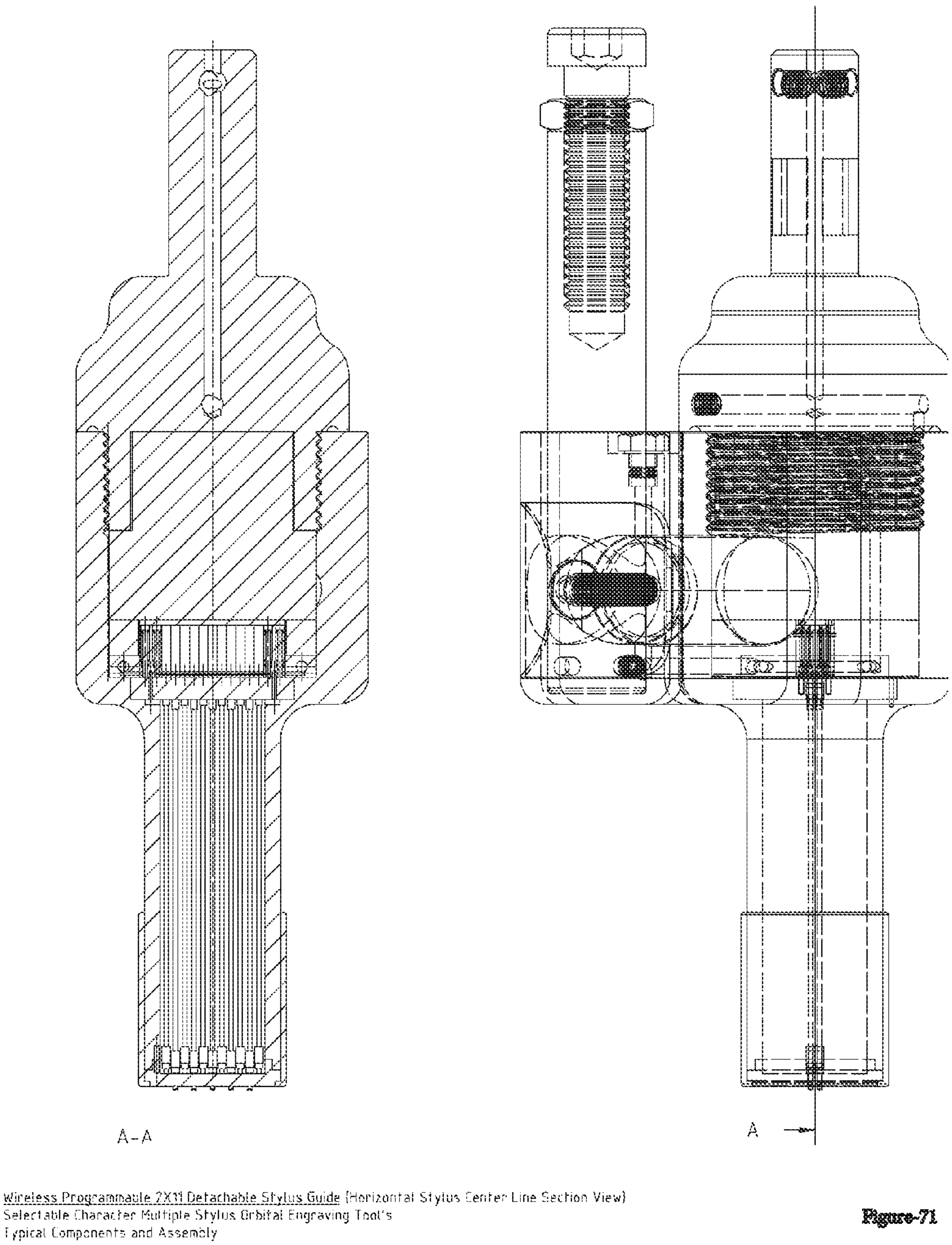
Figure 72:
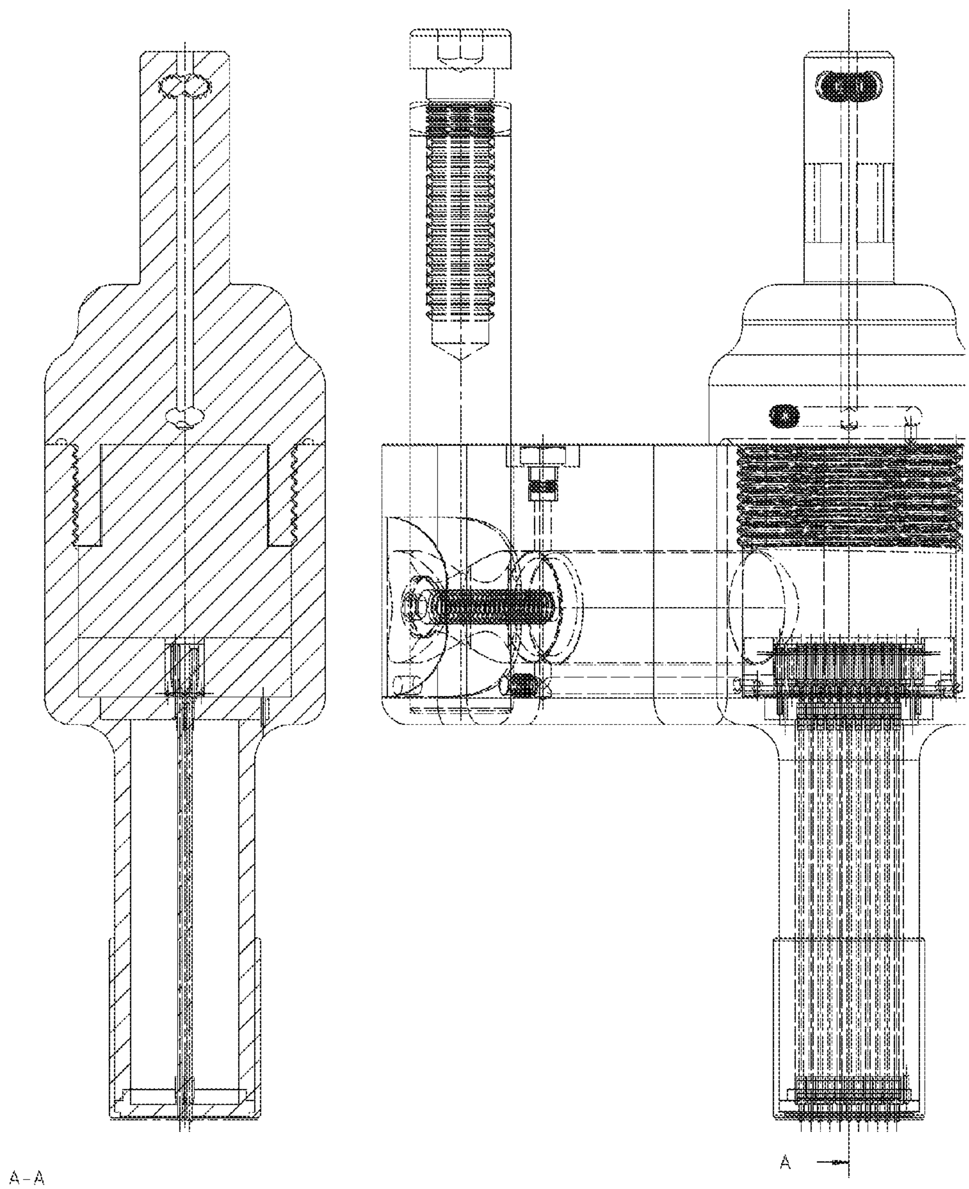
Figure 73:
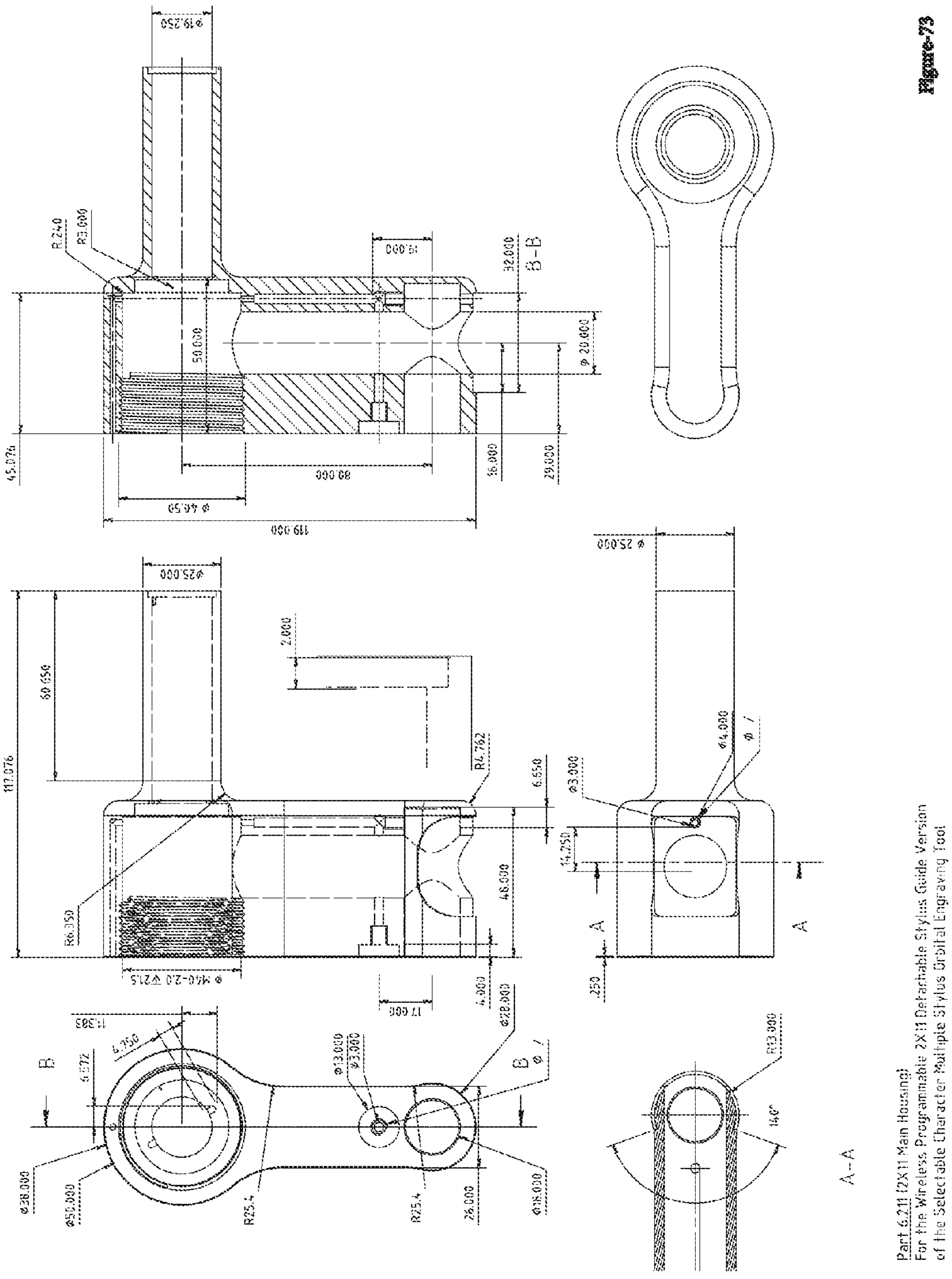
Figure 74:
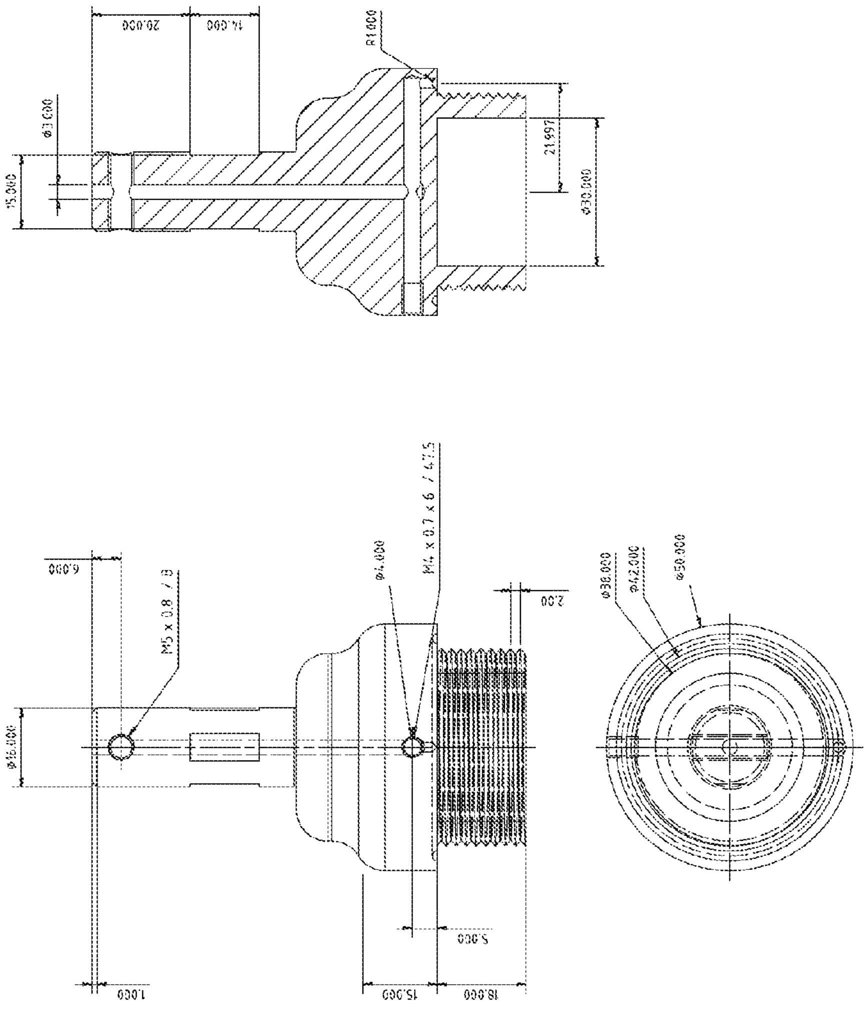
Figure 75:
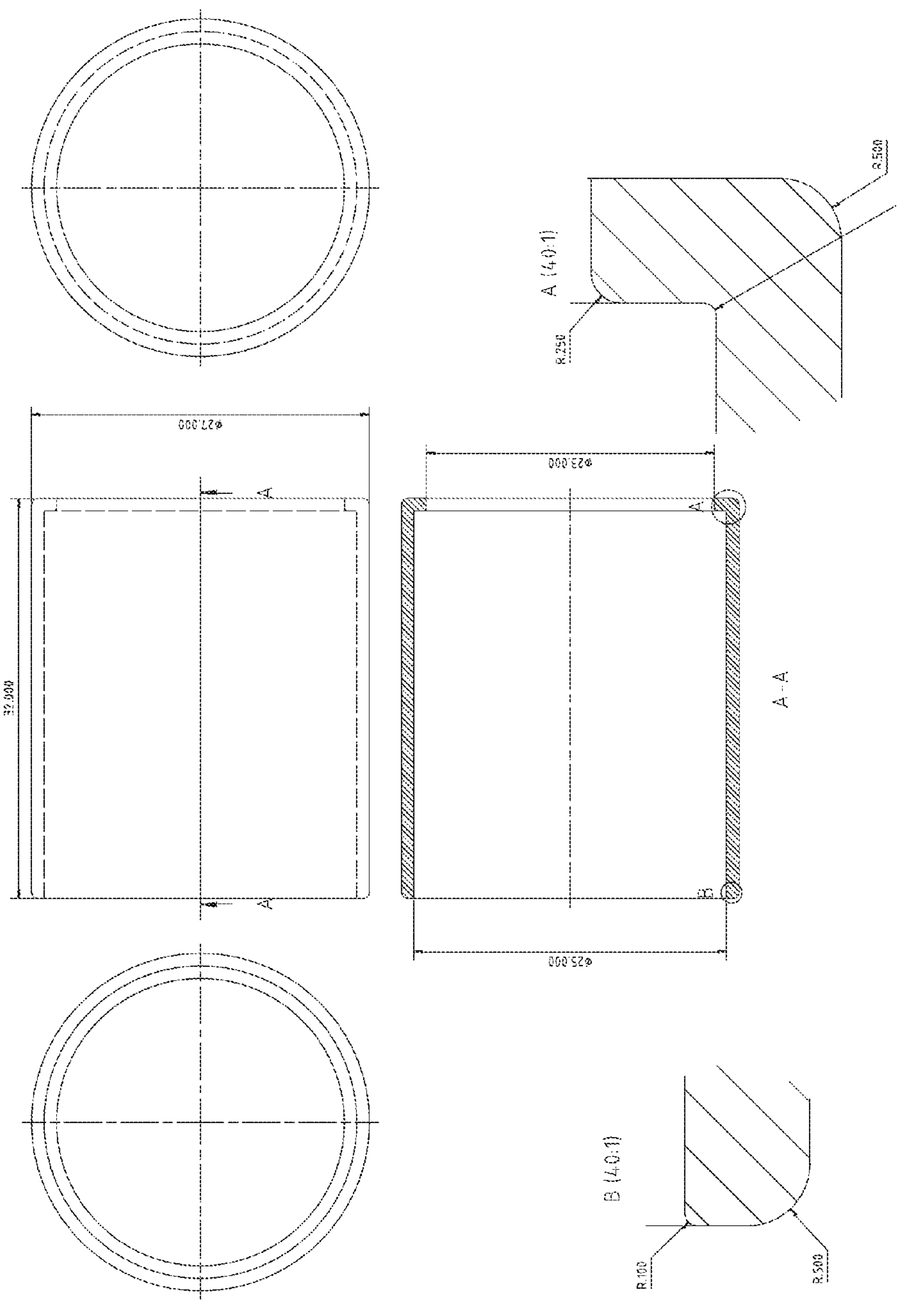
Figure 76:
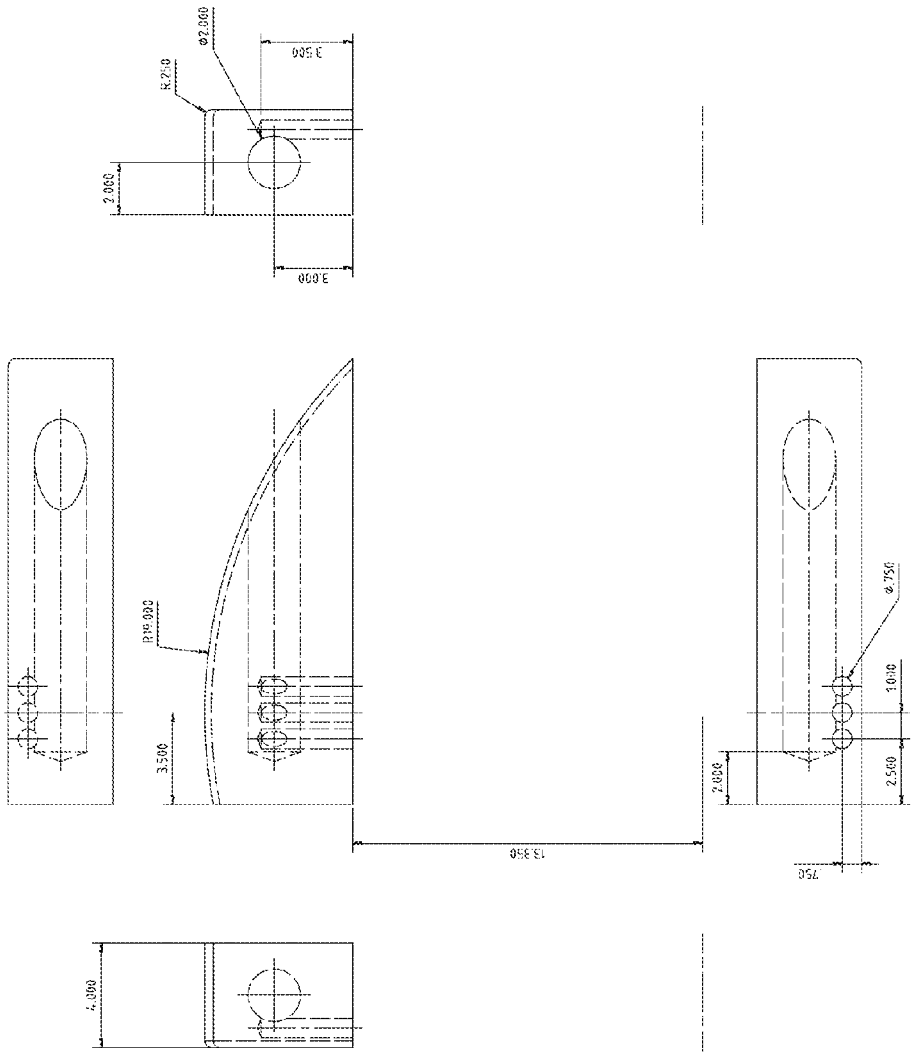
Figure 77:
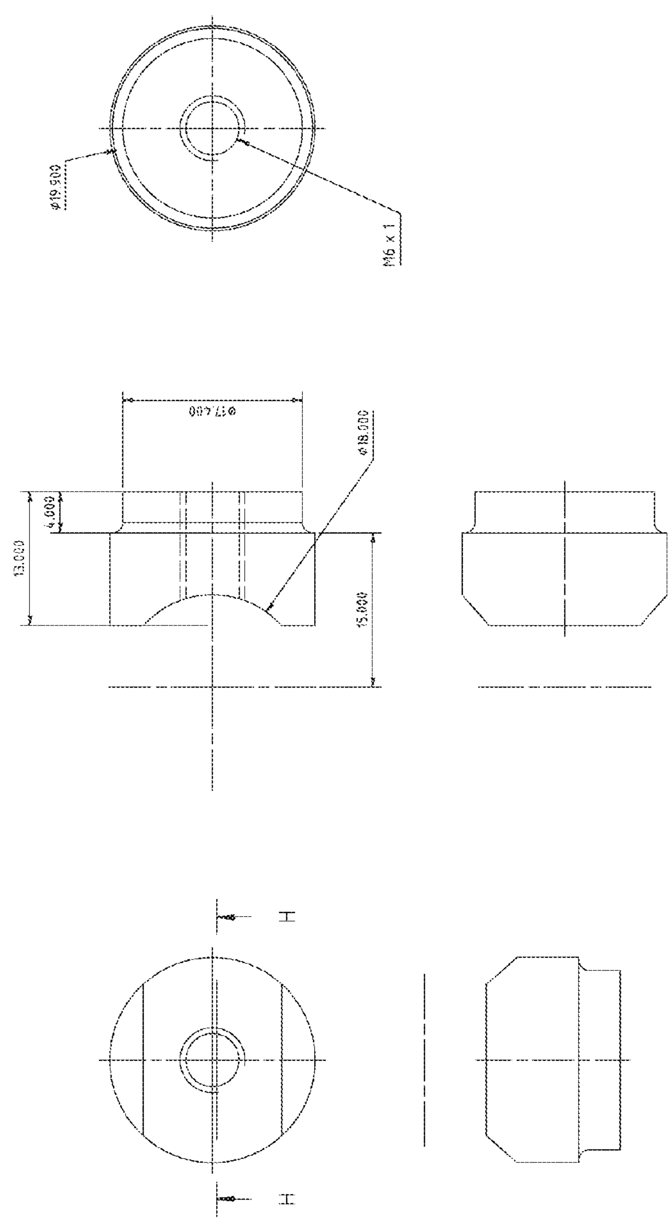

FIGS. 70 through 72 are the orthogonal views of FIG. 68 and FIGS. 73 through 78 are for the various internal fabricated components for FIG. 68 with its corresponding bill of material being listed in FIG. 78.

FIG. 79-88 for the spindle-rotation of the rotationally secure tool being battery operated.

Figure 79:
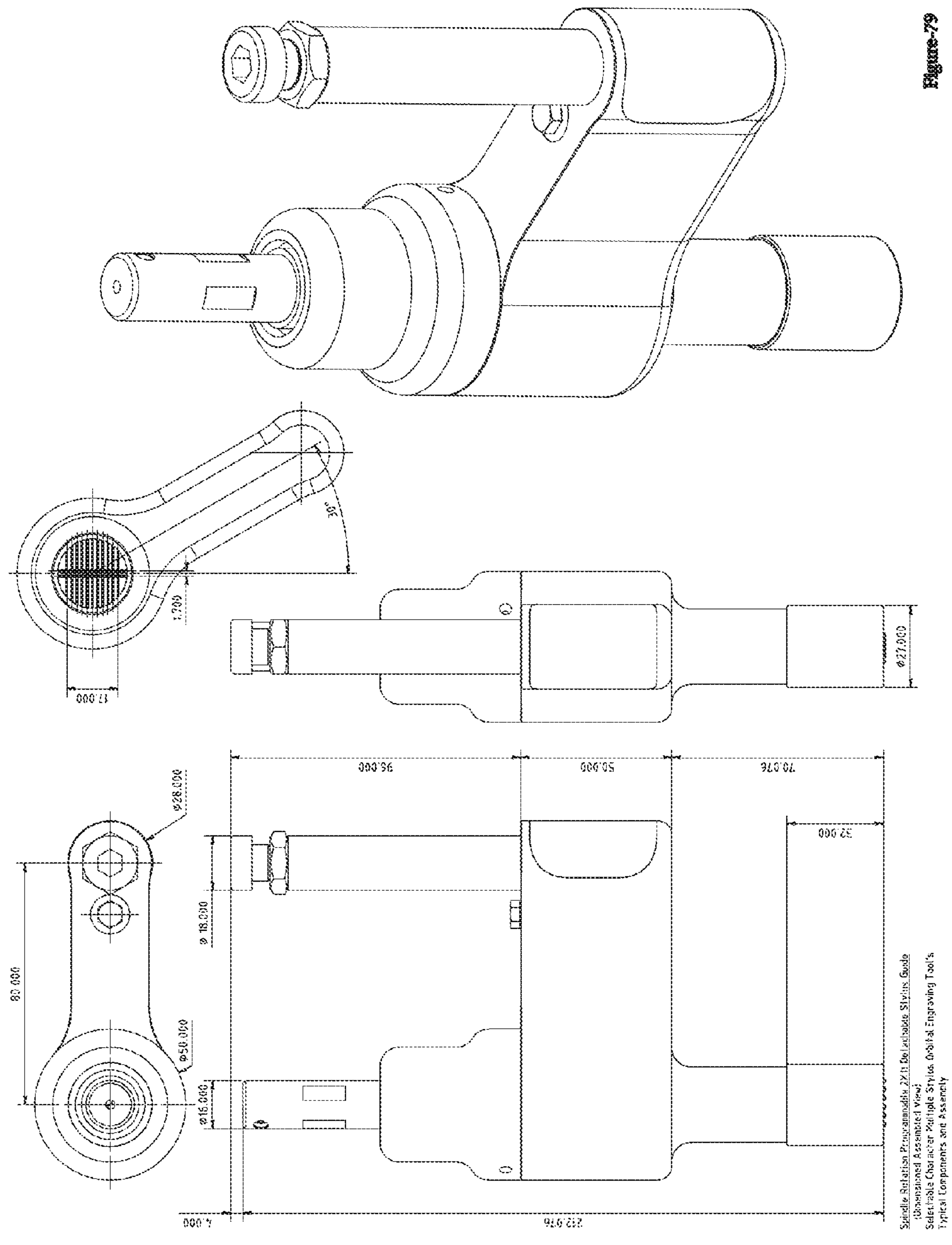

FIG. 79 shows the orthogonal and isometric views for the assembled for the battery powered spindle rotation programmable 2×11 detachable stylus guide engraving tool where the engraving tool's Ø16 mm mounting/Rotational control shaft is operably connected to the machine tool's rotatable spindle having the Ø 18 mm rotational stop being operably connected to the machine tool's non-rotating spindle face mounted adapter. Having the engraving tool's Ø16 mm mounting/Rotational control shaft being rotated by the machine tool spindle to operably select the styluses engraved character pattern as shown in FIG. 60.

Figure 80:
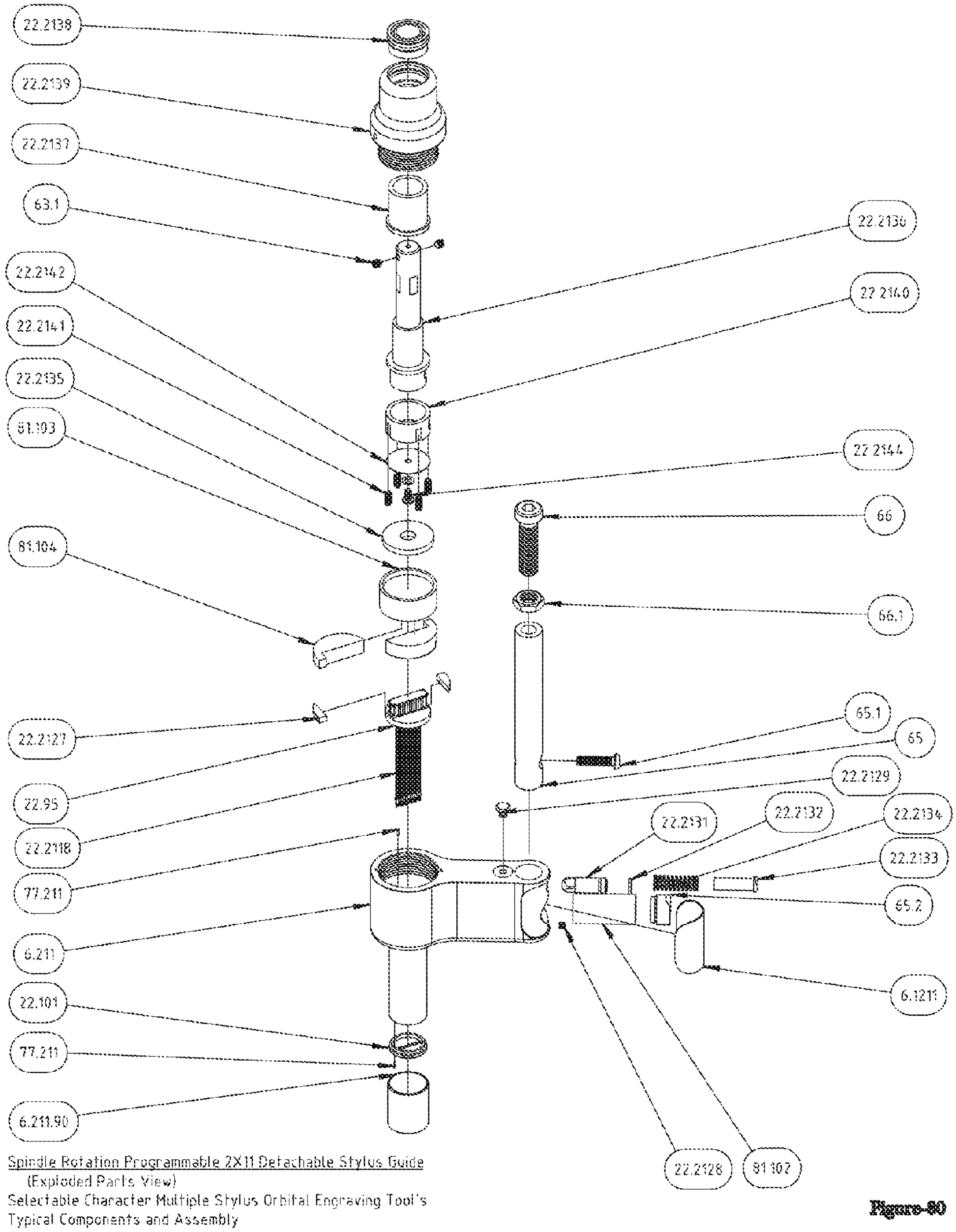
Figure 81:
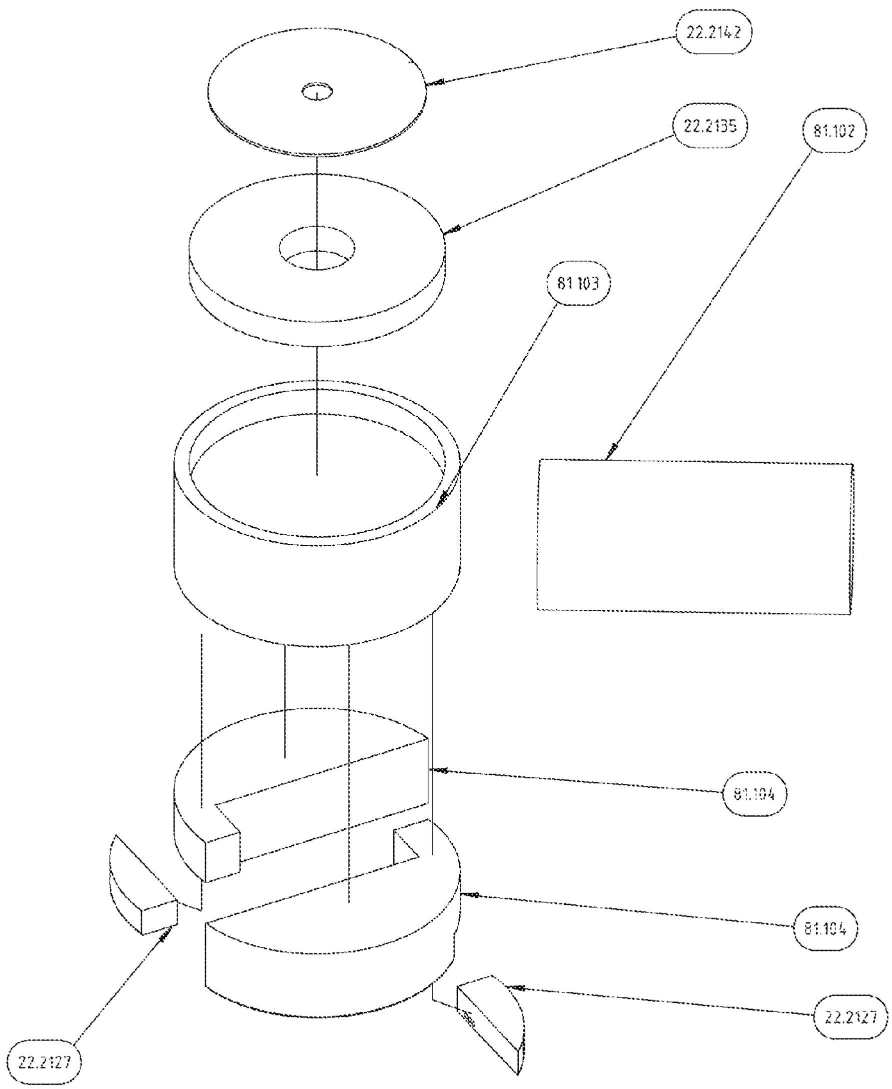

FIG. 80 is the exploded parts isometric view of the rotation programmable 2×11 detachable stylus guide engraving tool having the main body 6.211 enclosing the selectable stylus activation module 81.103 that receives its rotational position signal via encoder 22.2135 from the encoder disk 22.2142 that is connected to the engraving tool's Ø16 mm mounting/Rotational control shaft 22.2136 having the having the engraving tool's internal selective stylus pneumatic valve activation solenoid modules 81.104 being connected to the wireless control module 81.103 while being powered by an internal battery 81.102 as shown in FIG. 81.

Figure 82:
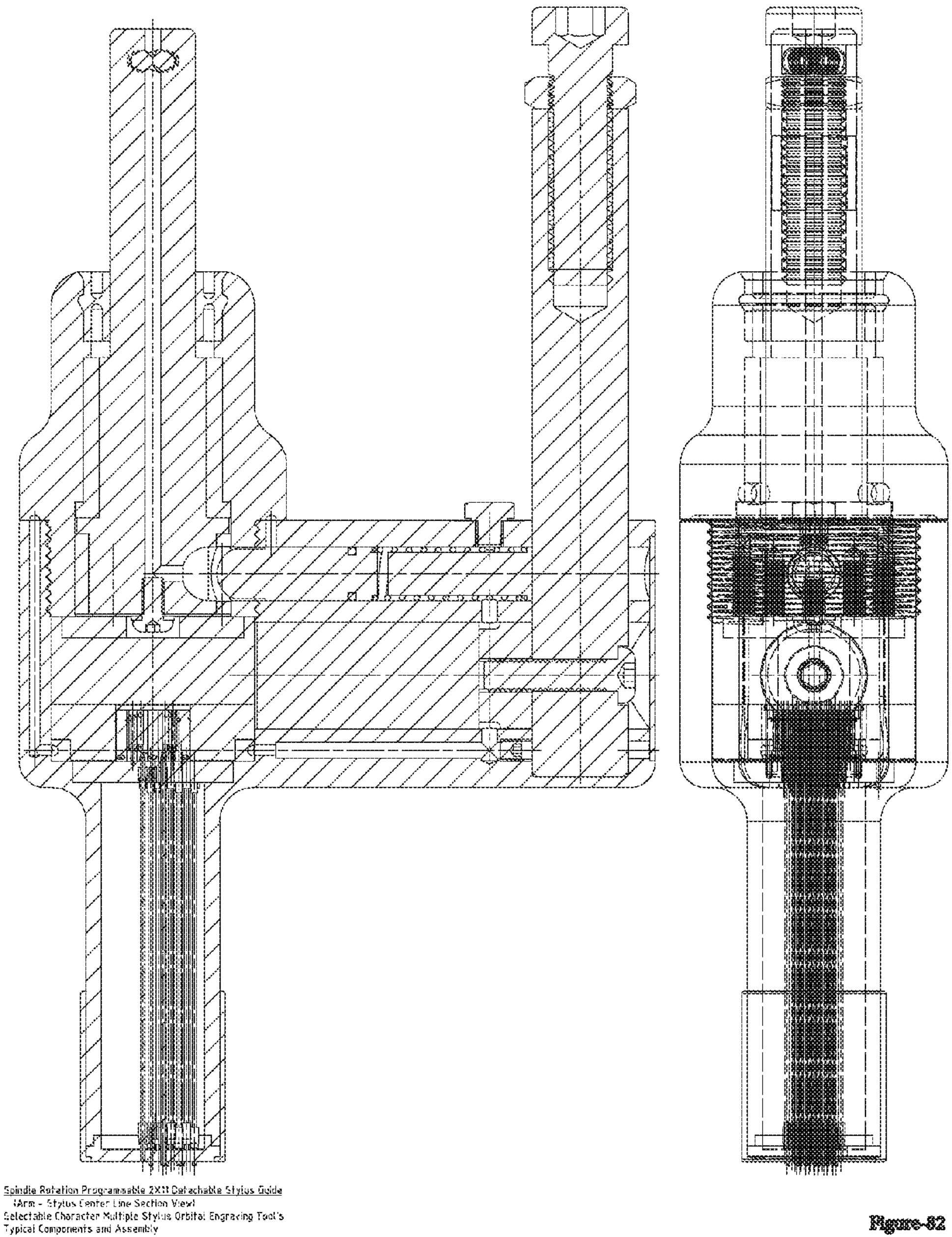
Figure 83:
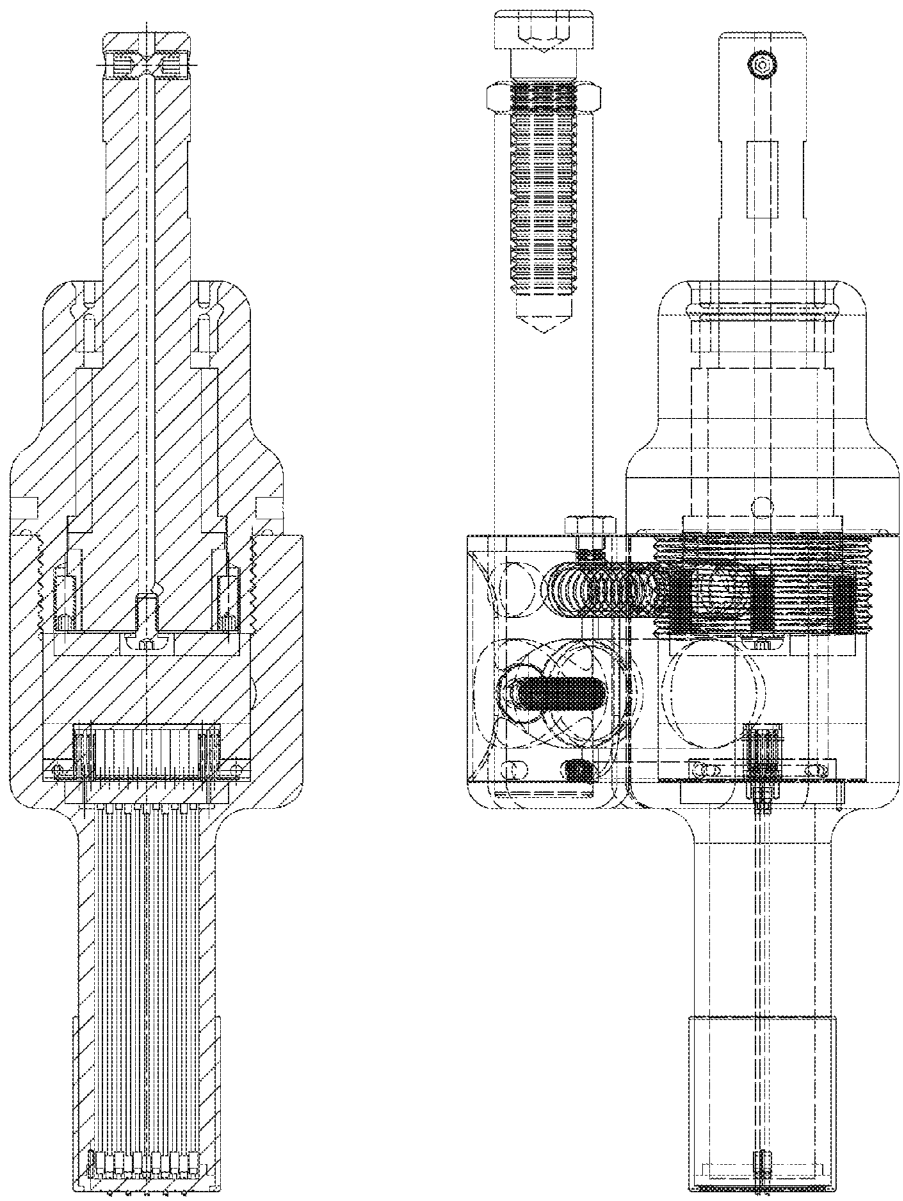
Figure 84:
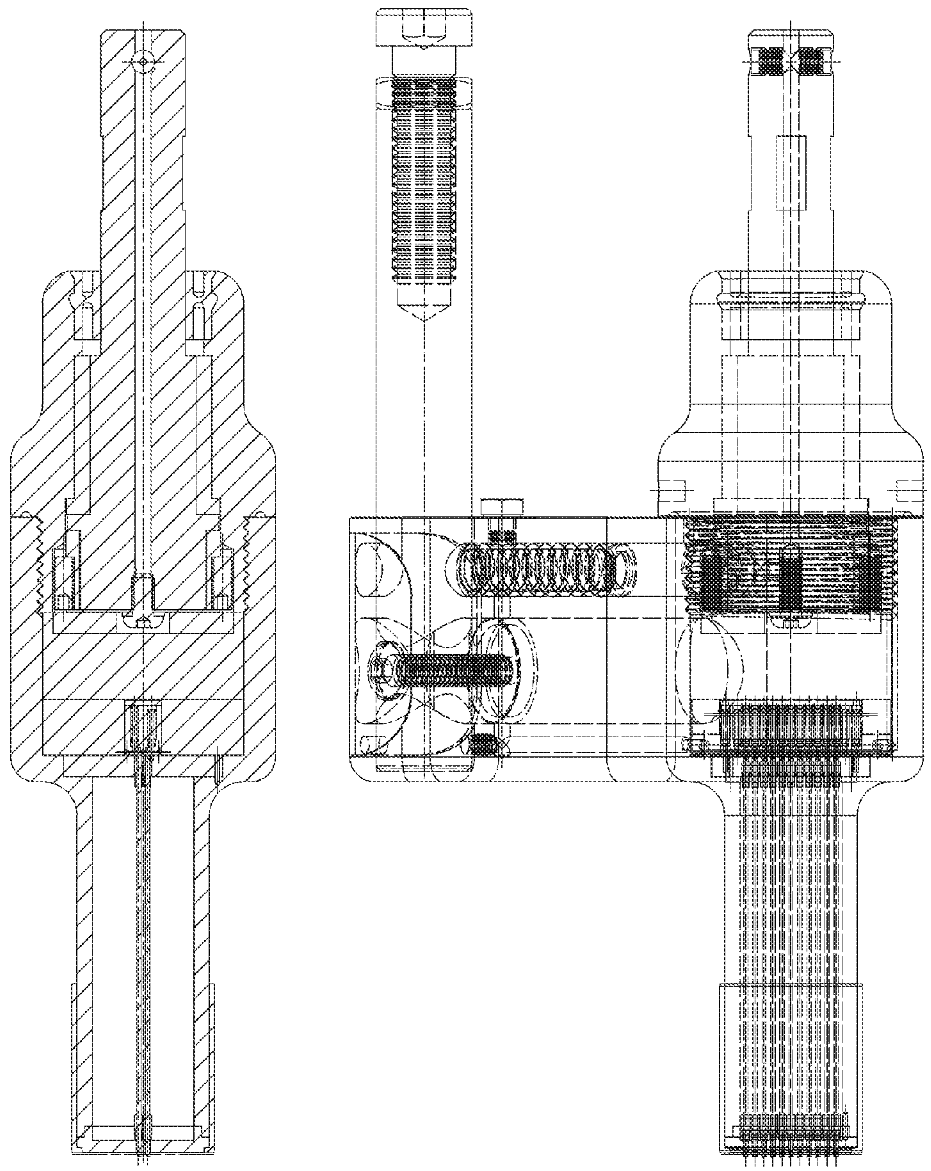
Figure 85:
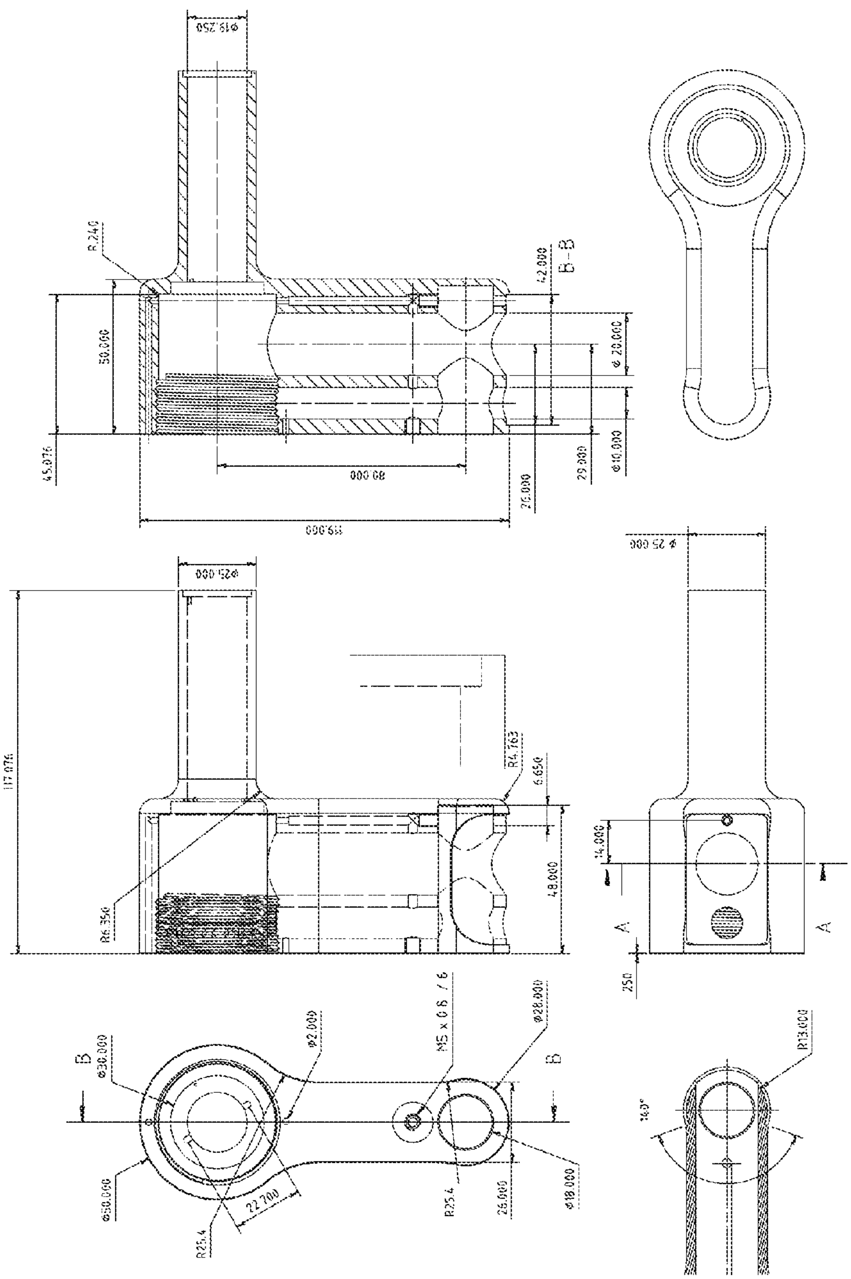
Figure 86:
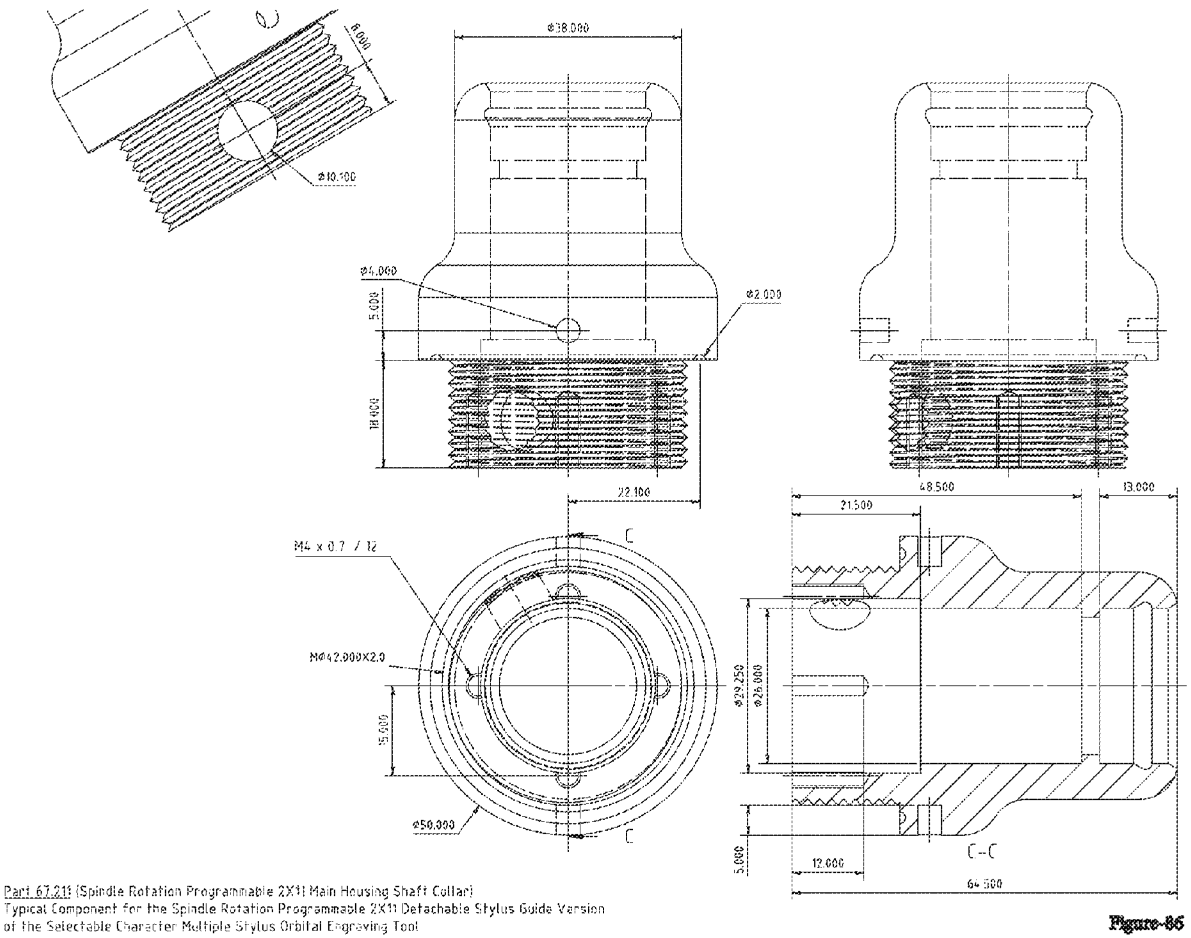
Figure 87:
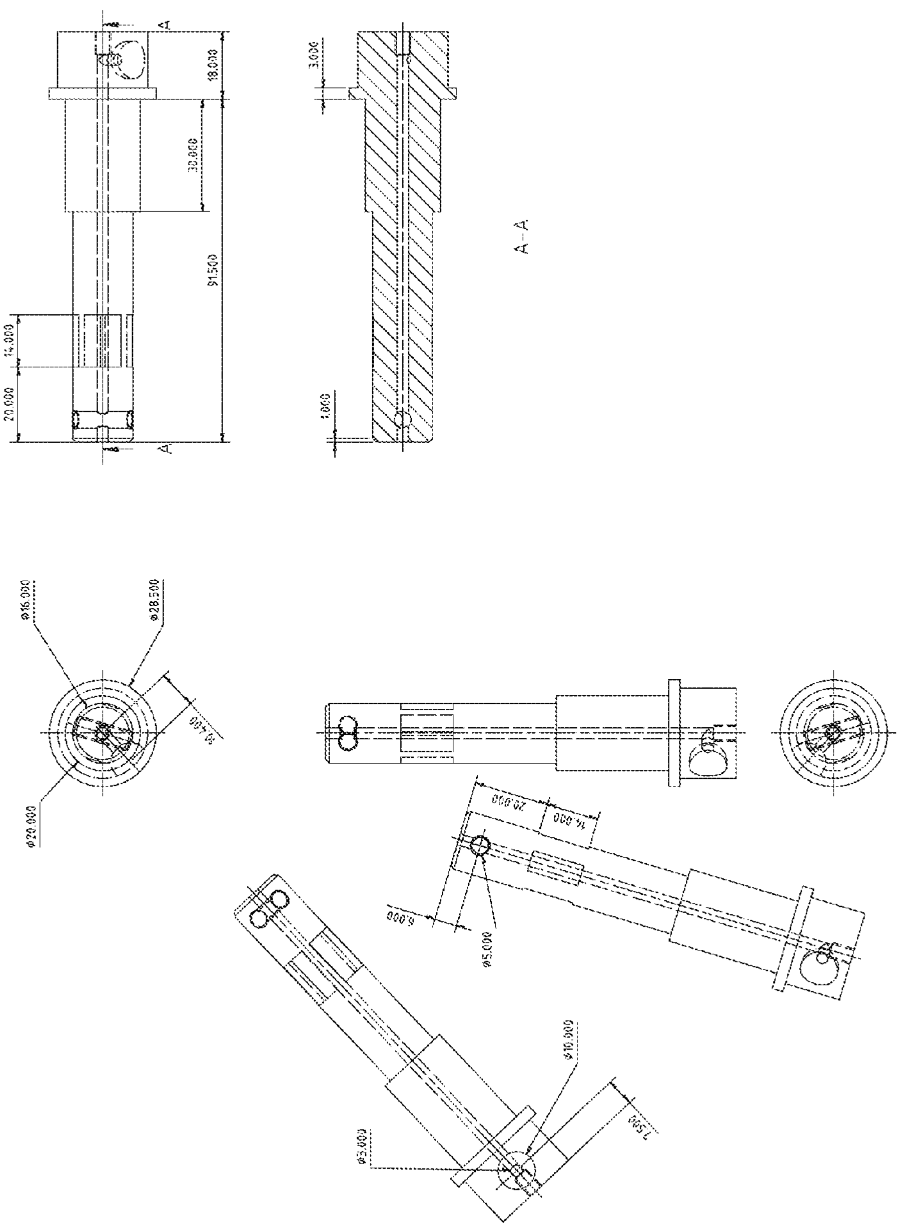

FIGS. 82 through 84 are the orthogonal views of FIG. 80 and FIGS. 85 through 87 are for the various internal specific fabricated components for FIG. 80 with its corresponding bill of material listed in FIG. 88.

FIG. 89-98 for the spindle-tool rotation of the "rotatable for selection" tool being battery operated.

Figure 89:
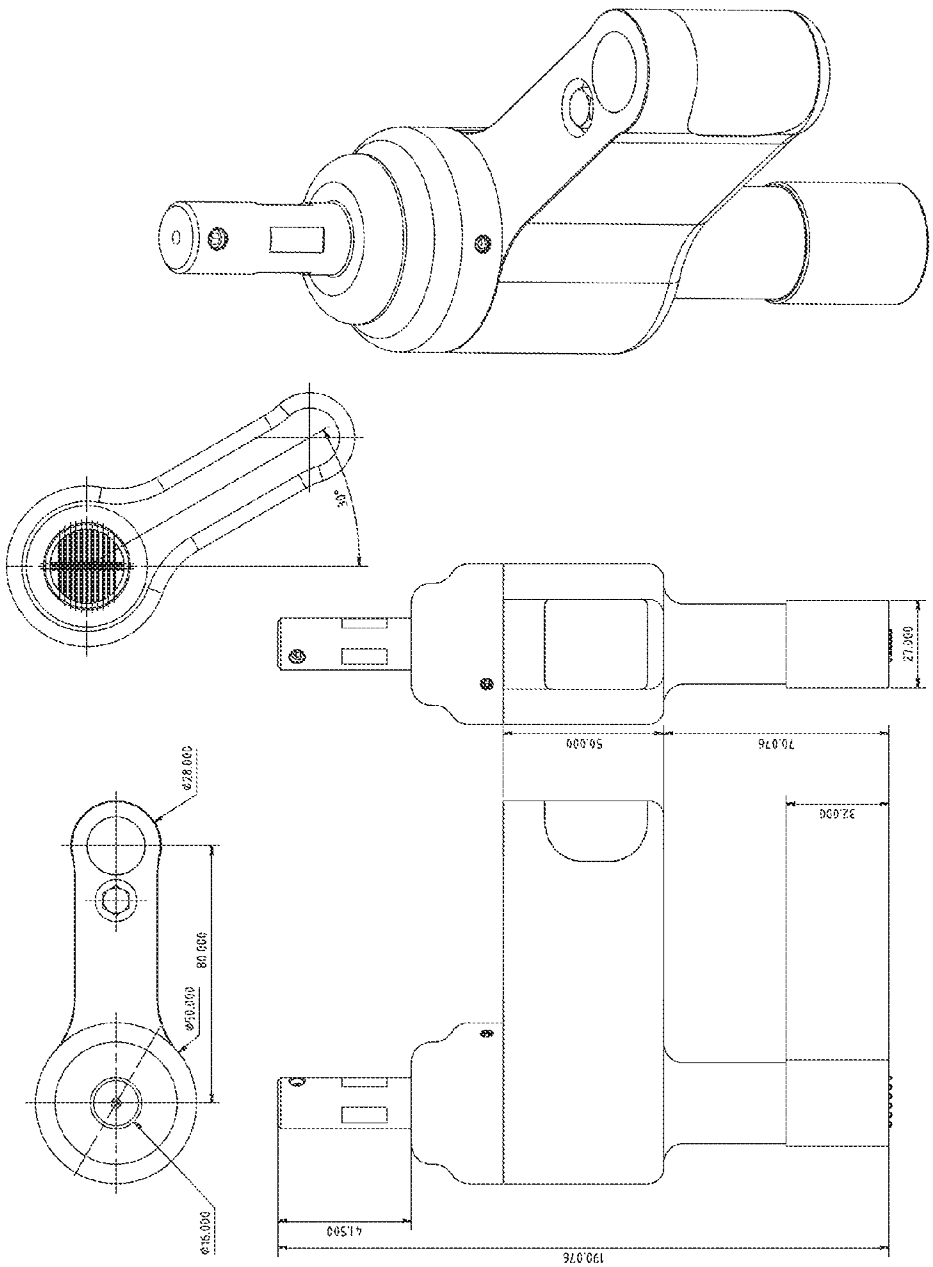

FIG. 89 shows the orthogonal and isometric views for the assembled for the battery powered engraving tool rotation programmable 2×11 detachable stylus guide engraving tool where the engraving tool's Ø016 mm mounting shaft is operably connected to the machine tool's rotatable spindle. Having the engraving tool's Ø16 mm mounting shaft being rotated by the machine tool spindle to rotate the engraving tool to operably select the styluses engraved character pattern as shown in FIG. 60.

Figure 90:
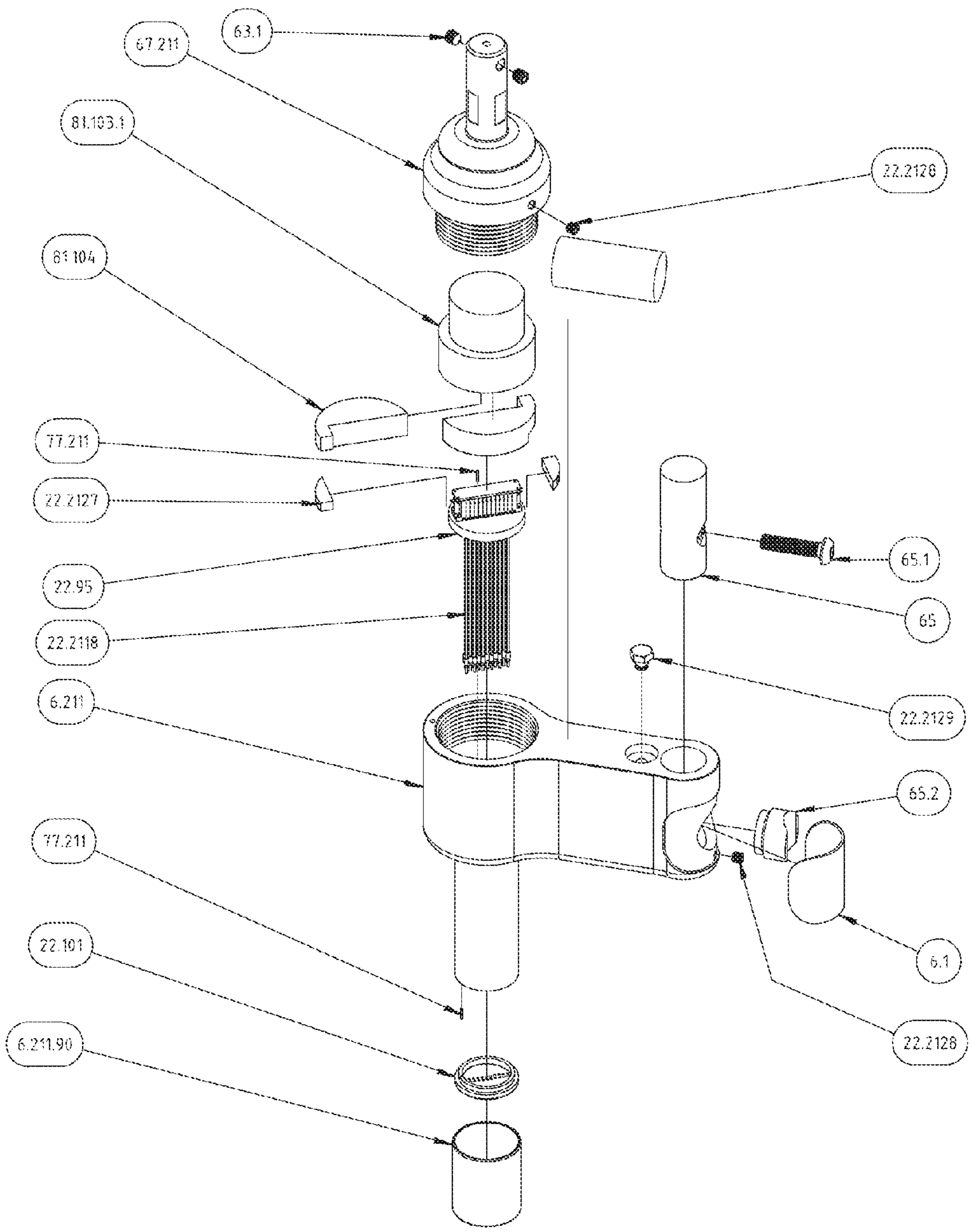
Figure 91:
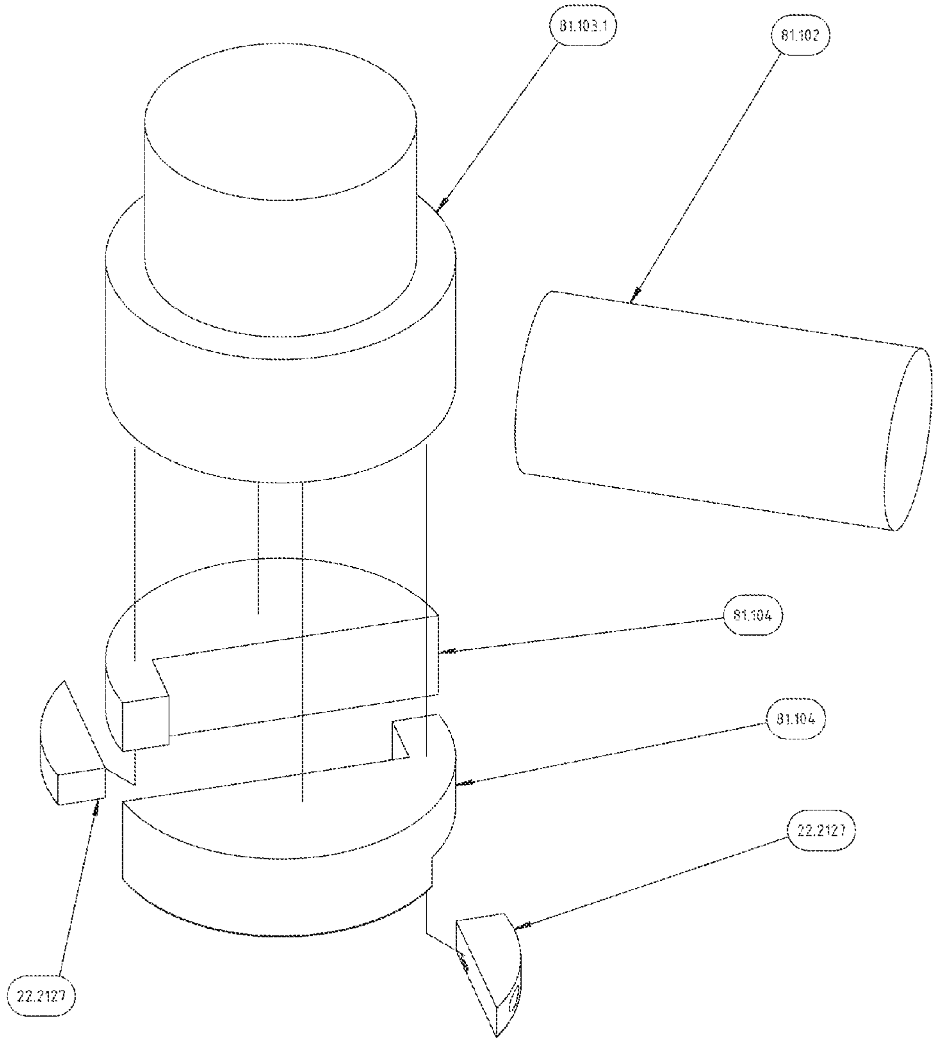

FIG. 90 is the exploded parts isometric view of the rotation programmable 2×11 detachable stylus guide engraving tool having the main body 6.211 enclosing the selectable stylus activation module 81.103.1 that receives its rotational position signal via an internal Rotational inclination positional encoder is rotationally sensitive to the Rotational orientation and direction of the engraving tool while being mounted to the machine tool's spindle via shaft 67.211 having the having the engraving tool's internal selective stylus pneumatic valve activation solenoid modules 81.104 being connected to the control module 81.103.1 while being powered by an internal battery 81.102 as shown in FIG. 91.

Figure 92:
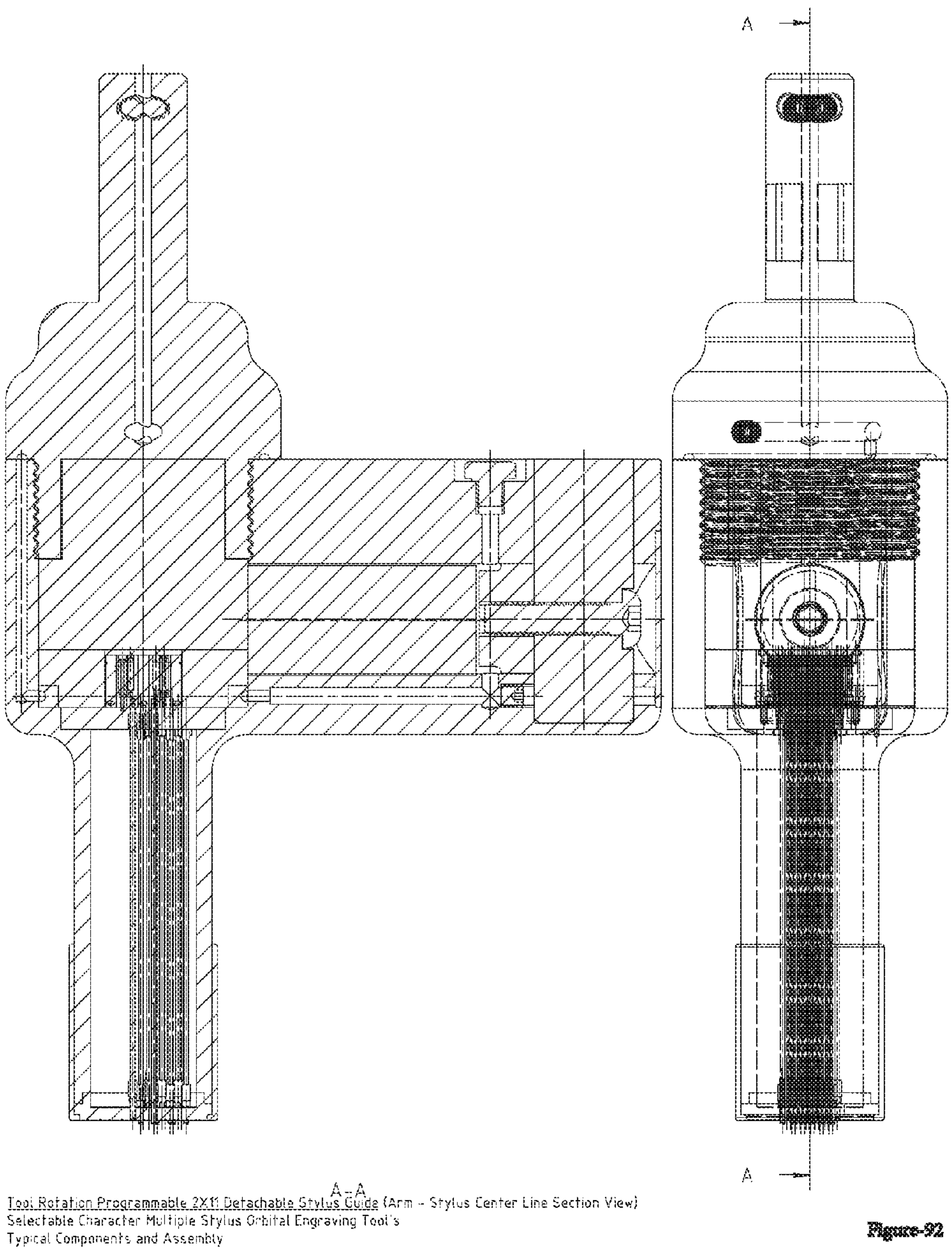
Figure 93:
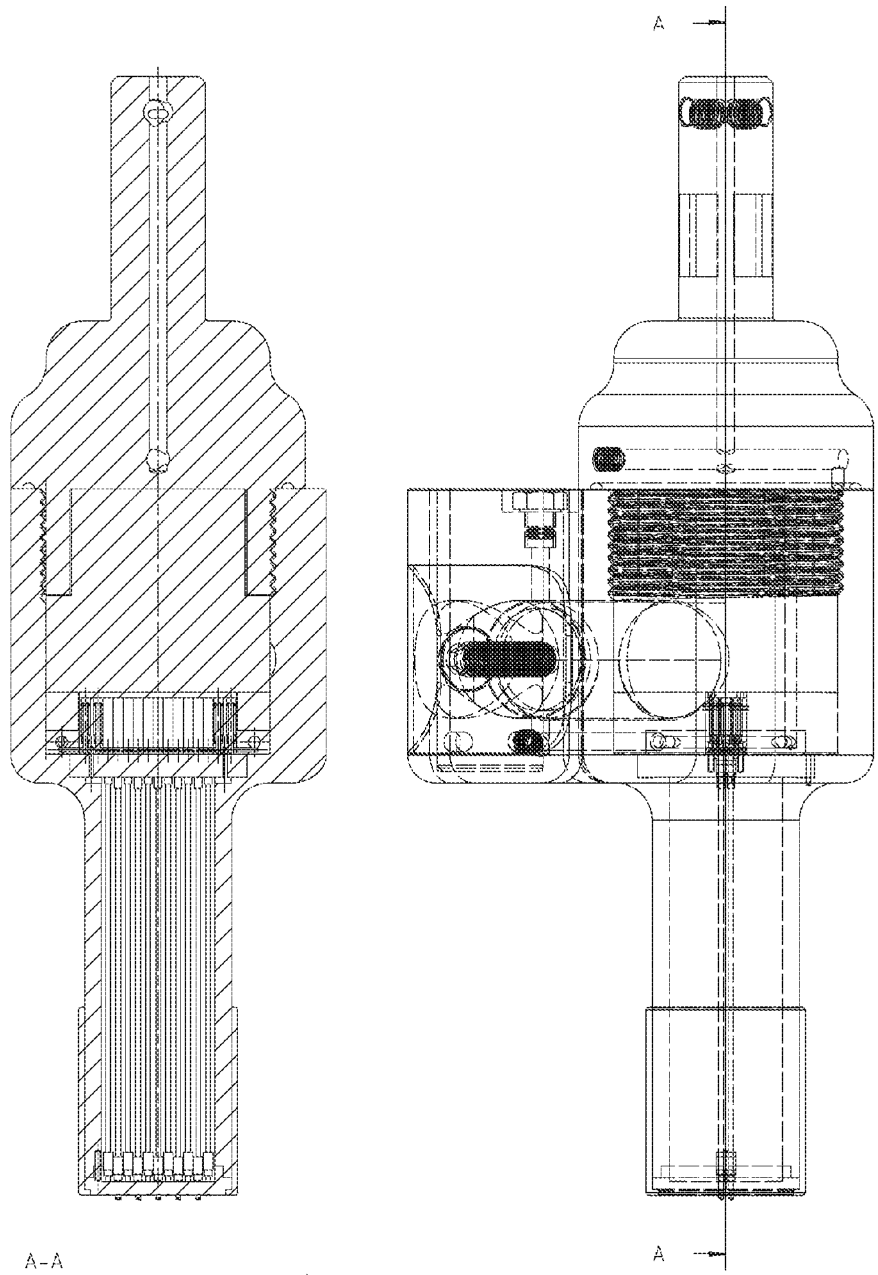
Figure 94:
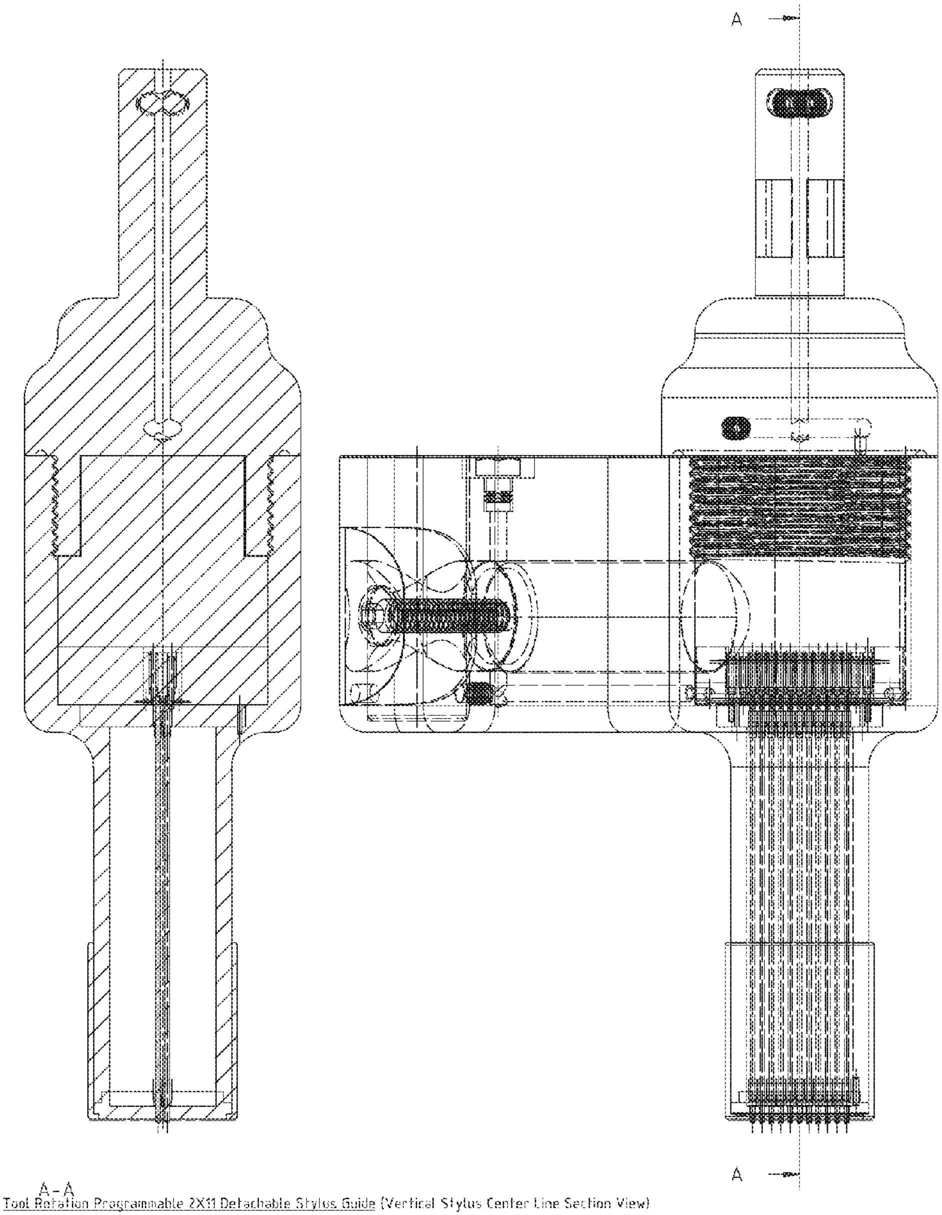
Figure 95:
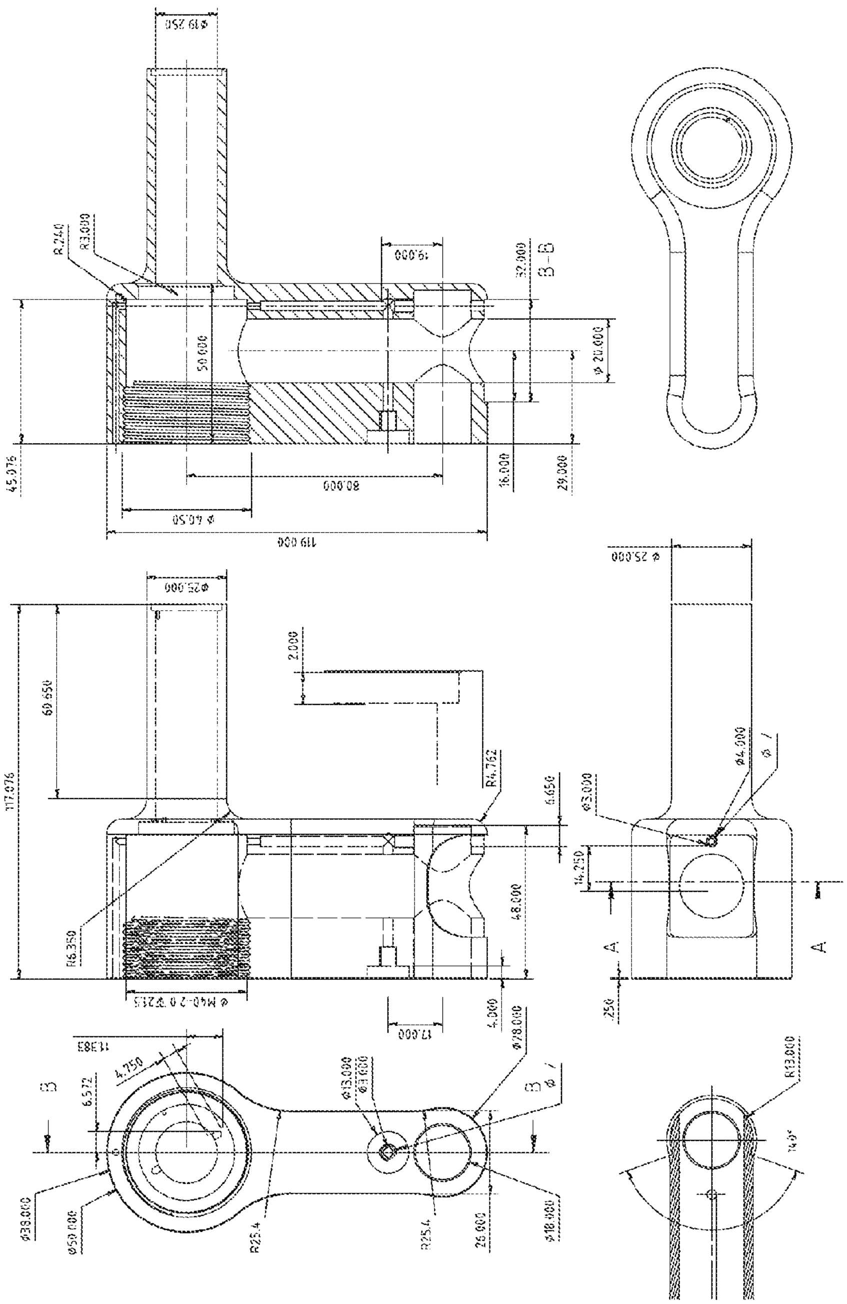
Figure 96:
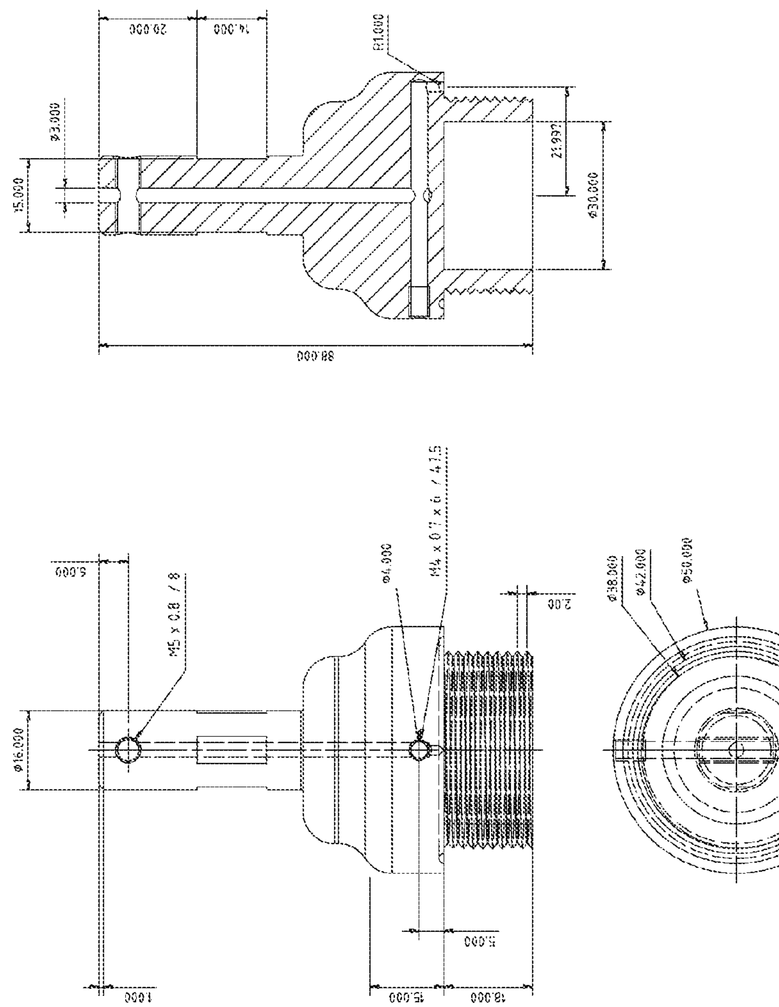
Figure 97:
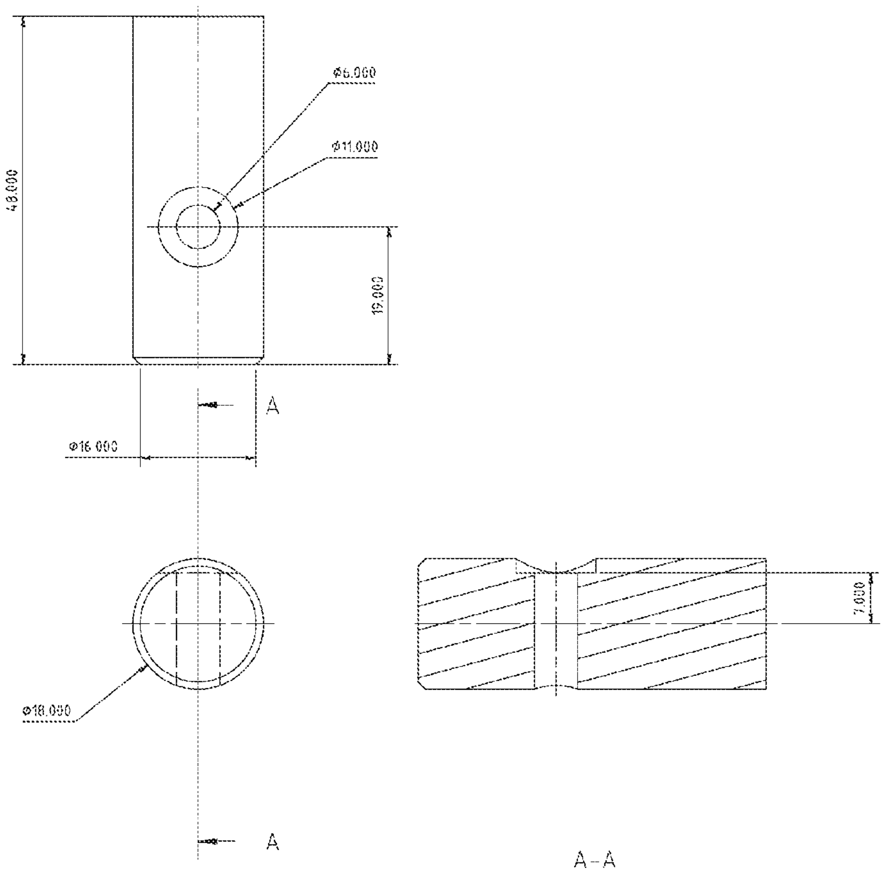

FIGS. 92 through 94 are the orthogonal views of FIG. 90 and FIGS. 95 through 97 are for the various internal specific fabricated components for FIG. 90 with its corresponding bill of material listed in FIG. 98.

FIG. 99-106 for the contact communication of the rotationally secure tool being operated by a system rechargeable battery.

Figure 99:
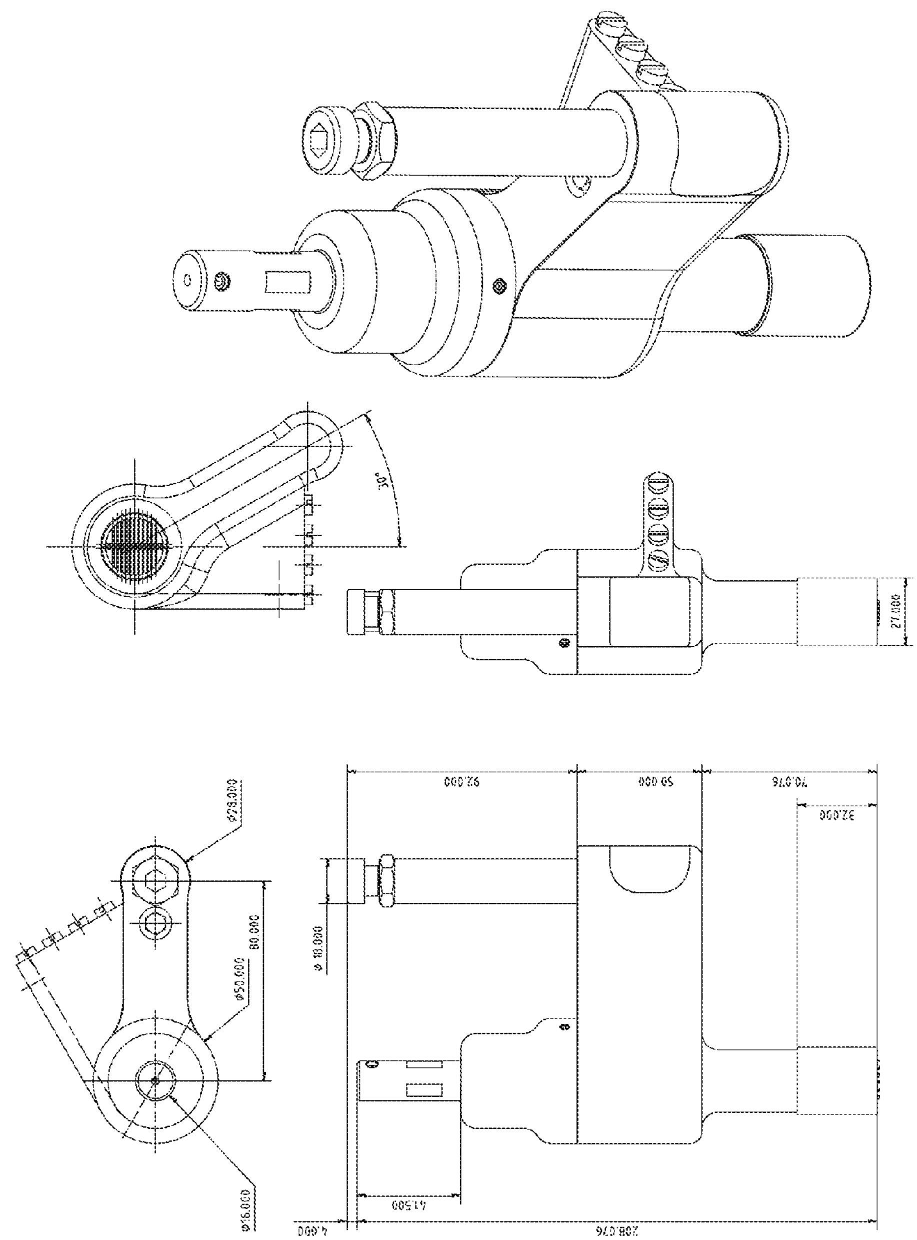

FIG. 99 shows the orthogonal and isometric views for the assembled for the rechargeable contacts 22.2145 engraving tool programmable 2×11 detachable stylus guide engraving tool where the engraving tool's Ø16 mm mounting shaft being secured by the machine tool spindle. Having the engraving patterns' operational sequence for the corresponding stylus pattern selection being communicated to the engraving tool via the appropriate contact 22.2145 communications to the operational control system to operably select the styluses engraved character pattern and sequence as required.

Figure 100:
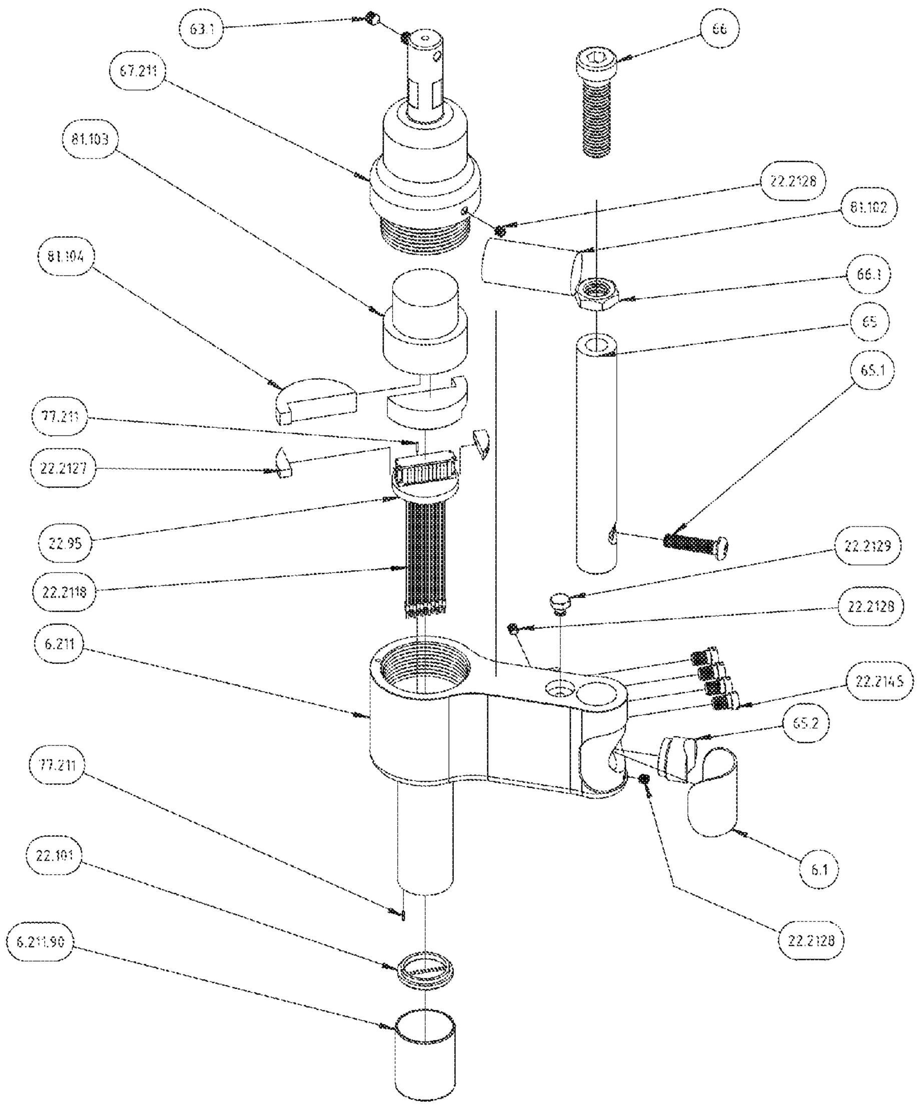
Figure 101:
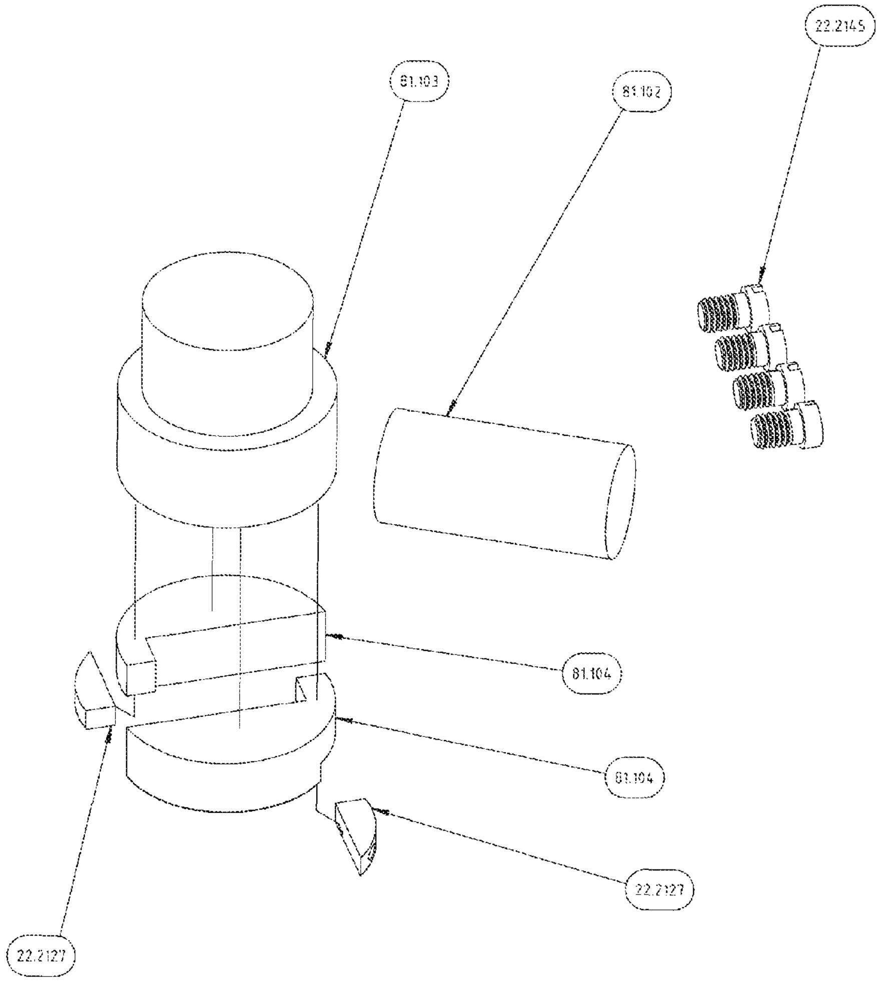

FIG. 100 is the exploded parts isometric view of the rechargeable contact programmable 2×11 detachable stylus guide engraving tool having the main body 6.211 enclosing the selectable stylus activation module 22.95 as described in FIGS. 52 through 59 being selectively/operably connected and controlled via an appropriate communication means having the engraving tool's internal selective stylus pneumatic valve activation solenoid modules 81.104 being connected to the wireless control module 81.103 while being powered by an internal battery 81.102 as shown in FIG. 101.

Figure 102:
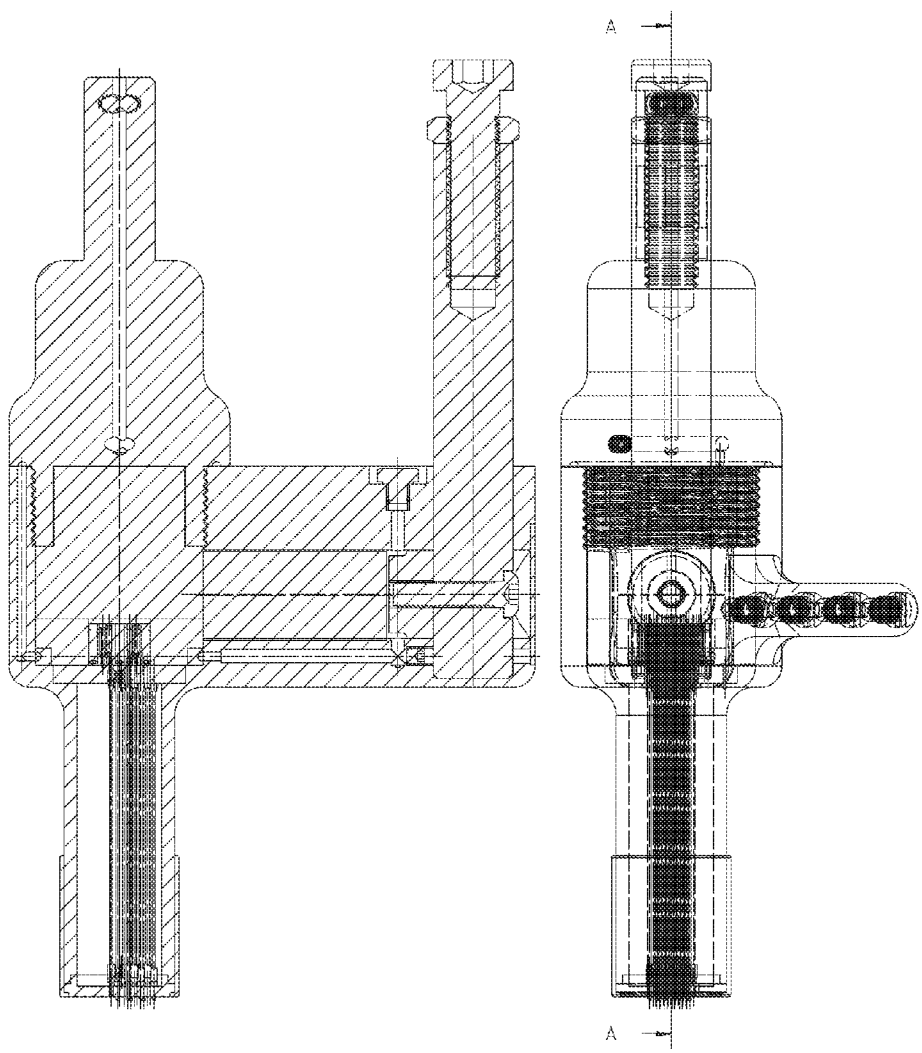
Figure 103:
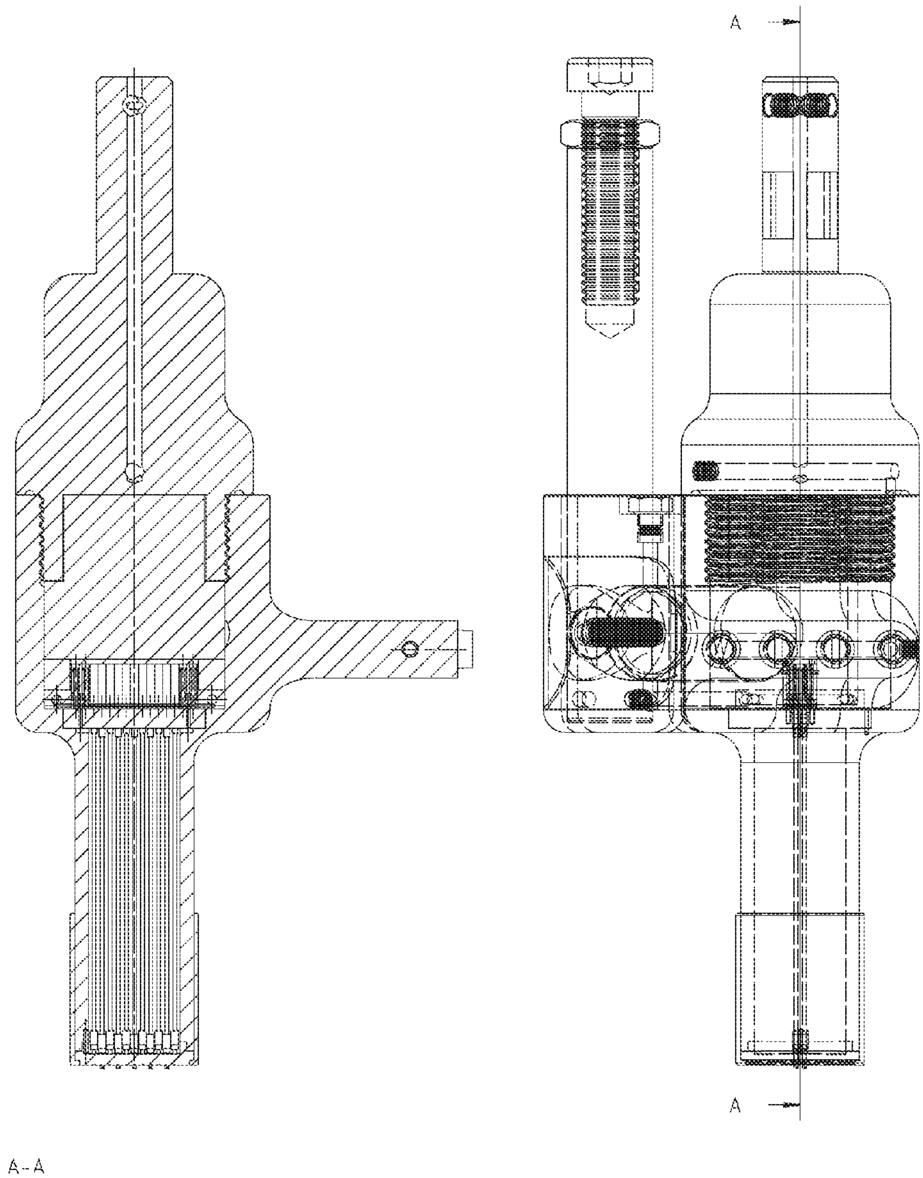
Figure 104:
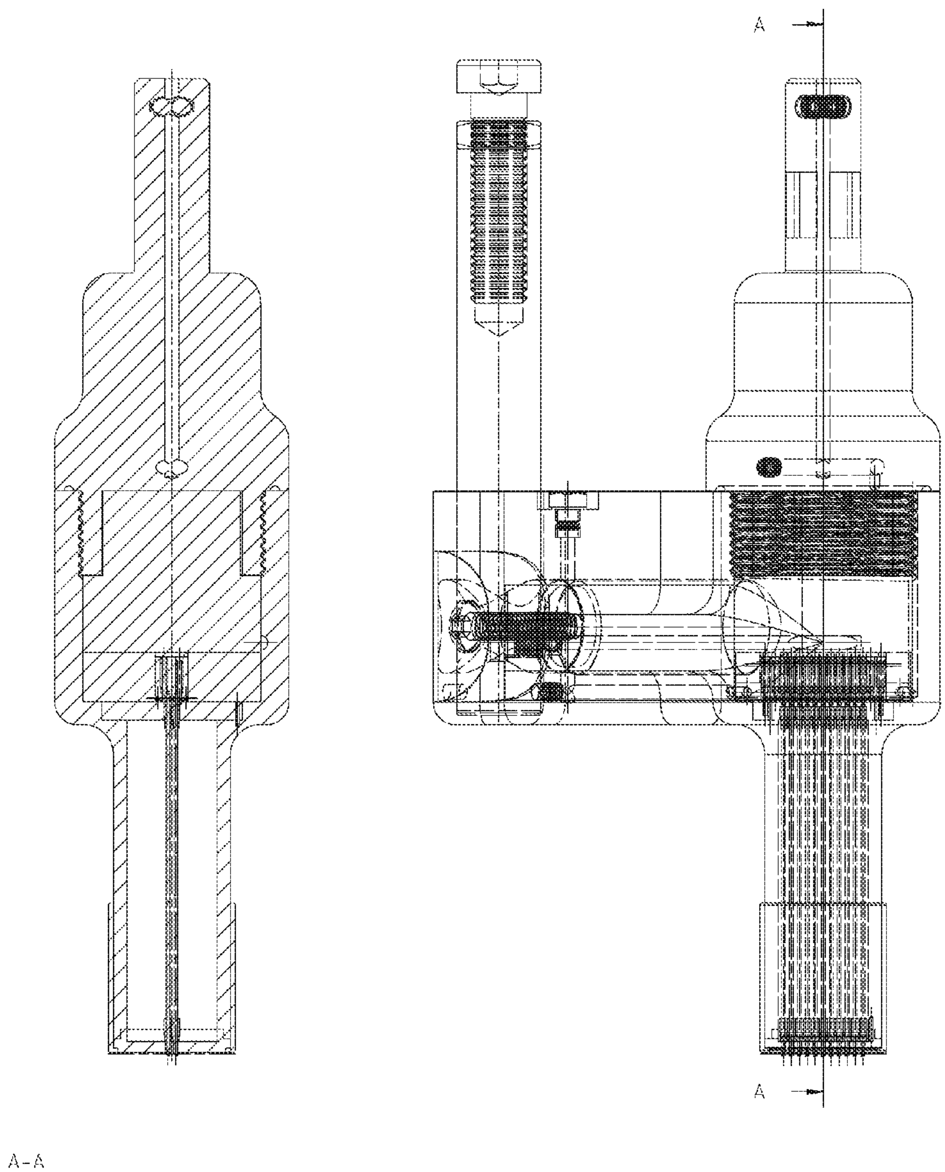
Figure 105:
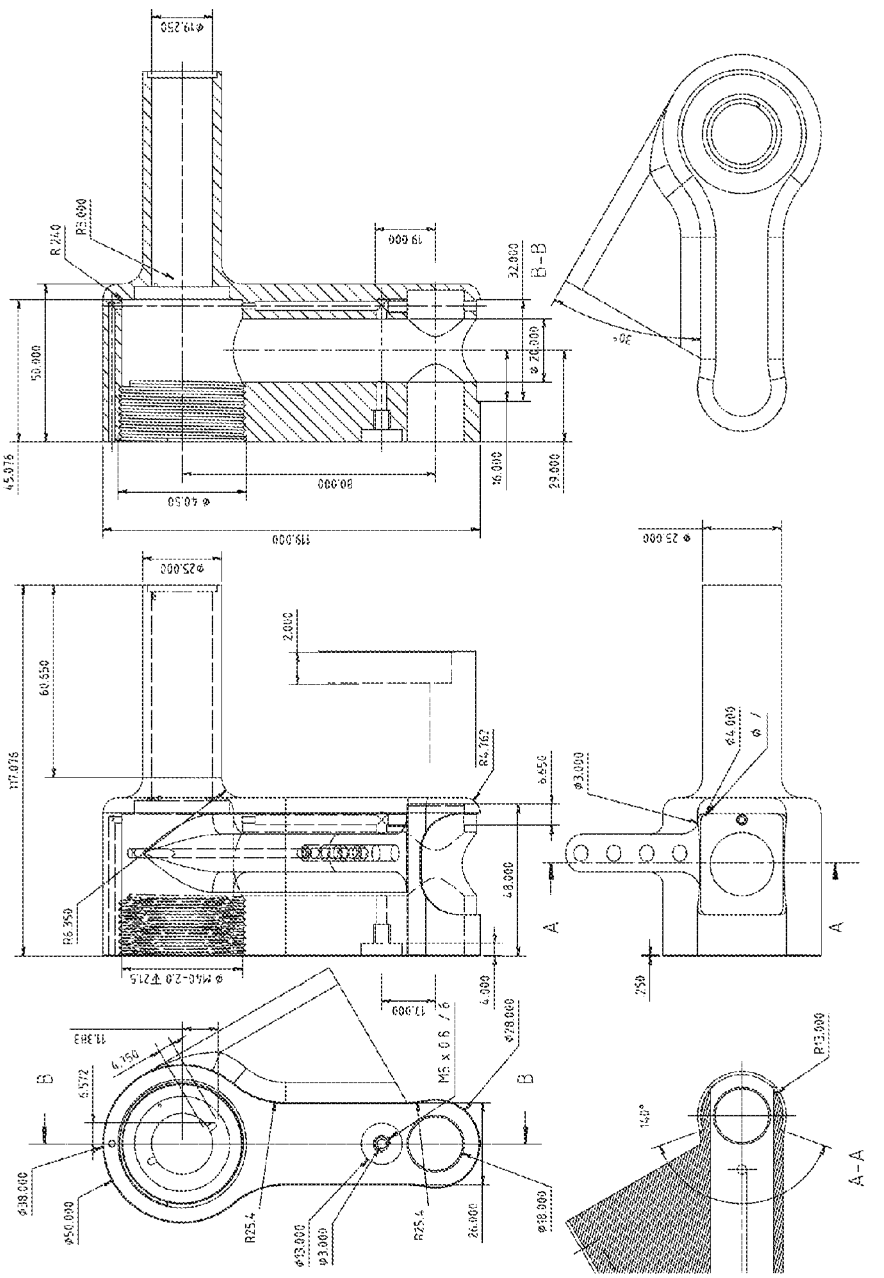

FIG. 102 through 104 are the orthogonal views of FIG. 100 and FIG. 105 is the specific fabricated component for FIG. 100 with its corresponding bill of material listed in FIG. 106.

FIG. 107-114 for the wireless communication of the rotationally secure tool being operated by a system rechargeable battery.

Figure 107:
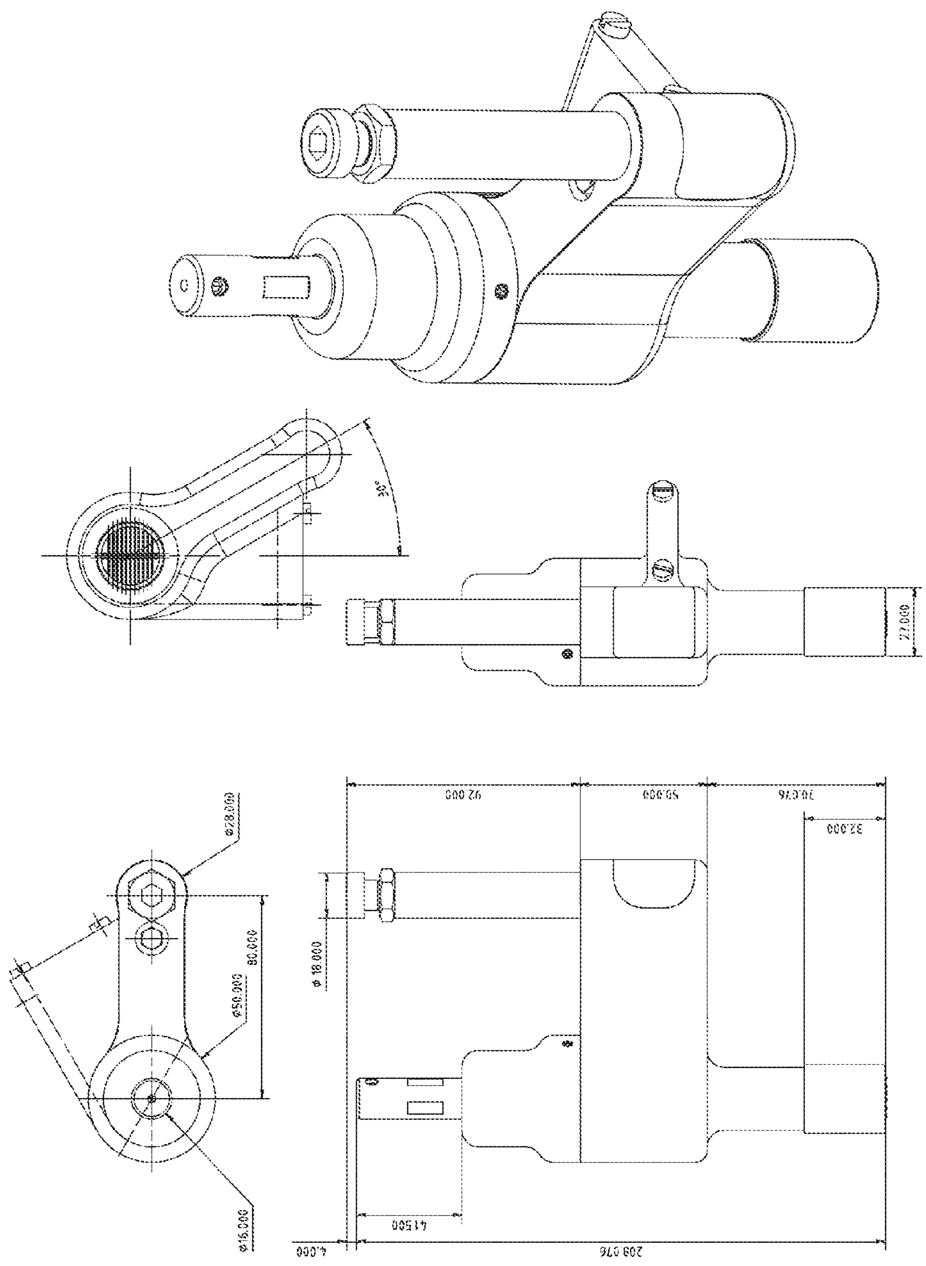

FIG. 107 shows the orthogonal and isometric views for the assembled rechargeable wireless programmable 2×11 detachable stylus guide engraving tool where the engraving tool's Ø16 mm mounting shaft is operably connected to the machine tool's rotatable spindle having the Ø18 mm rotational stop being operably connected to the machine tool's non-rotating spindle face mounted adapter.

Figure 108:
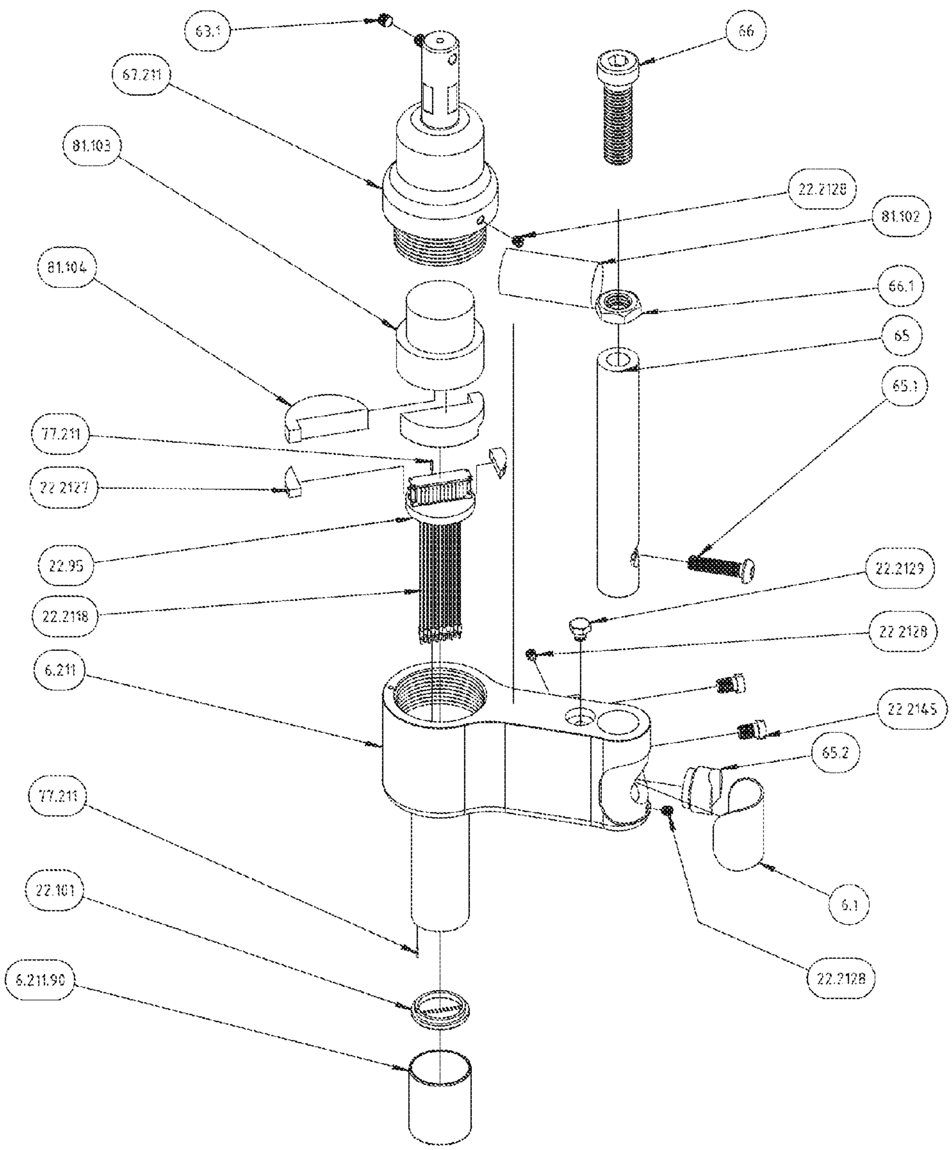
Figure 109:
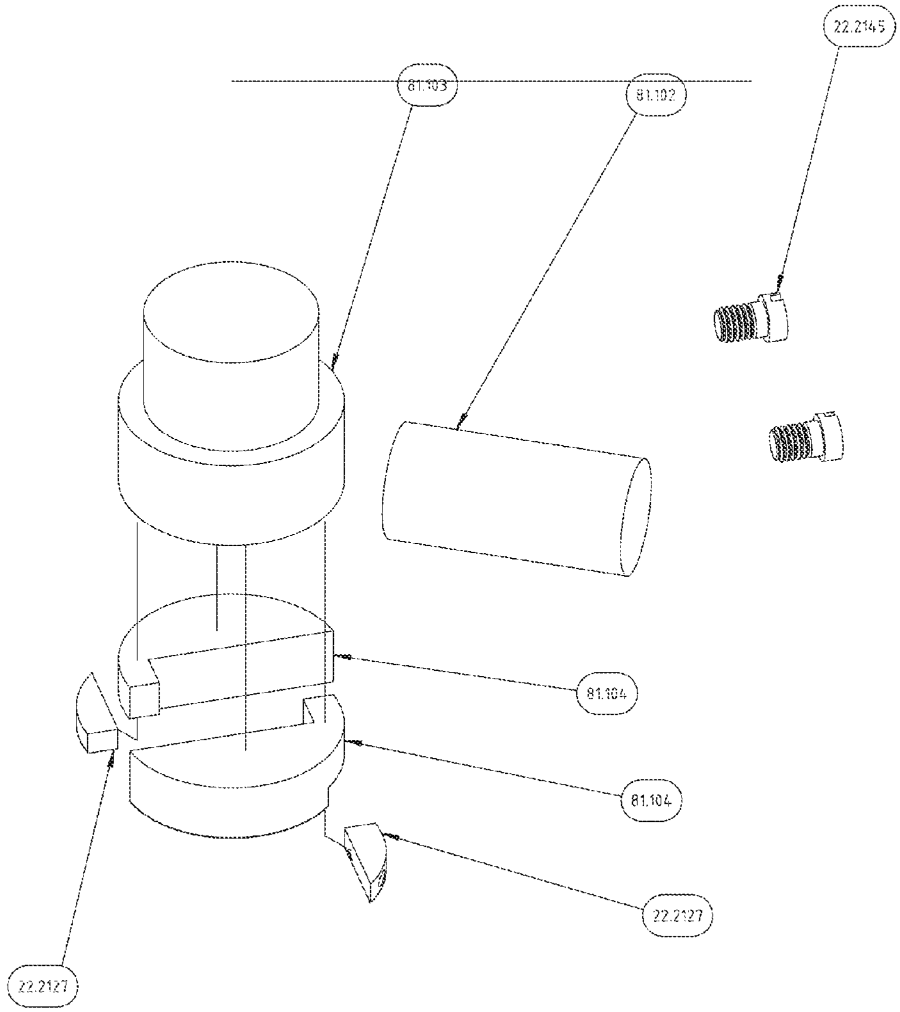

FIG. 108 is the exploded parts isometric view of the rechargeable wireless programmable 2×11 detachable stylus guide engraving tool having the main body 6.211 enclosing the selectable stylus activation module 22.95 as described in FIGS. 52 through 59 being operably connected and controlled via a wireless means as described in FIGS. 61 through 64 having the engraving tool's internal selective stylus pneumatic valve activation solenoid modules 81.104 being connected to the wireless control module 81.103 while being powered by an internal battery 81.102 as shown in FIG. 109 that is rechargeable via contacts 22.2145.

Figure 110:
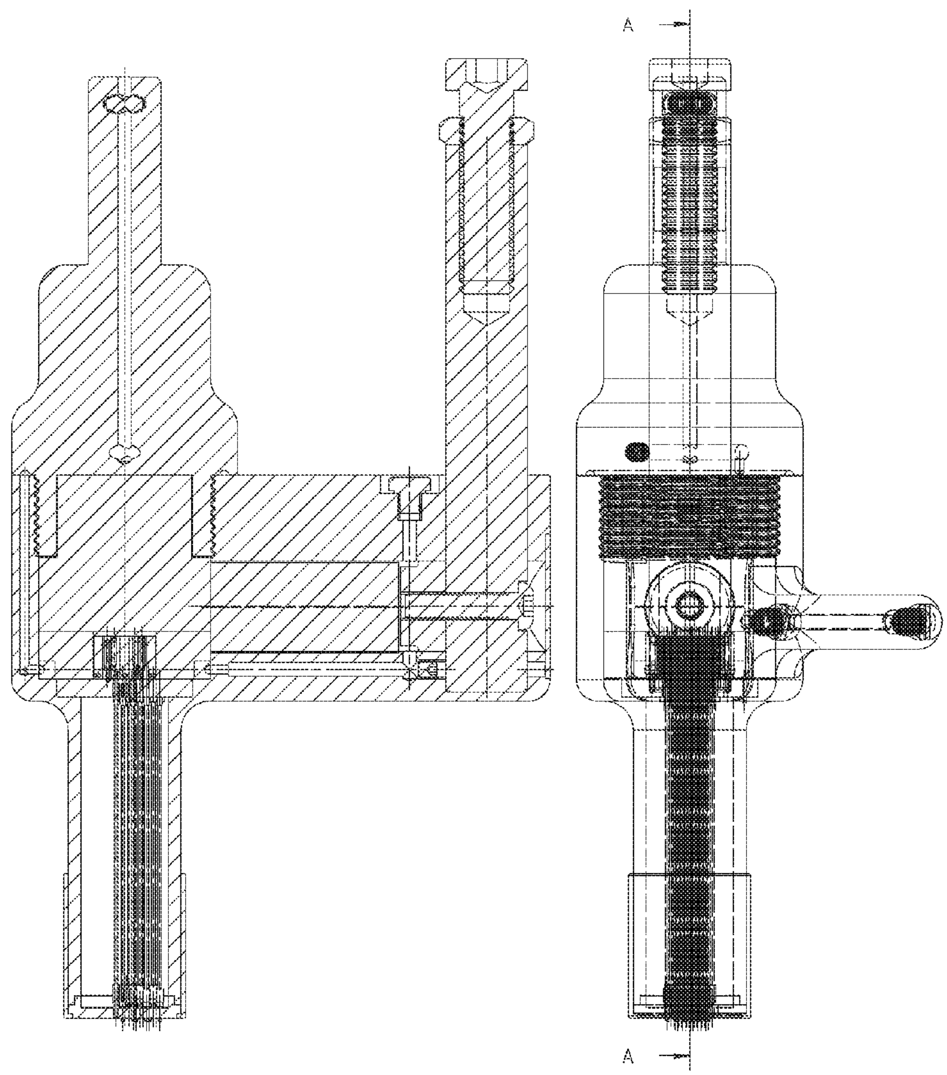
Figure 111:
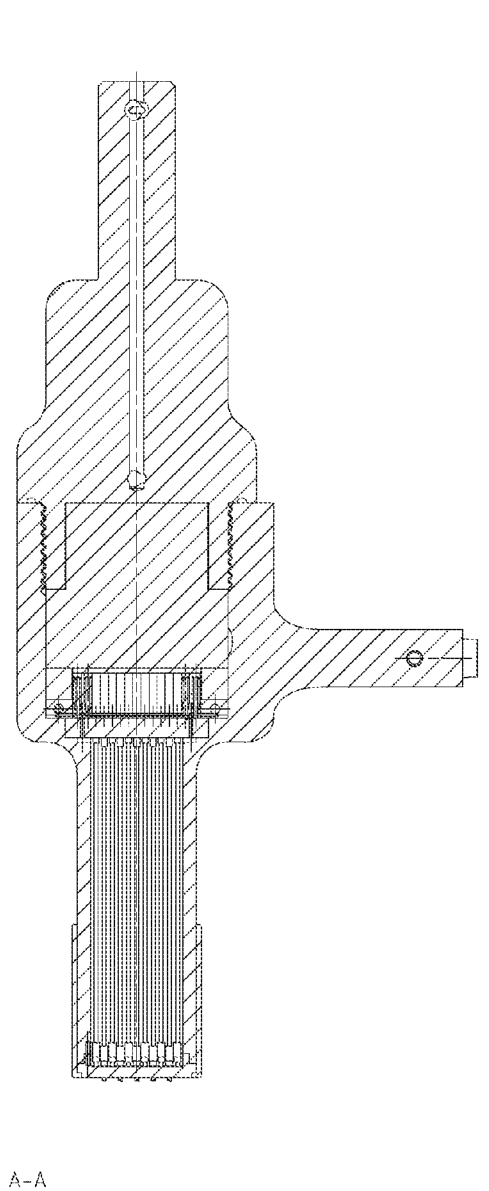
Figure 112:
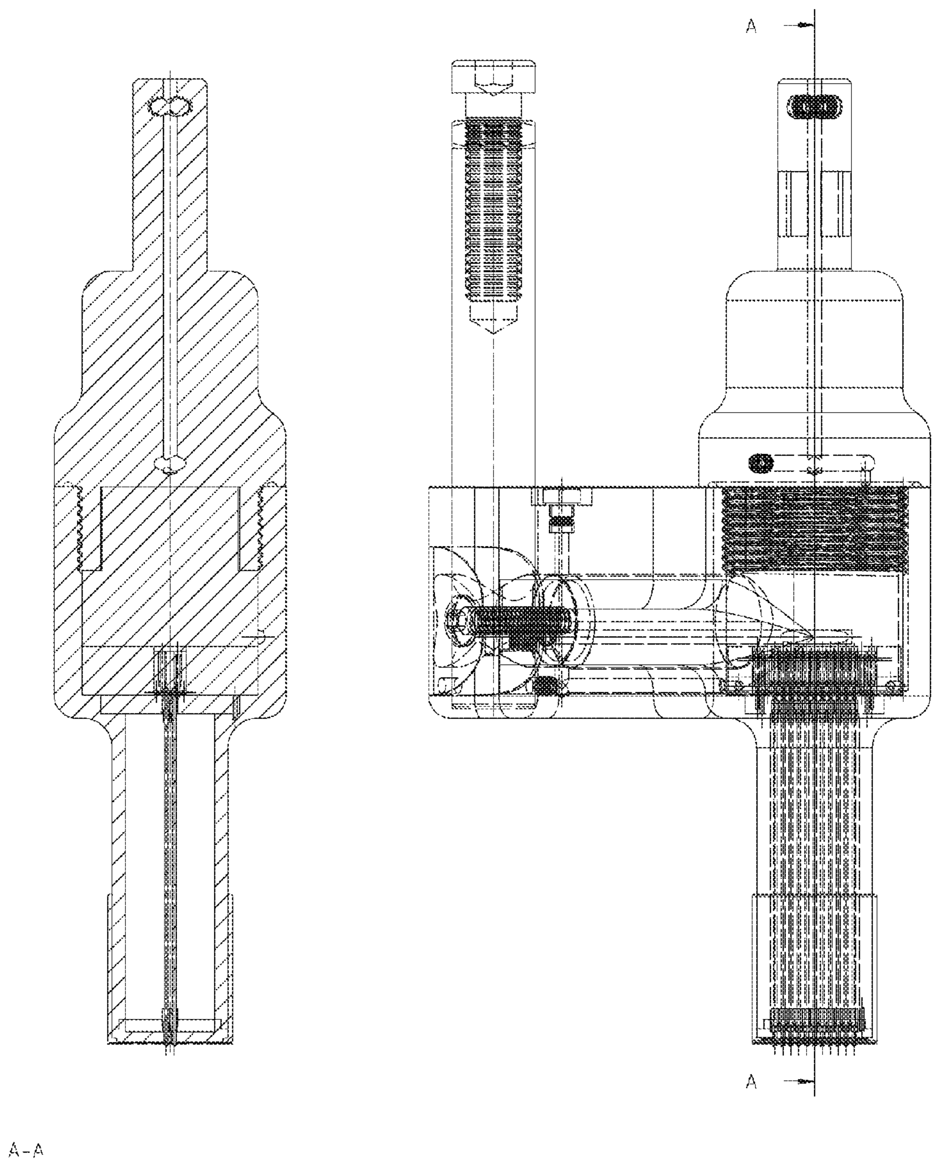
Figure 113:
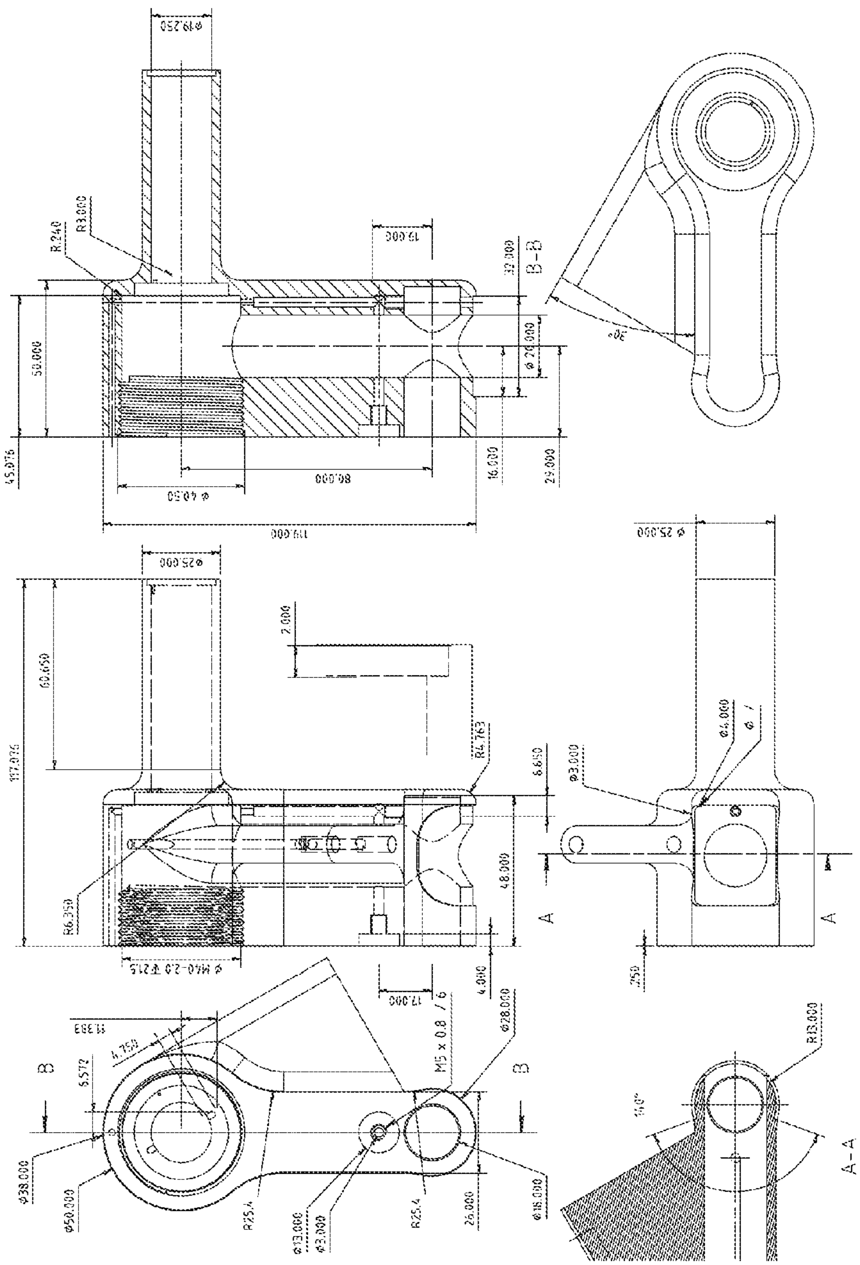

FIG. 110 through 112 are the orthogonal views of FIG. 107 and FIG. 113 are for the internal specific fabricated component for FIG. 107 with its corresponding bill of material listed in FIG. 114.

FIG. 115-122 for the optical communication of the rotationally secure tool being battery operated.

Figure 115:
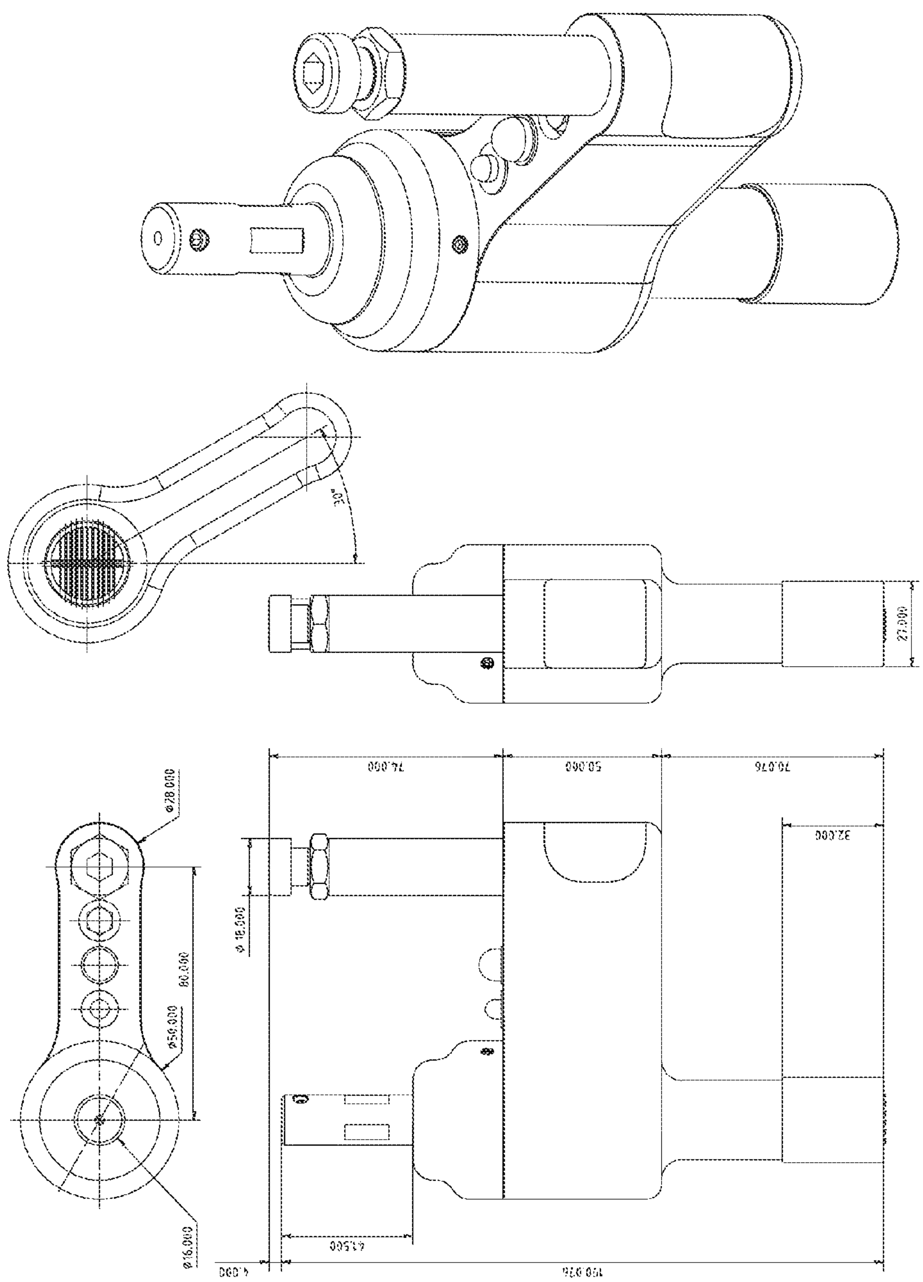

FIG. 115 shows the orthogonal and isometric views for the assembled battery powered optically programmable 2×11 detachable stylus guide engraving tool where the engraving tool's Ø16 mm mounting shaft is operably connected to the machine tool's spindle having the Ø18 mm rotational stop being operably connected to the machine tool's non-rotating spindle face mounted adapter.

Figure 116:
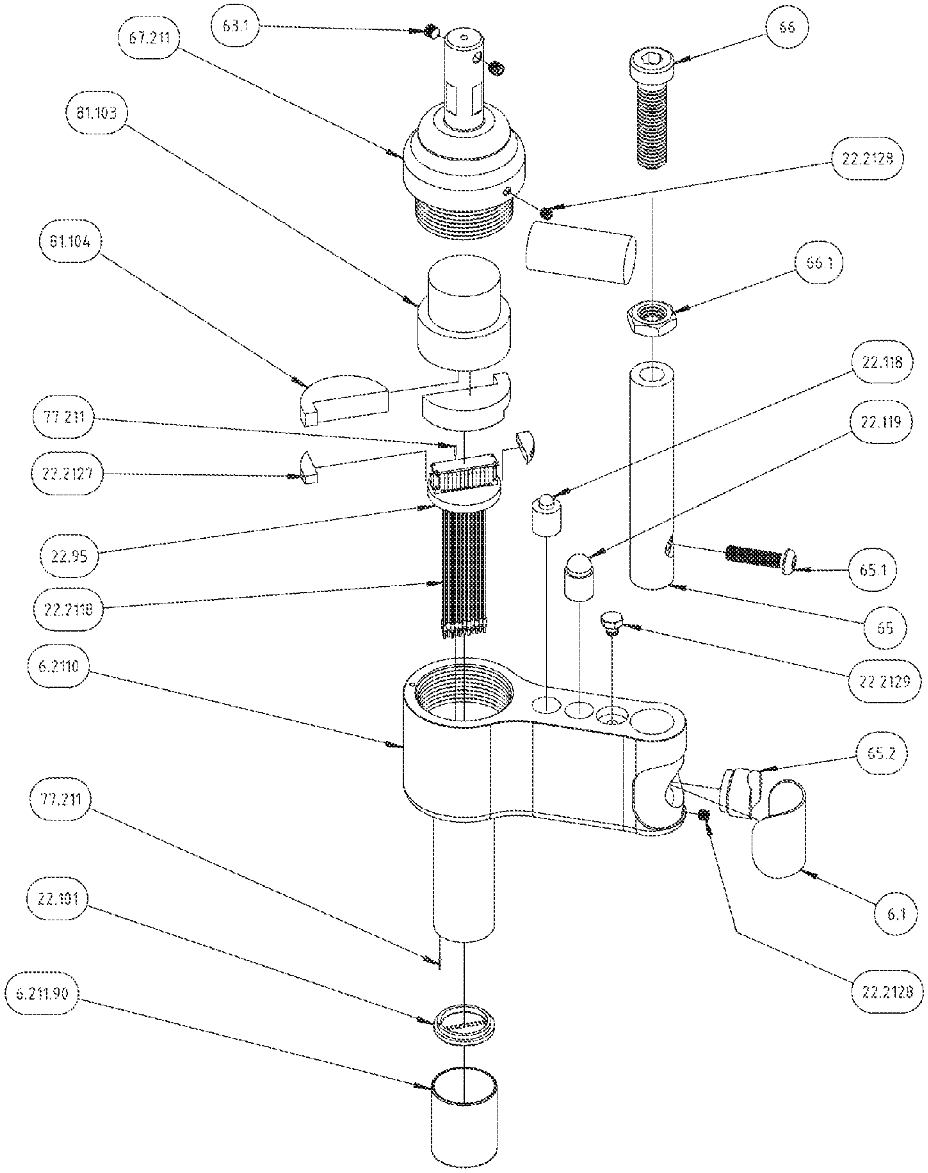
Figure 117:
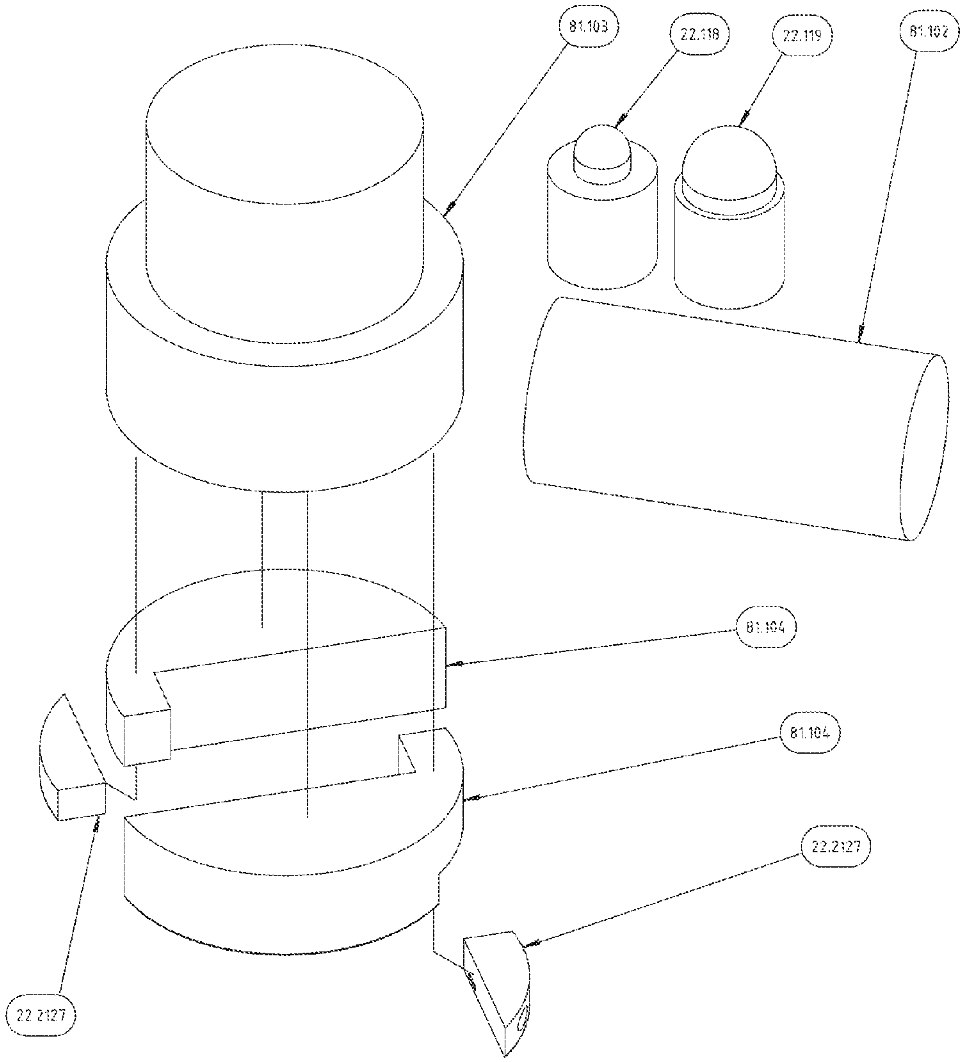

FIG. 116 is the exploded parts isometric view of the battery powered optically programmable 2×11 detachable stylus guide engraving tool having the main body 6.2110 enclosing the selectable stylus activation module 81.103 that receives its stylus selection commands optically via its IR receiver 22.119 and its corresponding acknowledgment via IR emitter 22.118 to the main control system via the equivalent of IR communications for the equivalent wireless control means as shown in FIGS. 61 through 64 while being mounted to the machine tool's spindle via shaft 67.211 having the having the engraving tool's internal selective stylus pneumatic valve activation solenoid modules 81.104 being connected to the control module 81.103 while being powered by an internal battery 81.102 as shown in FIG. 117.

Figure 118:
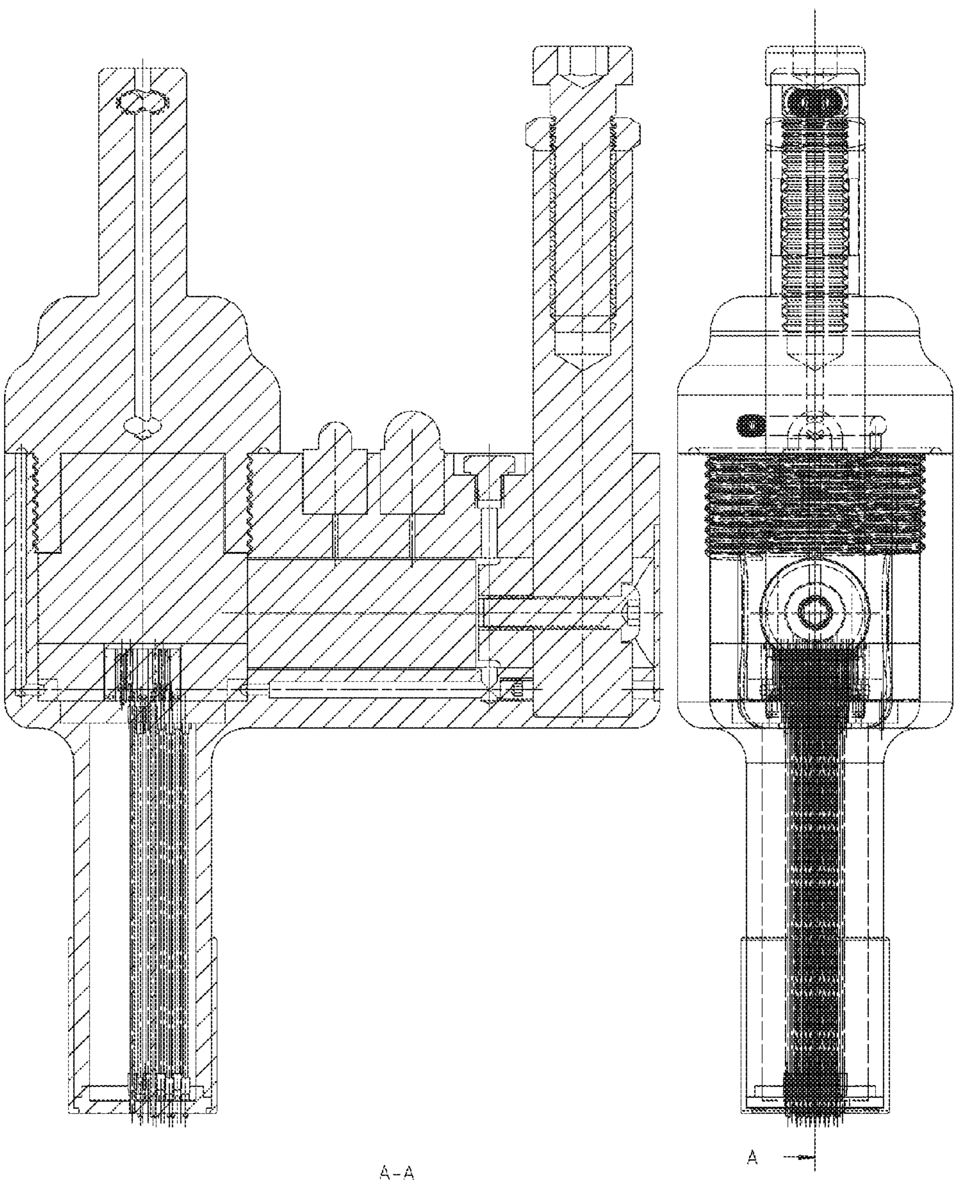
Figure 119:
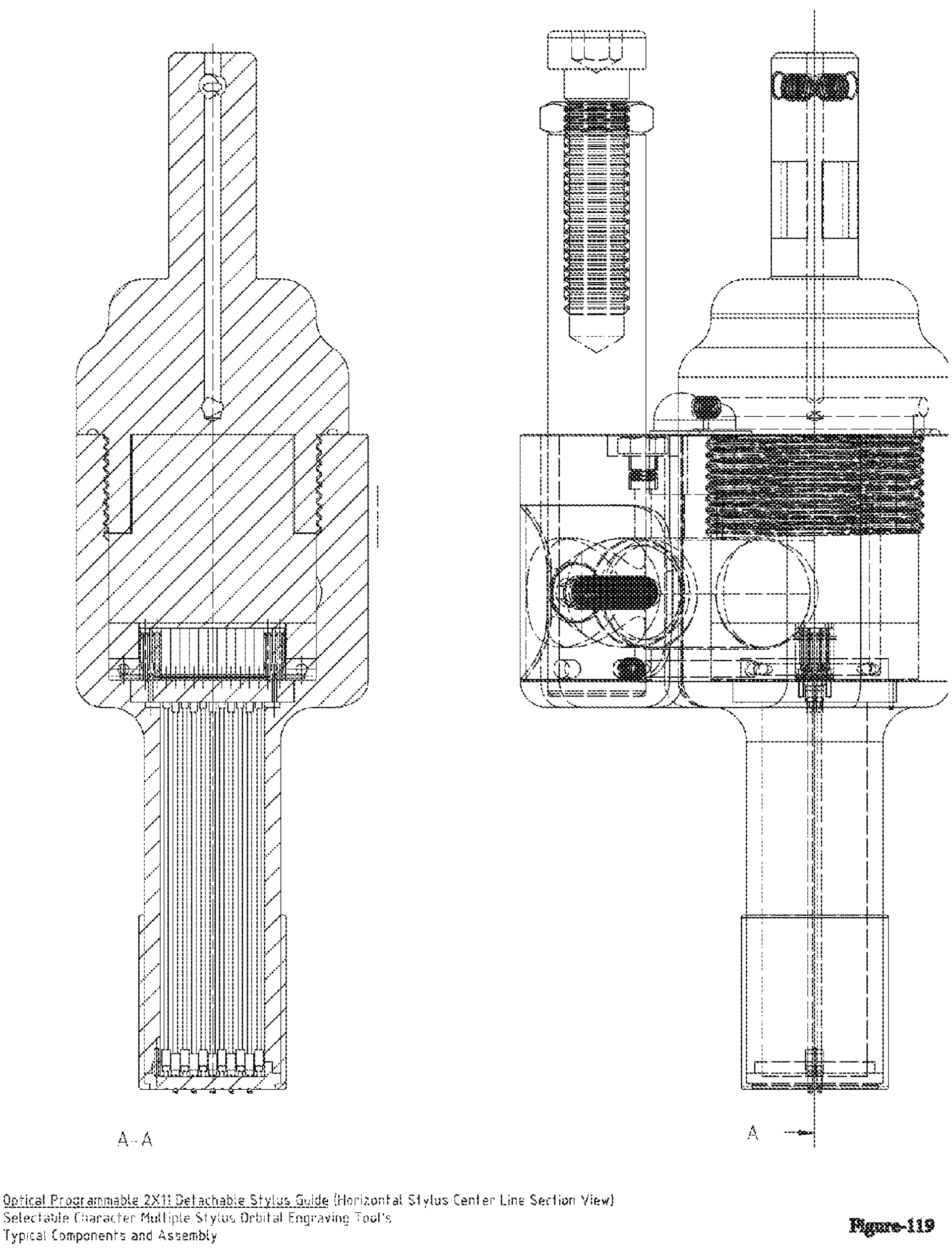
Figure 120:
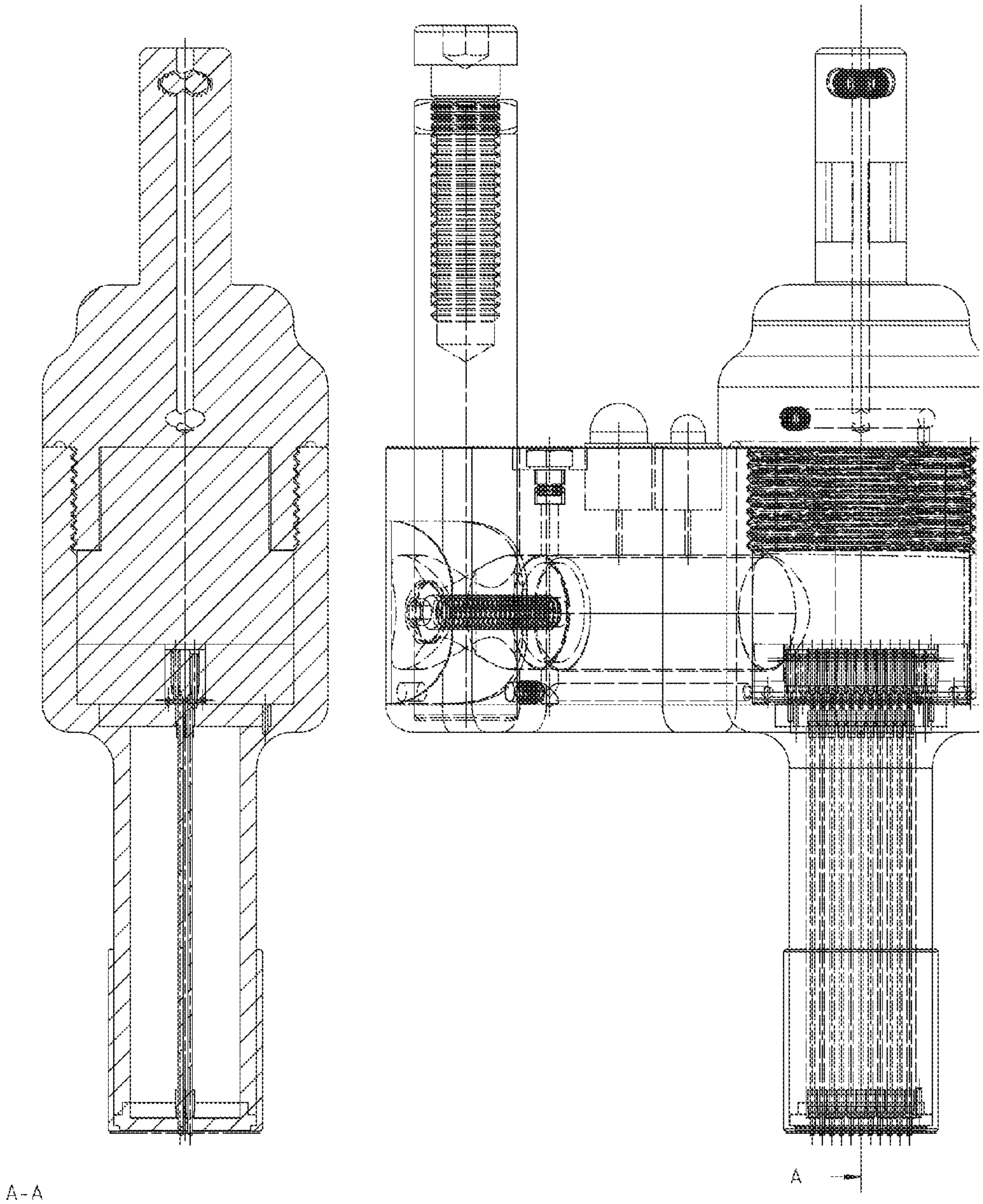
Figure 121:
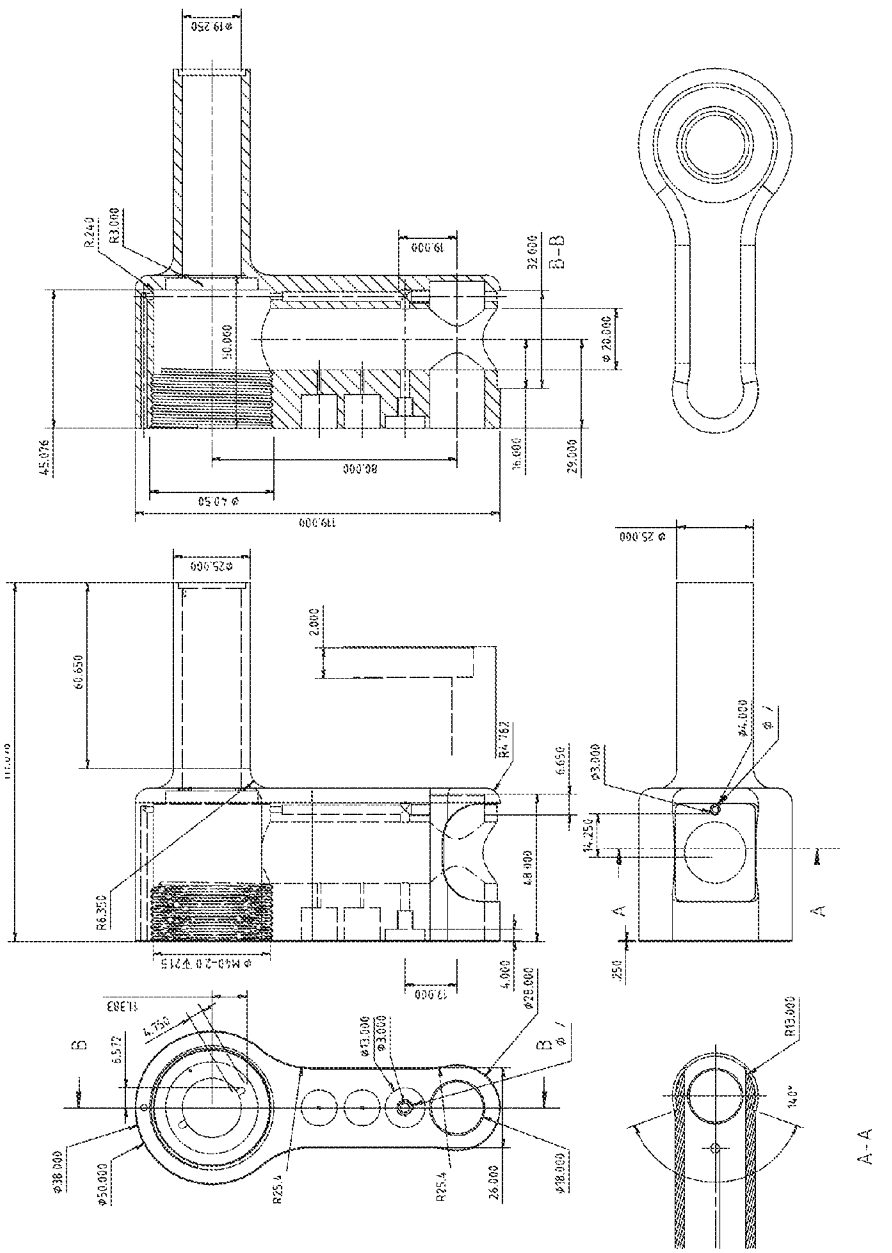

FIG. 118 through 120 are the orthogonal views of FIG. 115 and FIG. 121 are for the internal specific fabricated component for FIG. 115 with its corresponding bill of material listed in FIG. 122.

FIG. 123-130 for the optical communication of the rotationally secure tool being operated by a system rechargeable battery.

Figure 123:
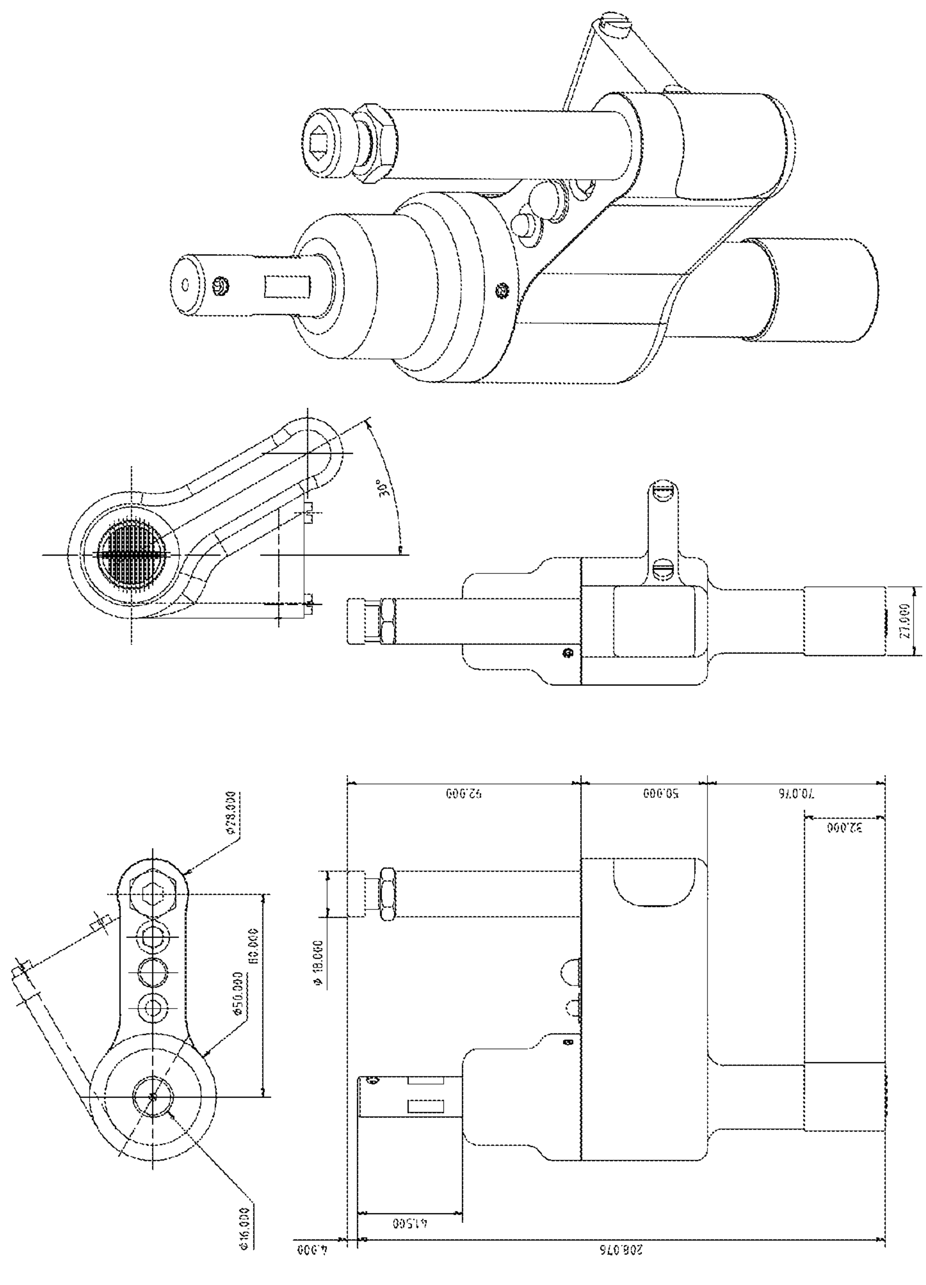

FIG. 123 shows the orthogonal and isometric views for the assembled rechargeable battery powered optically programmable 2×11 detachable stylus guide engraving tool where the engraving tool's Ø16 mm mounting shaft is operably connected to the machine tool's spindle having the Ø18 mm rotational stop being operably connected to the machine tool's non-rotating spindle face mounted adapter.

Figure 124:
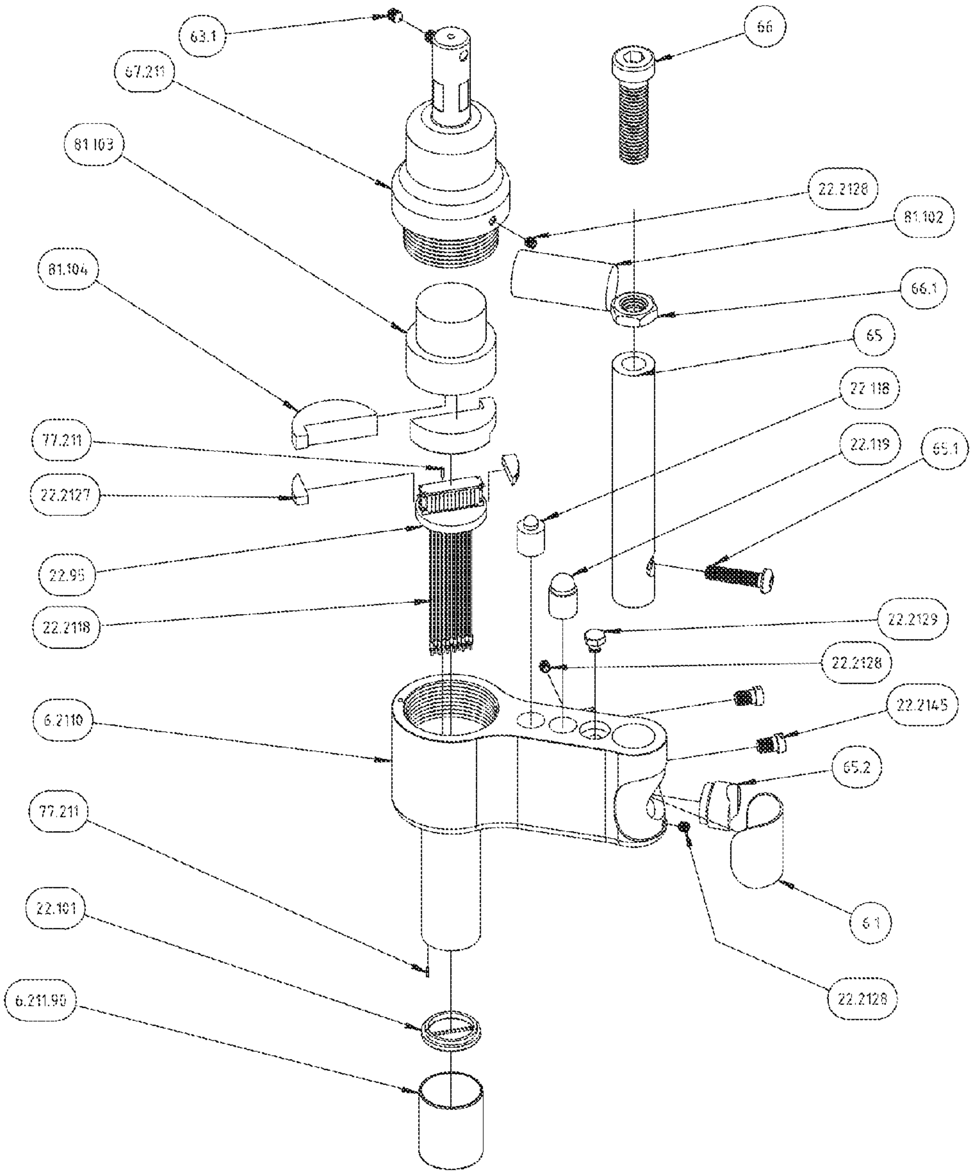
Figure 125:
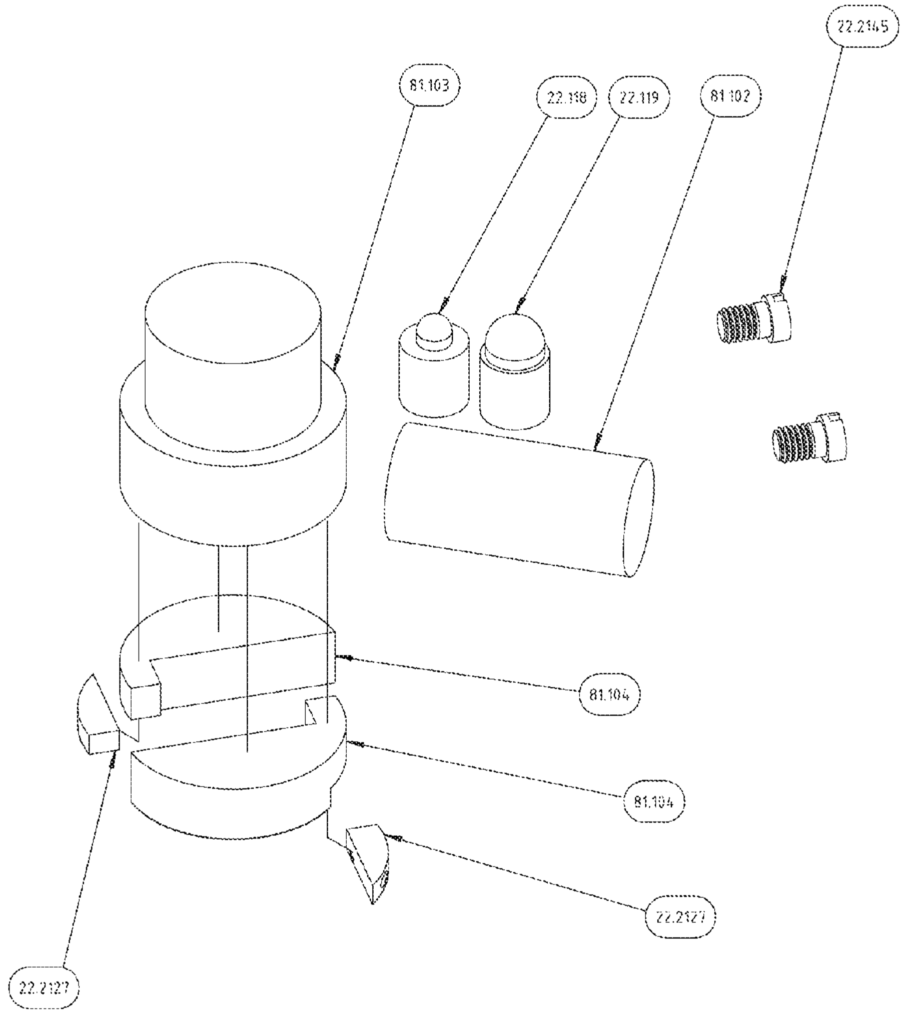

FIG. 124 is the exploded parts isometric view of the battery powered optically programmable 2×11 detachable stylus guide engraving tool having the main body 6.2110 enclosing the selectable stylus activation module 81.103 that receives its stylus selection commands optically via its IR receiver 22.119 and its corresponding acknowledgment via IR emitter 22.118 to the main control system via the equivalent of IR communications for the equivalent wireless control means as shown in FIGS. 61 through 64 while being mounted to the machine tool's spindle via shaft 67.211 having the having the engraving tool's internal selective stylus pneumatic valve activation solenoid modules 81.104 being connected to the control module 81.103 while being powered by an internal battery 81.102 as shown in FIG. 125 that is rechargeable via contacts 22.2145.

Figure 126:
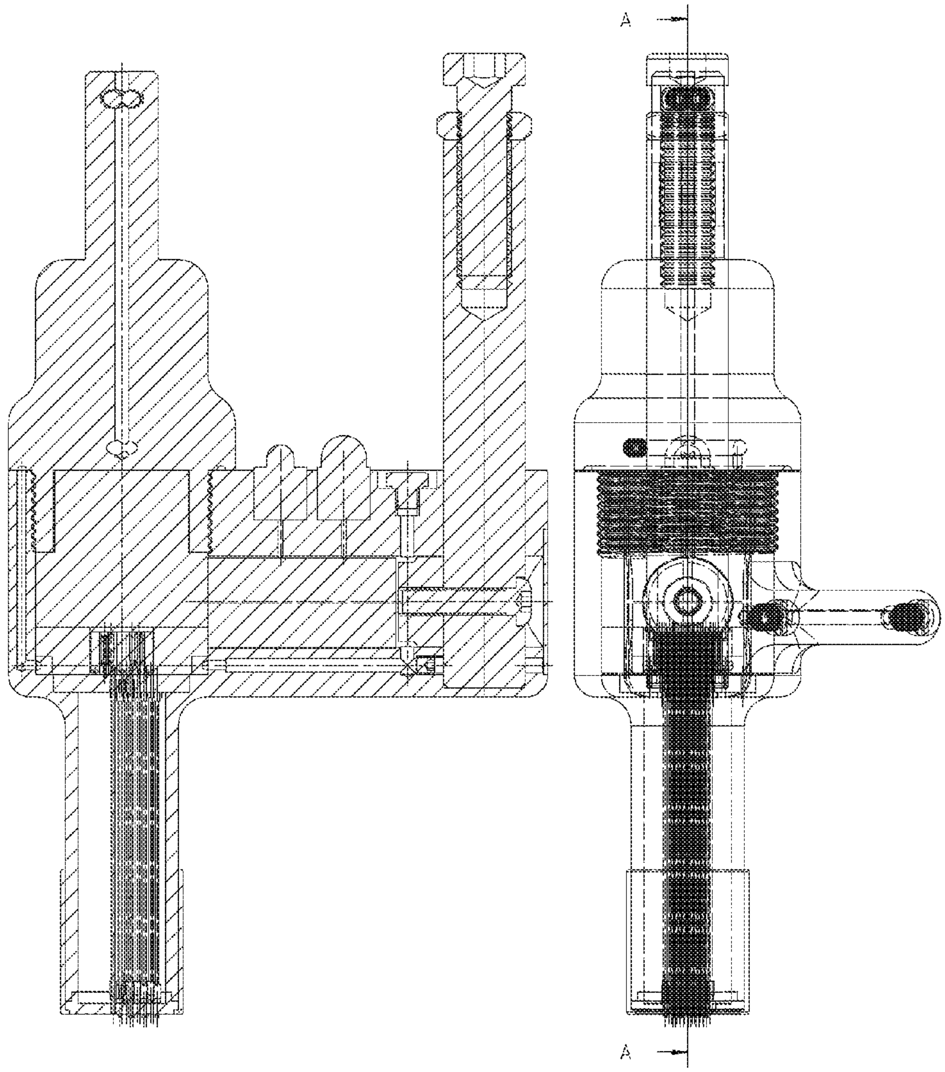
Figure 127:
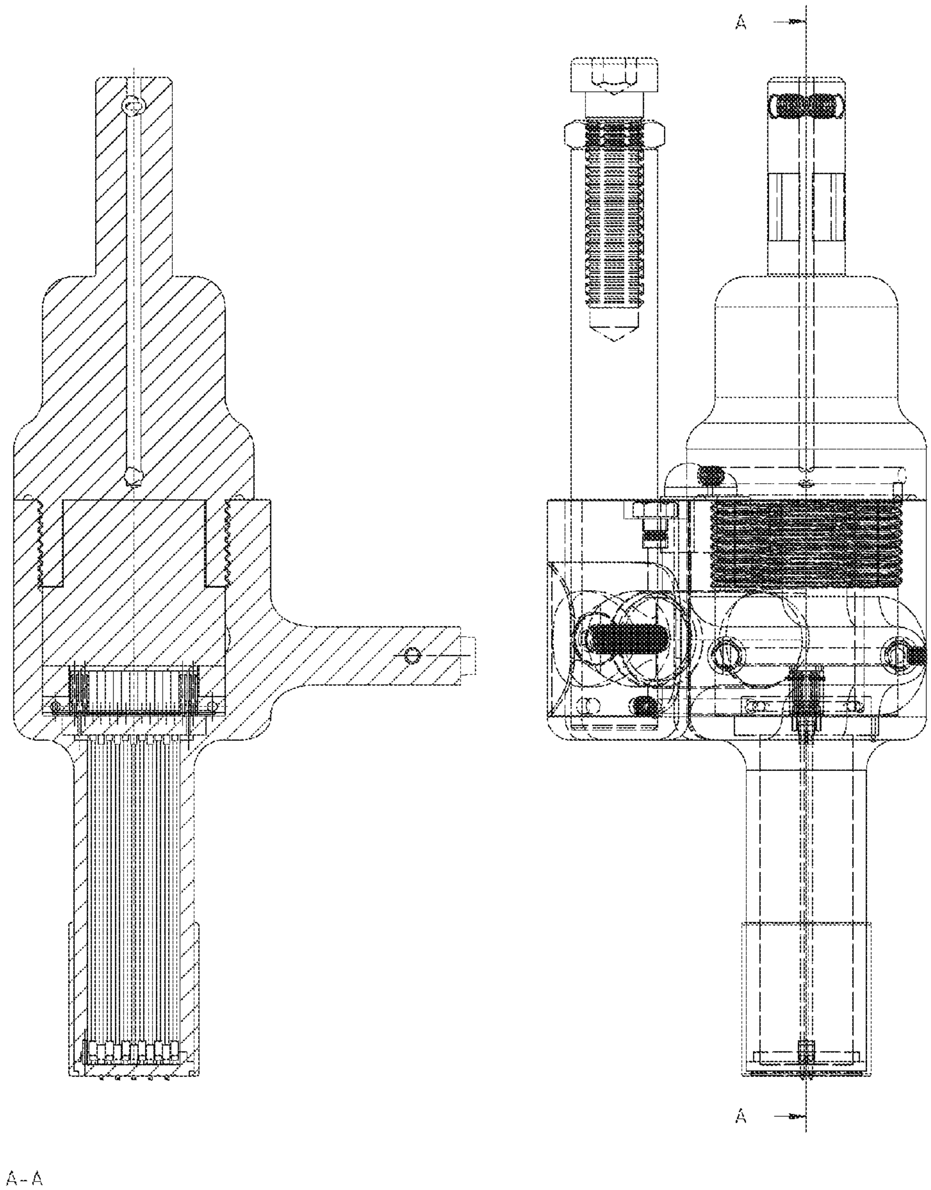
Figure 128:
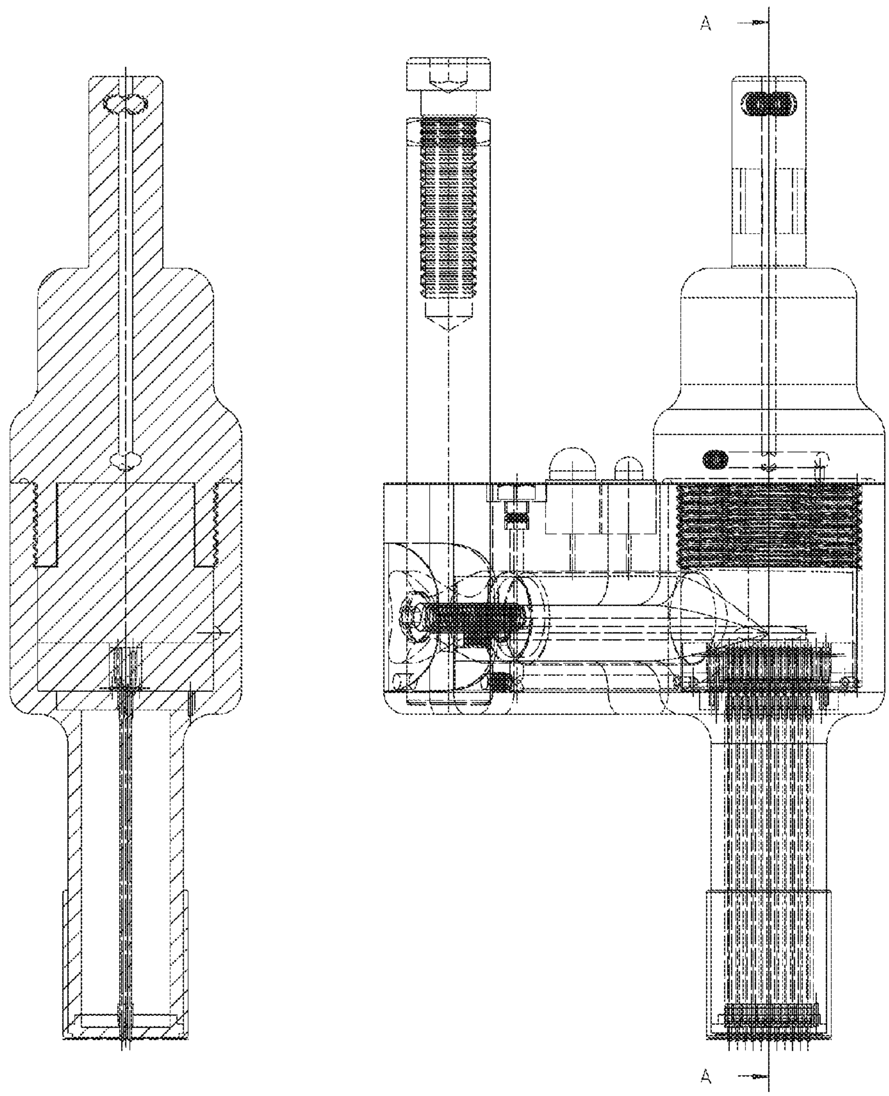
Figure 129:
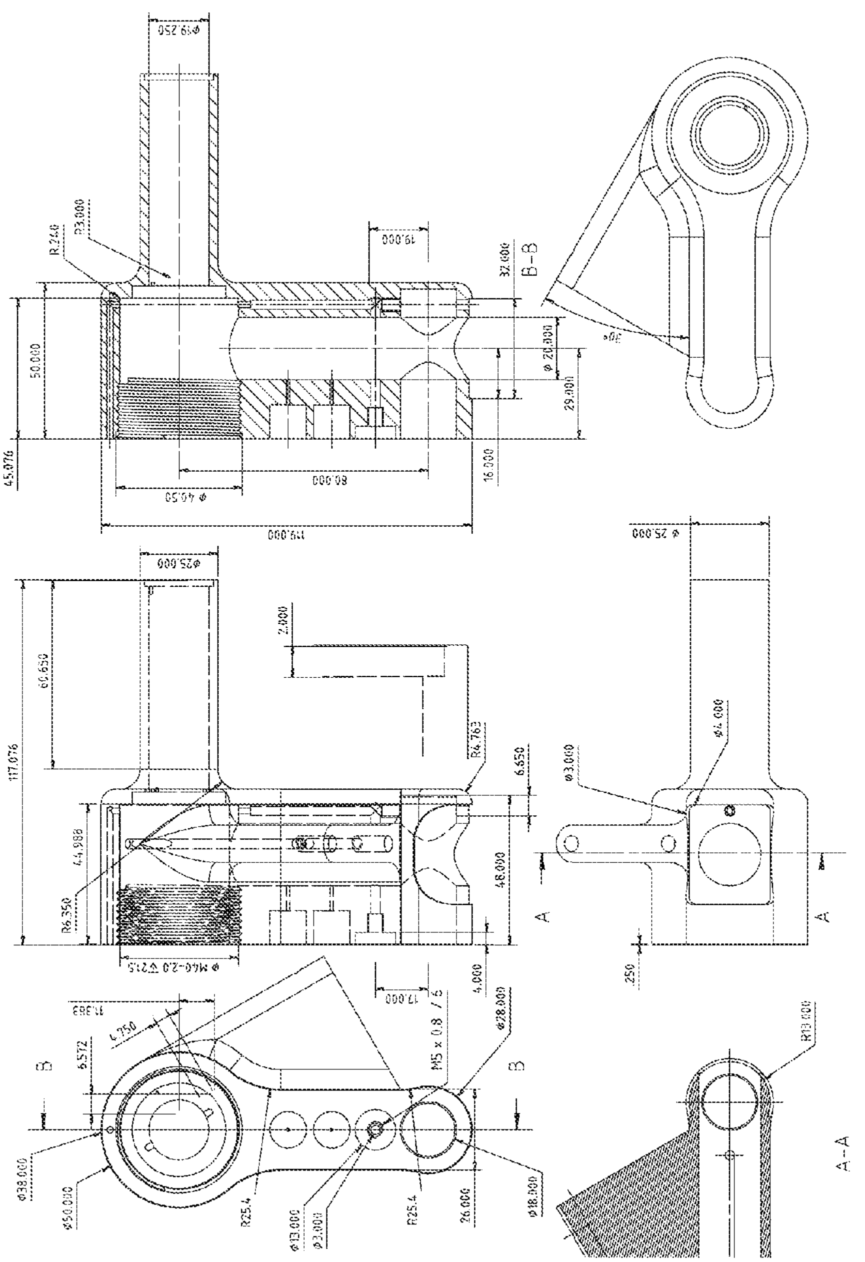

FIGS. 126 through 128 are the orthogonal views of FIG. 123 and FIG. 129 are for the internal specific fabricated component for FIG. 123 with its corresponding bill of material listed in FIG. 130.

FIG. 131-138 for the spindle-rotation of the rotationally secure tool being operated by a system rechargeable battery.

Figure 131:
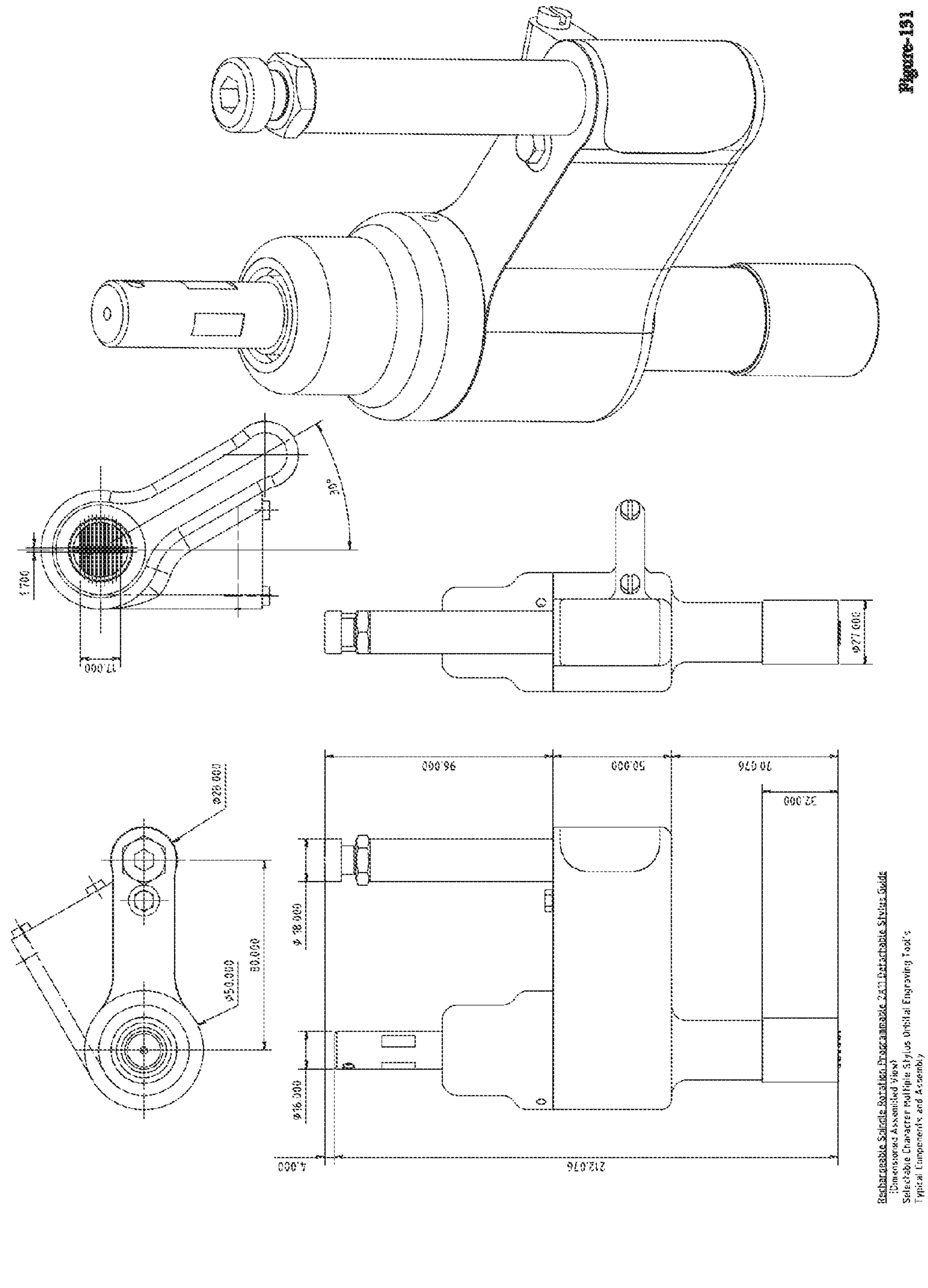

FIG. 131 shows the orthogonal and isometric views for the assembled for the rechargeable battery powered spindle rotation programmable 2×11 detachable stylus guide engraving tool where the engraving tool's Ø16 mm mounting/Rotational control shaft is operably connected to the machine tool's rotatable spindle having the Ø 18 mm rotational stop being operably connected to the machine tool's non-rotating spindle face mounted adapter. Having the engraving tool's Ø16 mm mounting/Rotational control shaft being rotated by the machine tool spindle to operably select the styluses engraved character pattern as shown in FIG. 60.

Figure 132:
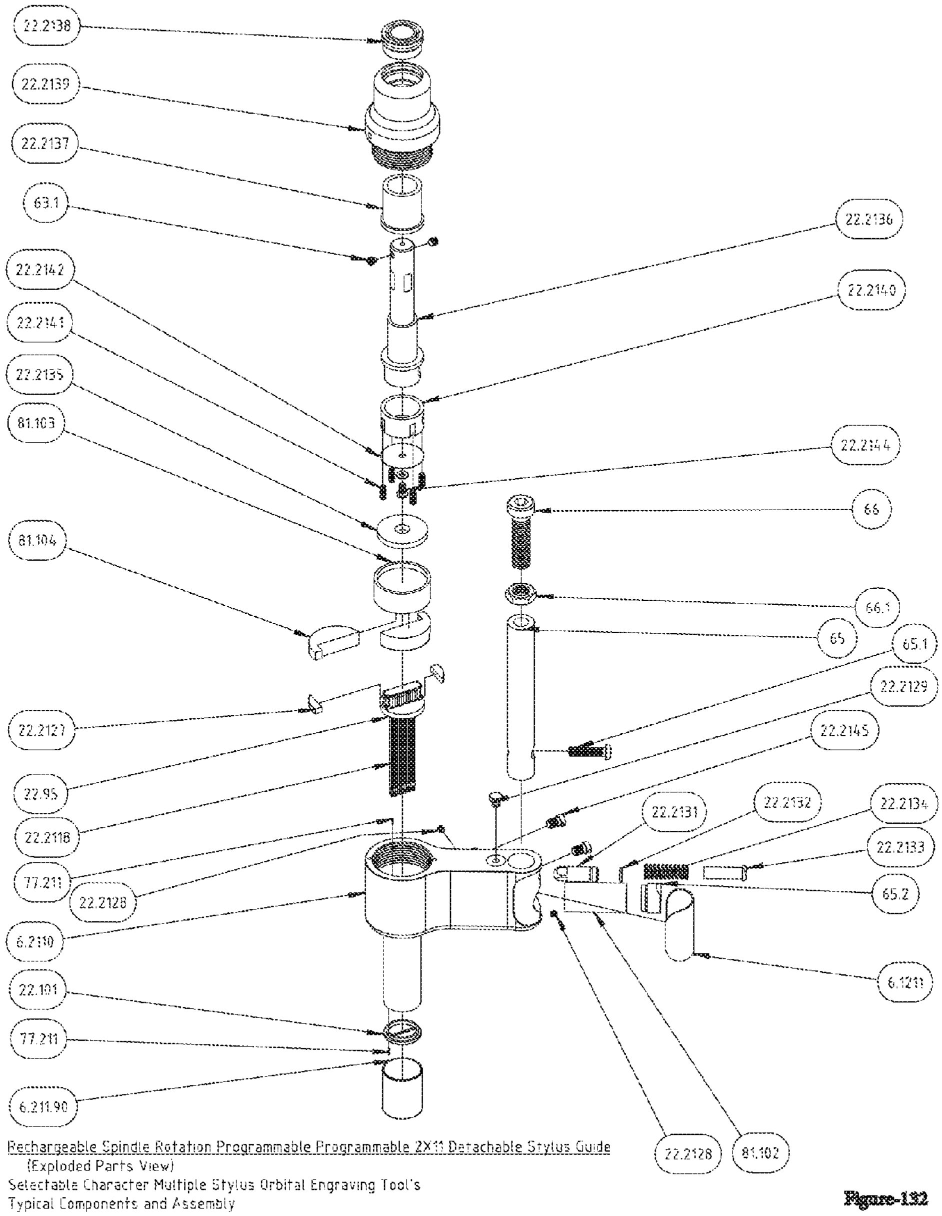
Figure 133:
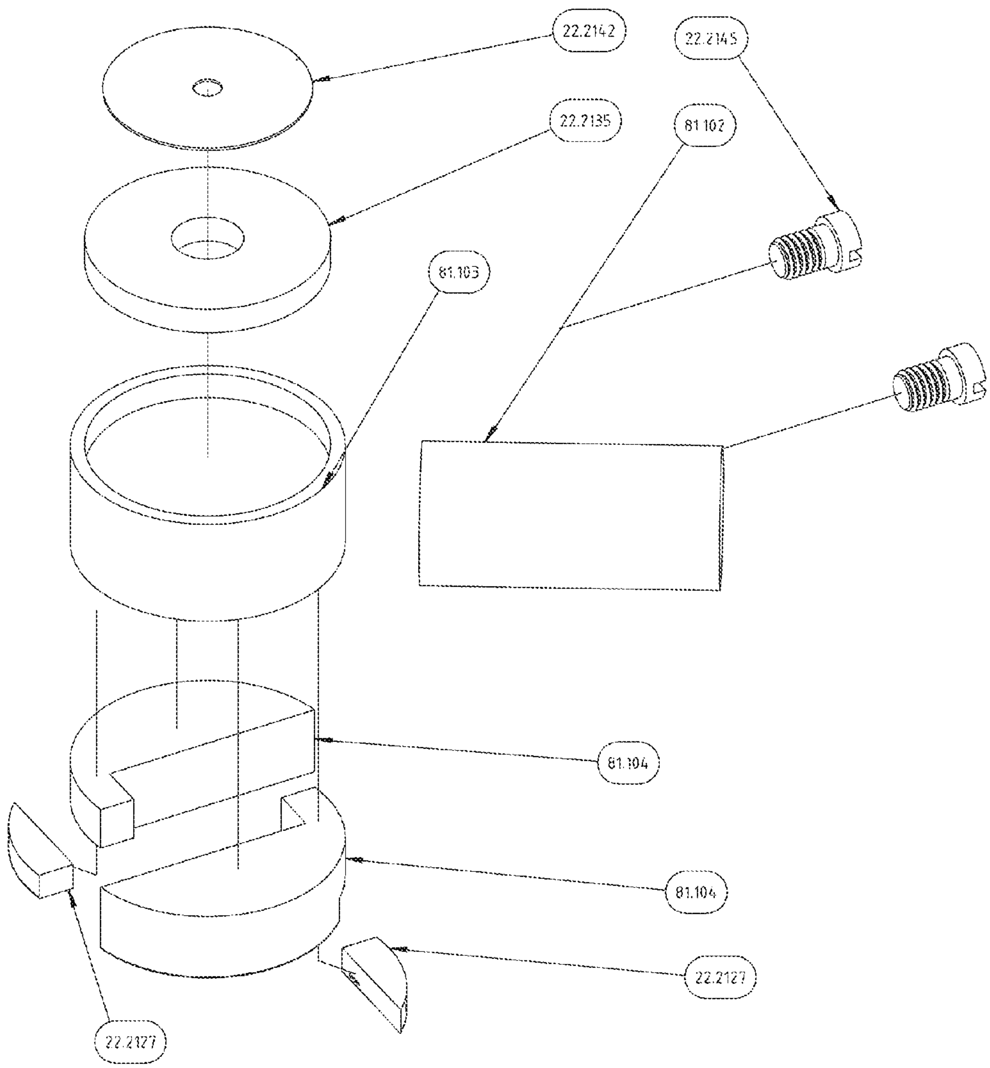

FIG. 132 is the exploded parts isometric view of the rotation programmable 2×11 detachable stylus guide engraving tool having the main body 6.2110 enclosing the selectable stylus activation module 81.103 that receives its rotational position signal via encoder 22.2135 from the encoder disk 22.2142 that is connected to the engraving tool's Ø16 mm mounting/Rotational control shaft 22.2136 having the having the engraving tool's internal selective stylus pneumatic valve activation solenoid modules 81.104 being connected to the wireless control module 81.103 while being powered by an internal battery 81.102 as shown in FIG. 133 that is rechargeable via contacts 22.2145.

Figure 134:
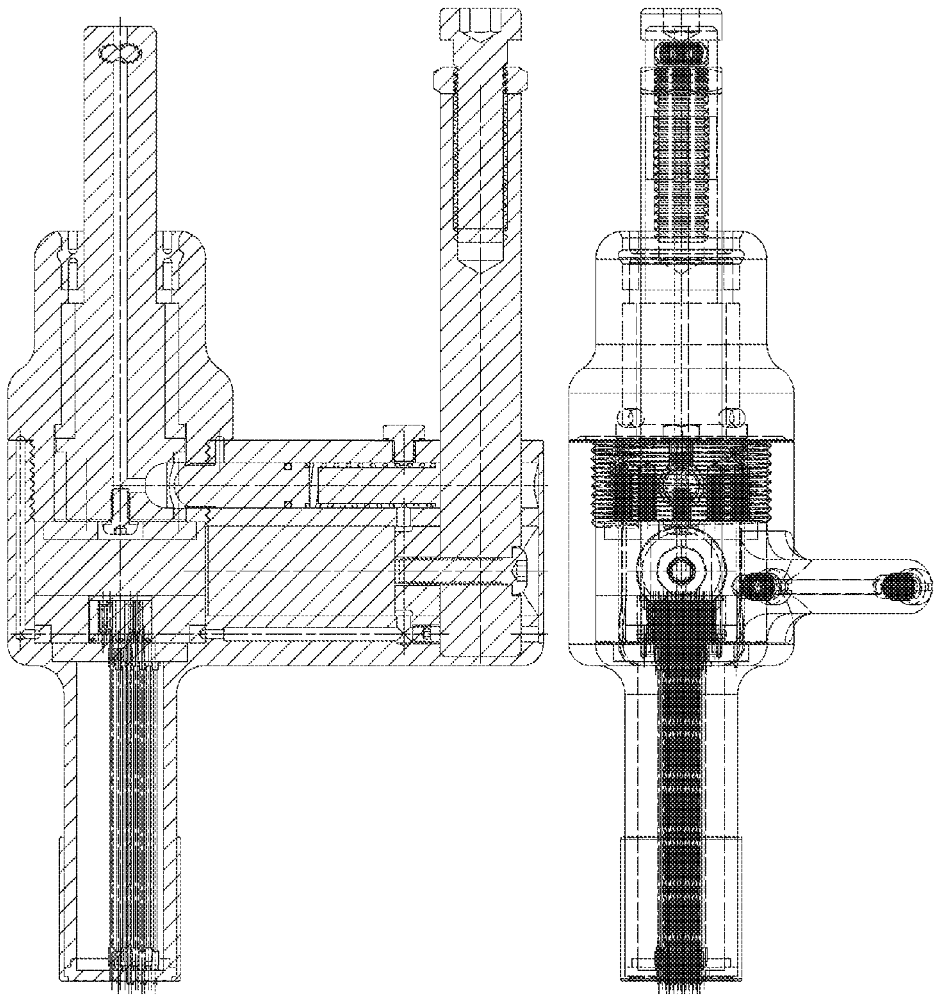
Figure 135:
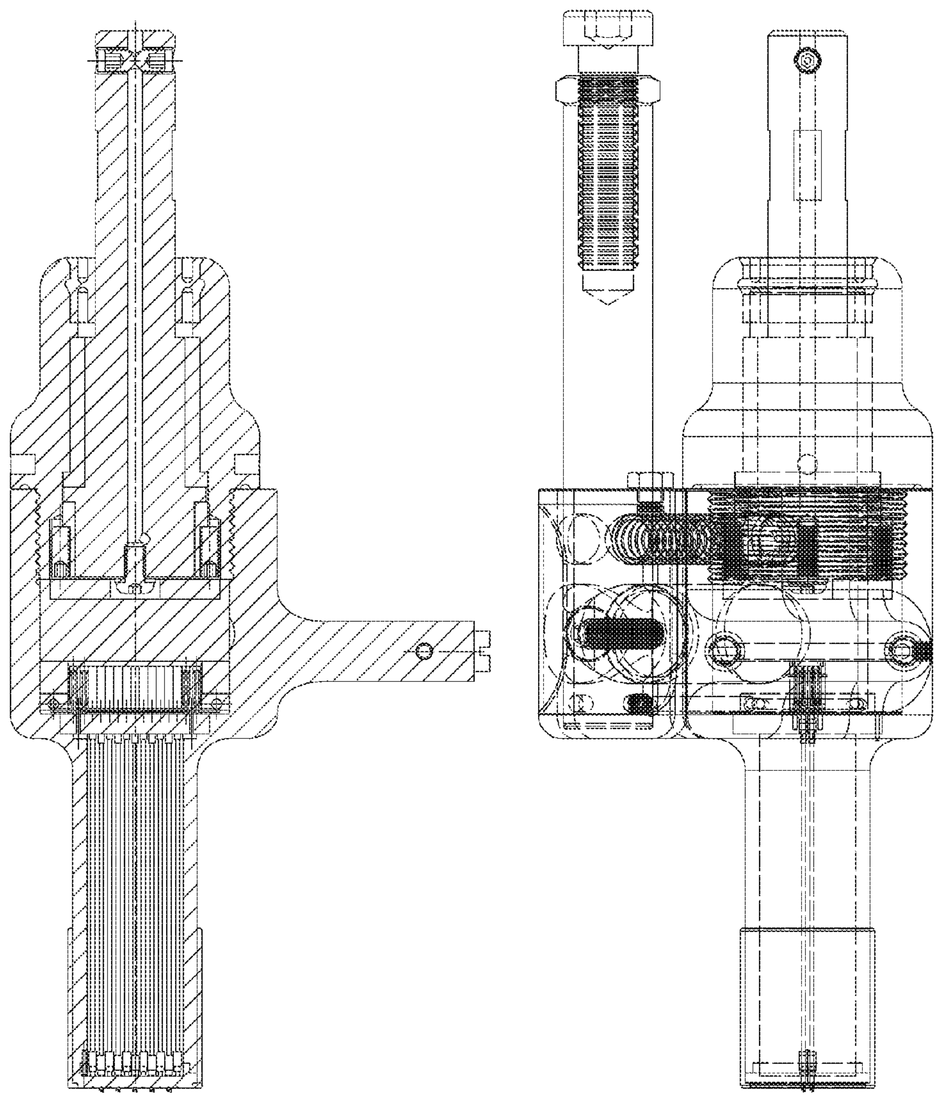
Figure 136:
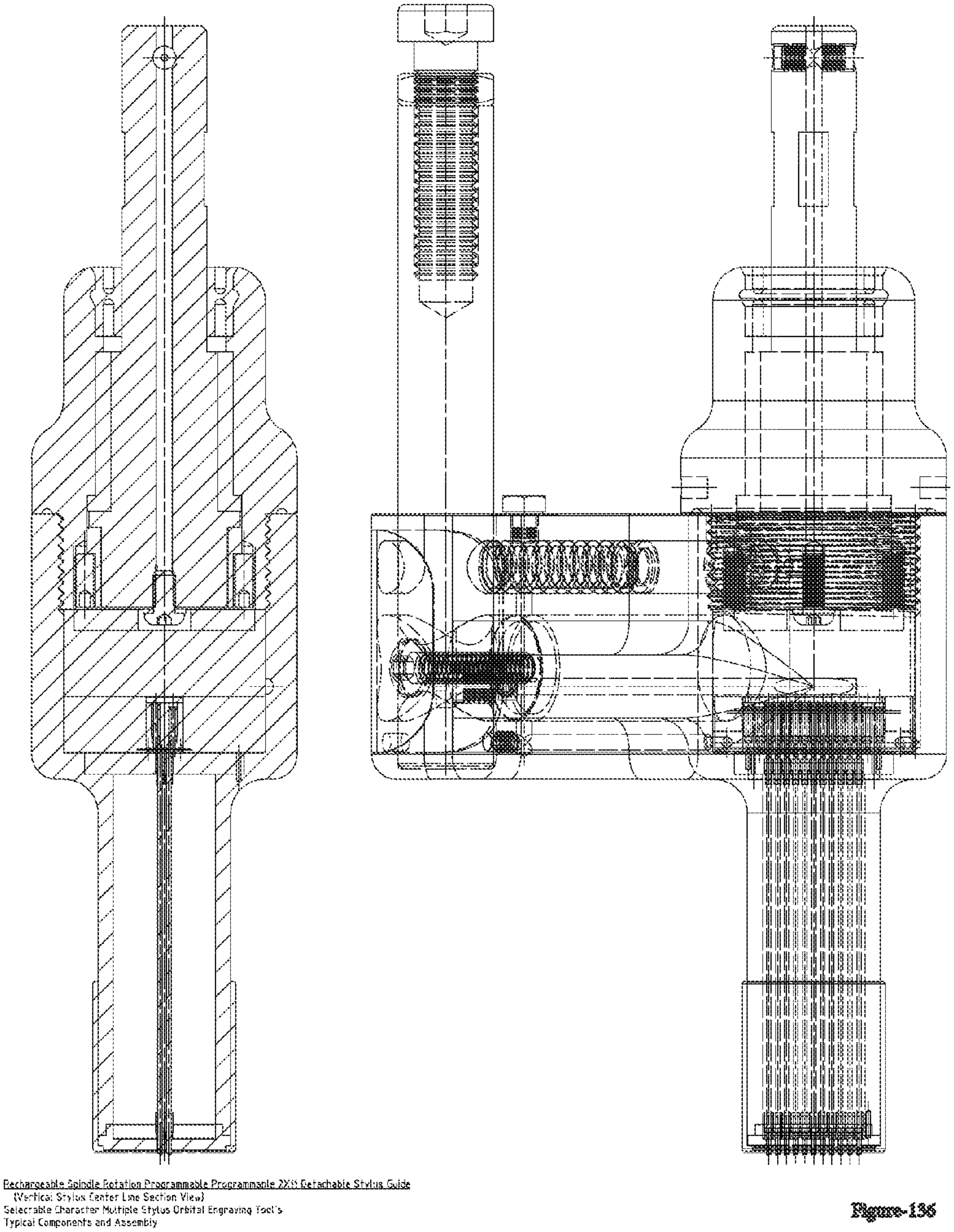
Figure 137:
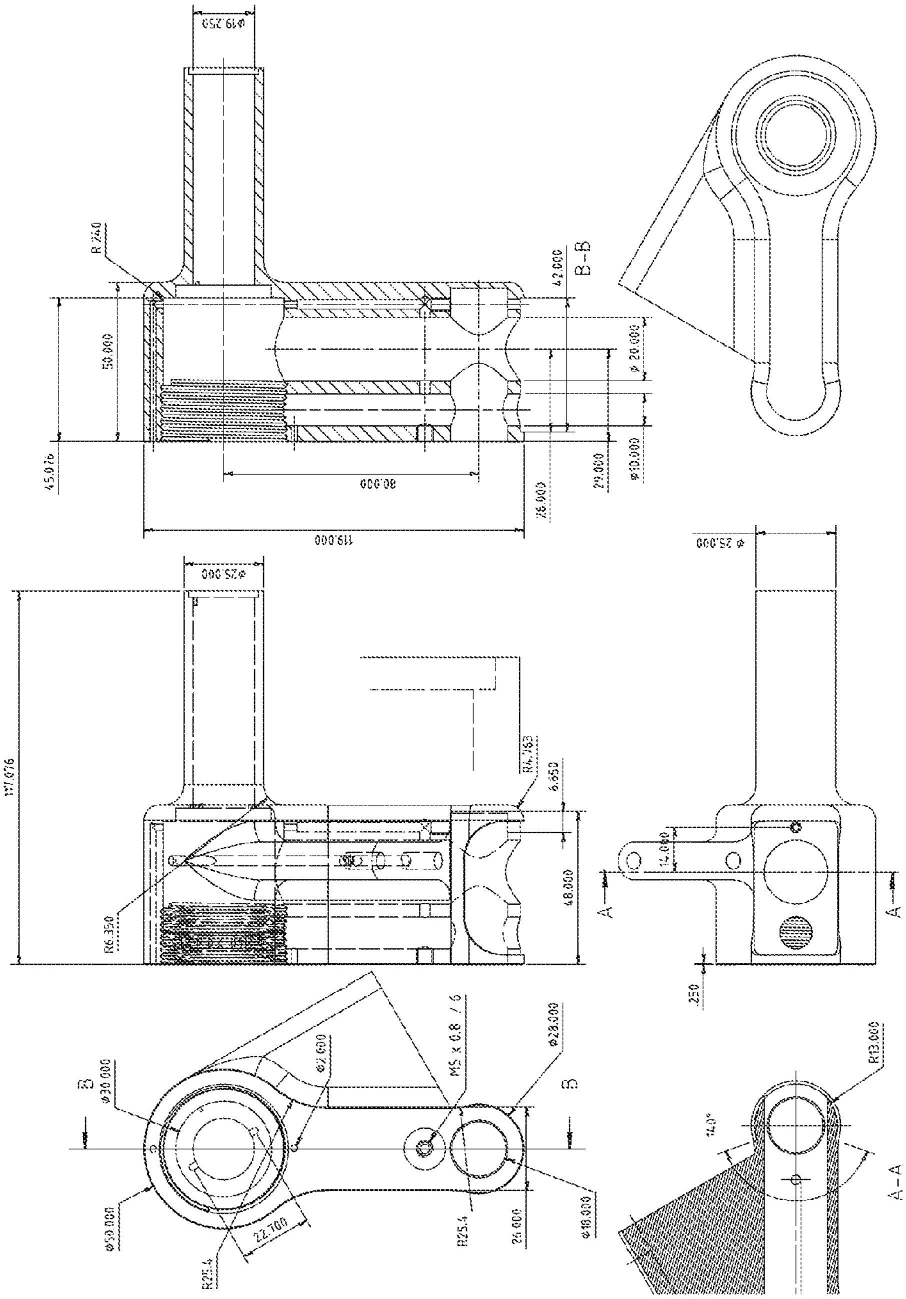

FIGS. 134 through 136 are the orthogonal views of FIG. 131 and FIG. 137 are for the internal specific fabricated component for FIG. 131 with its corresponding bill of material listed in FIG. 138.

FIG. 139-146 for the spindle-tool rotation of the "rotatable for selection" tool being operated by a system rechargeable battery.

Figure 139:
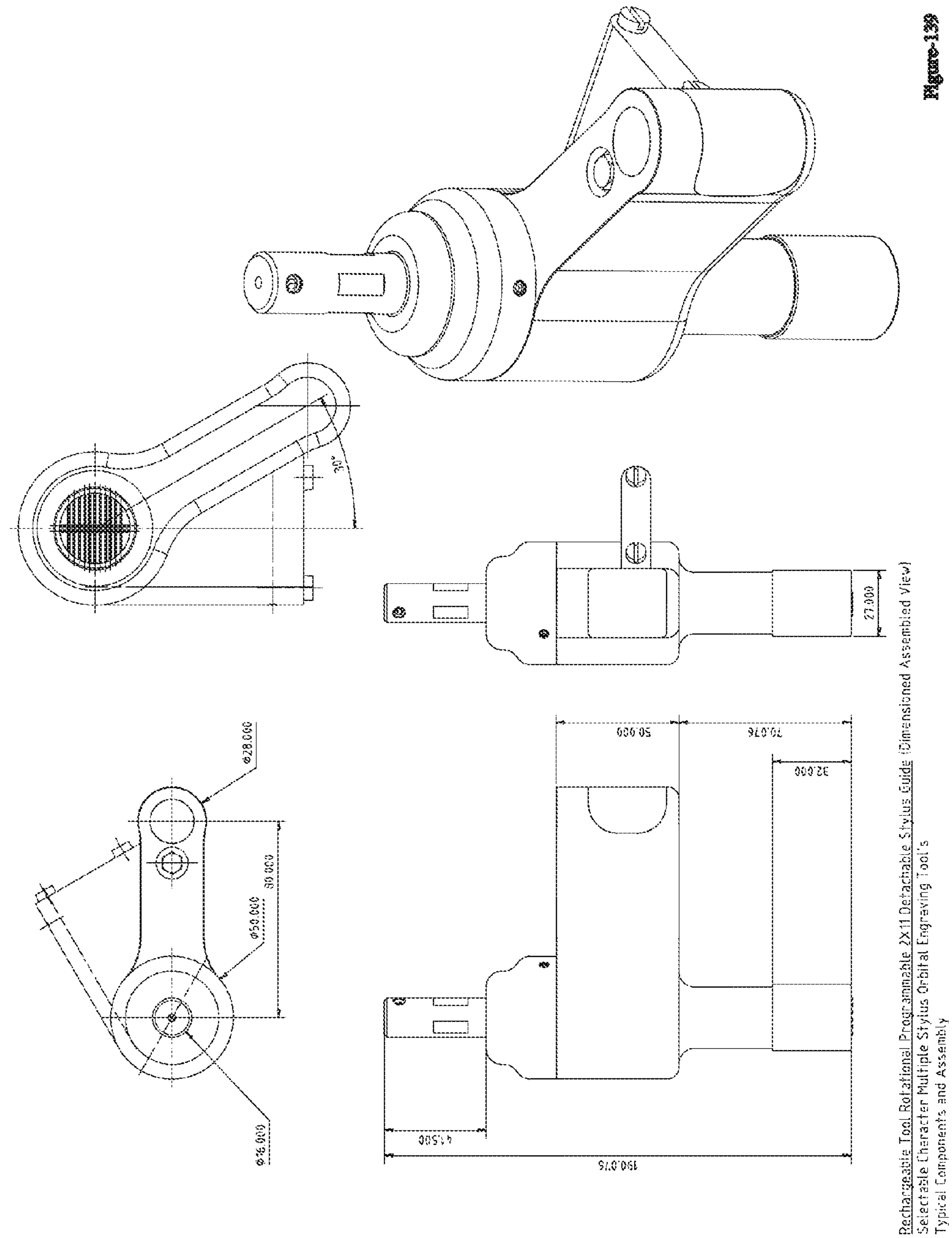

FIG. 139 shows the orthogonal and isometric views for the assembled for the rechargeable battery powered engraving tool rotation programmable 2×11 detachable stylus guide engraving tool where the engraving tool's Ø16 mm mounting shaft is operably connected to the machine tool's rotatable spindle. Having the engraving tool's Ø16 mm mounting shaft being rotated by the machine tool spindle to rotate the engraving tool to operably select the styluses engraved character pattern as shown in FIG. 60.

Figure 140:
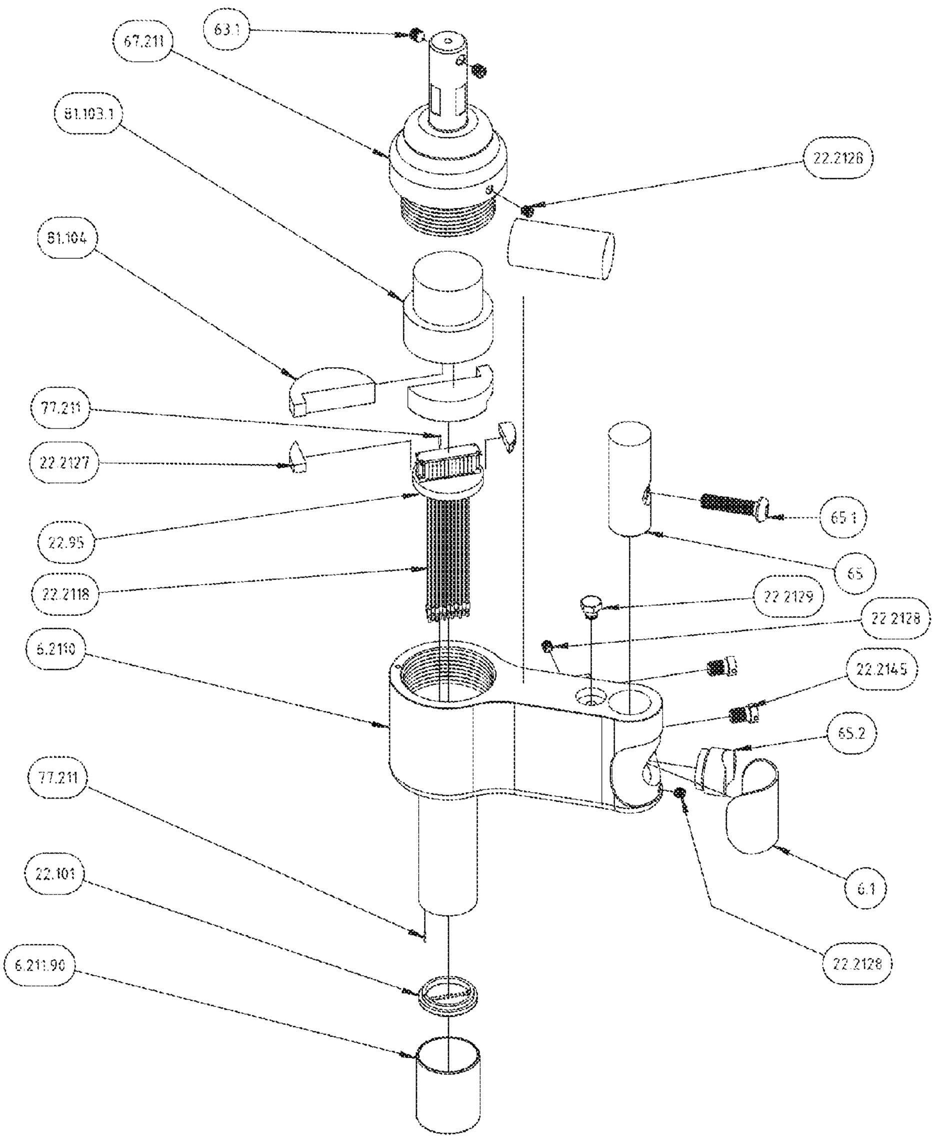
Figure 141:
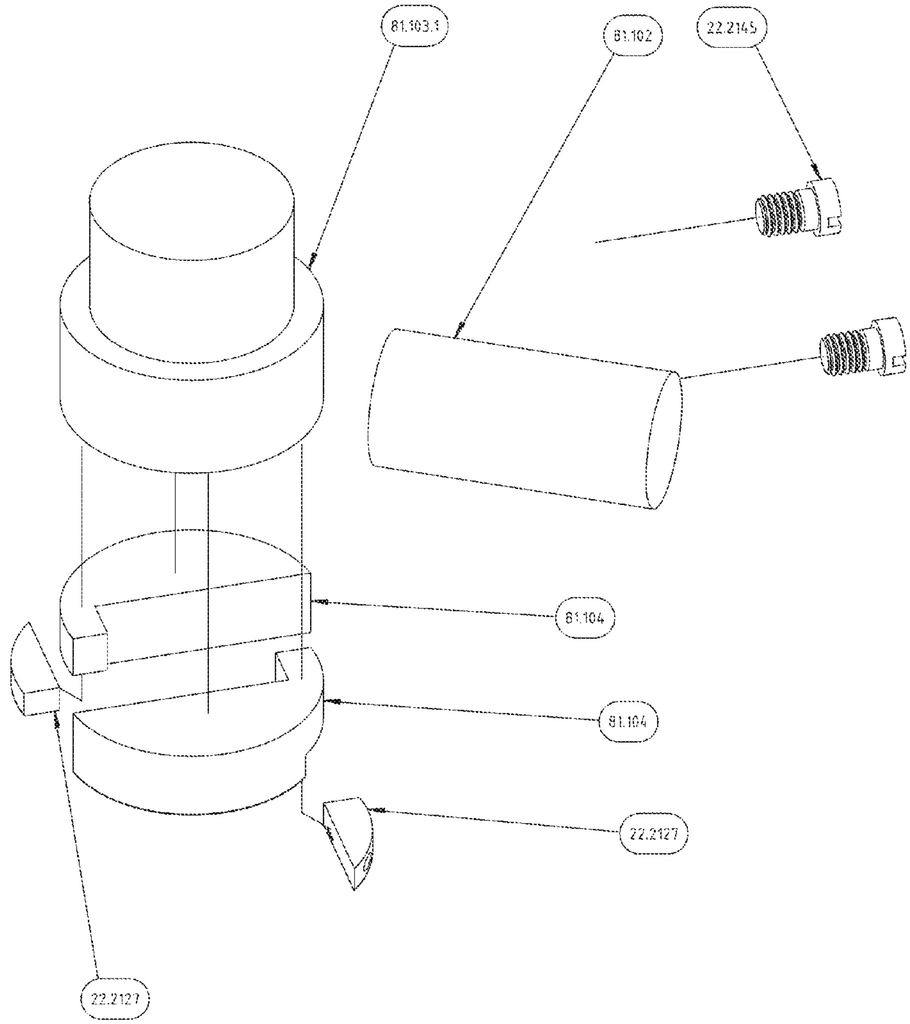

FIG. 140 is the exploded parts isometric view of the rotation programmable 2×11 detachable stylus guide engraving tool having the main body 6.2110 enclosing the selectable stylus activation module 81.103.1 that receives its rotational position signal via an internal Rotational inclination positional encoder is rotationally sensitive to the Rotational orientation and direction of the engraving tool while being mounted to the machine tool's spindle via shaft 67.211 having the having the engraving tool's internal selective stylus pneumatic valve activation solenoid modules 81.104 being connected to the control module 81.103.1 while being powered by an internal battery 81.102 as shown in FIG. 141 that is rechargeable via contacts 22.2145.

Figure 142:
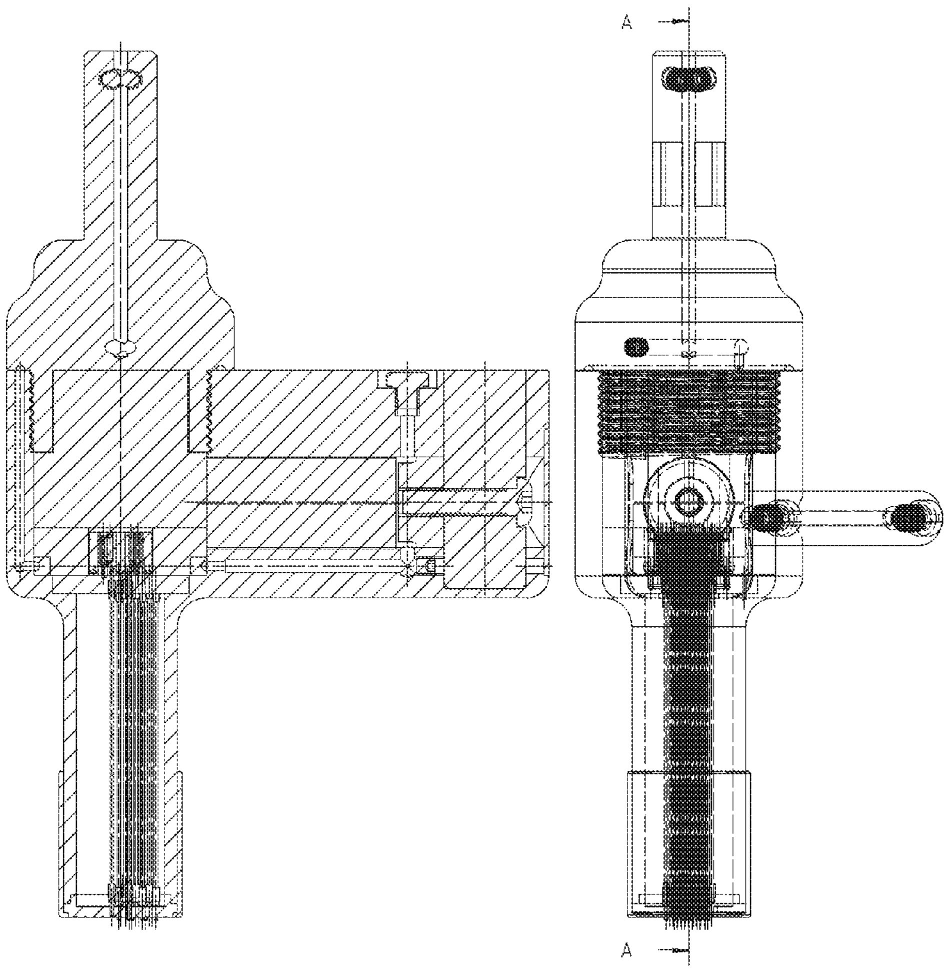
Figure 143:
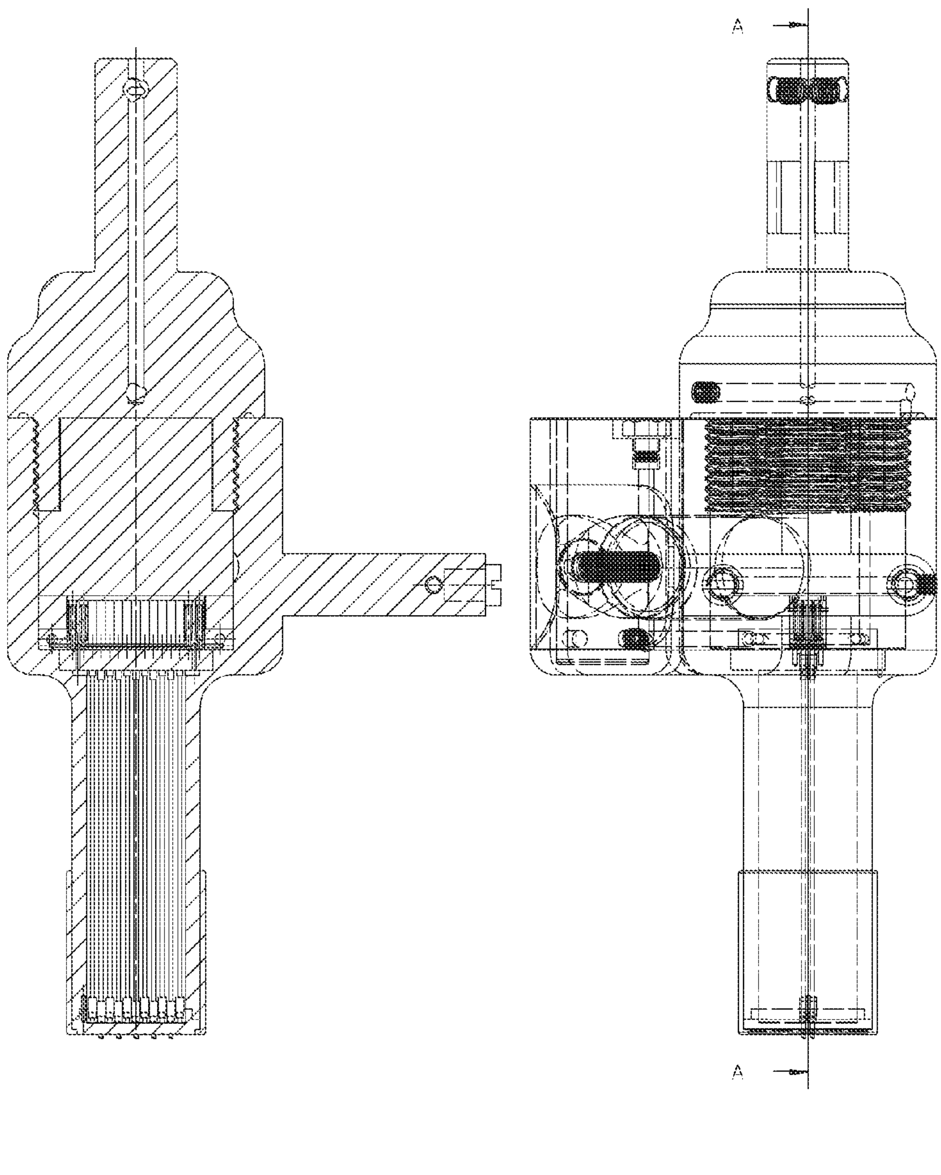
Figure 144:
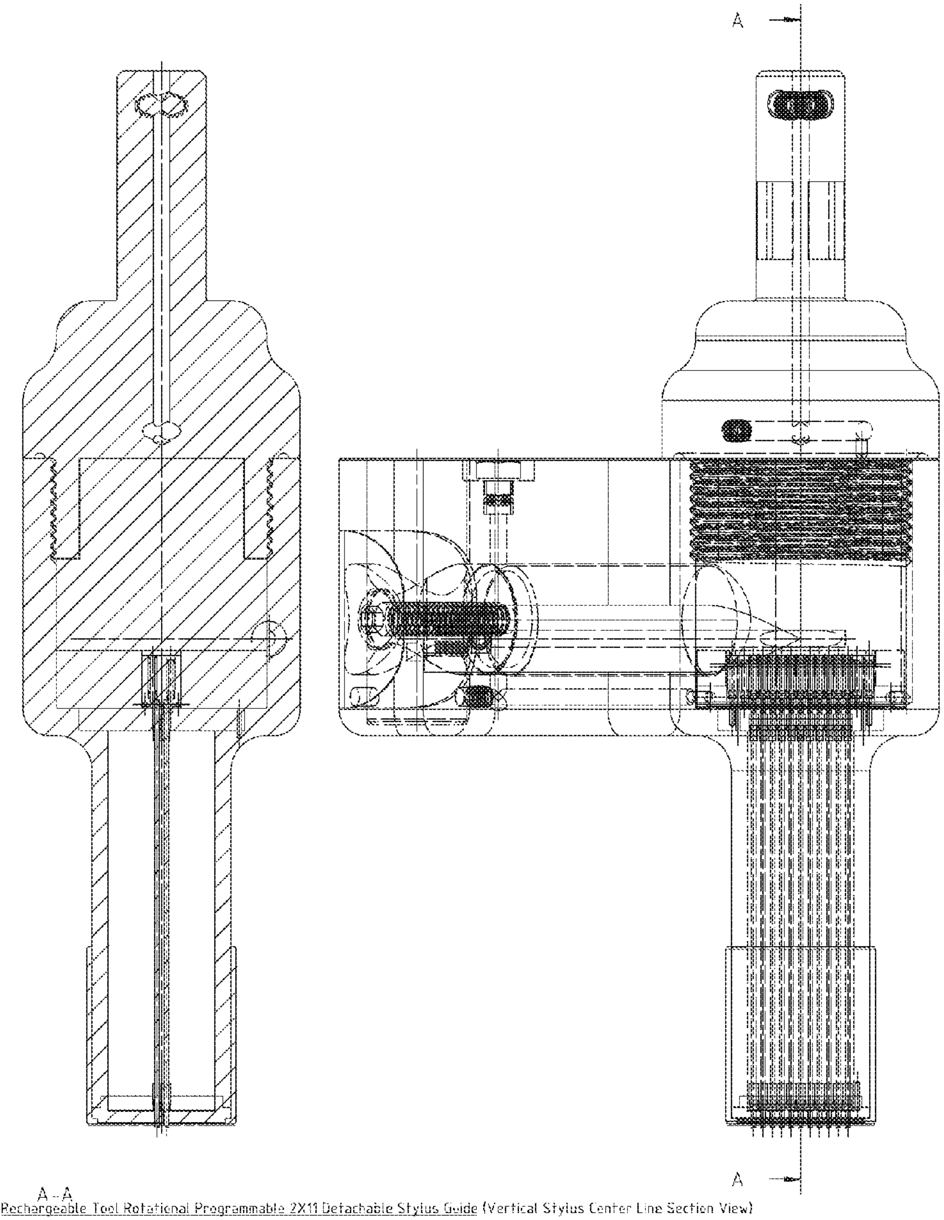
Figure 145:
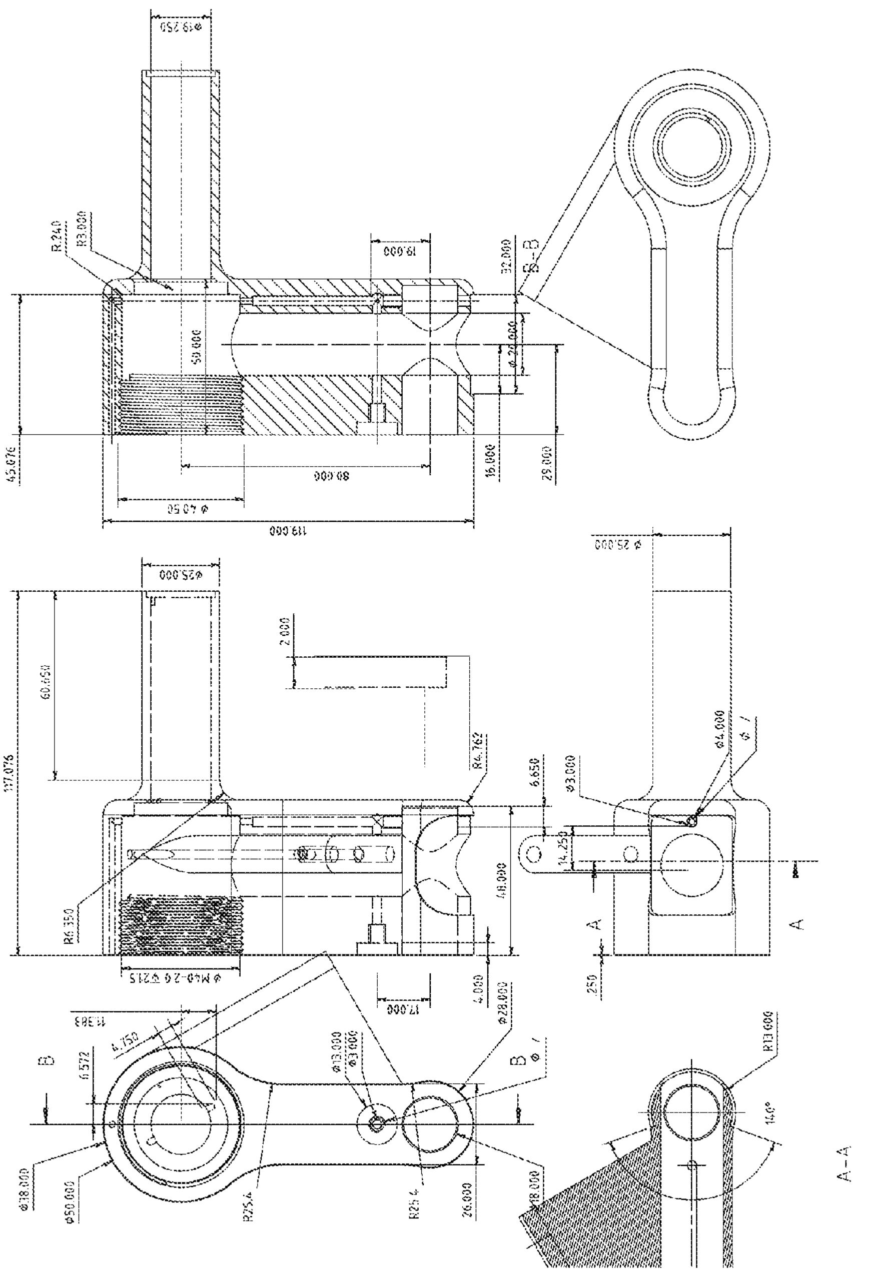

FIGS. 142 through 144 are the orthogonal views of FIG. 139 and FIG. 145 are for the internal specific fabricated component for FIG. 139 with its corresponding bill of material listed in FIG. 146.

FIG. 147-154 for the contact and wireless communication of the rotationally secure tool being operated by a system rechargeable battery.

Figure 147:
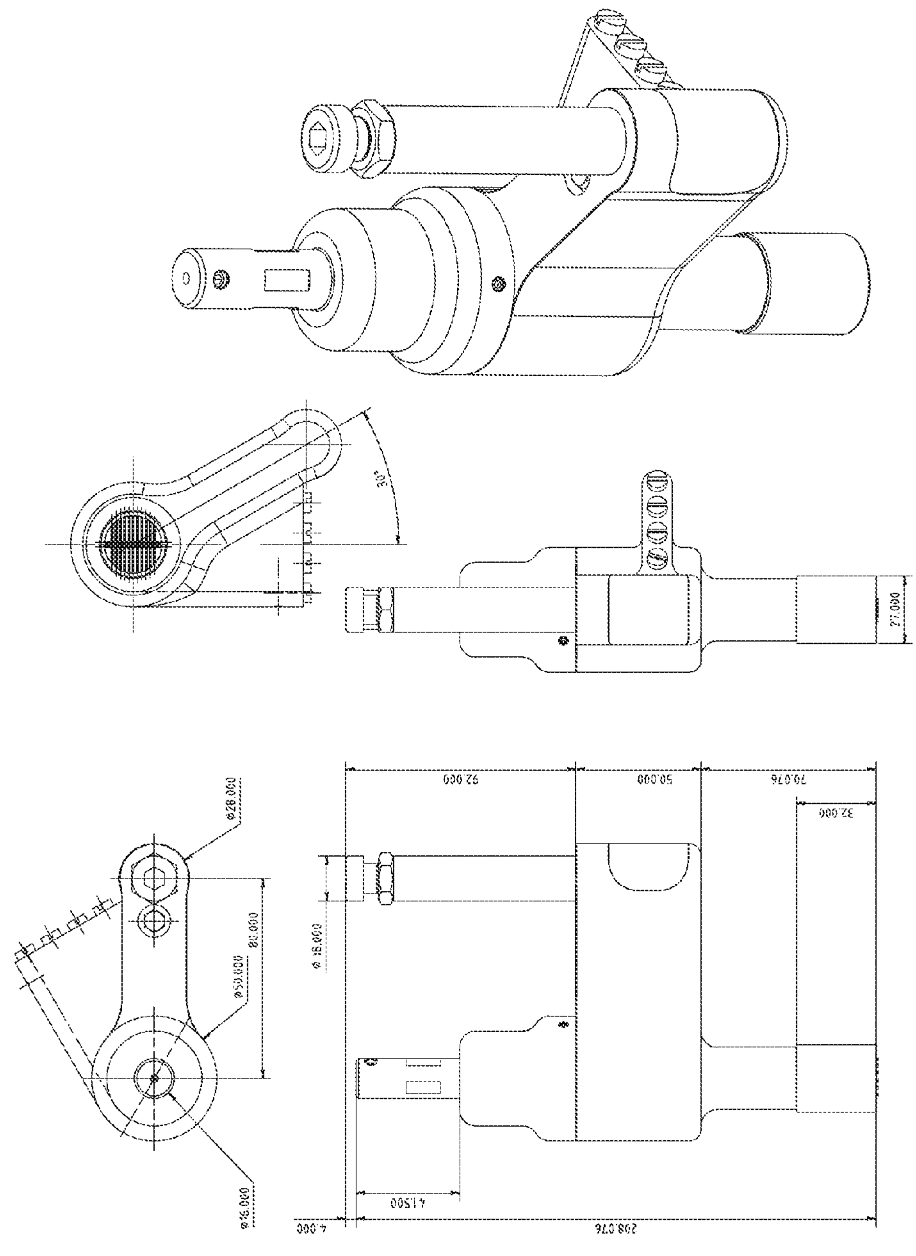

FIG. 147 shows the orthogonal and isometric views for the assembled rechargeable wireless and or contact programmable 2×11 detachable stylus guide engraving tool where the engraving tool's Ø16 mm mounting shaft is operably connected to the machine tool's rotatable spindle having the Ø18 mm rotational stop being operably connected to the machine tool's non-rotating spindle face mounted adapter.

Figure 148:
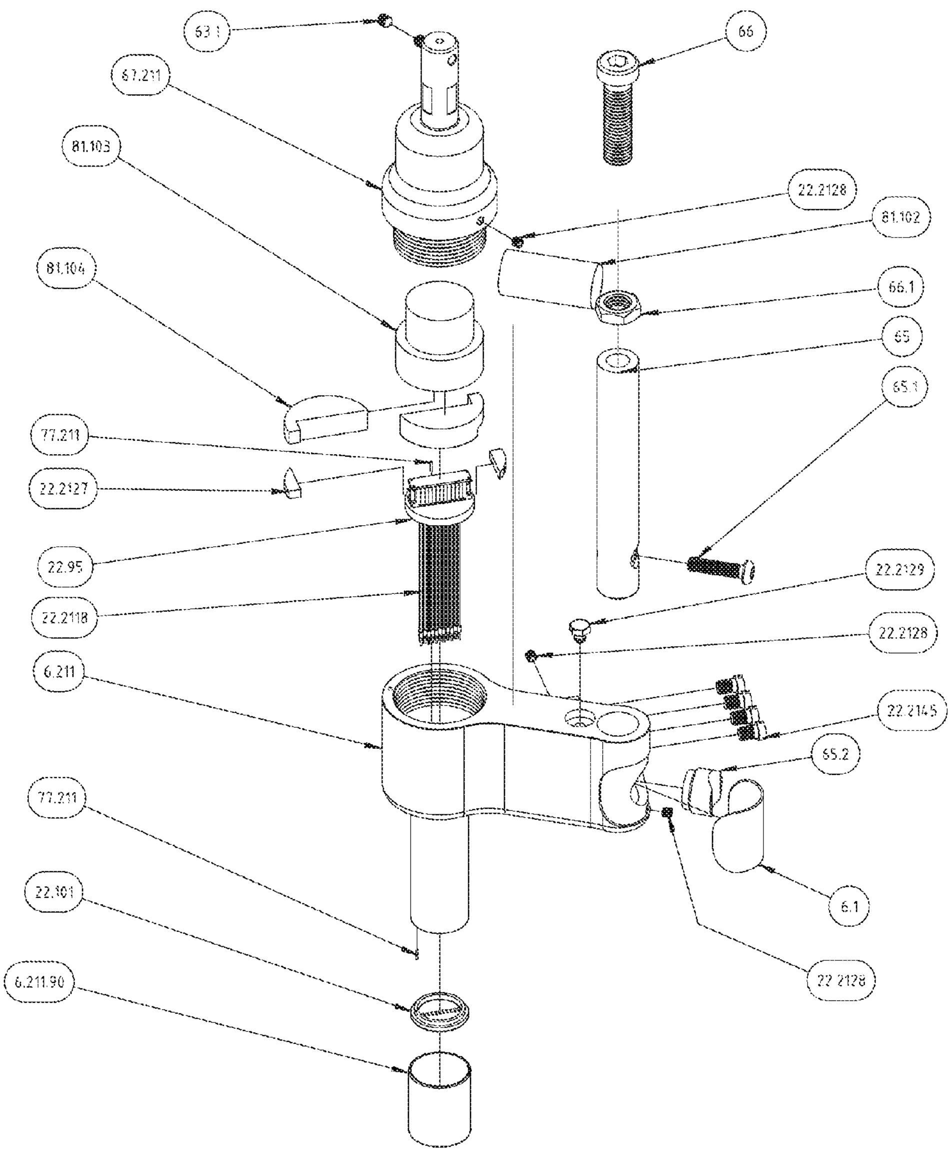
Figure 149:
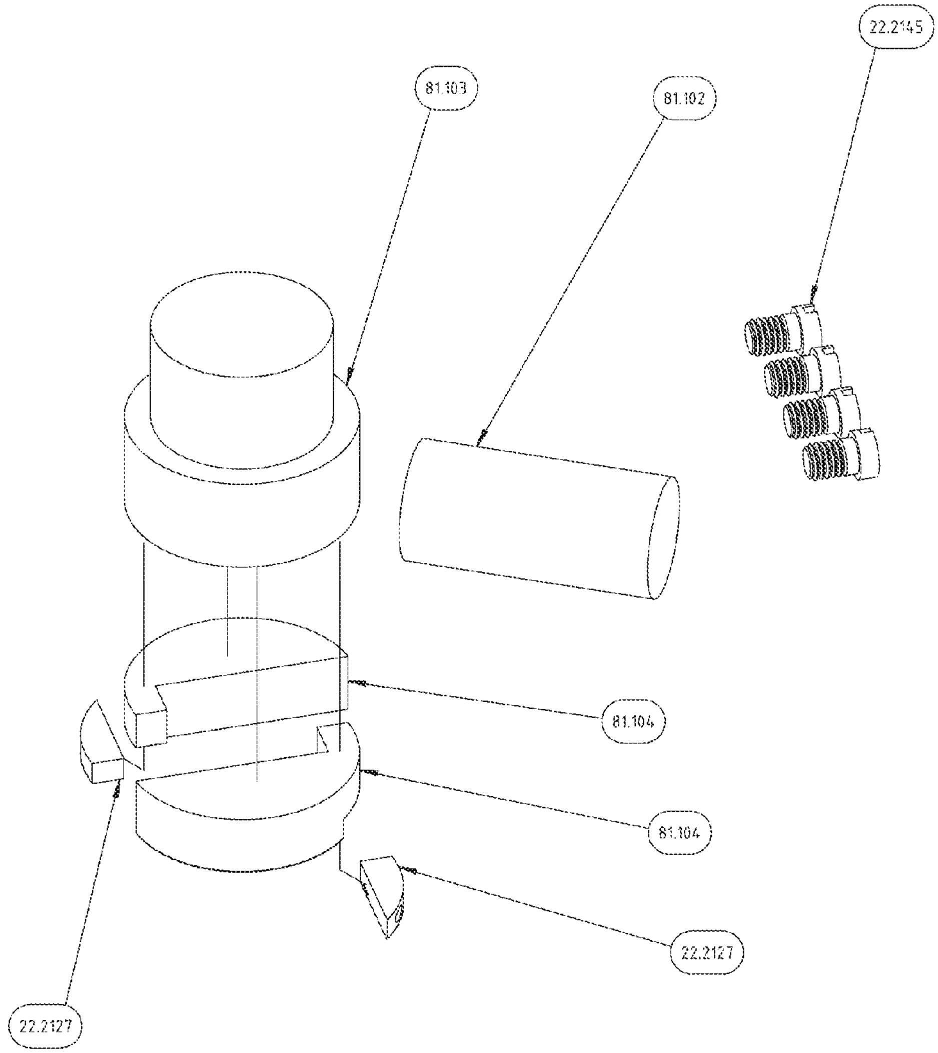

FIG. 148 is the exploded parts isometric view of the rechargeable wireless and or contact programmable 2×11 detachable stylus guide engraving tool having the main body 6.211 enclosing the selectable stylus activation module 22.95 as described in FIGS. 52 through 59 being operably connected and controlled via a wireless means as described in FIGS. 61 through 64 and or contact programmable means as described in the engraving tool as shown in FIG. 99 having the engraving tool's internal selective stylus pneumatic valve activation solenoid modules 81.104 being connected to the wireless control module 81.103 while being powered by an internal battery 81.102 as shown in FIG. 149 that is rechargeable via contacts 22.2145.

Figure 150:
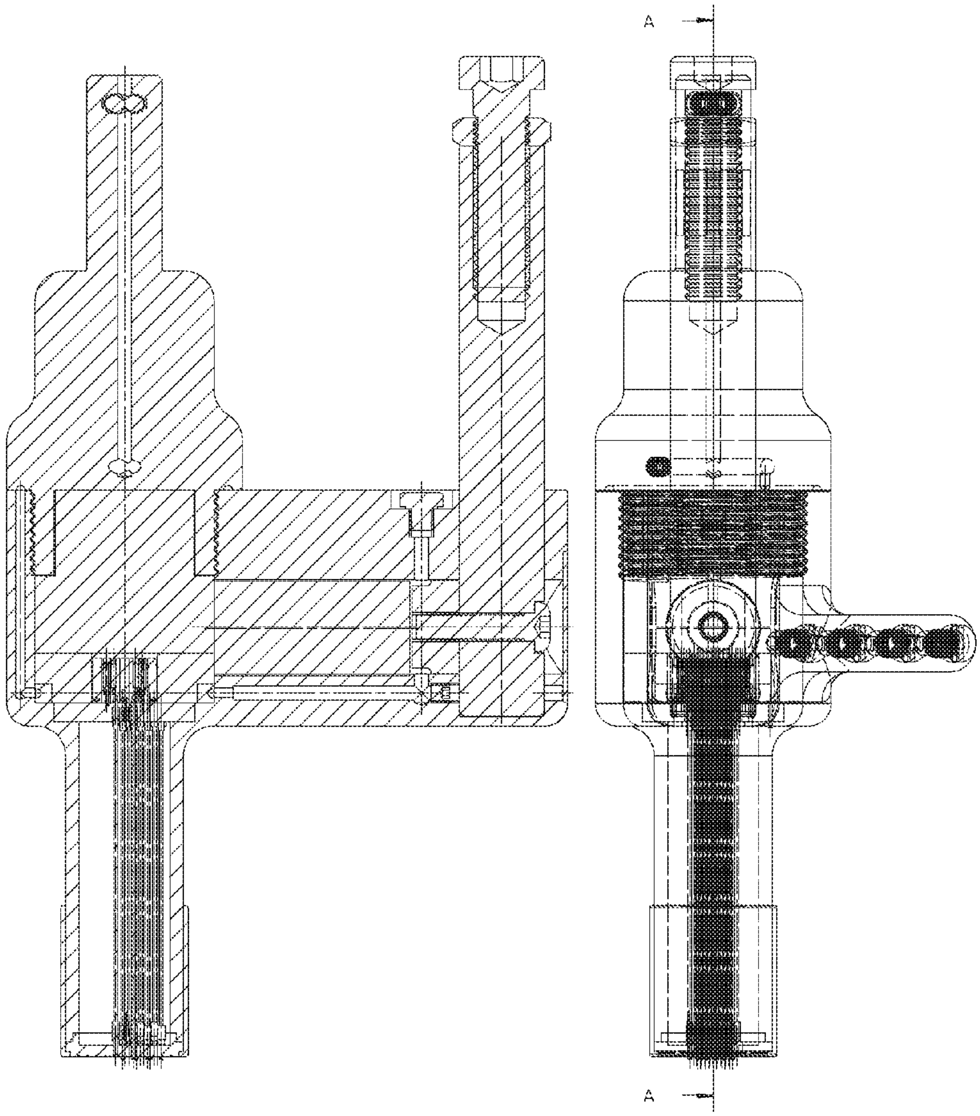
Figure 151:
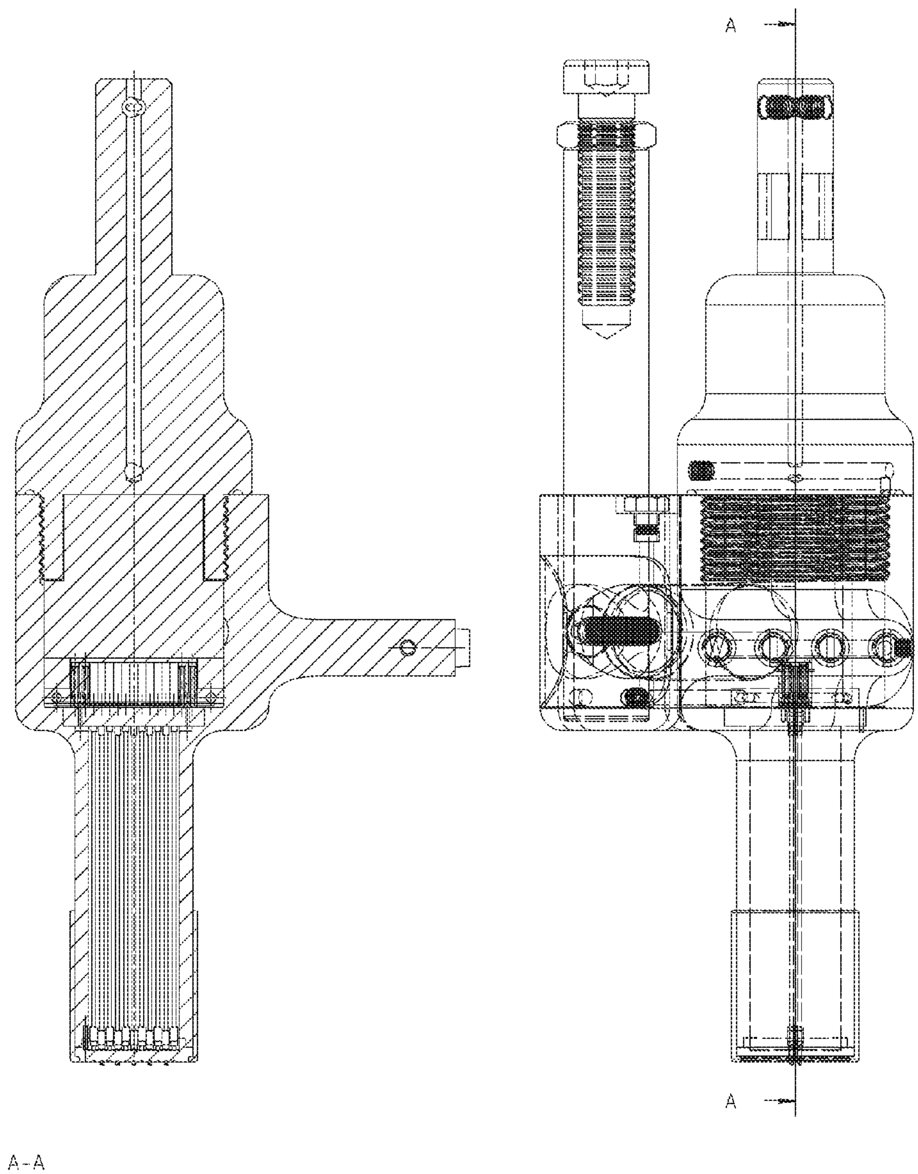
Figure 152:
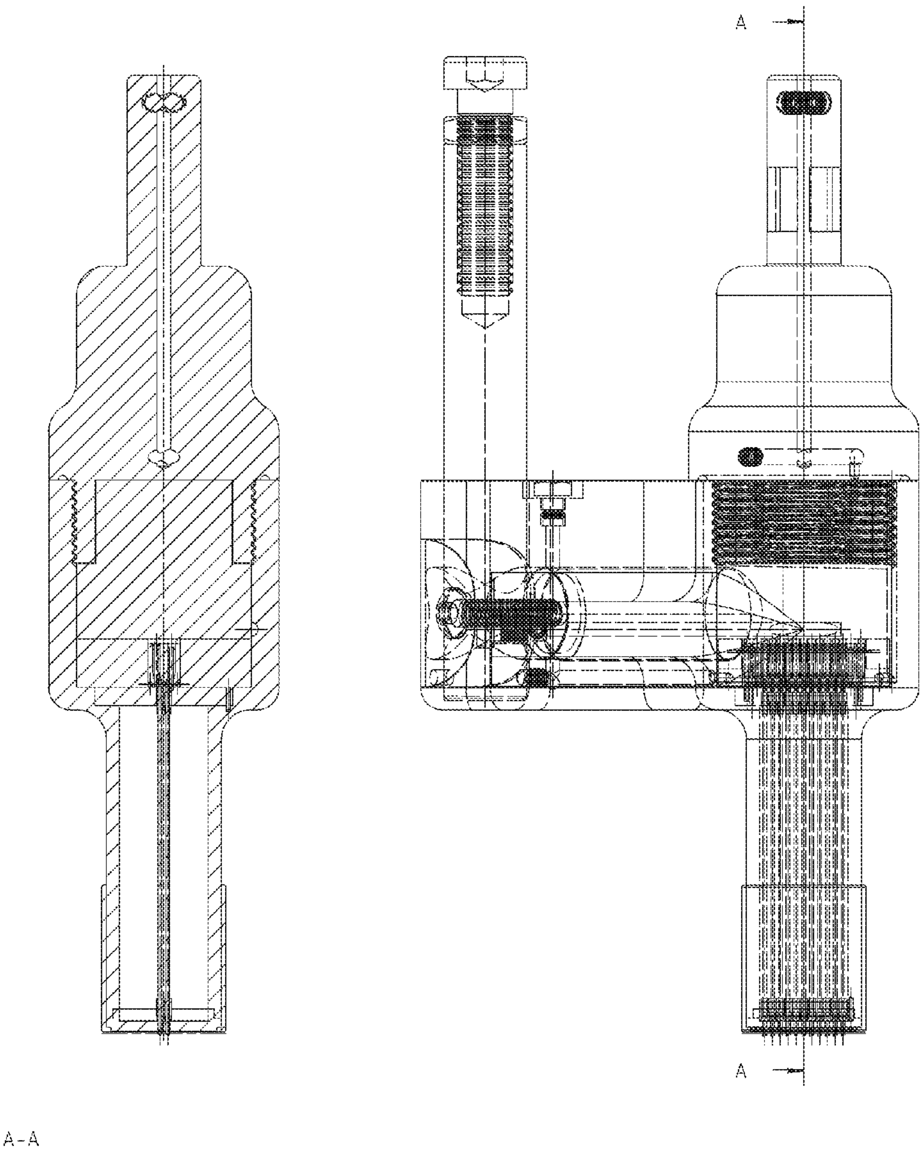
Figure 153:
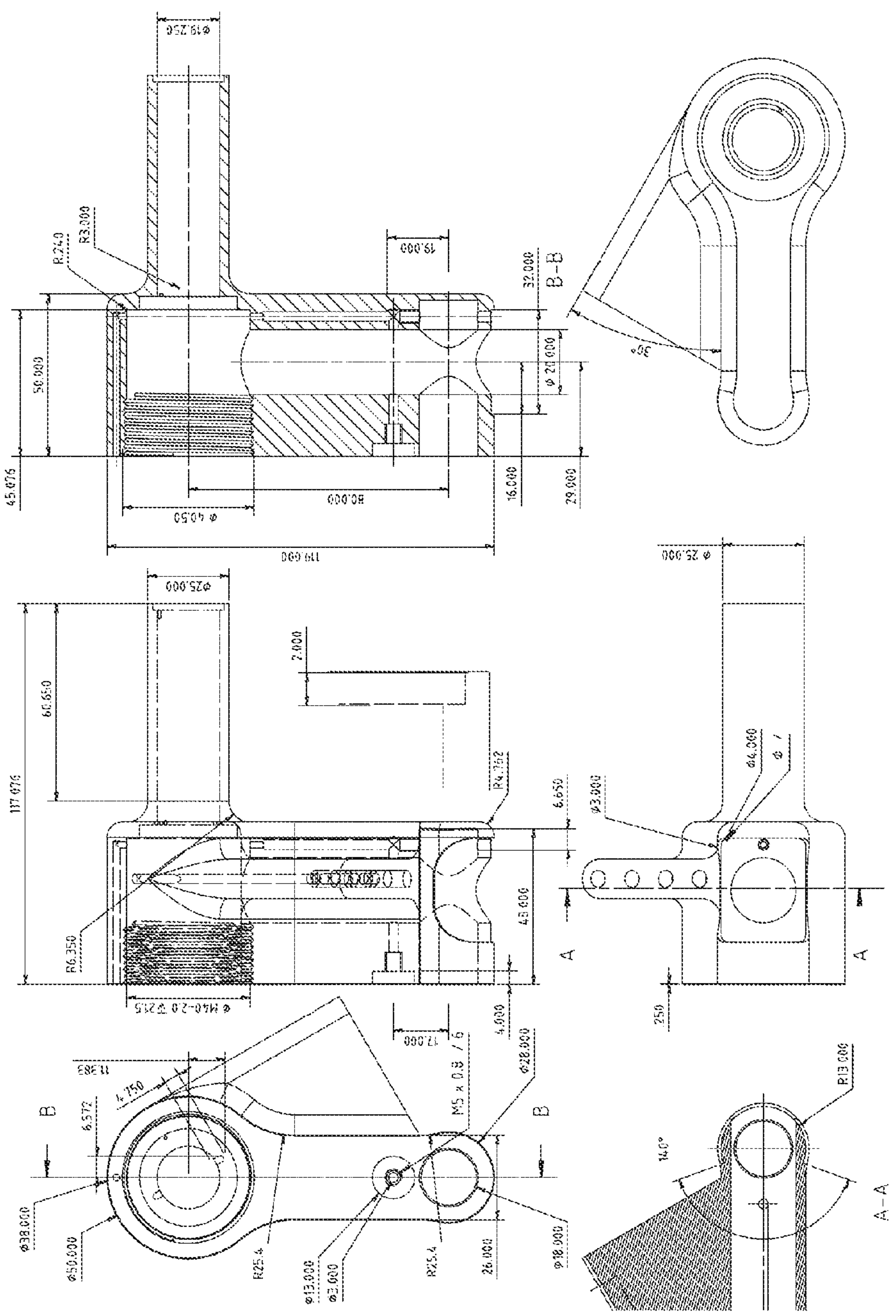

FIG. 150 through 152 are the orthogonal views of FIG. 147 and FIG. 153 are for the internal specific fabricated component for FIG. 147 with its corresponding bill of material listed in FIG. 154.

FIG. 155-162 for the contact and optical communication of the rotationally secure tool being operated by a system rechargeable battery.

Figure 155:
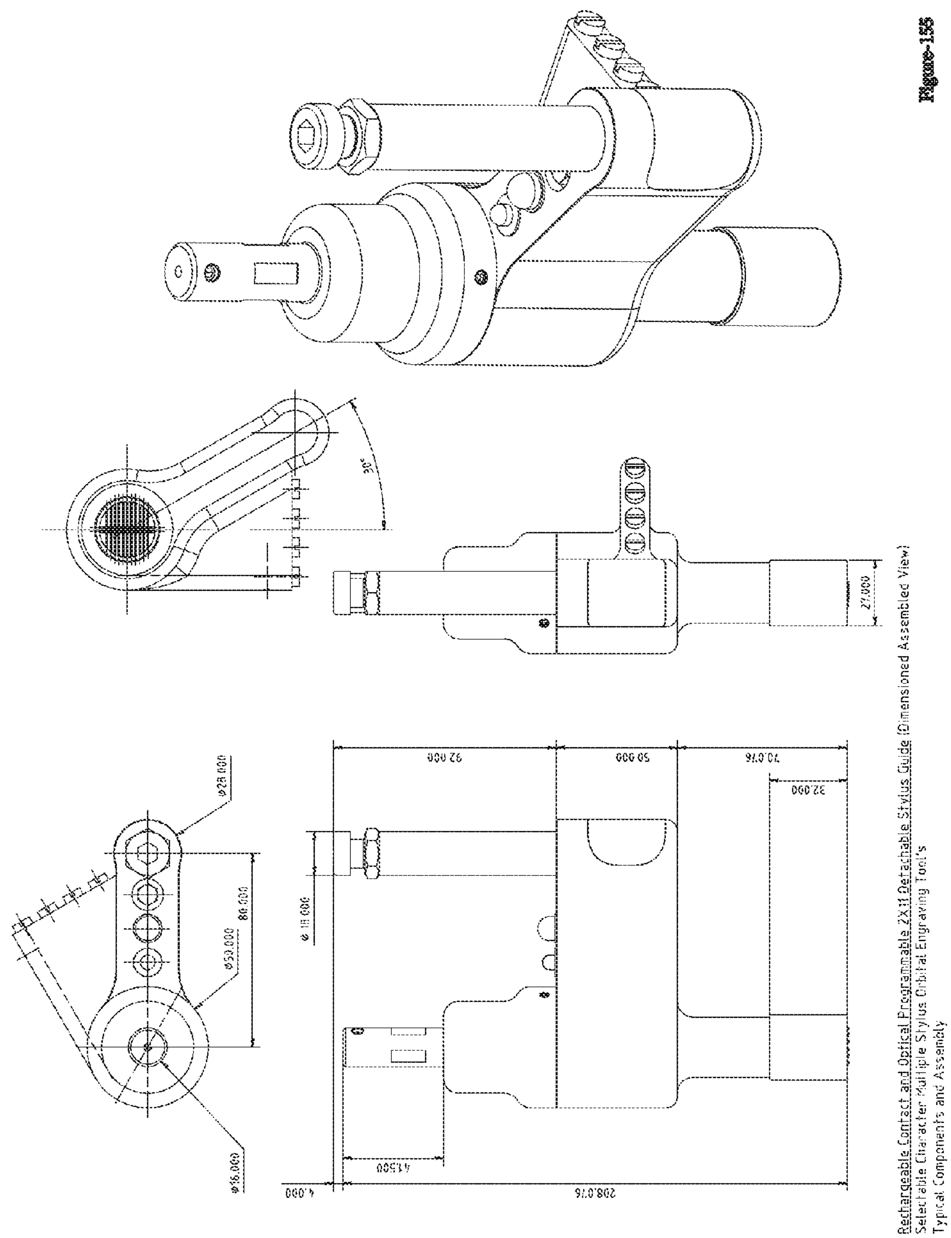

FIG. 155 shows the orthogonal and isometric views for the assembled rechargeable battery powered optically and or contact programmable 2×11 detachable stylus guide engraving tool where the engraving tool's Ø16 mm mounting shaft is operably connected to the machine tool's spindle having the Ø18 mm rotational stop being operably connected to the machine tool's non-rotating spindle face mounted adapter.

Figure 156:
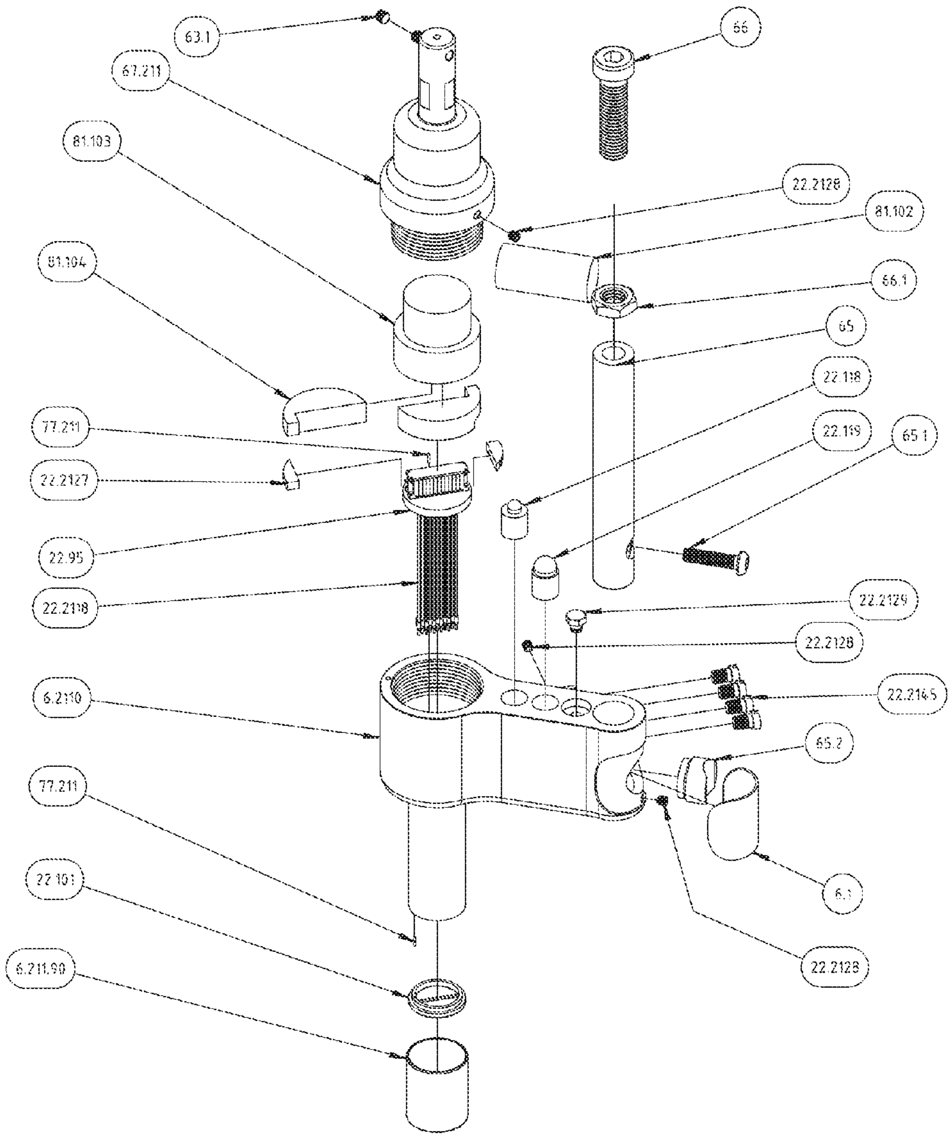
Figure 157:
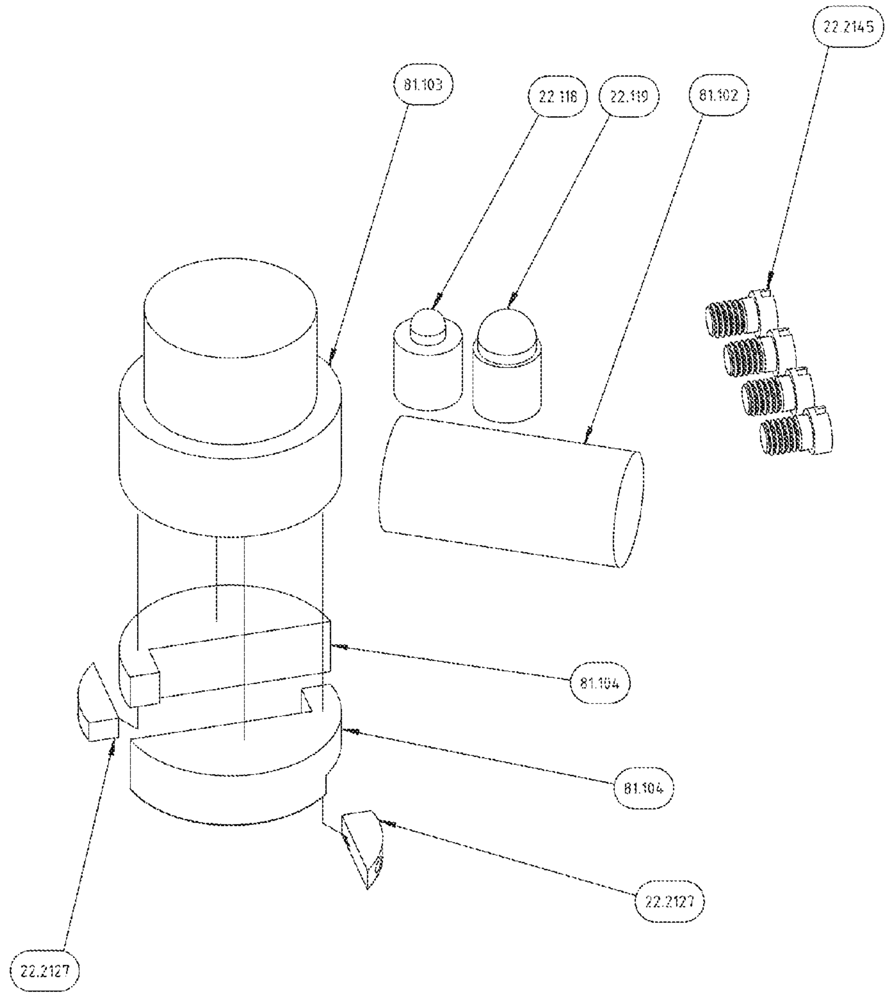

FIG. 156 is the exploded parts isometric view of the battery powered optically and or contact programmable 2×11 detachable stylus guide engraving tool having the main body 6.2110 enclosing the selectable stylus activation module 81.103 that receives its stylus selection commands optically via its IR receiver 22.119 and its corresponding acknowledgment via IR emitter 22.118 to the main control system via the equivalent of IR communications for the equivalent wireless control means as shown in FIGS. 61 through 64 while being mounted to the machine tool's spindle via shaft 67.211 having the having the engraving tool's internal selective stylus pneumatic valve activation solenoid modules 81.104 being connected to the control module 81.103 while being powered by an internal battery 81.102 as shown in FIG. 157 that is rechargeable and programmable via contacts 22.2145.

Figure 158:
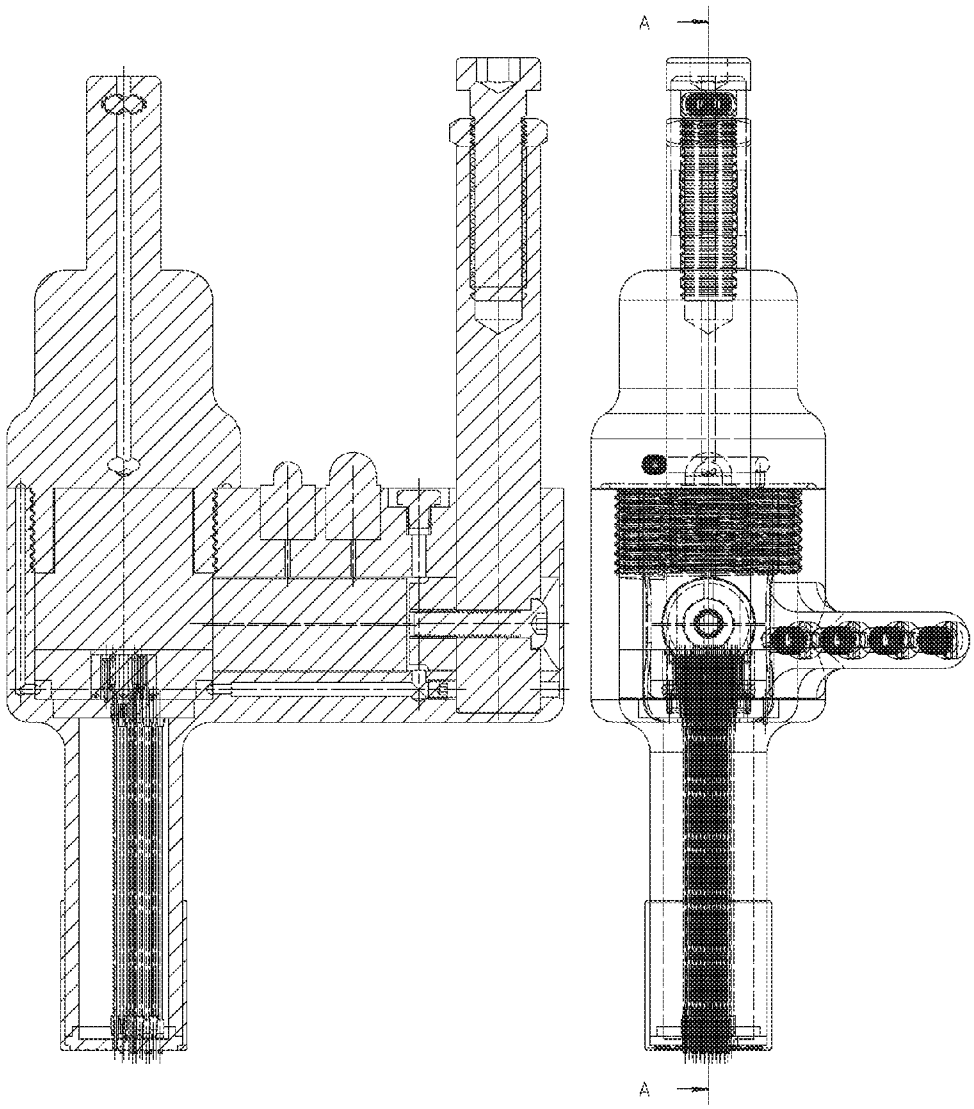
Figure 159:
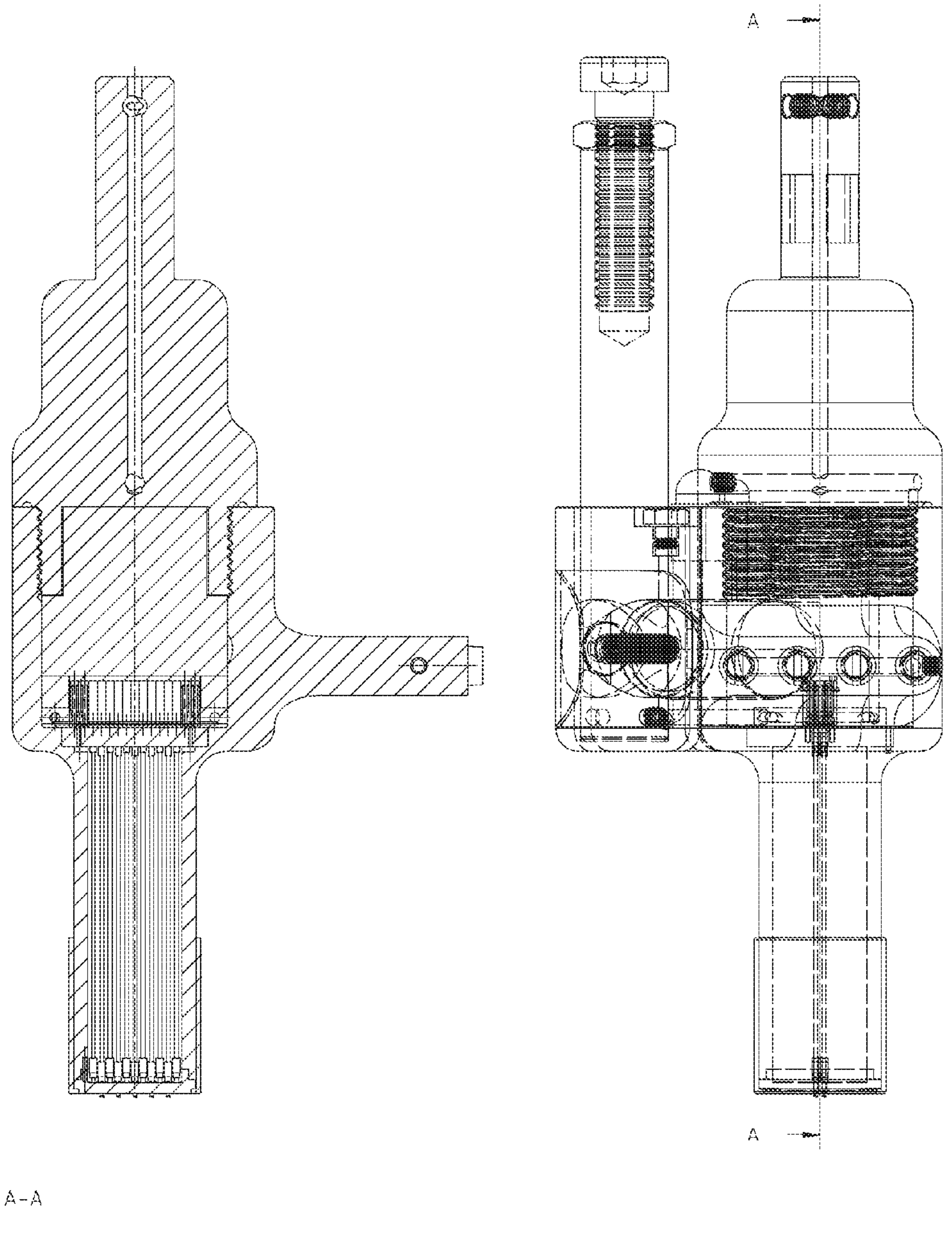
Figure 160:
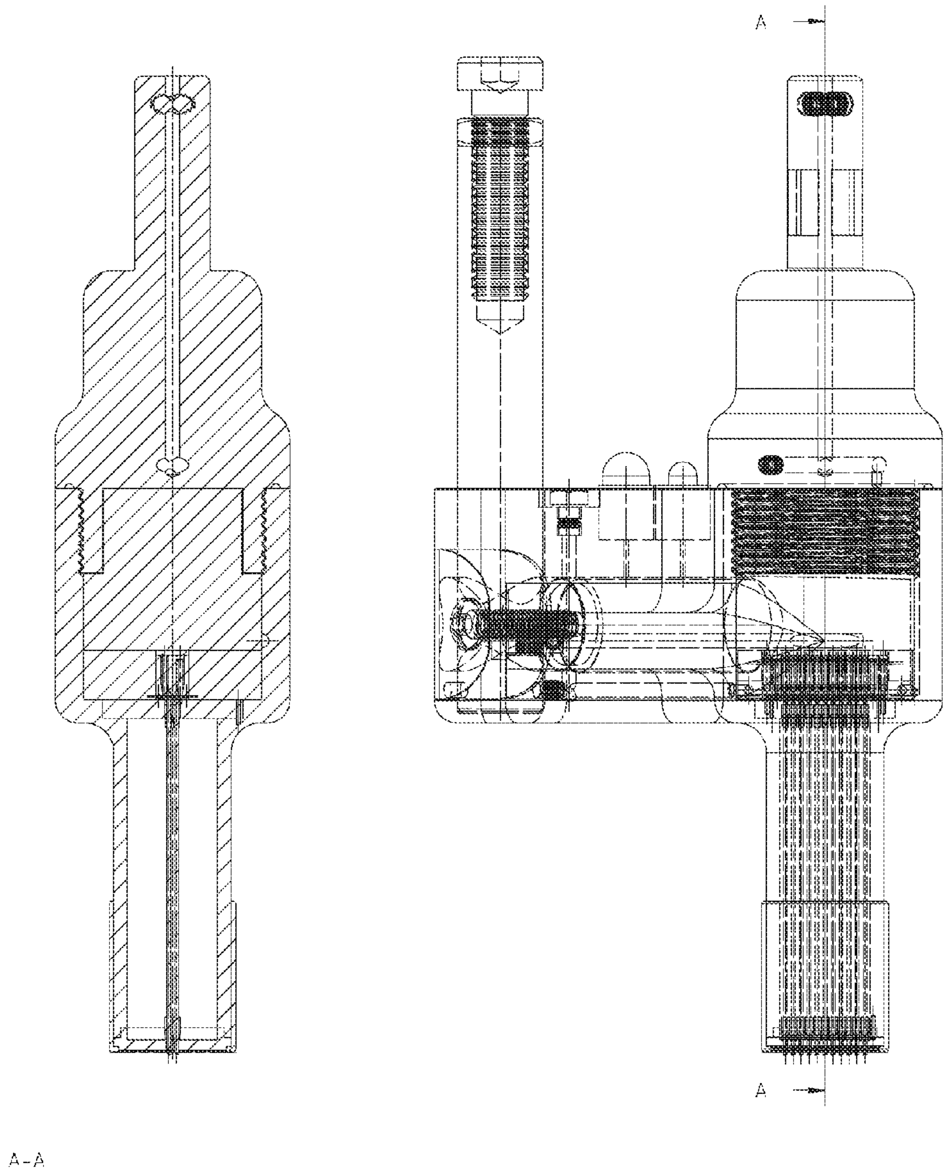
Figure 161:
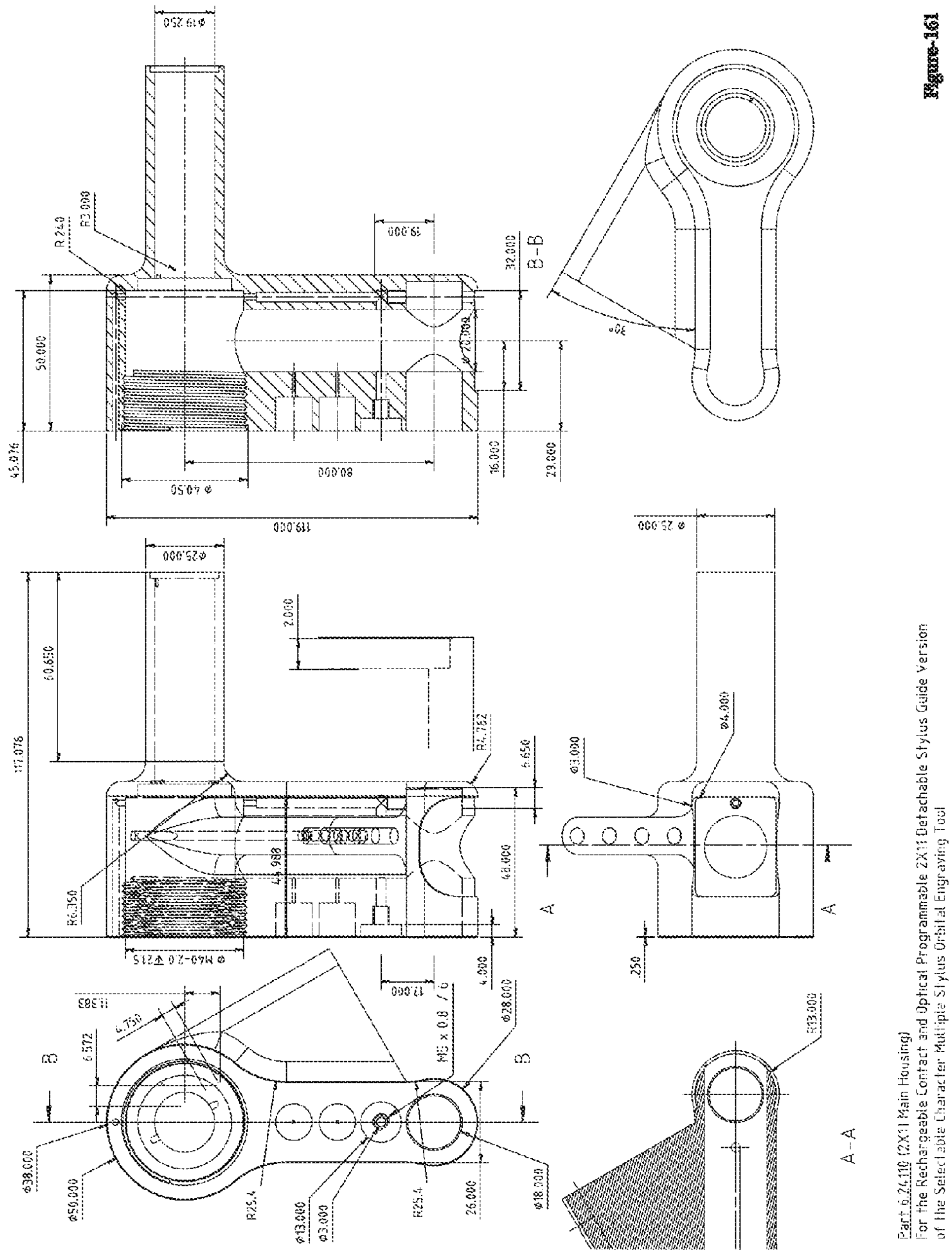

FIG. 158 through 160 are the orthogonal views of FIG. 155 and FIG. 161 are for the internal specific fabricated component for FIG. 155 with its corresponding bill of material listed in FIG. 162.

Optionally, the Selectable Character Multiple Stylus Orbital Engraving Tool can be implemented as a stand-alone reliable, high speed, cost effective, and simplified work-piece part engraving device, for those applications that do not require the capabilities of an expensive and complex CNC Machine Tool for engraving human and machine readable characters and graphic symbols.

The Selectable Character Multiple Stylus Orbital Engraving Tool is adaptable for additional applications and is not limited in that:

a. The Selectable Character Multiple Stylus Orbital Engraving Tool can have other means to operatively select the individual styluses.
b. The Selectable Character Multiple Stylus Orbital Engraving Tool can have other means for the operatively coupled orbital motion.
c. Multiple Selectable Character Multiple Stylus Orbital Engraving Tools can be coupled into an arrangement of multiple tools for the simultaneous engraving of multiple characters.
d. The Selectable Character Multiple Stylus Orbital Engraving Tool can be configured for engraving on an angled planar, and or, round surface.
e. The Selectable Character Multiple Stylus Orbital Engraving Tool can be configured for the quick changing of the styluses.
f. The Selectable Character Multiple Stylus Orbital Engraving Tool can have a combination of styluses having unique notch and or projection features on the leading cutting edge land(s) to provide a more unique and identifiable engraved character having encoded data for improving the identification and traceability of manufactured work-piece parts/articles.
g. The drilling stylus having a unique notch and or projection features on the leading cutting edge land to provide a more unique and identifiable engraved character having encoded data for improving the identification of manufactured work-piece parts/articles.
h. The Selectable Character Multiple Stylus Orbital Engraving Tool can be configured for a restricted and controlled stylus change operation to maintain the integrity of the traceability/counterfeit detection means for styluses having unique notch and or projection features on the leading cutting edge land(s) that would machine the encoded data for improving the identification of manufactured work-piece parts/articles.

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

What is claimed is:

1. A selectable symbol engraving tool for use with a computer numerical controlled (CNC) machine, comprising:
- a housing;
- an array of styluses supported in the housing, each stylus moveable between a retracted position and an extended position; and
- a pattern disk rotatably supported in the housing and connectable to a spindle of the CNC machine, wherein the pattern disk includes a plurality of hole patterns, each selectable via rotation of the spindle and including one or more clearance holes corresponding to a symbol;
- wherein the array of styluses is positioned to confront a selected one of the plurality of hole patterns such that styluses corresponding to the clearance holes are retracted and the remaining styluses are extended and operative to engrave the symbol corresponding to the selected hole pattern in a work piece.

2. The selectable symbol engraving tool of claim 1, further comprising an anti-rotation post radially offset from the pattern disk and attached to the housing, wherein the anti-rotation post is connectable to a spindle-nose of the CNC machine.

3. The selectable symbol engraving tool of claim 1, further comprising a detent plunger mated to the pattern disk.

4. The selectable symbol engraving tool of claim 1, wherein each stylus includes a retraction collar and wherein the pattern disk includes a pneumatic passage connectable to the CNC machine to provide pressurized air to the retraction collar.

5. The selectable symbol engraving tool of claim 1, wherein each stylus is rotatably supported in the housing and operative to drill into a work piece via orbiting about a virtual axis of rotation when the selectable character engraving tool is moved in a circular motion by the CNC machine.

6. The selectable symbol engraving tool of claim 1, wherein the pattern disk includes a plurality of stylus bearings and corresponding compliance members.

7. A selectable symbol engraving tool for use with a CNC machine, comprising:
- a housing;
- an array of styluses supported in the housing, each stylus moveable between a retracted position and an extended position; and
- a pattern disk rotatably supported in the housing and connectable to a spindle of the CNC machine, wherein the pattern disk includes a plurality of hole patterns, each selectable via rotation of the spindle and including one or more clearance holes corresponding to a symbol;
- wherein the array of styluses is positioned to confront a selected one of the plurality of hole patterns such that styluses corresponding to the clearance holes are retracted and the remaining styluses are extended and operative to engrave the symbol corresponding to the selected hole pattern in a work piece;
- an anti-rotation post radially offset from the pattern disk and attached to the housing, wherein the anti-rotation post is connectable to a spindle-nose of the CNC machine;
- wherein each stylus is rotatably supported in the housing and operative to drill into a work piece via orbiting about a virtual axis of rotation when the selectable character engraving tool is moved in a circular motion by the CNC machine.

8. The selectable symbol engraving tool of claim 7, further comprising a detent plunger mated to the pattern disk.

9. The selectable symbol engraving tool of claim 7, wherein each stylus includes a retraction collar and wherein the pattern disk includes a pneumatic passage connectable to the CNC machine to provide pressurized air to the retraction collar.

10. The selectable symbol engraving tool of claim 7, wherein the pattern disk includes a plurality of stylus bearings and corresponding compliance members.

11. A method for engraving a selected symbol into a work piece with a CNC machine, the method comprising:
- supporting an array of styluses on the spindle-nose of the CNC machine;
- selecting a plurality of active styluses corresponding to the selected symbol from the array of styluses;
- extending the plurality of active styluses;
- moving the spindle-nose toward the work piece causing the plurality of active styluses to contact the work piece;
- moving the spindle-nose in a circular motion thereby causing the plurality of active styluses to orbit about a virtual axis of rotation; and
- urging the styluses toward the pattern disk, wherein the pattern disk includes a plurality of hole patterns, each selectable via rotation of the spindle and including one or more clearance holes corresponding to a symbol and wherein the array of styluses is positioned to confront a selected one of the plurality of hole patterns such that styluses corresponding to the clearance holes are retracted and the plurality of active styluses are extended and operative to engrave the selected symbol corresponding to the selected hole pattern in the work piece.

12. The method of claim 11, further comprising preventing rotation of the array of styluses with respect to the spindle-nose.

13. The method of claim 11, wherein selecting the plurality of active styluses comprises rotating a pattern disk with a spindle of the CNC machine.

* * * * *